(12) United States Patent (10) Patent No.: US 8,165,385 B2
Reeves et al. (45) Date of Patent: Apr. 24, 2012

(54) SYSTEM AND METHOD FOR THREE-DIMENSIONAL IMAGE RENDERING AND ANALYSIS

(75) Inventors: Anthony P. Reeves, Ithaca, NY (US); William J. Kostis, Warren, NJ (US); Claudia Henschke, New York, NY (US); David Yankelevitz, Brooklyn, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 1153 days.

(21) Appl. No.: 11/827,985

(22) Filed: Jul. 13, 2007

(65) Prior Publication Data
US 2008/0002873 A1 Jan. 3, 2008

Related U.S. Application Data

(62) Division of application No. 10/257,064, filed on Mar. 24, 2003, now Pat. No. 7,274,810.

(51) Int. Cl.
*G06K 9/00* (2006.01)
(52) U.S. Cl. ............... 382/154; 382/128; 382/134
(58) Field of Classification Search .......... 382/128–134, 382/154
See application file for complete search history.

(56) References Cited

U.S. PATENT DOCUMENTS

| | | | |
|---|---|---|---|
| 5,228,443 A | 7/1993 | Tatar | |
| 5,283,837 A | 2/1994 | Wood | |
| 5,289,374 A | 2/1994 | Doi et al. | |
| 5,351,067 A | 9/1994 | Lumelsky et al. | |
| 5,666,434 A | 9/1997 | Nishikawa et al. | |
| 5,712,926 A | 1/1998 | Eberhard et al. | |
| 5,825,936 A | 10/1998 | Clarke et al. | |
| 5,877,771 A | 3/1999 | Drebin et al. | |
| 5,987,094 A * | 11/1999 | Clarke et al. | 378/62 |
| 6,205,350 B1 | 3/2001 | Lorenz et al. | |
| 6,263,093 B1 * | 7/2001 | Mochizuki | 382/128 |
| 6,483,507 B2 * | 11/2002 | Osborne et al. | 345/419 |

FOREIGN PATENT DOCUMENTS
WO 01-78005 10/2001

OTHER PUBLICATIONS

Blackenberg, et al., "The Influence of Volumetric Tumor Doubling Time, DNA Ploidy, and Histologic Grade on the Survival of Patients with Intracranial Astrocytomas", *AJNR:16*, pp. 1001-1012 (May 1995).
Breiman, et al. "Volume Determinations Using Computed Tomography", *AJR:138*, pp. 329-333 (Feb. 1982).
Weiss, William, "Implications of Tumor Growth Rate for the Natural History of Lung Cancer", *Journal of Occupational Medicine*, vol. 26, No. 5, pp. 345-352 (May 1984).

(Continued)

*Primary Examiner* — Wesley Tucker
(74) *Attorney, Agent, or Firm* — Hoffmann & Baron, LLP

(57) ABSTRACT

The present invention relates to methods and systems for conducting three-dimensional image analysis and diagnosis and possible treatment relating thereto. The invention includes methods of handling signals containing information (data) relating to three-dimensional representation of objects scanned by a scanning medium. The invention also includes methods of making and analyzing volumetric measurements and changes in volumetric measurements which can be used for the purpose of diagnosis and treatment.

41 Claims, 44 Drawing Sheets

OTHER PUBLICATIONS

Author: Z.-H. Cho, J. P. Jones, and M. Singh. *Foundations of Medical Imaging*. John Wiley and Sons Inc.; Title: "X-Ray Computerized Tomography", pp. 148-164; Date of Publication: 1993; Place of Publication: U.S.

Author: A. K. Jain; Title: "Fundamentals of Digital Image Processing", Prentice Hall, Englewood Cliffs, NJ; pp. 384-389; Date of Publication: 1989; Place of Publication: U.S.

Author: S. N. Reske, R. Bares, U. Bull, A. Guhlmann. E. Moser, and M. F. Wannenmacher; Title: "[Clinical value of positron emission tomography (PET) in oncologic questions: results of an interdisciplinary consensus conference. Schirmerreschaft der Deutschen Gesellschaft for Nuklearmedizin.]" (Summary in English is provided on p. 42); *Nuklearmedizin*, 35(2):42-52; Date of Publication: Apr. 1996; Place of Publication: Germany.

Author: M. D. Seemann, T. Beinert, F. Spelsberg, B. Obst, H. Dienemann, U. Fink, P. Kohz, and M. Reiser; Title: "Differentiation of solitary pulmonary coin lesions by high-resolution computerized tomography" (Summary in English provided on p. 580); *Radiology*, 36(7):579-585; Date of Publication: Jul. 1996; Place of Publication: Germany.

Author: J. Serra; *Image analysis and mathematical morphology*.; pp. 34-92; Academic Press, London; Date of Publication: 1982; Place of Publication: London.

Author: J. Serra; Title: "Introduction to Morphological Filters"; *Image analysis and mathematical morphology*; vol. 2: *Theoretical advances*, pp. 101-114; Academic Press, London; Date of Publication: 1988; Place of Publication: London.

Author: S. W. Tamarkim; Title: "Spiral computed tomography and computed tomographic angiography"; In J. R. Haaga, C. F. Lanzieri, D. J. Sartoris, and E. A. Zehrouni, editors, *Computed tomography and magnetic resonance imaging of the whole body*. Mosby; pp. 1694-1706; Date of Publication: 1994; Place of Publication: U.S.

Author: W. Press; Title: "Numerical Recipes in C"; $2^{nd}$ Edition, Cambridge University Press; pp. 402-420; Date of Publication: 1992; Place of Publication: unknown.

Author: M.S. Brown, M.F. McNitt-Gray, J.G. Goldin and D.R. Aberle; Title: "Model-based segmentation architecture for lung nodule detection in CT"; *RSNA 2000 annual meeting*.

Author: S.G. Erberich, K.S. Song, H. Arakawa, H.K. Huang, R. Webb, K.S. Hoo, B.W. Loo; Title: "Knowledge-based lung nodule detection from helical CT" (Text of Publication only as Figures are not available); *RSNA 1997 annual meeting*.

Author: K. Kanazawa, M. Kubo, N. Niki, H. Satoh, H. Ohmatsu, K. Eguchi, N. Moriyama; Title: "Computer Assisted Diagnosis of Lung Cancer Using Helical X-ray CT"; *Proceedings of ICPR*, pp. 381-385; Date of Publication: 1996; Place of Publication: U.S.

Author: N. Otsu; Title: "A threshold selection method from gray-level histograms"; IEEE Trans. Systems Man Cybernet, 9(1), pp. 62-66; Date of Publication: 1979; Place of Publication: Japan.

Author: C.L. Novak, D.P. Naidich, L. Fan, J. Qian, J.P. Ko, A.N. Rubinowitz; Title: "Improving Radiologists' Confidence of Interpreting Low-dose Multidetector Lung CT screening Studies Using an Interactive CAD system"; Scientific paper presentation, RSNA $87^{th}$ scientific assembly and annual meeting, Nov. 25-30, 2001.

Author: S. G. Armato, III, F. Li, M.L. Giger; Title: "Performance of Automated CT Lung Nodule Detection on Missed Cancers"; scientific paper presentation, RSNA $87^{th}$ scientific assembly and annual meeting, Nov. 25-30, 2001.

Author: S.H. Heywang-Koebrunner, B. Lommatzsch, et al.; Title: "Comparison of spiral and conventional CT in the detection of pulmonary nodules(abstract)"; *Radiology, RSNA 1992 annual meeting*.

Author: M.K. Gurcan, N. Petrick, B. Sahiner, H.P. Chan, P.N. Cascade, E.A. Kazerooni, L.M. Hadjiiski; Title: "Computerized lung nodule detection on thoracic CT images: combined rule-based and statistical classifier for false positive reduction"; *SPIE*, vol. 4322, pp. 686-692; Date of Publication: 2001; Place of Publication: U.S.

Author: O. Karacan, O.A. Ibis, S. Akcay, O. Akkoca, F.O. Eyuboglu, and M. Coskun; Title: "Chest readiography and the solitary pulmonary nodule"; *Journal of Radiology*; Date of Publication: 2002; Place of Publication: unknown.

Author: A. Akanuma; Title: "Clinical method to estimate time of origin and maximum volume of malignant tumors"; *Radiation Medicine*, 1(1):89-104; Publication: Jan.-Mar. 1983; Place of Publication: Japan.

Author: E. Arana, P. Delicado, and L. Marti-Bonmati.; Title: "Validation procedures in radiologic diagnostic models"; Neural network and logistic regression. *Investigative Radiology*, 34(10):636-642; Date of Publication: Oct. 1999; Place of Publication: Spain.

Author: S. G. Armato, III, M. L. Giger, K. Ashizawa, and H. MacMahon; Title: "Automated lung segmentation in digital lateral chest radiographs"; *Medical Physics*, 25(8):1507-1520; Date of Publication: Aug. 1998; Place of Publication: U.S.

Author: S. G. Armato, III, M. L. Giger, C. J. Moran, J. T. Blackburn, K. Doi, and H. MacMahon; Title: "Computerized detection of pulmonary nodules on CT scans"; *Radiographics*, 19(5):1303- 1311; Date of Publication: Sep.-Oct. 1999; Place of Publication: U.S.

Author: P. J. Besl and R. C. Jain; Title: "Invariant surface characteristics for 3D object recognition in range images"; *Computer Vision, Graphics, and Image Processing*, 33(1):33-80; Date of Publication: Jan. 1986; Place of Publication: U.S.

Author: R. N. Bracewell and S. J. Wernecke; Title: "Image reconstruction over a finite field of view"; *Journal of the Optical Society of America*, 65:1342-1346; Date of Publication: 1975; Place of Publication: U.S.

Author: M. S. Brown, M. F. McNitt-Gray, N. J. Mankovich, J. G. Goldin, J. Hiller, L. S. Wilson, and D. R. Aberle; Title: "Method for segmenting chest CT image data using an anatomical model: Preliminary results"; *IEEE Transactions on Medical Imaging*, 16(6):828-839; Date of Publication: Dec. 1997; Place of Publication: U.S.

Author: M. J. Carreira, D. Cabello, M. G. Penedo, and A. Mosquera; Title: "Computer-aided diagnoses: Automatic detection of lung nodules"; *Medical Physics*, 25(10):1998-2006; Date of Publication: Oct. 1998; Place of Publication: Spain.

Author: G. Cittadini Jr., R. Conzi, and G. Motta; Title: "Spiral computed tomography in the diagnosis and staging of bronchopulmonary carcinoma"; *Chir Ital*, 47(3):13-17; Date of Publication: 1995; Place of Publication:.

Author: J. Collins and E. J. Stern; Title: "Ground-glass opacity at CT: the ABCs" *AJR American Journal of Roentgenology*, 169(2):355-367; Date of Publication: Aug. 1997; Place of Publication: U.S.

Author: V. P. Collins, R. K. Loeffler, and H. Tivey; Title: "Observations on growth rates of human tumors"; *American Journal of Roentgenology*, 76:988-1000; Date of Publication: 1956; Place of Publication: U.S.

Author: ACR-NEMA Standards Committee. *Digital Imaging and Communications in Medicine (DICOM): Version 3.2*. Rosslyn, VA; Date of Publication: 1999; Place of Publication: U.S.

Author: A. M. Cormack.; Title: "Representation of a function by its line integrals with some radiological applications"; *Journal of Applied Physics*, 34:2722-2727; Date of Publication: 1963; Place of Publication: U.S.

Author: A. M. Cormack.; Title: "Representation of a function by its line integrals with some radiological applications II"; *Journal of Applied Physics*, 34:2908-2913; Date of Publication: 1964; Place of Publication: U.S.

Author: P. Croisille, M. Souto, M. Cova, S. Wood, Y. Afework, J. E. Kuhlman, and E. A. Zerhouni; Title: "Pulmonary nodules: Improved detection with vascular segmentation and extraction with spiral CT"; Work in progress. *Radiology*, 197(2):397-401; Date of Publication: Nov. 1995; Place of Publication: U.S.

Author: S. Dholakia and D. C. Rappaport; Title: "The solitary pulmonary nodule. Is it malignant or benign?"; *Postgraduate Medicine*, 99(2):246-250; Date of Publication: Feb. 1996; Place of Publication: U.S.

Author: C. E. Engeler, J. H. Tashjian, S. W. Trenkner, and J. W. Walsh; Title: "Ground-glass opacity of the lung parenchyma: a guide to analysis with high-resolution CT"; *AJR American Journal of Roentgenology*, 160(2):249-251; Date of Publication: Feb. 1993; Place of Publication: U.S.

Author: B. J. Flehinger. M. Kimmel, T. Polyak, and M. R. Melamed; Title: "Screening for lung cancer"; The Mayo Lung Project revisited. *Cancer*, 72(5):1573-1580; Date of Publication: Sep. 1, 1993; Place of Publication: U.S.

Author: R. S. Fontana, D. R. Sanderson, L. B. Woolner, W. F. Taylor, W. E. Miller, J. R. Muhm, P. E. Bernatz, W. S. Payne, P. C. Pairolero, and E. J. Bergstralh; Title: "Screening for lung cancer"; A critique of the Mayo Lung Project. *Cancer*, 67(4 (suppl.)):1155-1164; Date of Publication: Feb. 15 1991; Place of Publication: U.S.

Author: A. Van Gelder and J. Wilhelms; Title: "Topological considerations in isosurface generation"; *ACM Transactions on Graphics*, 13(4):337-375; Date of Publication: Oct. 1994; Place of Publication: U.S.

Author: M. L. Giger, K. T. Bae, and H. MacMahon; Title: "Computerized detection of pulmonary nodules in computed tomography images"; *Investigative Radiology*, 29(4):459-465; Date of Publication: Apr. 1994; Place of Publication: U.S.

Author: M. L. Giger, K. Doi, and H. MacMahon; Title: "Image feature analysis and computer-aided diagnosis in digital radiography. 3. Automated detection of nodules in peripheral lung fields"; *Medical Physics*, 15(2):158-166; Date of Publication: Mar.-Apr. 1988; Place of Publication: U.S.

Author: R. C. Gonzales and R. E. Woods; *Digital Image Processing*. Addison-Wesley, Reading, MA; Date of Publication: 1992; Place of Publication: U.S.

Author: J. W. Green and C. C. Lushbaugh; Title: "Histopathological study of the mode of inhibition of cellular proliferation by urethane"; *Cancer Research*, 9:199-209; Date of Publication: 1949; Place of Publication: U.S.

Author: Gurney, Jud W.; Title: "Determining the likelihood of malignancy in solitary pulmonary nodules with Bayesian analysis"; Part 1. Theory. *Radiology*, 186(2):405-413; Date of Publication: Feb. 1993; Place of Publication: U.S.

Author: J. A. Hanley and B. J. McNeil; Title: "The meaning and use of the area under a receiver operating characteristic (ROC) curve"; *Radiology*, 143(1):29-36; Date of Publication: Apr. 1982; Place of Publication: Canada.

Author: C.I. Henschke, D.I. McCauley, D.F. Yankelevitz, D. P. Naidich, G. McGuinness, O. S. Miettinen, D. M. Libby, M. W. Pasmantier, J. Koizumi, N. K. Altorki, and J. P. Smith; Title: "Early Lung Cancer Action Project: overall design and findings from baseline screening;" *Lancet*, 354(9173):99-105; Date of Publication: Jul. 1999; Place of Publication: U.S.

Author: C. J. Herold, A. A. Bankier, and D. Fleischmann; Title: "Lung metastases"; *European Radiology*, 6(5):596-606; Date of Publication: 1996; Place of Publication: Austria.

Author: G. N. Hounsfield; Title: "Computerized transverse axial scanning (tomography). I. Description of system"; *British Journal of Radiology*, 46(552):1016-1022; Date of Publication: Dec. 1973; Place of Publication: England.

Author: G. N. Hounsfield; Title: "Computed medical imaging"; Nobel lecture, Dec. 8, 1979. *Journal of Computer Assisted Tomography*, 4(5):665-674; Date of Publication: Oct. 1980; Place of Publication: England.

Author: Z. Huo, M. L. Giger, C. J. Vyborny, U. Bick, P. Lu, D. E. Wolverton, and R. A. Schmidt; Title: "Analysis of spiculation in the computerized classification of mammographic masses"; *Medical Physics*, 22(10):1569-1579; Date of Publication: Oct. 1995; Place of Publication: U.S.

Author: Z. Huo, M. L. Giger, C. J. Vyborny, D. E. Wolverton, R. A. Schmidt, and K. Doi; Title: "Automated computerized classification of malignant and benign masses on digitized mammograms"; *Academic Radiology*, 5(3):155-168; Date of Publication: Mar. 1998; Place of Publication: U.S.

Author: S. Itoh, M. Ikeda, T. Isomura, T. Endo, K. Yamakawa, K. Itoh, S. Naganawa, K. Maruyama, and T. Ishigaki; Title: "Screening helical CT for mass screening of lung cancer: application of low-dose and single-breath-hold scanning"; *Radiation Medicine*, 16(2):75-83; Date of Publication: Mar.-Apr. 1998; Place of Publication: Japan.

Author: R. Jain, R. Kasturi, and B. G. Schunck. *Machine Vision*. McGraw-Hill, New York; Date of Publication: 1995; Place of Publication: U.S.

Author: L. R. Kaiser and J. B. Shrager; Title: "Video-assisted thoracic surgery: the current state of the art"; *AJR American Journal of Roentgenology*, 99(2):246-250; Date of Publication: Feb. 1996; Place of Publication: U.S.

Author: W. A. Kalender; Title: "Technical foundations of spiral CT"; *Seminars in Ultrasound, CT, and MRI*, 15(2):81-89; Date of Publication: Apr. 1994; Place of Publication: Germany.

Author: W. A. Kalender; "Thin-section three-dimensional spiral CT: is isotropic imaging possible?"; *Radiology*, 197(3):578-580; Date of Publication: Dec. 1995; Place of Publication: Germany.

Author: W. A. Kalender, W. A. Seissle, E. Klotz, and P. Vock; Title: "Spiral volumetric CT with single breath-hold technique continuous transport and continuous scanner rotation"; *Radiology*, 176(1):181-183; Date of Publication: Jul. 1990; Place of Publication:Switzerland.

Author: M. Kaneko, K. Eguchi, H. Ohmatsu, R. Kakinuma, T. Naruke, K. Suemasu, and N. Moriyama; Title: "Peripheral lung cancer: screening and detection with low-dose spiral CT versus radiography"; *Radiology*, 201(3):798-802; Date of Publication: Dec. 1996; Place of Publication: Japan.

Author: Y. Kawata, N. Niki, H. Ohmatsu, K. Eguchi, and N. Moriyama; Title: "Shape analysis of pulmonary nodules based on thin section CT images"; SPIE *Proceedings*, 3034:964-974; Date of Publication: Feb. 1997; Place of Publication: Japan.

Author: J. H. Kim, J. G. Im, M. C. Han, B. G. Min, and C. W. Lee; Title: "Improved visualization of simulated nodules by adaptive enhancement of digital chest radiography"; *Academic Radiology*, 1(2):93-99; Date of Publication: Oct. 1994; Place of Publication: South Korea.

Author: T. Kobayashi, X.-W. Xu, H. MacMahon, C. E. Metz, and K. Doi; Title: "Effect of a computer-aided diagnosis scheme on radiologists' performance in detection of lung nodules on radiographs"; *Radiology*, 199(3):843-848; Date of Publication: Jun. 1996; Place of Publication: U.S.

Author: A. K. Laird; Title: "Dynamics of tumor growth: Comparison of growth rates and extrapolation of growth curve to one cell"; *British Journal of Cancer*, 19:278-291; Date of Publication: 1965; Place of Publication: U.S.

Author: S. H. Landis, T. Murray, S. Bolden, and P. A. Wingo; Title: "Cancer statistics, 1999";. *CA: A Cancer Journal for Clinicians*, 49(1):8-31; Date of Publication: Jan.-Feb. 1999; Place of Publication: U.S.

Author: G. A. Lillington; Title: "Management of solitary pulmonary nodules"; *Postgraduate Medicine*, 101(3):145-150; Date of Publication: Mar. 1997; Place of Publication: U.S.

Author: W. E. Lorensen and H. E. Cline; Title: "Marching cubes: A high resolution 3D surface construction algorithm"; *Computer Graphics*, 21(4):163-169; Date of Publication: Jul. 1987; Place of Publication: U.S.

Author: F. Mao, W. Qian, J. Gaviria, and L. P. Clarke; Title: "Fragmentary window filtering for multiscale lung nodule detection: Preliminary study"; *Academic Radiology*, 5(4):306-311; Date of Publication: Apr. 1998; Place of Publication: U.S.

Author: T. Matsumoto, H. Yoshimura, K. Doi, M. L. Giger, A. Kano, H. MacMahon, K. Abe, and S. M. Montner; Title: "Image feature analysis of false-positive diagnoses produced by automated detection of lung nodules"; *Investigative Radiology*, 27(8):587-597; Date of Publication: Aug. 1992; Place of Publication: U.S.

Author: M. F. McNitt-Gray, E. M. Hart, N. Wyckoff, J. W. Sayre, J. G. Goldin, and D. R. Aberle; Title: "A pattern classification approach to characterizing solitary pulmonary nodules imaged on high resolution CT: Preliminary results"; *Medical Physics*, 26(6):880-888; Date of Publication: Jun. 1999; Place of Publication: U.S.

Author: M.R. Melamed, B. J. Flehinger, M. B. Zaman, R. T. Heelan, W. A. Perchick, and N. Martini; Title: "Screening for early lung cancer. Results of the Memorial Sloan-Kettering study in New York"; *Chest*, 86(1):44-53; Date of Publication: Jul. 1984; Place of Publication: U.S.

Author: S. Mitruka, R. J. Landreneau, M. J. Mack, L. S. Fetterman, J. Gammie, S. Bartley, S. R. Sutherland, C. M. Bowers, R. J. Keenan RJ, P. F. Ferson,.and R. J. Weyant; Title: "Diagnosing the indeterminate pulmonary nodule: percutaneous biopsy versus thoracoscopy"; *Surgery*, 118(4):676-684; Date of Publication: Oct. 1995; Place of Publication: U.S.

Author: O. Monga, R. Deriche, and J.-M. Rocchisani; Title: "3D edge detection using recursive filtering: Application to scanner images"; *Computer Vision, Graphics, and Image Processing: Image Understanding*, 53(1):76-87; Date of Publication: Jan. 1991; Place of Publication: France.

Author: H. Nathan; Title: "Management of solitary pulmonary nodules. An organized approach based on growth rate and statistics"; *JAMA*, 227(10):1141-1144; Date of Publication: Mar. 1974; Place of Publication: U.S.

Author: M. H. Nathan, V. P. Collins, and R. A. Adams; Title: "Differentiation of benign and malignant pulmonary nodules by growth rate"; *Radiology*, 79:221-231; Date of Publication: 1962; Place of Publication: U.S.

Author: R. Pearl and L. J. Reed; Title: "On the rate of growth of the population of the United States since 1790 and its mathematical presentation"; *Proceedings of the National Academy of Sciences*, 6:275-285; Date of Publication: 1920; Place of Publication: U.S.

Author: J. Peiss, M. Verlande, W. Ameling, and R. W. Guenther; Title: "Classification of lung tumors on chest radiographs by fractal texture analysis"; *Investigative Radiology*, 31(10):625-629; Date of Publication: Oct. 1996; Place of Publication: Germany.

Author: M. G. Penedo, M. J. Carreira, A. Mosquera, and D. Cabello; Title: "Computer-aided diagnosis: A neural-network-based approach to lung nodule detection"; *IEEE Transactions on Medical Imaging*, 17(6):872-880; Date of Publication: Dec. 1998; Place of Publication: Spain.

Author: R. J. Prokop and A. P. Reeves; Title: "A survey of moment-based techniques for unoccluded object representation and recognition"; *CVGIP: Graphical Models and Image Processing*, 54(5):438-360; Date of Publication: Sep. 1992; Place of Publication: U.S.

Author: R. D. Pugatch; Title: "Radiologic evaluation in chest malignancies. A review of imaging modalities"; *Chest*, 107(6 suppl.)):294S-297S; Date Publication: Jun. 1995; Place of Publication: U.S.

Author: A. P. Reeves, W. J. Kostis, C. 1. Henschke, B. Zhao, and D. F. Yankelevitz; Title: "Three-dimensional feature characterization of small pulmonary nodules from helical CT images"; *Radiology*, 209P:163; Date of Publication: Nov. 1998; Place of Publication: U.S.

Author: A. P. Reeves, W. J. Kostis, D. F. Yankelevitz, and C. I. Henschke; Title: "Three-dimensional shape characterization of solitary pulmonary nodules from helical CT scans"; In H. U. Lemke, M. W. Vannier, K. Inamura, and A. G. Farman, editors, *Proceedings of Computer Assisted Radiology and Surgery (CARS '99)*, pp. 83-87. Elsevier Science; Date of Publication: Jun. 1999; Place of Publication: U.S.

Author: A. P. Reeves, R. J. Prokop, S. E. Andrews, and F. P. Kuhl; Title: "Three-dimensional shape analysis using moments and Fourier descriptors"; *IEEE Transactions on Pattern Analysis and Machine Intelligence*, 10(6):937-943; Date of Publication: Nov. 1988; Place of Publication: U.S.

Author: A. P. Reeves and B. S. Wittner; Title: "Shape analysis of three dimensional objects using the method of moments"; In *Proceedings of 1983 IEEE Conference on Computer Vision and Patten Recognition*, pp. 20-26; Date of Publication: Jun. 1983; Place of Publication: U.S.

Author: J. Remy, M. Remy-Jardin, F. Giraud, and J. Wannebroucq; Title: "Spiral volumetric scanning and its applications in thoracic pathology"; *Rev Mal Respir*, 11(1):13-27; Date of Publication: 1994; Place of Publication: unknown.

Author: T. W. Ridler and S. Calvard; Title: "Picture thresholding using an iterative selection method"; *IEEE Transactions on Systems, Man, and Cybernetics*, SMC-8(8):630-632; Date of Publication: Aug. 1978; Place of Publication: London.

Author: K. V. Rolston, S. Rodriguez, M. Dholakia, E. Whimbey E, and I. Raad; Title: "Pulmonary infections mimicking cancer: a retrospective; three-year review"; *Support Care Cancer*, 5(2):90-93; Date of Publication: Mar. 1997; Place of Publication: U.S.

Author: S. Sanada, K. Doi, and H. MacMahon; Title: "Image feature analysis and computer-aided diagnosis in digital radiography: automated delineation of posterior ribs in chest images"; *Medical Physics*, 18(5):964-971; Date of Publication: Sep.-Oct. 1991; Place of Publication: U.S.

Author: S. Sasaoka. H. Takabatake, M. Mori, H. Natori, and S. Abe; Title: "Digital analysis of pulmonary nodules—potential usefulness of computer-aided diagnosis for differentiation of benign from malignant nodules"; *Nippon Kyobu Shikkan Gakkai Zasshi*, 33(5):489-496; (With English Abstract) Date of Publication: May 1995; Place of Publication: unknown.

Author: M. D. Seemann, A. Staebler, T. Beinert, H. Dienemann, B. Obst, M. Matzko, C. Pistitsch, and M. F. Reiser; Title: "Usefulness of morphological characteristics for the differentiation of benign from malignant solitary pulmonary lesions using HRCT;" *European Radiology*, 9(3):409-417; Date of Publication: 1999; Place of Publication: Germany.

Author: R. Shah, S. Sabanathan, J. Richardson, A. J. Mearns, and C. Goulden; Title "Results of surgical treatment of stage I and II lung cancer"; *Journal of Cardiovascular Surgery*, 37(2):169-172; Date of Publication: Apr. 1996; Place of Publication: United Kingdom.

Author: R. H. Sherrier, C. Chiles, W. E. Wilkinson, G. A. Johnson, and C. E. Ravin; Title: "Effects of image processing on nodule detection rates in digitized chest radiographs: ROC study of observer performance"; *Radiology*, 166(2):447-450; Date of Publication: Feb. 1998; Place of Publication: U.S.

Author: S. Sone, S. Takashima, F. Li, Z. Yang, T. Honda, Y. Maruyama, M. Hasegawa, T. Yamanda, K. Kubo, K. Hanamura, and K. Asakura; Title: "Mass screening for lung cancer with mobile spiral computed tomography scanner"; *Lancet*, 351(9111):1242-1245; Date of Publication: Apr. 1998; Place of Publication: Japan.

Author: M. Sonka, G. Sundararmoorthy, and E. A. Hoffman; Title: "Knowledge-based segmentation of intrathoracic airways from multidimensional high resolution CT images";. *SPIE*, 2168:73-85; Date of Publication: Aug. 1994; Place of Publication: U.S.

Author: J. S. Spratt, J. S. Meyer, and J. A. Spratt; Title: "Rates of growth of human solid neoplasms: Part I"; *Journal of Surgical Oncology*, 60(2):137-146; Date of Publication: Oct. 1995; Place of Publication: U.S.

Author: S. J. Swensen, J. R. Jett, W. S. Payne, R. W. Viggiano, P. C. Pairolero, and V. F. Trastek; Title: "An integrated approach to evaluation of the solitary pulmonary nodule"; *Mayo Clinic Proceedings*, 65(2):173-186; Date of Publication: Feb. 1990; Place of Publication: U.S.

Author: S. J. Swensen, M. D. Silverstein, D. M. Ilstrup, C. D. Schleck, and E. S. Edell; Title: "The probability of malignancy in solitary pulmonary nodules. Application to small radiologically indeterminate nodules"; *Archives of Internal Medicine*, 157(8):849-855; Date of Publication: Apr. 1997; Place of Publication: U.S.

Author: S. Toshioka, K. Kanazawa, N. Niki, H. Satoh, H. Ohmatsu, K. Eguchi, and N. Moriyama; Title: "Computer aided diagnosis system for lung cancer based on helical CT images"; *SPIE Proceedings*, 3034:975-984; Date of Publication: Feb. 1997; Place of Publication: Japan.

Author: J. D. Urschel; Title: "Surgical treatment of peripheral small cell lung cancer"; *Chest Surg Clin N Am*, 7(1):95-103; Date of Publication: Feb. 1997; Place of Publication: U.S.

Author: K. Usuda, Y. Saito, M. Sagawa, M. Sato, K. Kanma, S. Takahashi, C. Endo, Y. Chen, A. Sakurada, and S. Fujimura; Title: "Tumor doubling time and prognostic assessment of patients with primary lung cancer"; *Cancer*, 74(8):2239-2244; Date of Publication: Oct. 1994; Place of Publication: Japan.

Author: N. F. Vittitoe, J. A. Baker, and C. E. Floyd; Title: "Fractal texture analysis in computer-aided diagnosis of solitary pulmonary nodules"; *Academic Radiology*, 4(2):96-101; Date of Publication: Feb. 1997; Place of Publication: U.S.

Author: P. Vock, M. Soucek, M. Daepp, and W. A. Kalender; Title: "Lung: spiral volumetric CT with single-breath-hold technique"; *Radiology*, 176(3):864-867; Date of Publication: Sep. 1990; Place of Publication: Switzerland.

Author: W. Weiss; Title: "Implications of tumor growth rate for the natural history of lung cancer"; *Journal of Occupational Medicine*, 26(5):345-352; Date of Publication: May 1984; Place of Publication: U.S.

Author: S. A. Wood, E. A. Zerhouni, J. D. Hoford, E. A. Hoffman, and W. Mitzner; Title: "Measurement of three-dimensional lung tree structures by using computed tomography"; *Journal of Applied Physiology*, 79(5):1687-97; Date of Publication: Nov. 1995; Place of Publication: U.S.

Author: X.-W. Xu and K. Doi; Title: "Image feature analysis for computer-aided diagnosis: Accurate determination of ribcage boundary in chest radiographs"; *Medical Physics*, 22(5):617-626; Date of Publication: May 1995; Place of Publication: U.S.

Author: X.-W. Xu and K. Doi; Title: Image feature analysis for computer-aided diagnosis: Detection of right and left hemidiaphragm edges and delineation of lung field in chest radiographs; *Medical Physics*, 23(9):1613-1624; Date of Publication: Sep. 1996; Place of Publication: U.S.

Author: X.-W. Xu, K. Doi, T. Kobayashi, H. MacMahon, and M. L. Giger; Title: "Development of an improved CAD scheme for automated detection of lung nodules in digital chest images"; *Medical Physics*, 24(9):1395-1403; Date of Publication: Sep. 1997; Place of Publication: U.S.

Author: S. Yamamoto, I. Tanaka, M. Senda, Y. Tateno, T. Iinuma, T. Matsumoto, and M. Matsumoto; Title: "Image processing for computer-aided diagnosis of lung cancer by CT (LSCT)"; *Systems and Computers in Japan*, 25(2):67-80; Date of Publication: Feb. 1994; Place of Publication: Japan.

Author: D. F. Yankelevitz, C. I. Henschke, J. H. Koizumi, N. K. Altorki, and D. Libby; Title: "CT-guided transthoracic needle biopsy of small solitary pulmonary nodules"; *Clinical Imaging*, 21(2):107-10; Date of Publication: Mar.-Apr. 1997; Place of Publication: U.S.

Author: H. Yoshimura, M. L. Giger, K. Doi, H. MacMahon, and S. M. Montner; Title: "Computerized scheme for the detection of pulmonary nodules: A nonlinear filtering technique"; *Investigative Radiology*, 27(2):124-129; Date of Publication: Feb. 1992; Place of Publication: U.S.

Author: P. Chandrasekhar, L. Wolff, E. Zerhouni, and W. Mitzner; Title: "Segmentation of 3 pulmonary trees using mathematical morphology"; In P. Maragos, R. W. Schafer, and M. A. Butt, editors, *Mathematical Morphology and its Applications to Image and Signal Processing*, pp. 409-416. Kluwer Academic Press; Date of Publication: May 1996; Place of Publication: unknown.

Author: T. Fleiter, E.M. Merkle, A.J. Aschoff, G. Lang, M. Stein, J. Gorich, F. Liewald, N. Rilinger, and R. Sokiranski; Title: "Comparison of real-time virtual and fiberoptic bronchoscopy in patients with bronchial carcinoma: opportunities and limitations"; *American Journal of Roentgenology*, 169(2):1591-1595; Date of Publication: Dec. 1997; Place of Publication: Germany.

Author: M. L. Giger, K.T. Bae, and H. MacMahon; Title: "Image processing and computer-aided diagnosis"; *Radiologic Clinics of North America*, 34(3):565-596; Date of Publication: May 1996; Place of Publication: U.S.

Author: P. A. Heng, P. F. Fung, T. T. Wong, Y. H. Siu, and H. Sun; Title: "Interactive navigation and bronchial tube tracking in virtual bronchoscopy"; *Studies in Health Technology and Informatics*, 62:130-133; Date of Publication: 1999; Place of Publication: Hong Kong.

Author: W. J. Kostis, A. P. Reeves, D. F. Yankelvitz, and C. I. Henschke; Title: "Three-dimensional segmentation of solitary pulmonary nodules from helical CT scans"; In H. U. Lemke, M. W. Vannier, K. Inamura, and A. G. Farman, editors, *Proceedings of Computer Assisted Radiology and Surgery (CARS '99)*, pp. 203-207. Elsevier Science; Date of Publication: Jun. 1999; Place of Publication: U.S.

Author: F. Maes, A. Collingnon, D. Vandermeulen, G. Marchal, and P. Suetens. Title: "Multimodality image registration by maximization of mutual information" ; *IEEE Transactions on Medical Imaging*, 16(2):187-198; Date of Publication: Apr. 1997; Place of Publication: Belgium.

Author: W. Park, E. A. Hoffman, and M. Sonka; Title: "Segmentation of intrathoracic airway trees: A fuzzy logic approach"; *IEEE Transactions on Medical Imaging*, 17(4):489-497; Date of Publication: Aug. 1998; Place of Publication: U.S.

Author: A. P. Reeves and W. J. Kostis; Title: "Computer-aided diagnosis for lung cancer"; *Radiologic Clinics of North America*, 38(3):497-509; Date of Publication: May 2000; Place of Publication: U.S.

Author: R. M. Summers, D. H. Feng, S. M. Holland, M. C. Sneller, and J. H. Shelhamer; Title: "Virtual bronchoscopy: Segmentation method for real-time display"; *Radiology*, 200(3):857-862; Date of Publication: Sep. 1996; Place of Publication: U.S.

Author: J. K. Udupa; Title: "Three-dimensional visualization and analysis methodologies: a current perspective"; *Radiographics*, 19(3):783-806; Date of Publication: May-Jun. 1999; Place of Publication: U.S.

Author: W. M. Wells, III, P. Viola, H. Atsumi, S. Nakajima, and R. Kikinis; Title: "Multi-modal volume registration by maximization of mutual information"; *Medical Image Analysis*, 1(1):35-51; Date of Publication: Mar. 1996; Place of Publication: U.S.

Author: D. F. Yankelevitz, R. Gupta, B. Zhao, and C. I. Henschke;. Title: "Small pulmonary nodules: Evaluation with repeat CT-preliminary experience"; *Radiology*, 212(2):561-566; Date of Publication: Aug. 1999; Place of Publication: U.S.

Author: D. F. Yankelevitz, A. P. Reeves, W. J. Kostis, B. Zhao, and C. I. Henschke; Title: "Determination of malignancy in small pulmonary nodules based on volumetrically determined growth rates"; *Radiology*, 209P:375; Date of Publication: Nov. 1998; Place of Publication:.

Author: D. F. Yankelevitz, A. P. Reeves, W. J. Kostis, B. Zhao, and C. I. Henschke; Title: "Small Pulmonary Nodules: Volumetrically Determined Growth Rates Based on CT Evaluation"; Radiology, 217(1):251-256; Date of Publication: Oct. 2000; Place of Publication: U.S.

Author: A. P. Reeves and W. J. Kostis; Title: "Computer-Aided Diagnosis of Small Pulmonary Nodules"; *Seminars in Ultrasound, CT, and MRI*, 21(2):116-128; Date of Publication: Apr. 2000; Place of Publication: U.S.

Author: B. Zhao, W. J. Kostis, A. P. Reeves, D. F. Yankelevitz, and C. I. Henschke; Title: "Consistent Segmentation of Repeat CT Scans for Growth Assessment in Pulmonary Nodules"; Proceedings of the SPIE, Medical Imaging 1999, 3661:1012-1018; Date of Publication: May 1999; Place of Publication: U.S.

Author: S. Hu, E. A. Hoffman, and J.M. Reinhardt; Title: "Automatic Lung Segmentation for Accurate Quantitation of Volumetric X-Ray CT Images"; *IEEE Transactions on Medical Imaging*, vol. 20, No. 6; Date of Publication: Jun. 2001; Place of Publication: U.S.

Author: J. Hsieh; Title: "Generalized Adaptive Median Filters and their Application in Computed Tomography"; *SPIE*, vol. 2298, pp. 662-669; Date of Publication: 1994; Place of Publication: U.S.

Author: J. Hsieh; Title: "Adaptive Trimmed Mean Filter for CT Imaging"; Mathematical Methods in Medical Imaging III, Proceedings of *SPIE*, vol. 2299, pp. 316-324; Date of Publication: 1994; Place of Publication: U.S.

Author: H. Soltanian-Zadeh, J.P. Windham and J. Soltanianzadeh; Title: "CT Artifact Correction: An Image Processing Approach"; Medical Imaging 1996: Image Processing, Proceedings of *SPIE*, vol. 2710, pp. 477-485; Date of Publication:1996; Place of Publication: U.S.

Author: A. P. Reeves, W. J. Kostis, D. F. Yankelevitz, C.I. Henschke; Title: "Analysis of Small Pulmonary Nodules without Explicit Segmentation of CT images"; *Radiological Society of North America—2000 Scientific Program*, vol. 217, pp. 243-244; Date of Publication: Nov. 2000; Place of Publication: U.S.

Author: Y. Lee, T., Hara, H. Fujita, S. Itoh, and T. Ishigaki; Title: "Automatic Detection of Pulmonary Nodules in Helical CT Images Based on an Improved Template-Matching Technique"; *IEEE Transactions on Medical Imaging*, vol. 20, No. 7, pp. 595-604; Date of Publication: Jul. 2001; Place of Publication: U.S.

Author: F. Maes, A. Collignon, D. Vandermeulen, G. Marchal and P. Suetens; Title: "Multimodality image registration by maximization of mutual information"; *IEEE Transactions on Medical Imaging*, vol. 16, No. 2, pp. 187-198; Date of Publication: Apr. 1997; Place of Publication: U.S.

Author: Takagi, N.; Kawata, Y., Nikvi, N.; Morit, K.; Ohmatsu, H.; Kakinuma, R.; Eguchi, K.; Kusumoto, M.; Kaneko, M.; Moriyama, N.; Title: "Computerized characterization of contrast enhancement patterns for classifying pulmonary nodules"; *Image Processing, 2000. Proceedings. 2000 International Conference* on vol. 1, pp. 188-191; Date of Publication: 2000; Place of Publication: U.S.

Author: A. P. Reeves, W. J. Kostis; Title: "Computer-Aided Diagnosis of Small Pulmonary Nodules"; *Seminars in Ultrasound, CT. and MRI*, vol. 21, No. 2, pp. 116-128; Date of Publication: Apr. 2000; Place of Publication: U.S.

Author: W. J. Kostis, A. P. Reeves, D. F. Yankelevitz, C.I. Henschke; Title: "Three-dimensional segmentation of solitary pulmonary nodules from helical CT scans"; *CARS '99 Computer Assisted Radiology and Surgery: Proceedings of the 13th International Congress and Exhibition*, pp. 203-207; Date of Publication: 1999; Place of Publication: U.S.

Author: Li Fan, Carol L. Novak, Jiangzhong Qian, Gerhard Kohl, and David P. Naidich; Title: "Automatic Detection of Lung Nodules from Multi-Slice Low Dose CT Images"; Proc SPIE 2001; 4322:1828-1835; Date of Publication: 2001; Place of Publication: U.S.

Author: Binsheng Zhao, Anthony Reeves, David Yankelevitz, and Claudia Henschke; Title: "Three-Dimensional multi-criterion automatic segmentation of pulmonary nodules of helical CT images"; Optical Engineering, 38(8):1340-1347; Date of Publication: 1999; Place of Publication:.

Author: American Cancer Society; Title: "Cancer Facts & Figures 2002"; 1599 Clifton Road, NE, Atlanta, GA, 30329-4251.

Author: Claudia I. Henschke, D.P. Naidich, D.F. Yankelevitz, G. McGuinness, D.I. McCauley, J.P. Smith, D.M. Libby, M.W. Pasmantier, M. Vazquez, J. Koizumi, D. Flleder, N.K. Altorki, and O.S. Miettinen; Title: "Early Lung Cancer Action Project: Initial Findings on Repeat Screening"; Cancer Jul. 1, 2001; 92(1):153-159; Date of Publication: Jul. 1, 2001; Place of Publication.

Author: S.G. Armato III, M.L. Giger, J.T. Blackburn, K. Doi, H. MacMahon; Title: "Three-dimensional approach to lung nodule detection in helical CT"; *SPIE*, vol. 3661, pp. 553-559; Date of Publication: 1999; Place of Publication: U.S.

Author: S.L. Lou, C.L. Chang, K.P. Lin and T. Chen; Title: "Object based deformation technique for 3-D CT lung nodule detection"; *SPIE*, vol. 3661, pp. 1544-1552; Date of Publication: 1999; Place of Publication: U.S.

Author: T. Okumura, T. Miwa, Jun-ichi Kako, S. Yamamoto, M. Matsumoto, Y. Tateno, T. Linua and T. Matsumoto; Title: "Image processing for computer-aided diagnosis of lung cancer screening system by CT (LSCT)"; *SPIE*, vol. 3338, pp. 1314-1322; Date of Publication: 1998; Place of Publication: U.S.

Author: M. Fiebich, C. Wietholt, B.C. Render, S.G. Armato, K.R. Hoffmann, D. Wormanns and S. Diederich; Title: "Automatic detection of pulmonary nodules in low-dose screening thoracic CT examinations"; *SPIE*, vol. 3661, pp. 1434-1439; Date of Publication: 1999; Place of Publication: U.S.

Author: H. Taguchi, Y. Kawata and N. Niki, H. Satoh, H. Ohmatsu, K. Eguchi, M. Kaneko and N. Moriyama; Title: "Lung cancer detection based on helical CT images using curved surface morphology analysis"; *SPIE*, vol. 3661, pp. 1307-1313; Date of Publication: 1999; Place of Publication: U.S.

Author: S-C B. Lo, S-L A. Lou, J-S Lin, M.T. Freedman, M.V. Chien and S.K. Mun; Title: "Artificial convolution neural Network techniques and applications for lung nodule detection"; *IEEE transactions on medical imaging*, vol. 14, No. 4, pp. 711-718; Date of Publication: 1995; Place of Publication: unknown.

Author: W.J. Kostis; Title: "Three-dimensional computed tomographic image analysis for early cancer diagnosis in small pulmonary nodules"; Ph.D. dissertation, Cornell University; Date of Publication: 2001; Place of Publication: U.S.

Author: R. Kakinuma, H. Ohmatsu, M. Kaneko, K. Eguchi, K. Naruke, K. Nagai; Title: "Detection failures in spiral CT screening for lung cancer: analysis of CT findings"; Radiology, 212, pp. 61-66; Date of Publication: 1999; Place of Publication: U.S.

Author: F. Li, S. Sone, H. Abe, H.M. MacMahon, S.G. Armato, K. Doi; Title: "Missed Lung Cancers in low-dose Helical CT Screening Obtained from a General Population"; scientific paper presentation, RSNA 87th scientific assembly and annual meeting, Nov. 25-30, 2001.

Author: M. Remy Jardin, F. Giraud, C-H Marquette; Title: "Pulmonary nodules: detection with thick section spiral CT versus conventional CT"; Radiology, 187(No. 2), pp. 513-520; Date of Publication: 1993; Place of Publication: U.S.

Author: J.A. Buckley, W.W. Scott, S.S. Siegelman, et al.; Title: "Pulmonary nodules: effect of increased data sampling on detection with spiral CT and confidence in diagnosis"; Radiology, 196, pp. 395-400; Date of Publication: 1995; Place of Publication: U.S.

Author: Y. Kawata, N. Niki, H. Ohmatsu, M. Kusumoto, R. Kakinuma, K. Mori, N. Nishiyama, K. Eguchi, M. Kaneko, and N. Moriyama; Title: "Tracking interval changes of pulmonary nodules using a sequence of three-dimensional thoracic images"; In Medical Imaging 2000: Image Processing, Proceedings of SPIE, vol. 3979, pp. 86-96; Date of Publication: 2000; Place of Publication: U.S.

Author: Y. Kawata, N. Niki, H. Ohmatsu, M. Kusumoto, R. Kakinuma, K. Mori, N. Nishiyama, K. Eguchi, M. Kaneko, and N. Moriyama; Title: "Analysis of evolving processes in pulmonary nodules using a sequence of three-dimensional thoracic images"; In M. Sonka d K.M. Hanson, editors, *Medical Imaging 2001: Image Processing, Proceedings of SPIE*, vol. 4322, pp. 1890-1901; Date of Publication: 2001; Place of Publication: U.S.

* cited by examiner

SYSTEM AND METHOD FOR THREE-DIMENSIONAL IMAGE RENDERING AND ANALYSIS

CROSS-REFERENCE TO RELATED APPLICATION

This application is a divisional of U.S. application Ser. No. 10/257,064, filed Mar. 24, 2003, now U.S. Pat. No. 7,274,810 the disclosure of which is incorporated herein by reference.

The present application claims priority to two (2) provisional applications identified as follows: U.S. Application Ser. No. 60/196,208, filed Apr. 11, 2000; and U.S. Application Ser. No. 60/253,974, filed Nov. 29, 2000. Each of these earlier filed provisional applications are incorporated herein by reference.

The invention was made with government support under R01CA63393 and RO1CA78905 by the National Cancer Institute. The government has certain rights to the invention.

BACKGROUND OF THE INVENTION

The present invention relates to the art of diagnostic imaging, and, in particular, to methods and systems for conducting highly enhanced three-dimensional reproduction and analysis of three-dimensional images and diagnosis and treatment related thereto.

It is known in the art of image diagnostic systems and methods to scan objects found in a host patient, retrieve signals resulting from such scanning, and process the signals to obtain information for possible diagnosis and treatment. To date, much of the effort has been directed to treatment of such data in two dimensions, and analysis has to a certain extent been constrained by two-dimensional limitations. Consequently, professionals relying on such information have, similarly, been somewhat constrained in their ability to create diagnostic and possible treatment models.

As a result of the inventors herein having the perspicacity to think and analyze based on three-dimensional vision, new methods and corresponding systems are now available for use in various applications. In one of the more basic applications, detection and analysis of objects in the body, especially growths, can be produced and analyzed to a degree of accuracy previously thought unknown. This is particularly useful especially in the area of life threatening pathologies, e.g., cancer. One particularly pernicious pathology is lung cancer. The ability to be able to detect early stage lung cancer has provided strong motivation to improve diagnostic capabilities.

For example, the small pulmonary nodule is a common radiographic finding that poses a diagnostic and clinical challenge in contemporary medicine. Approximately 170,000 new lung cancers are detected each year in the United States alone. Pulmonary nodules are the major indicator of these malignant lung cancers, but may also be signs of a variety of benign conditions. Of the all the new lung cancers currently detected each year in the United States, approximately 90% are fatal, responsible for nearly 160,000 deaths in 1999 alone [46]. In fact, lung cancer is the number one cause of cancer mortality, responsible for more deaths in men than prostate and colon cancer combined, and in women, for approximately as many as breast and colon cancer combined [46].

One contributing factor for this low survival rate is the historical lack of early detection, or the detection of the disease at a stage where it is most likely to be curable. Until now, the majority of lung cancers are either "symptom-detected," or found on chest x-rays (CXR) of asymptomatic patients. In most cases, the tumor is detected at an advanced stage where opportunity for successful intervention is limited. It has now been shown, through the work of the Cornell Early Lung Cancer Action Project (ELCAP) that it may be possible to detect a significant number of malignancies at an early stage, where cure rates are much more promising, through the use of lung cancer screening [28]. The cornerstone of the ELCAP study is the use of computed tomography (CT) for the detection of small pulmonary nodules and the use of early-repeat CT (ERCT) for evaluation of these nodules, by high-resolution computed tomography (HRCT). It has been reported that low-dose CT has the potential to detect tumors 4-6 times as frequently as CXR [28]. It is theorized that this may engender a "stage-shift" in tumors detected by CT versus CXR. This additional time for potential intervention holds the promise of increasing survival from the current 12% to over 70% 5-year survival following resection of a stage I cancer [28, 76].

The tools developed in this work concern the application of computer vision and image analytic techniques to provide quantitative information describing the characteristics of pulmonary nodules seen in helical CT studies. They are an effort to capture in a reproducible, mathematical form the somewhat subjective characteristics traditionally used by radiologists and other physicians to describe these lesions in order to determine their likelihood of malignancy. Advances in helical CT technology are now allowing for the detection of a significant number of pulmonary nodules less than 1 cm in diameter. At this point, traditional methods for nodule characterization (many based on hand-measurement and subjective evaluation) become less effective, given the small size of these lesions. Through the use of computer-aided diagnostic techniques, we have a unique opportunity to assist the radiologist in the increasingly difficult task of diagnosing these small nodules. Furthermore, as the expected widespread acceptance of CT screening for early detection of lung cancer increases, computer-aided tools should play a prominent role in the early detection, characterization, and cure of lung cancer in many thousands of patients around the world.

Pulmonary nodules, while most important when they represent malignancy, are frequently the manifestations of a variety of benign conditions such as hamartoma, benign adenoma, or rarely, sarcoidosis, amyloidosis or infection. Fungal pulmonary infections (histoplasmosis, cryptococcosis, coccidiomycosis), mycobacterial (tuberculosis) and other bacterial infections may also, infrequently mimic neoplasms [69].

Establishing a specific diagnosis is important) since surgery is usually not needed in the treatment of benign small pulmonary nodules (SPNs). On the other hand, SPNs may represent malignancy (cancer) of several types (squamous-cell, adenocarcinoma, large-cell, small-cell, bronchioloalveolar carcinoma, etc.) where expeditious removal by thoracotomy is usually indicated. For example, approximately 5% of patients with "small-cell" lung cancer are diagnosed after a chest radiograph (x-ray) shows an SPN. Currently, the definitive diagnosis is made after the tumor has been removed surgically. If the diagnosis is made before the operation, clinical decision making is facilitated since multiorgan scanning and inediastinoscopy to detect spread or metastasis are performed prior to thoracotomy [85]. In addition, very small pulmonary nodules may not be detectable in the ordinary chest x-ray or conventional CT and are visible in helical (spiral) CT examinations. Therefore, improvement in the available techniques for the detection (e.g. differentiation from vessels) and differentiating malignant from benign SPNs are needed and will result in clinical and economic benefits.

Small pulmonary nodules are usually identified on routine chest radiographs (CXR) in asymptomatic patients or on chest radiographs obtained for other indications. Most nodules have a benign cause, but bronchogenic carcinoma, metastases, and other malignant processes are common causes and must be excluded in the differential diagnosis. As they are potentially malignant, SPNs require expeditious evaluation. Techniques including computerized tomography (CT) have been used for the differential diagnosis of pulmonary nodules. Radiologic evaluation includes chest x-ray (CXR) or computed tomography (CT) for the detection of nodules, high-resolution CT (HRCT) for further characterization, and CT and magnetic resonance imaging (MRI) to evaluate the mediastinum, and extrathoracic structures.

The radiologic characteristics that differentiate benign from malignant pulmonary lesions include size, the presence of calcification in a "benign pattern," the shape and surface characteristics, rate of change in size, clinical characteristics of the patient such as age and smoking history, etc. Meticulous assessment of the margin of the nodule is necessary. Useful characteristics for the differentiation of benign from malignant include, sharpness of margin, the presence of spicules, length of spicules, spicules extending to the visceral pleura, pleural tail sign and circumscribed pleural thickening. Even with current criteria however, the best sensitivity and specificity that can be achieved are 85% and 78%, respectively. Further improvements in diagnostic accuracy are needed since at the present time many patients with ambiguous findings are referred for early surgery [72].

Mediastinal CT is the preferred modality for examining the mediastinum in these patients while magnetic resonance imaging is used selectively, e.g. in patients with superior sulcus tumors who are candidates for surgery. The differential diagnosis is an important consideration, particularly in patients with small pulmonary nodules, due to the increased sensitivity in lesion detection, increased specificity and lesion (tissue) characterization (usually done with MILI) [29]. Metabolic imaging by positron-emission tomography (PET) provides many advantages over conventional anatomically-based cross-sectional imaging, although its use is generally resolution-limited to nodules larger than 1 cm in diameter. For routine use in oncology, a detailed assessment of specific efficiency of PET is indicated [67]. Mediastinoscopy is done using CT for guidance [61]. Fine-needle aspiration biopsy is a useful diagnostic tool [95]. Thoracic biopsy is a safe and accurate minimally invasive surgical approach to resectable peripheral SPN. Many patients require surgical biopsy especially those with adequate physiologic reserve (that is those who would be able to tolerate surgery) [53]. Also, video-assisted thoracic surgery (VATS) often allows one to accomplish the same goal as the comparable open procedure but with less morbidity and a shorter hospital stay. With continued development of instrumentation, increasingly complex procedures continue to be accomplished with this technique [37].

Currently the diagnosis and management of SPNs is based on the basic principle that every nodule must be regarded as potentially malignant until proven otherwise. Malignant nodules are surgically removed unless the patient is in such bad shape from other diseases that he or she can not survive the surgery or there is proof that the cancer (malignant tumor) originated elsewhere in the body and that the SPN is a metastasis. On the other hand, resection of a benign nodule carries a small surgical cost. The major benefit derived from resection of the benign SPNs is that the diagnosis is made by pathological examination and malignancy is excluded. In addition, once a small pulmonary nodule has been detected, the diagnosis should be made quickly to avoid spreading of the malignancy.

When a malignant cause cannot be ruled out, the patient's age, smoking history, and nodule size must be considered. For moderate and high-risk patients, an immediate and more invasive work-up is indicated [17]. Observation by serial radiographs or CT studies may be the appropriate course for patients who are at low risk for malignancy. When the probability of malignancy is low, the patient may be advised to have repeated radiologic examinations in order to determine whether the SPN is changing over time before the decision about whether to operate is made. Therefore, making the diagnosis without surgery either at initial examination or after consideration of repeated examinations would be of benefit [47].

In addition to primary pulmonary pathology, pulmonary nodules may be due to metastatic disease from cancers of the breast, stomach, pancreas, kidney, bladder, and the genitourinary tract. Computed tomography, especially helical CT, is probably the most sensitive imaging technique in the identification of pulmonary metastases, because it detects a higher number of pulmonary nodules compared with other techniques. In a population of patients presenting with multiple, solitary pulmonary nodules, or the absence of nodules, helical CT shows 30 to 40% of supplementary nodules when compared to conventional scanning techniques. Helical, or spiral, scanning is a relatively new computed tomographic technique based on the continuous acquisition of volumetric CT data during continuous x-ray beam rotation and continuous patient translation through the scanner at constant velocity. It has many advantages over conventional CT including rapid image acquisition during a single-breath-hold scan of the lung, and the ability to obtain axial image reconstructions at arbitrary and overlapping intervals, thus allowing the detection of small lesions that otherwise would be inconspicuous because of respiratory motion or slice averaging. This leads to better identification of small pulmonary nodules and to high quality multiplanar reconstructions that can be useful in the study of mediastinal lymph nodes and the vascular and tracheobronchial spread of lung cancer [10].

In addition to its use in standard radiographic studies, helical CT also enables the optimal use of contrast products in which the iodine is poorly concentrated to study the pulmonary vessels. The continuity, both anatomically and for the lesions obtained by spiral CT is such that it is now possible to apply to thoracic pathology techniques of multiplanar and three-dimensional reconstruction. If all the information is contained in conventional transverse imaging is shown slice by slice, not everything is perceived by the observer because the information is inconveniently presented, by deconstructing anatomical and lesional picture. In helical CT, reconstructions of the volume may be inspected from a coronal, sagittal, oblique or three-dimensional perspective, furnishing supplementary information to axial images alone [66].

Traditionally, measurements of pulmonary nodules have been made by the radiologist using calipers or a ruler on a chest radiograph. The goal was to make an approximate measure of the nodule size by estimating the diameter seen in the projection captured on the chest film. The sizes could be recorded, along with subsequent measures to establish whether the nodule was growing and at what rate. This practice has carried over into the reading of many CT examinations. Although computer-based workstations are sometimes available for the review of CT studies, the sequential images are often output in "hard copy," film format and viewed on a light box. Here too, caliper measurements are the norm, with size being estimated from the image with the greatest cross-sectional area.

As a step toward precision and reproducibility of measurement, many digital review workstations provide "digital calipers," that allow the radiologist to make measurements using a mouse. While a general improvement of caliper-based measurements on film, it should be noted that the estimate of nodule size is still observer-dependent, for the following reasons: (a) selection of an appropriate cross-section (maximal area) for measurement is variable; (b) nodule cross-sections may not be circular, prompting multiple measurements and averaging schemes; (c) the margin of many nodules is somewhat indeterminate; and (d) window and level settings can markedly change the apparent size of a nodule.

These factors suggest that a more automated assessment of nodule size would be beneficial to the unbiased, reproducible estimation of size and growth. A potentially more important point is that the measurements made by the radiologist are nearly always two-dimensional in nature. With computer-aided methods, the entire nodule volume may be measured with great precision, eliminating the problems of slice selection, non-circularity, and window and level distortion.

Computer vision is the study of techniques for the extraction of information from images. The images may be two-, three-, or higher-dimensional in nature, and are acquired by varying types of image sensors, including conventional 2D cameras, video microscopy systems, x-ray film digitization, and computed tomography systems. The underlying physics of acquisition also varies, including the absorption of visible light, infrared, x-ray, and the sensing of magnetic resonance. Each of these may be accomplished in a variety of geometries and projections.

Computer vision is closely allied with its sister disciplines: image processing and computer graphics. Image processing is the application of techniques for the improvement or modification of an image, generally so that it may be better perceived by a human observer. Computer graphics is concerned with basically the inverse problem of computer vision: generation of images based on an informational description.

Most of the techniques now popular in computer vision have been developed for industrial and military applications. Examples include product quality control, and detection of tactical targets in radar, sonar, and conventional images. More recently, computer vision has been applied to problems in biology and medicine. Automated analysis of cell morphology from microscopic images, analysis of anatomical structures radiographic images, and study of function using advanced imaging modalities are fast becoming key applications for computer vision methods.

One notable difference between computer vision in medicine and biology and traditional computer vision is that in industrial applications, the structure of objects being studied is frequently known a priori, and also often has a carefully described geometry. Biological structures, however, while they normally have a particular structure, exhibit a wide range of variation, especially in pathological cases. Even normal anatomical structures defy simple geometric description, as they are three-dimensional, complex structures that exhibit variation between subjects and also often have a dynamic appearance in the same subject. Growth over time, as well as motion during image acquisition make it non-trivial to obtain easily-modeled data of a particular structure, even in a single subject.

These subtleties motivate techniques that can characterize the size, shape, and other qualities (e.g. density) of a biological structure in a quantitative, reproducible way. This allows for the comparison of data between subjects, as well as the study of a structure in a single subject over time. Such measures are precisely what is needed to effectively study the progression of a pulmonary nodule from first detection to eventual diagnosis, and in many cases, during follow-up as well.

The purpose of computed tomography (CT) is to display the anatomy of a slice of the body by measuring absorption of x-rays as they pass through the body in many trajectories. Imaging usually is done in slices perpendicular to the axial (head to toe) direction. The resulting measurements are manipulated mathematically to obtain two- or three-dimensional displays.

X-rays are electromagnetic radiation ($10^{-10}$-$10^{-8}$ nm) that are produced when an electron beam strikes a metal anode, typically made of tungsten. The anode is heated during the generation of the x-rays and dissipation of heat becomes a limitation in long examinations. Only x-rays in one general direction are allowed to exit the x-ray generator by the use of a beam collimator made of lead shielding material. As they travel through matter, the x-rays are attenuated, i.e., their intensity (related to the number of photons per unit cross sectional area) is decreased by absorption or scatter. Absorption occurs through the photoelectric effect, where the x-ray energy is given to an electron that is freed from the atom. Scatter occurs where x-rays of higher energy (generated by electrons accelerated by higher voltages, having higher frequency) transfer some of their energy to an electron (the energy necessary to free it from the atom), while the remaining energy becomes a secondary photon (x-ray) that is transmitted in a new direction. Thus, absorption is useful in diagnostic radiology since it occurs in a known direction while scatter creates noise due to secondary x-rays of unknown direction being detected by the x-ray sensor(s).

CT and all other x-ray diagnostic examinations are based on the fact that different structures of the body absorb or scatter x-rays to a different degree. The fundamental principle is expressed by Beer's Law $$\frac{dI}{dL} = -\mu I \qquad (1.1)$$

describing the attenuation of intensity of electromagnetic radiation as it passes through a homogeneous medium. In this equation, I is the intensity of the radiation (number of x-rays, photons, per unit surface area); L is the length of the pathway, and $\mu$, is the linear attenuation coefficient. This equation merely describes that the x-ray attenuation as it goes through a unit length of the medium is proportional to the intensity of the incident radiation or that each x-ray (photon) has equal probability of being absorbed while traveling through a given thickness of a given material as any other x-ray (photon). This differential equation leads to the following exponential relation describing the intensity I of radiation as it passes through a medium:

$$I = I_0 e^{-\mu L} \qquad (1.2)$$

where I is the transmitted intensity through a thickness L. This is derived easily from the fundamental definition of e $$\frac{d}{dx}(e^x) = e^x \qquad (1.3)$$

and the associated chain-rule for differentiable functions of x $$\frac{d}{dx}(e^u) = e^u \frac{du}{dx} \quad (1.4)$$

Therefore, $$\frac{dI}{dL} = \frac{d(I_0 e^{-\mu L})}{dL} = -\mu I_0(e^{-\mu L}) \quad (1.5)$$

FIG. 1 illustrates Equation 1.2, where the intensity of the radiation passing through the material, I, is a function of the intensity of the incident radiation, $I_0$, the length of the material, L, and the linear attenuation coefficient of the material, $\mu$. This coefficient is determined by the density of the material, the atomic number, and the wavelength (or energy spectrum for polychromatic x-rays) of the x-ray radiation under consideration. Thus, knowing the linear attenuation coefficient in each voxel of the body would provide information on the density and atomic number of the elements at that location.

The process of creating images from x-ray absorption data along a variety of angles and translations is called image reconstruction, involving the solution of a set of equations relating the geometry of absorption data seen in each projection. A given CT projection is the result of x-ray traversal through objects of varying attenuation coefficients at varying distances. This relationship can be generalized as $$I_n = I_0 e^{-\mu_1 L_1} \cdot I_0 e^{-\mu_2 L_2} \ldots I_0 e^{-\mu_n L_n} \quad (1.6)$$

where $I(I_n)$ is the intensity of the radiation emerging from the body and detected by the detector, $\mu_1, \mu_2, \ldots \mu_3$, are attenuation coefficients of the individual structures traversed by the x-ray and $L_1, L_2, \ldots L_3$, are corresponding distances traveled by the x-rays (lengths). Assuming equal lengths from x-ray source to detectors in helical CT (L, chosen at the time of image reconstruction), Equation 1.6 can be rewritten as $$I_n = I_0 e^{-(\mu_1 + \mu_2 + \ldots \mu_n)L} \quad (1.7)$$

FIG. 2 illustrates the physical system in which Equation 1.7 applies. In this case, the incident x-ray beam passes through several materials of varying length and attenuation characteristics. The computation of the individual attenuation coefficients ($\mu_1, \mu_2, \ldots, \mu_n$) requires the solution of an equal number of equations obtained from the different projections acquired in the CT procedure.

The usual method for solution of the set of equations and the generation of the CT image is called filtered back-projection, based on the Radon transform. In this method, a uniform value of attenuation is projected over the path of each ray such that the total attenuation is proportional to the measured attenuation [14, 15, 6]. These values are stored as elements of one vector of the reconstructed matrix. The procedure is repeated for each ray sum of the CT while corrections are made for voxels traversed by the x-ray beam in an oblique fashion. The assumption that x-ray attenuation is uniform throughout the path of each x-ray beam (obviously an oversimplification) results in blurring of the resulting image. In spite of this limitation, filtered back-propagation is popular because of its inherent parallelism. It allows processing of the data obtained by each ray while data acquisition continues in other projections, dramatically improving computational efficiency. The blurring is decreased by increasing the number of projections and by convolution with a filter function (convolution kernel). The filtering functions depend on x-ray tube geometry, detectors, intended effects (sharpening edges thus enhancing spatial resolution at the expense of decreased density resolution versus more refined density resolution while sacrificing spatial sharpness, etc.).

The relative pixel values obtained by this image reconstruction process are not the absolute values of the linear attenuation coefficients of individual voxels of the body ($\mu_1 + \mu_2 + \ldots \mu_n$). The CT numbers, called Hounsfeld Units (HU) in honor of Godfrey Hounsfield (the inventor of CT scanning [30, 31]), are related to the linear attenuation coefficients as follows:

$$CT\ number = \frac{K(\mu - \mu_\omega)}{\mu_\omega} \quad (1.8)$$

where $\mu_\omega$ is the attenuation coefficient of water, $\mu$ the attenuation coefficient of the pixel in question, and K a constant. The value of K must be large enough (e.g. 200-2000) to accommodate the accuracy of the scanner. For example, consider a CT scanner with a density resolution of ±0.5%, or ±1 in 200. In this case, a value of K=200 would be sufficiently high to encode density values, as they are typically recorded with integer precision. A larger value of K would expand the scale beyond the accuracy of the scanner.

Helical CT is a newer method of data acquisition in computerized tomography [83, 40]. Data acquisition is continuous during rotation of the x-ray source and the detector (mounted in a toroidal gantry) around the patient who is simultaneously moved in the axial (head to toe) direction through the rotating gantry at precise speeds from 1 mm to more than 10 mm per second. The resulting helical projections are used to reconstruct an anisotropic Cartesian space representing the x-ray absorption at each voxel in the scanned patient volume.

In commonly used instruments, the x-ray beam is collimated to a fan that defines the image plane at any given time, and the array of detectors travels in a circular path around (typically 360°) the patient. This approach provides the opportunity to obtain many projections (and therefore images) in a short period of time (e.g. in one breath-hold), and the collection of data in a continuous volumetric manner, rather than in slices. This allows reconstruction in any position as well as improved two-dimensional and three-dimensional views. The major practical advantage of spiral CT is the ability to cover complete anatomic regions in a single exposure [38]. Isotropic imaging, where spatial resolution is the same in all three directions, will eventually become a reality [39]. Helical CT has been found useful in the study of pulmonary nodules where optimally centered studies have been shown to improve accuracy [40, 88].

The most important parameters of a CT protocol relate to the image geometry, reconstruction resolution, and radiation dose. Pitch is defined as the ratio of the table speed in mm/revolution (assuming a 360° reconstruction algorithm) to the collimation width of the x-ray beam. For a given beam collimation, the table may be advanced at a speed that would move the table through one collimation width per revolution, or 1:1 pitch, or at a higher pitch, reducing the effective radiation dose and scan time at the cost of image quality. For example, a protocol with 10 mm collimation and 20 mm/revolution table speed would acquire images with a 2:1 pitch.

The reconstruction resolution is described by several parameters. The in-plane resolution (the image plane is perpendicular to the scanner axis), which is equal in the x and y dimensions, gives the resolution of a pixel in a single 2D reconstructed image. The axial resolution, or resolution in the z dimension, is determined by the slice spacing, or the physical distance between reconstructed 2D images. This spacing is a function of the scan collimation, pitch, and reconstruction algorithm. Furthermore, images may be reconstructed at overlapping intervals (e.g. 10 mm overlapping slices at 5 mm intervals). The axial resolution of conventional CT protocols is often 5-20 times more coarse than the in-plane resolution. This results in 3D voxels that are anisotropic (not all dimensions exhibit equal spacing).

Radiation dose is a function of x-ray tube current, typically expressed in mA, tube voltage, expressed in kV (peak measurements are given units of kVp), and scan duration. The tube current and voltage directly affect the quality of reconstructed images, as the signal-to-noise ratio seen at the x-ray detectors is proportional to the dose used. Improvements in detector sensitivity and filtered image reconstruction algorithms are continually reducing the minimum dose required to achieve acceptable image quality at a given scan geometry.

There are three types of CT examinations commonly performed in the study of pulmonary nodules. The first is a low-dose, low (axial) resolution screening scan, aimed at the detection of possible pulmonary nodules in the lungs. The second, following detection of a pulmonary nodule, is a standard-dose scan of the entire lung volume. The third (and primary focus of this work) is a standard-dose, high-resolution scan of the region containing the detected pulmonary nodule, used for analysis and characterization of the nodule itself. A description of the parameters typically used in the different scan protocols is shown in FIG. 3.

Current CT scanners impose a tradeoff between image quality, slice thickness, and x-ray dose. Many scanners have a gantry rotation speed of approximately 1 revolution/second. This implies that a breath hold on the order of 30 seconds to 1 minute is required to obtain a whole lung scan. More recent scanners, using multislice technology, have reduced this time to just a few seconds, helping to eliminate respiratory and other motion artifacts. It may be anticipated that future developments in CT detector and processing technology may make possible much more rapid and higher resolution scans such that future screening scans may be taken at high ($\approx$0.1 mm) axial resolution. However, current CAD systems are designed for the constraints of today's scanners which suggest a two-resolution approach: a low-dose initial whole-lung scan followed (in some protocols) by a high-resolution focused scan of detected nodules.

Much research has been done relating to the manual detection and characterization of pulmonary nodules by radiologists. In the past 10-15 years, work in computer-assisted and automated detection has appeared in the literature. Until quite recently, the dominant imaging modality for the study of cancer in the lung has been the chest radiograph, or chest x-ray (CXR). With the increasing use of CT for the detection of these lesions, however, we are now seeing an increase in the use of automated methods for the detection of pulmonary nodules in thoracic CT studies. Some work has also been reported dealing with characterization of pulmonary nodules, but it is only quite recently that advances have been made in this area. As characterization of pulmonary nodules from CT scans is the focus of this work, the following sections provide a view of pertinent related issues in the study of nodules using both CXR, and CT, in the screening setting, and for nodule characterization.

The goal of lung cancer screening is to detect pulmonary nodules, establish their probability of malignancy at an early stage, and thereby improve likelihood of cure. The traditional detection of pulmonary nodules occurs by their appearance on a routine chest radiograph, or one taken for unrelated reasons. In the past 10-15 years, research has been done in developing computer-aided methods for detection of these nodules.

In the 1970s, the National Cancer Institute (NCI) sponsored three large screening trials to evaluate the benefits of lung cancer screening using chest radiography and sputum cytology. These were held at the Mayo Clinic, Johns Hopkins, and Memorial Sloan-Kettering. [52, 20, 19]. Although these studies found that lung cancer screening allowed for earlier detection of lung cancer, better resectability of tumors, and better survivorship of the surgery, the overall mortality in the screened and control groups were similar. Thus, lung cancer screening was not recommended as national policy.

Detection of pulmonary nodules has traditionally been done through visual inspection of chest radiographs. Since the 1970's, however, much research has been devoted to the automation of this process. Computer-aided detection and analysis systems for pulmonary nodules fall into several categories. Image processing techniques have been used to improve contrast and otherwise enhance candidate regions for the visual detection of nodules [43, 44, 77]. Systems have been developed for the automated detection of candidate nodules [50, 96, 93, 8, 59]. Some work has also been done on automated analysis of nodules in CXR images for the prediction of malignancy [71, 58, 87].

The preprocessing stage of several CAD systems for the detection of nodules in CXR involves histogram manipulation. Techniques have been explored using histogram equalization and high-frequency enhancement [59]. Several studies have described the use of image differencing, which is the subtraction of a "nodule suppressed" image from one that is "nodule enhanced," to help reduce the influence of other anatomical structures appearing in the radiograph [23, 96, 44, 93]. This enhancement of CXR images is achieved using one or more matched filters designed to identify the round regions characteristic of many nodules. For example, a disk-shaped filter may be convolved with the image to enhance nodule-like regions. A ring-shaped median filter may be used for nodule suppression. Related work in preliminary segmentation of lung images has also been done in the areas of lung boundary delineation [91, 3] and rib identification [70]. These steps help eliminate regions of the image from consideration as potential nodules.

A second stage of histogram manipulation may be performed following the initial image preprocessing. Multiple thresholding of the preliminary images may be performed to identify the incremental contribution of each intensity band to candidate regions. In this way, suspect regions are iteratively enlarged (by decreasing a threshold) and analyzed [50, 8]. Computed tomography (CT) is fast becoming the modality of choice for the detection and analysis of pulmonary nodules. Studies in lung cancer screening with CT have been performed in Japan [41, 78] and New York [28].

There have been several prototype systems for performing complete, automated lung CAD [94, 22, 84, 7] (i.e., taking as input whole-lung scans and identifying nodules). Note that these systems involve low-resolution screening scans and therefore, may be able to detect small nodules (<1 cm) but there is insufficient information to characterize them. These early attempts employ a multiphase approach involving the following three stages: (a) identification of the lung regions in the CT images; (b) separation of candidate nodules from vessels within the lung regions; and (c) classification of candidate nodules.

For diagnostic classification of small nodules, a focused HRCT scan of the region-of-interest is obtained. Prototype CAD systems for these scans have been developed in which the region-of-interest is specified by the radiologist and just the separation and classification stages are automatic [63, 42].

The lungs may be separated from other structures in the chest by first performing some noise reduction through spatial filtering and then applying a simple threshold with background removal to the whole-lung scan. As an example, a single slice from a whole-lung screening scan is shown in FIG. 4 and the extracted lung region is shown in FIG. 5. The entire lung volume can be measured or visualized as shown in FIG. 6. A similar method was used by Giger et al. [22], while Brown et al. [71] used an anatomical model with fuzzy set membership based on several soft constraints including threshold, continuity and relative position. Toshioka et al. [84] use geometric filtering to avoid irregularities in the detected boundary. They also use a second method, basing their lung boundary on predictions from rib locations in order to identify the presence of very large nodules.

Further analysis of other thoracic structures is also possible. For example, the lumen of the trachea and the main bronchi may be traced by a simple seeded region growing algorithm; typical results for screening data is shown in FIG. 7. This figure illustrates the limitations of the approach on screening scans due to their low axial resolution; the bronchial tree and the vascular structure can be extracted to a much finer degree with higher-resolution scans. Three-dimensional region growing combined with tree-traversal algorithms has also been used in removal of the lung vasculature as a preliminary step to nodule detection [90, 16, 79].

Until recently, nearly all of the literature on the characterization of pulmonary nodules from radiologic images was concerned with the radiographic appearance of the lesions to a trained radiologist. Most of the measures of nodule size were made manually using calipers or a ruler on chest radiographs or hardcopy CT images. Measurements of shape and density distribution were also described in somewhat qualitative terms.

Some notable work on the characterization and subsequent classification of pulmonary nodules may be found in [26, 47, 82, 73]. The chief characteristics reported were size, smoothness of edge, presence and (for larger nodules) pattern of classification, spiculation, lobulation, cavitation, and the presence of a pleural tail.

Perhaps more important than shape and density characterization, the estimation of nodule aggressiveness as a function of growth rate has been studied for some forty years. Nodule doubling time, as computed from manual measures of nodule diameter, has long been utilized effective predictor of nodule malignancy [12, 56].

A variety of techniques have been used to characterize potential candidate regions for nodule detection in screening data. Measurement of object circularity is often helpful, as this metric may help exclude rib crossings and other structures [50, 44, 92]. Methods involving gradient analysis have also been described [50, 49]. These are based on the notion that the edge gradients of a small nodule-like object should primarily point toward the center of that object, unlike the case with ribs and many vessels.

Morphological operations have been explored for the detection of nodules in CXR [96]. These nonlinear filters impose geometric constraints on the candidate regions, allowing, for example, round objects (e.g. nodules) to be distinguished from longer, flatter ones (e.g. ribs, heart, etc.). Correlation-based template matching has also been used to identify candidate nodules, an idea related to matched filter enhancement [8, 59].

The selection of candidate regions may be refined by one or more automated decision-making steps. Both neural networks [93, 59] and rule-based [8] systems have been used in this capacity. Inputs to these decision-refinement stages come from one or more shape, edge, or histogram features.

One of the most important issues regarding the use of CAD systems for nodule detection is the effective detection rate. Most computer-aided schemes for the analysis of chest radiographs unfortunately have relatively low sensitivity. In addition there is frequently a high false-positive rate (very low specificity) in these systems. A typical result is 2-7 false-positives per image, with sufficient sensitivity (over 70%) [93, 8]. Thus, the choice of operating point on the receiver operating characteristic (ROC) curve for a particular CXR analysis technique may be quite challenging.

In addition to the detection of pulmonary nodules, computer techniques have recently been studied for the classification of nodules found in chest radiographs. Computation of density gradients as a measure of shape and surface irregularity has been used to distinguish benign from malignant nodules [71]. Fractal texture analysis has also been applied to the nodule classification problem with encouraging results [58, 87].

When assessing nodule growth for the prediction of malignancy, two or more CT studies, separated by a suitable interscan interval, are needed. It is theorized that it may also be possible to estimate the probability of nodule malignancy based on size, shape, and density parameters determined from a single exam.

In a screening setting, 2D features are frequently measured to refine the set of nodule candidates for detection. In this capacity, Giger et al. [22] used measures including perimeter, area, compactness, circularity, elongation, and location within the lung. Similarly, Toshioka et al. [84] used area, thickness, circularity, density mean and variation, and location. For small nodule characterization, however, HRCT studies are required (see FIG. 3) and methods for high-resolution characterization are being explored [42, 63, 51].

McNitt-Gray et al. [51] have explored two-dimensional (2D) shape metrics including aspect ratios, circularity, and compactness, as well as a variety of texture measures (e.g. correlation texture and difference entropy). Their study also employed bending energy as a measure of surface characteristics. Three-dimensional measures of surface characteristics were studied by Kawata et al. (42). Using data isotropically resampled to 0.33 mm$^3$ voxels, they measured Gaussian and mean curvature as metrics of irregularity in nodule margin.

Another challenging problem in the study of pulmonary nodules is the analysis of non-solid nodules, or ground-glass opacities (GGOs) [18, 11]. These lesions are difficult to characterize using traditional size and shape metrics.

Patient demographic information has been used as an adjunct to radiographic analysis in the prediction of small pulmonary nodule status. Several patient characteristics have been shown to be highly correlated with nodule malignancy. These include advanced age and smoking history (pack-years) [81, 82, 47].

To study the pulmonary nodule using computer-aided techniques, we must formulate one or more models of what a pulmonary nodule is, in particular, with respect to its radiographic appearance. Pulmonary nodules are lung neoplasms that fall into two general categories: benign and malignant. The separation between these categories is generally one based on rate of growth. Most benign lesions do not grow, or grow much more slowly than malignancies. There are, however, some notable exceptions. Infections in the lung may exhibit extremely fast growth. Also, it has been suggested that there may be some indolent, slow-growing malignant species.

These malignancies are by far the exception, however, and doubling times for most malignant nodules range from 30-400 days [47].

Pulmonary nodules appear radiographically as round, opaque lesions with density slightly more dense than that of water (~0-100 HU). Their position in the lung and immediate surroundings, from an image-analytic perspective, differentiates them into one of the following categories: (a) well-circumscribed—the nodule is located centrally in the lung, without significant connections to vasculature; (b) vascularized—the nodule is located centrally in the lung, but has significant vascularization (connections to neighboring vessels); (c) pleural tail—the nodule is near the pleural surface, connected by a thin structure ("pleural tail"); and (d) juxta-pleural—a significant amount of the nodule periphery is connected to the pleural surface.

The above categories describe the types of solid pulmonary nodules seen in CT images. A second class, known currently as ground glass opacities (GGO) have a significantly less uniform radiographic appearance and will be considered separately later in this work.

One of the best predictors of nodule malignancy is growth rate. Similarly, nodule size, is also highly correlated with malignancy [82]. Significantly larger nodules (>3 cm in diameter) are more likely represent lung cancer [82]. Overall size has therefore been used in characterization and classification studies [26, 82].

In addition to these benefits, volumetric measurement allows for the identification of anisotropic growth. It is commonly assumed that pulmonary nodules grow uniformly in all dimensions.

In 1956, Collins et al. [12] succinctly described the relationship of growth and cancer, as well as the need for quantitative measurements of tumor growth:

"The definition of cancer, its diagnosis and its prognosis all depend upon description of growth. To the layman a synonym for cancer is a 'growth.' There are no quantitative terms for the description of growth or growth rate in clinical use."

Their seminal paper continues, providing some of the most important early discussion of tumor "doubling time," a measure of the amount of time (usually expressed in days) for a tumor to double in volume. Nodule growth, and the rate at which it takes place, is perhaps the feature most predictive of malignancy. Nodule doubling time and calcification in "benign" patterns have been the only universally accepted diagnostic tools of thoracic radiologists in the differentiation of benign from malignant lesions.

Traditional measures of the size and shape of pulmonary nodules were made manually on chest radiographs using calipers. Nodule size was characterized by a measure of diameter (based on the assumption that nodules appeared roughly circular), or as a combination of several "diameter" measurements.

Assessment of pulmonary nodule shape has been based on subjective shape characteristics including notions of roundness, spiculation, lobulation, and sharpness of edge. Nodule surface characteristics are frequently used to help classify benign from malignant nodules. In particular, the presence of spiculation on the surface, as well as lobulation of the overall nodule shape, have been reported as more common in malignant nodules [47, 82]. As with measurement of nodule size, there have been difficulties in making reproducible shape characterizations, due to the lack of a precise mathematical basis and measurement technique.

Several techniques for measuring nodule surface characteristics have been described in the literature. Huo et al. [32, 33] used analysis of radial edge gradients (a technique originally developed for mammography) in two-dimensional CT images. Kawata et al. [42] used a method of curvature estimation based on 3D image gradient analysis. Such techniques for curvature estimation, and the prerequisite 3D gradient analysis and edge detection have been described in detail [5, 54].

Detection of pulmonary nodules in screening CT scans is challenging due to the desire to limit radiation dose and scan time, both of which result in a reduction of information. The need to scan the full lung volume in a single breath hold motivates the use of large intervals between images (10 mm). An additional reduction in radiation dose achieved through low tube current further affects image quality. With these constraints, computer algorithms for the detection of pulmonary nodules have traditionally focused on two-dimensional (2D) algorithms or serial 2D methods that examine connectivity between nodule candidates in adjacent slices.

Automated CAD systems for the detection of pulmonary nodules have been based on a multistage approach, as illustrated in FIG. 8. The main stages are: (a) preprocessing, (b) identification, and (c) classification. Preprocessing involves noise filtering and isolation of the lung region from the image data. Identification is the use of image filters and knowledge based reasoning to develop a set of nodule candidates from the lung volume being searched. Classification is the analysis of nodule candidates, normally as part of a rule-based decision system, to reject other structures (e.g. vessels) from consideration and to assess the likelihood that each remaining candidate is a true nodule. The classification stage in detection systems is sometimes extended to include the separation of benign from malignant lesions, however, this may only achieve limited results with the low-dose, low (axial) resolution studies common to initial screening exams. Characterization and classification techniques that lead to prediction of malignancy are generally performed using high-resolution CT (HRCT).

A number of automated CAD systems for the detection of pulmonary nodules in low-dose screening studies have been described in the literature [94, 22, 84, 7, 4].

A typical lung cancer screening protocol consists of a low-dose (140 kVp, 40 mA) CT scan of the full lung volume using 10 mm collimation, reconstructed at 5 mm intervals, with an in-plane resolution of 0.5 mm or better. Following reconstruction, the resultant voxels are highly anisotropic (0.5×0.5×10 mm). Although the in-plane resolution may be sufficient for the detection (and preliminary characterization) of many lesions, small pulmonary nodules (less than 10 mm in diameter) may appear in only one to three contiguous images. This anisotropy presents special challenges in distinguishing between small pulmonary nodules and fine vasculature.

Blood vessels may have either a linear or elliptical cross-section in a single CT image, depending on orientation. The more perpendicular to the image plane a vessel lies, the more circular the resultant image. Therefore, it is a non-trivial problem to distinguish between small pulmonary nodules and small vascular cross-sections as the low axial resolution of screening studies limits the three-dimensional information needed to fully characterize these objects. The problem is further exacerbated by the fact that nodules are frequently attached to the pulmonary vasculature or to the pleural surface, increasing their difficulty of detection as they may be considered part of either confounding structure due to the similar density values found in many non-calcified nodules.

The preprocessing stage identifies the region of the CT images that correspond to the lung volume. Algorithms have been developed to automatically detect the thoracic cavity, lung volume, tracheobronchial tree, and pulmonary vasculature.

The first step in most pulmonary CAD systems is to identify the lung boundary, thereby eliminating other thoracic structures from the nodule search region. This is typically accomplished using serial 2D gray-level thresholding techniques on each CT image. Spatial filtering may be applied to reduce the effect of noise on the boundary segmentation. Once a preliminary boundary has been determined, geometric filtering may also be used to eliminate discontinuities in the boundaries determined in adjacent slices, as well as to reduce the contribution of image artifacts.

An example of this procedure is shown in FIG. 4 through FIG. 6. FIG. 4 shows a single 2D image from a low-dose screening scan. FIG. 5 shows the lung region in this cross-section produced using the techniques described above. A three-dimensional surface-shaded rendering can also be produced, as is shown in FIG. 6.

Giger et al. [22] used histogram analysis to determine appropriate thresholds for lung segmentation. Toshioka et al. [84] used spline representation and curvature analysis to refine lung boundaries based on standard thresholding as well as the detection of rib locations. This enables the detection of juxta-pleural nodules, which can be excluded from the lung volume using simpler threshold-based methods. Anatomical models were developed by Brown et al. [7] as the basis for a knowledge-based system that utilized fuzzy set membership based on density, spatial locality, and position. These models were then used in the determination of lung, tracheobronchial tree, and thoracic cavity regions. In our studies, we have found that simple thresholding combine with geometric filtering has produced good results in identifying these regions.

Another preprocessing step in pulmonary CAD systems is the identification of the tracheobronchial tree and pulmonary vasculature. Segmentation of the airways may be accomplished by seeded region-growing techniques. An example of this algorithm applied to screening data is shown in FIG. 12. It is evident that the low axial resolution of anisotropic screening data limits the extent to which the bronchi can be followed. Tree-based algorithms that explicitly track the bifurcations of the bronchi and pulmonary vasculature have been described by Wood et al. [90]. Related methods based on morphological filtering [97] and fuzzy logic [103] as well as the benefit of airway subtraction to nodule detection have also been described [16].

Once preprocessing has eliminated regions outside the lung from consideration, the next step in nodule detection is the identification of nodule candidates from the remaining lung volume. This is typically done through the use of one or more gray-level thresholding operations, as the nodules are of higher density than the surrounding lung parenchyma. Yamamoto et al. [94] combined single and double-thresholding with connected-component analysis to identify nodule candidates that are within a selected density range and size. In addition, morphological filters, including disk and ring-shaped kernels as well as 2D morphological opening ("rolling ball filter"), were used to select candidates. Multiple thresholding based on histogram analysis has been used to select nodule candidates and differentiate them from vessels [22]. In this system, while increasing the threshold, vasculature that bifurcates along the scanner axis will produce one or more "daughter nodes" in adjacent slices, thereby reducing the likelihood that the candidate is a true nodule.

The final stage of a pulmonary nodule detection system, classification, is the refinement of a set of nodule candidates based on size, shape, and other measures. A likelihood estimate that the remaining candidates are nodules is also often assigned. The techniques used in refining the set of nodule candidates are somewhat related to those used in the characterization and classification of nodules in high-resolution diagnostic studies. The difference, however, is that the aim of nodule candidate classification is to separate nodules from non-nodules, while characterization and classification in diagnostic HRCT is used to separate benign from malignant nodules. With this distinction in mind, many of the nodule feature metrics used in detection and diagnostic CAD systems describe similar size and shape characteristics. It is important to note, however, that the standard low-dose screening study is significantly anisotropic, and therefore largely limits the feasibility of performing measurements in three dimensions. For this reason, features used for nodule candidate classification have been primarily limited to 2D metrics or analysis of connectivity between adjacent 2D slices.

When a pulmonary nodule is detected at initial screening, high-resolution computed tomographic (HRCT) images may subsequently be acquired to further study the lesion. These studies typically involve scanning the region-of-interest (ROI) containing the nodule at a high in-plane resolution (0.3-0.5 mm), with small beam collimation (1.0 mm) and 1:1 pitch. At the time of HRCT, a diagnostic CT scan of the chest is also commonly done for use in patient management. FIG. 3 shows a comparison between low-dose screening, diagnostic, and HRCT studies.

An important consideration for HRCT studies is that the entire 3D volume of the lesion should be acquired without significant artifact (due to respiration or other patient motion). In traditional high-resolution studies, only the several images containing the largest 2D nodule cross-section were considered vital, as measurements would be made visually or with calipers. Thus, it is an object of the present invention to provide the capability for enhanced size, shape, and densitometric measurement of objects found in the body.

SUMMARY OF THE INVENTION

The present invention includes methods, systems, and computer readable medium for producing and analyzing three-dimensional images. In particular, the present invention relates to image representation and analysis for diagnosis and possible treatment of humans.

With respect to image production, the present invention includes providing a three-dimensional image representation of an object which detectably attenuates a signal resulting from scanning. A signal corresponding to the three-dimensional image is obtained and can be supersampled in three dimensions to a degree greater than the highest spatial frequency of the signal.

Scanning-medium used herein can include x-rays, magnetic field (as provided by MRI), ultrasound, laser, electrical current, visible light, ultraviolet light, infrared light, and radio frequency. A preferred embodiment of the present invention contemplates the use of x-rays such that the signals produced therefrom provides CT tomography for processing and analysis.

Preferably, supersampling includes imposing three-dimensional units of image representation (voxels) on a three-dimensional image signal and increasing the number of such units in order to reduce the contribution of error per unit. Preferably, the supersampling is conducted in three-dimensional isotropic space.

This method can be conducted on a host body, especially a patient, wherein the object is a tissue mass such as a growth, e.g., a tumor. It has been found especially useful for detecting and analyzing pulmonary nodules, and, especially, small pulmonary nodules which are equal to or less than 10 mm in diameter.

After the image has been supersampled, it can be further processed by segmenting the object from other structures detected in the signal retrieved from the scan. Such further processing can include subtracting attachments such as vascular attachments from the object, and, subtracting the object from adjacent structures such as pleural structures. The image can be further processed by restoring volumetric characteristics of the object.

Another aspect of the present invention includes three-dimensional segmentation of a region of interest and a host body to differentiate an object found in the region. The region of interest is scanned with, for example, x-ray, to provide a signal corresponding to a three-dimensional representation of the region upon which three-dimensional units of representation are imposed. The units are then identified as having object signal, background signal and as boundary units which have both object and background signal. The image representation units are then subjected to thresholding in order to separate background from object, followed by three-dimensional connected component analysis to identify those images as objects contiguous in three-dimensional space.

The connected component analysis can include component labeling in three dimensions such as by recursive connected component labeling or iterative connected component labeling.

Furthermore, the segmentation procedure can include the step of three-dimensional supersampling of the three-dimensional signal image.

Segmenting can also include morphologically filtering images identified as a result of the steps set forth above. Such filtering can include three-dimensional opening of the images where by small connections between regions are broken and sharp edges are removed, such opening including erosion followed by dilation of the images in three dimensions. The method can also include a closing of the three-dimensional region of the background signal resulting from the previous steps, such closing including dilation followed by erosion of the background in three dimensions.

The segmentation can also include three-dimensionally regrowing images to approximate true surface characteristic of the images. In one embodiment the regrowing is iterative constrained dilation in three dimensions.

The segmentation procedure can also include eliminating structures adjacent images of interest, and, in the case of a nodule, such structures can include thoracic structures such as a pleural surface. In order to remove thoracic structures, the present invention contemplates determining in three dimensions angles describing orientation of the surface of a structure to be eliminated followed by performing an opening operation (based on the angles previously found) to detect a majority of the structure to the exclusion of the image of interest. Thereafter, the structure is three-dimensionally subtracted from the image of interest. In a preferred embodiment, the step of determining in three dimensions the angles describing orientation of the surface of the structure can be conducted by three-dimensional moment analysis. Moreover, the method for eliminating adjacent structure can also include morphologically filtering in three dimensions the image of interest. Finally, the signal can be processed to provide a smooth surface representation of the image of interest.

A smooth surface representation of a three-dimensional voxel representation of a three-dimensional image can include: segmenting the image to provide a segmented voxel three-dimensional signal; followed by modified tessellating the three-dimensional image to provide a three-dimensional triangulated curve surface estimation; after which the triangulated curve surface estimation can be smoothed by filtering.

Another aspect of the present invention is the ability to provide an estimated volumetric change time (DT) of an object which undergoes change in size in the body, such as a growth or even an organ found in a mammalian host, e.g., a human. This method contemplates obtaining a measurement of a change of a volumetric characteristic of the object over a period of time. The "change" referred to herein can be growth or regression of growth. The change of the volumetric characteristic is then related to the time period of such change by an exponential change model whereby an estimated doubling time can be derived by comparing the volume change over such time period. An "exponential change model" as used herein includes "exponential growth model." Thus, when the term "exponential growth model" is used in the description, exponential change model is deemed to be implicit.

This method is implemented by obtaining two three-dimensional volumetric assessments of an existing object at a first time $t_1$ and at a later second time $t_2$. The volumetric assessment can be a volume $V_1$ followed by measurement of a volume $V_2$. Alternatively, the volumetric characteristic can be a measure of the mean density at time $t_1$ and a measure of the mean density at time $t_2$. Another embodiment contemplates combing a change retardation factor, R, with the standard exponential growth model.

In a preferred method of estimating the doubling time, the measurements can be obtained from three-dimensional images provided from signals having three-dimensional data resulting from scanning the host, and, in other preferred embodiments, when such image has been supersampled, segmented, and both supersampled and segmented. This method is particularly useful in conducting diagnosis and possible treatment of pulmonary nodules, especially small pulmonary nodules which are usually not greater than about 10 mm in diameter.

An alternative embodiment of this method and system include the ability to estimate doubling time of a an object which does not appear in a first scan of the region of interest but does appear at a second scan at time $t_2$. In this case a minimum detectable change dimension β is identified followed by calculating doubling time using a volumetric measurement at $t_2$ and a volume measurement derived from the minimal detectable change dimension β over the time period between $t_1$ and $t_2$.

Another embodiment of the present invention related to time between scans includes a method and system for determining time between scanning examinations, or interscan intervals. In this aspect of the invention, a maximum magnitude of error, ε, between volumetric measurements from scanning and actual object size is developed. A minimum reliably-detectable percent volume change (α) is then identified based on the maximum magnitude of error. A relationship is established between the magnitude of error and object size, preferably a linear relationship, and an expression using an exponential change model is derived in terms of change in volume and time. Based on the expression resulting from the exponential change model relationship, a time interval to observe a percent change is determined. Preferably, this method and system is highly applicable to potentially cancerous growths, especially when the interscan interval is sufficiently short in duration to increase probability of early detection as cancerous. Once again this procedure is especially helpful in detection, analysis, and diagnosis of small pulmonary nodules, e.g., those not greater than 10 mm in diameter.

The present invention also contemplates a method and system of determining volumetric change in size over a period of time. In this method a doubling time of change is first determined, followed by establishing a relationship based on a exponential change model of said period of time between volumetric change time and a relative change in volume, followed by determining the volumetric change over such period of time.

Another method and system of analyzing three-dimensional scanned-produced images includes three-dimensionally registering a region of interest taken at separate times. In one method the registration is effected by locating the center of mass (COM) in the region of interest and aligning subsequent images of the region of interest for analysis. This can be accomplished by iteratively determining the center of mass as explained in detail hereinafter.

In another manifestation of this embodiment, the three-dimensional registration of regions of interest is conducted by three-dimensional correlation. In this case two images of region of interest are selected wherein the limits of search in such region are specified. The second region of interest is translated to all locations in the search region and the three-dimension correlation between the two regions of interest are determined to find the greater value of a match metric.

Analysis of three-dimensional registration of two regions of interest can also include a process of weighting such as by use of Gaussian window, a triangular radial window, or a rectangular radial window, which can be used to reduce unwanted confounding structures found in the region of interest. The three-dimensional weighting of the region of interest can also include method of moment analysis to provide density distribution of the weighted region of interest.

Yet another aspect of the present invention is a method of estimating curvature of an object which has been scanned to provide a signal having a three-dimensional representation of such object. This method includes providing a three-dimensional triangularly tessellated representation of the object followed by determining the surface normal to all triangles in the tessellated representation. In this regard it is noted that every plane surface has a normal, thus each triangle has a surface normal which is determined in accordance with this method. Next, a surface normal at each vertex is then calculated based on the surface normals resulting from the previous step. Then the angular differences between the surface normal at each vertex (designated home vertex, $V_t$) and the vertex normals of all vertices adjacent to the home vertex are determined. Finally, the curvature is estimated at each vertex of the object based on the angular differences resulting from the previous step. The relationships and algorithms supporting this method have been set forth in detail in the Detailed Description of the invention.

The present invention also includes a method of providing a curvature metric analysis of a three-dimensional object which has been scanned to provide a single corresponding to such object. In this method, a measurable three-dimensional representation of an object is provided which includes a surface. Surface curvature is estimated of such surface at a number of discreet points on the surface to provide a number of surface curvature estimates. Then a frequency distribution of the surface curvature estimates resulting from the previous step is determined. Subsequent to determining the frequency distribution of the surface curvature estimates, various aspects of the distribution can be determined, including, but not limited to variance, range of distribution, mean of the distribution, minimum of the distribution, and maximum of the distribution. Preferably the method set forth above can be applied to an object which is a growth in a human such as a pulmonary nodule, especially one which is not greater than 10 mm in diameter.

Moreover, the analysis based on three-dimensional registration can also include estimated doubling time of an object based on a change in the mean density of the region of interest. In this case, an object such as an object image, is Gaussian-weighted and the estimation can be an iterative technique to select an appropriate standard deviation, $\sigma$, for weighting. The doubling time has been calculated based on standardized mean density and a stopping criteria, $\epsilon$.

As a result of the present invention, three-dimensional resampling techniques have been developed and evaluated which mitigate partial volume effects in the assessment of object volume. There has been a significant improvement in the reproducibility of volumetric estimates afforded by the techniques of the present invention over use of standard reconstructed CT data. For example, the double time estimates are consistent with pathologic diagnosis and are more appropriate estimates than those based on 2D metrics. Furthermore, as a result of estimating curvature based on a smoothed tessellated polygonal surface model, the actual nodule surface is approximated given the available resolution.

Another benefit of the present invention is to establish new techniques for computer-aided diagnosis (CAD) of small pulmonary nodules (SPNs). A collection of three-dimensional size, shape, and density metrics have been developed for characterization of small pulmonary nodules. This development has enhanced the ability to differentiate benign from malignant lesions.

Furthermore, new methods have been developed for possible computer-aided analysis and diagnosis of small pulmonary nodules in computed tomographic data. Small pulmonary nodules, those with a diameter of less than 10 mm in diameter, are now commonly detected and analyzed according to their size, shape, density and growth characteristics.

For a better understanding of the present invention, together with other and further objects, references made to the following description taken in conjunction with the accompanying drawings and the scope of the invention will be pointed out in claims.

DETAILED DESCRIPTION OF THE INVENTION

Figure 1:
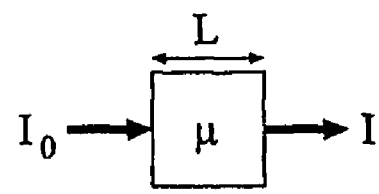
FIG. 1 is an illustration of Beer's Law in a homogeneous material.
Figure 2:
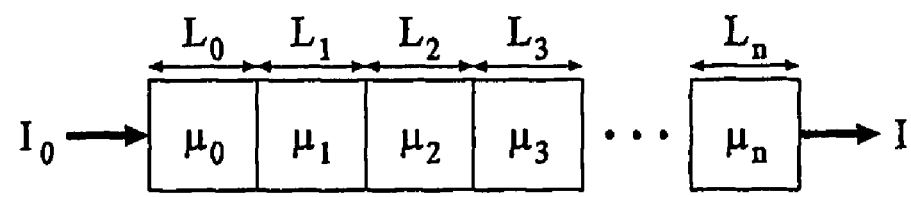
FIG. 2 is an illustration of Beer's Law in a heterogeneous material.

The present invention relates to methods and systems for conducting three-dimensional image analysis and diagnosis and possible treatment modalities relating thereto. For the purpose of disclosing the present invention and the present preferred embodiments thereof, the detailed description has been broken down by subject matter in order to more clearly explicate the various aspects of the invention. Headings have been provided for the sake of convenience and focus of subject matter, but are not meant in any way to limit the scope of applicability of the subject matter found in one section. Indeed, each technical aspect is generally considered germane to subject matter found in other sections. Thus, one must read all of the sections as related to the extent that the technology disclosed therein can be applied to the technology found in other sections.

Furthermore in this regard, a certain degree of redundancy has been built into the detailed description in order to provide as much as possible overview and correlation of the technology between sections found herein.

A system in accordance with one embodiment of the present invention can include a scanner, a processor, a memory, a display device, input devices, such as a mouse and keyboard, and an internal bus connecting the various components together. The system can be coupled to a communication medium, such as a modem connected to a phone line or a wireless network, or an Internet connection. Since the components of a computer and how they operate are well known to one of ordinary skill in the art, they will not be discussed here.

A scanner includes any device capable of imposing a scanning medium on subject, e.g., a patient, to produce a signal attenuated by objects in the field of the scan. These devices include, but are not limited to, CT scanners, MRI, PET, ultrasound, optical tomography, and electrical impedance tomography. A preferred scanner is a helical CT scanner which was used in the work and analysis reported herein.

A processor as referred to herein is a system of one or more electronic components which are statically or dynamically configured (in hardware or software) to implement an algorithm or process. Examples include systems based on microprocessors, application-specific integrated circuits (ASICs), field-programmable gate arrays (FPGAs), and/or discrete components. Any type of storage device, such as a RAM or ROM, can be used as the memory in the system. Additionally, the memory can be a magnetic, optical, magneto-optical, or solid state drive that is coupled to the processor and which can receive portable memory devices, such as floppy disks, hard disks, optical disks, or solid-state memory on which the method of processing computed tomography images in accordance with the present invention is programmed. All media which can store information, operating instructions, etc., and can be read by a computer for processing, storage, etc. is referred to collectively herein as "machine readable-medium." The method of processing computed tomography images in accordance with the present invention can be stored as an executable program in the memory.

Section 1: Computer Assisted Diagnosis (CAD)—Virtually all aspects of the present invention can be used to provide computer assistance in the process of diagnosis for detecting, treating, and monitoring the biological condition(s) of a patient. The degree to which the techniques and technology disclosed herein are used and/or relied on depends on the condition, the patient, the predictability of outcome, the physician and other factors too numerous to detail herein. To the extent the technology disclosed herein can be considered as relevant to (e.g., as a basis for or as part of) Computer Assisted Diagnosis (CAD), each aspect of the invention claimed herein includes such relevancy to CAD apparatus, systems and methods.

Section 2: Nodule Size and Shape—As a means for explanation and analysis, a basic model for the appearance of a small solid pulmonary nodule is defined as roughly spherical, with a diameter less than 1 cm. The nodule has a density (CT attenuation) significantly higher than that of the surrounding lung parenchyma. The nodule form may be confounded by other neighboring/attached structures, including vessels and the pleural surface. As the concern is the analytic characterization of the nodule itself, an important task is image segmentation the delineation of the nodule boundary and removal of other structures from consideration. The image segmentation process is one of the most challenging aspects of any computer vision task. Segmentation methods for pulmonary nodules in CT scans are discussed herein. Segmentation can also be viewed as preprocessing of the image region of interest (ROI) to yield a three-dimensional representation of the nodule which conforms to our basic model of a pulmonary nodule.

Figure 9:
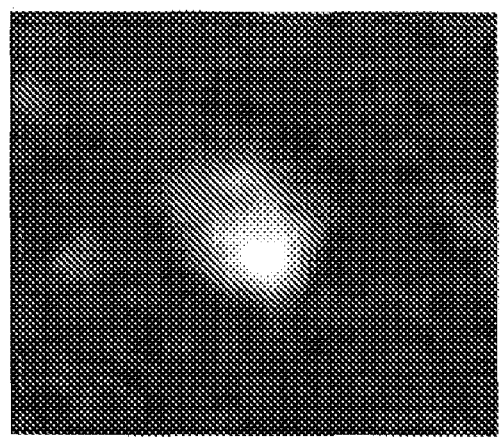
FIG. 9 illustrates a well-circumscribed small pulmonary nodule.

Consider this basic model in the case where the nodule is well circumscribed. An image of a well-circumscribed pulmonary nodule is shown in FIG. 9. In this case, the segmentation may be accomplished using a simple gray-level thresholding operation. Selection of the appropriate threshold involves the following issues. First, a threshold can be selected that best separates the nodule (foreground) from the lung parenchyma (background), which in the well-circumscribed case would have a bimodal intensity histogram. This separation may be achieved by selection of a threshold that falls at the midpoint between the peaks of each mode of the histogram, or by using a process (and related algorithmic relationship) that considers the area under the histogram in each region. Thresholding methods are discussed in Section 4.

The second consideration when selecting a threshold is in evaluating its change in size over time. Thus a single threshold should be selected which is appropriate across multiple studies of the same nodule. In addition, a standard threshold may be determined for a general class of well-circumscribed nodules such that the size of nodules can be compared across time and multiple subjects.

Confounding Structures—Well-circumscribed pulmonary nodules with their characteristically high contrast to the surrounding lung parenchyma are unfortunately not the only class of pulmonary nodules commonly seen in CT studies. Measurement of the size and shape of pulmonary nodules is frequently confounded by the presence of other structures nearby or adjoining the nodule. A simple two-level model based on CT attenuation is insufficient to completely separate the pulmonary nodule under consideration from these other structures, as they frequently exhibit similar density characteristics.

Figure 10:
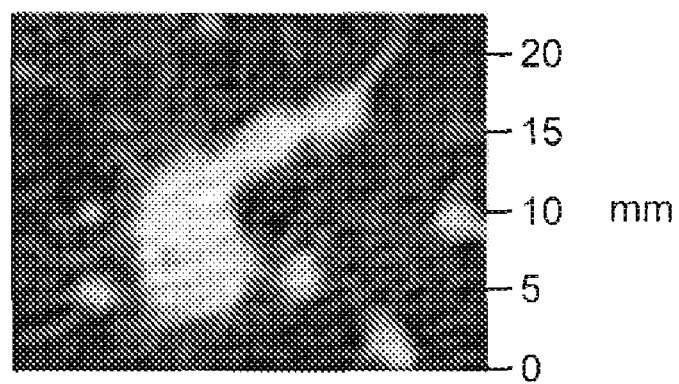
FIG. 10 illustrates a small pulmonary nodule with confounding vasculature.

Vasculature—Pulmonary nodules, as other cellular structures in the body, require oxygen and nutrients to sustain growth. These are supplied to the nodule by the local vasculature (blood vessels). The radiographic appearance of these vessels ranges from undetectable in peripheral lesions, to significant in more central ones. FIG. 10 shows an image of a small pulmonary nodule with surrounding and attached vessels.

A variety of physiological factors underly the presence of vascular attachments to pulmonary nodules. In the context of this work, however, it is sufficient to state that vessels may appear nearby or significantly attached to nodules, which complicates the nodule segmentation problem. Method (and related algorithms) for the subtraction of blood vessels during image segmentation are discussed in Section 4.

Figure 11:
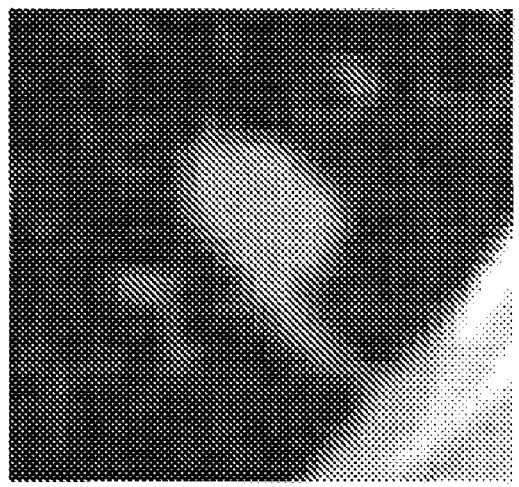
FIG. 11 illustrates a small pulmonary nodule with a pleural tail.

Pleural Surface—Peripheral pulmonary nodules often exhibit some degree of attachment to the pleural surface (on the periphery of the lung, compressed against the external boundary of the thorax). One possible type of attachment is the so-called "pleural tail sign." This appears as a small, thin structure of nodule-like attenuation connecting the nodule to the pleural surface. A nodule with a pleural tail is shown in FIG. 11. In such cases, segmentation is relatively straightforward and methods similar to those used to remove confounding vessels may be employed.

Figure 12:
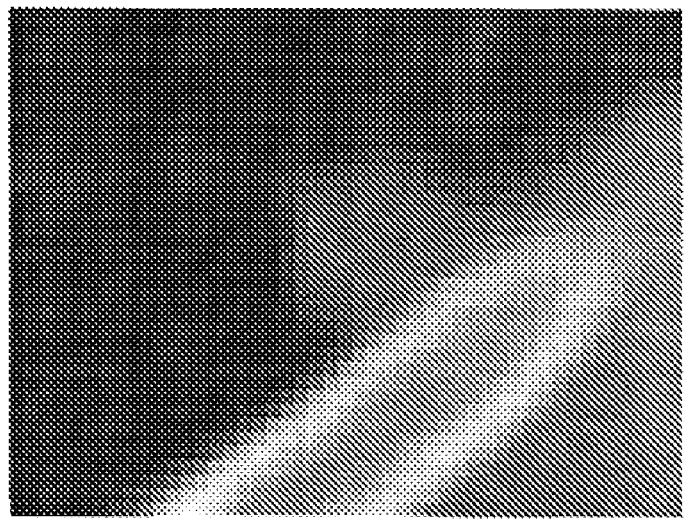
FIG. 12 illustrates a small juxtapleural nodule.

A second class of pleurally-attached nodules are those that are juxtapleural. These nodules share a significant amount of their surface with the pleura. For this reason, delineation of the boundary between pleura and nodule can be quite challenging. A small juxtapleural nodule is shown in FIG. 12. Segmentation techniques for juxtapleural nodules are described in Section 4.

Nodule Models—Segmentation and measurement of pulmonary nodules in CT data benefits from a more formal mathematical model and description of each nodule type we wish to describe. The four basic solid nodule types are as follows: well-circumscribed, vascularized, pleural-tail, and juxtapleural. Having given a qualitative description of each one of these types, we may now formalize mathematical models for each.

Well-Circumscribed—A well-circumscribed nodule is one that is located centrally in the lung, without significant connections to vasculature. A simple model for the nodule would be based on the fact that there is contrast in x-ray attenuation and, therefore, voxel intensity, between the nodule and the surrounding lung parenchyma. This model a set N of voxels in the nodule would then include all voxels greater than or equal to a given intensity threshold:

$$N = \{v(x,y,z) | v(x,y,z) \geq T\} \tag{2.1}$$

This model would be very sensitive to noise, however, as any voxel in the region of interest meeting the threshold criterion would be included. A better model is to include connectivity between the voxels in the nodule. For each voxel in the set, then, there would have to be at least one neighboring voxel also in the set. Note that we intentionally exclude the trivial case where the nodule would be a single voxel. This connected nodule model could be defined in terms of the set of voxels adjacent to a given voxel. This set will be denoted as adj(v(x, y, z)). Voxel connectivity will be described below in detail. Our model for the well-circumscribed nodule is then the set of connected voxels greater than or equal to a given intensity threshold:

$$N_c = \{v(x,y,z) | (v(x,y,z) \geq T) \char`\^ (\exists n | n \in adj(v(x,y,z)), n \in N_c)\} \tag{2.2}$$

There is the possibility that there may be more than one connected component A in the region of interest (ROI). Considering the fact that there may be more than one set of connected voxels meeting the threshold criterion, we will elect to choose the largest of these sets, $N_{max}$, (that which has the largest volume):

$$N_{max} = \max A_i \tag{2.3}$$

where each of the eligible sets is defined as $$A_1 = \{v(x,y,z) | (v(x,y,z) \geq T) \char`\^ (\exists n | n \in adj(v(x,y,z)), n \in A_1)\} \tag{2.4}$$

Thus, we will assume that the nodule will be the largest connected component (meeting the threshold criterion) in the ROI.

Vascularized—A vascularized nodule is one that is located centrally in the lung, but has significant vascularization (connections to neighboring vessels). Clearly, the use of the well-circumscribed nodule model for the segmentation and analysis of vascularized nodules is inappropriate, as that model of connectivity would include the vascular components as part of the nodule. Instead, we define a model which distinguishes nodule volume from connected vessels geometrically.

Consider a model in which the vascularized nodule is the union of spheres of diameter $\mu$.

$$N_v = \cup s(x,y,z) | d_s = \mu \tag{2.5}$$

Each of the voxels in each one of these spheres must satisfy a threshold criterion, as was true for the well-circumscribed nodule model, as well as have no more than $\mu/2$ distance from the sphere's center. The following equation describes such a sphere, s(x, y, z), centered at voxel (x, y, z), where D is the Euclidean distance function between two voxel locations.

$$s(x,y,z) = \cup \{(v(x_i,y_i,z_i) | (v(x_i,y_i,z_i) \geq T) \char`\^ (D(\{x_i,y_i,z_i\}, \{x,y,z\}) \leq \mu/2)\} \tag{2.6}$$

We will additionally define a maximum diameter, $\lambda$, of any vessels which may be connected to the nodule volume. Then, if we choose $\mu$ such that $\mu > \lambda$, we ensure that the majority of each vessel volume will not be included in the nodule volume.

Figure 13:
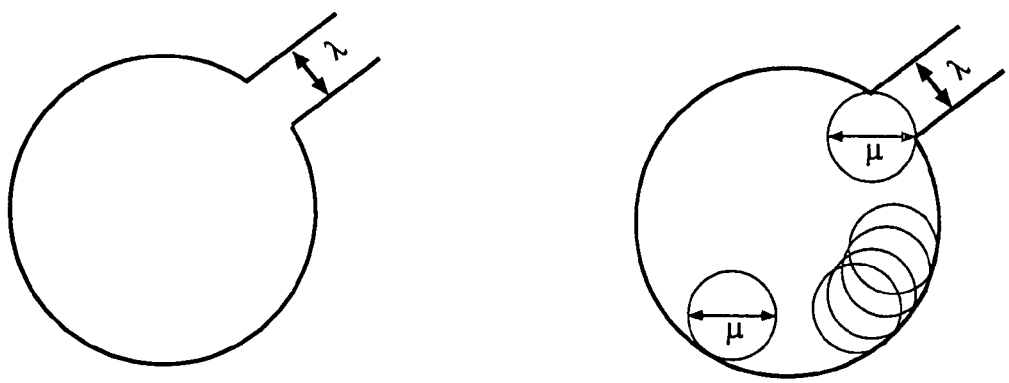
FIG. 13 illustrates a model of a vascularized nodule.
Figure 14:
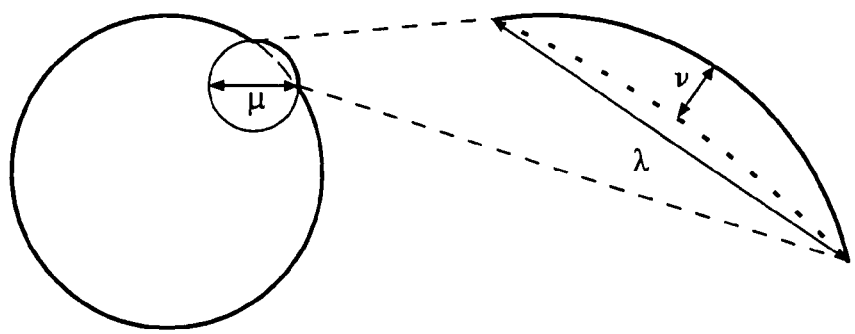
FIG. 14 illustrates a volume overestimation at point of vessel attachment.

This model of a vascularized nodule is illustrated in two dimensions in FIG. 13. The illustration on the left shows all of the nodule and vessel area (volume in 3D) which meets the thresholding criterion. The illustration on the right shows how the nodule volume can be described as the union of circles (spheres in 3D) of diameter $\mu$, while effectively ignoring the majority of the vascular component. The model of a vascularized nodule as a union of translated spheres is closely allied with the notion of the opening operation in mathematical morphology. This topic and it's practical relation to the vascularized nodule model will be discussed below in greater detail. One of the issues of interest is the overestimation of nodule volume at the point of vessel attachment, as illustrated in FIG. 14. Note how the spherical "structuring element" allows the inclusion of a small amount of the vessel volume (outside the spherical nodule volume). For an idealized model of a spherical nodule with a vascular attachment of diameter $\lambda$, it is possible to formally state the extent of this volume overestimation. The volume in the extraneous region, $V_{ext}$, is the difference between the portion (spherical cap), $\hat{V}\mu$, of the structuring element that extends beyond the line of length $\lambda$, and the spherical cap, $\hat{V}_s$, of the spherical nodule volume beyond the same line. These two regions are illustrated (in 2D) in the right-hand part of FIG. 14. The extraneous region, $V_{ext}$ is that between the dotted line (the boundary of the large sphere) and the external boundary. The largest perpendicular distance in this cup-shaped volume is shown as v. The volume $\hat{V}\mu$ is the region between the straight line of length A and the external boundary, while the volume $\hat{V}_s$ is that between the straight line and the dotted boundary of the large sphere. Therefore, the extraneous, cup-shaped, volume is simply their difference:

$$V_{ext} = \hat{V}\mu - \hat{V}_s \tag{2.7}$$

Figure 15:
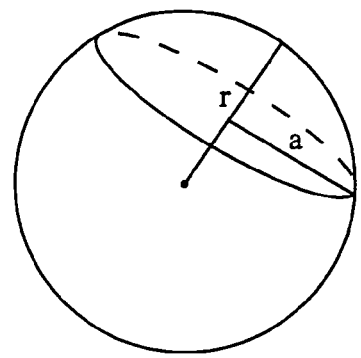
FIG. 15 illustrates a volume of a spherical cap.

FIG. 15 illustrates the volume of a spherical cap. The volume as a function of r, the radius of the sphere, and a, the radius of the intersecting disk is $$\hat{V}(r, a) = \frac{\pi}{3}\left(r - \sqrt{r^2 - a^2}\right)^2 \left(2r - \sqrt{r^2 - a^2}\right) \tag{2.8}$$

Using Equation 2.8, we may substitute the appropriate values of r and a to derive the volumes of $\hat{V}\mu$, and $\hat{V}_s$, and subsequently, $V_{ext}$. For the structuring sphere, of radius $\mu/2$, the volume of the spherical cap is $$V_\mu = \frac{\pi}{3}\left(\mu/2 - \sqrt{(\mu/2)^2 - \lambda/2)^2}\right)^2 \left(\mu - \sqrt{u/2)^2 - (\lambda/2)^2}\right) \tag{2.9}$$

and for the large sphere of radius $r_s$, the volume of the corresponding spherical cap is $$\hat{V}_s = \frac{\pi}{3}\left(r_s - \sqrt{r_s^2 - \lambda/2)^2}\right)^2 \left(2r_s - \sqrt{r_s^2 - (\lambda/2)^2}\right) \tag{2.10}$$

Figure 16:
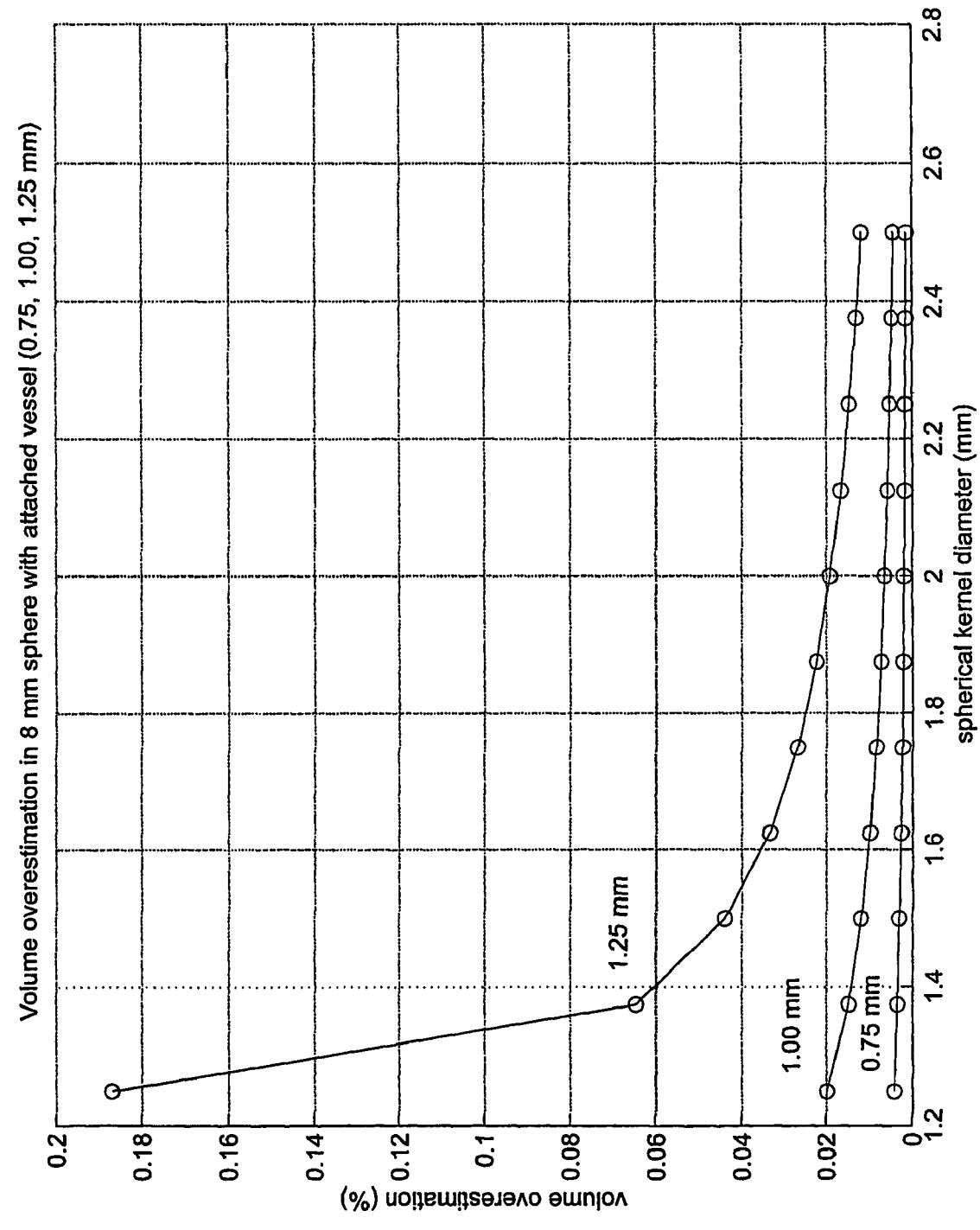
FIG. 16 illustrates a volume overestimation of an 8 mm spherical nodule with vascular attachments of varying sizes following opening with a spherical kernel.

The volume of the extraneous cup-shaped region, therefore, can be determined using Equations 2.7, 2.9, and 2.10. Note that these expressions are general for any sized spherical nodules, structuring spheres, and vessel diameters. More specifically, for a particular spherical nodule size and structuring sphere, the contribution of multiple vessels of different diameters can be determined. An example is illustrated in FIG. 16, where a spherical nodule of 8 mm in diameter (r=4) has a vascular attachment of varying diameter (λ). Each of the curves in the graph corresponds to a λ value of 0.75, 1.0, or 1.25 mm. The graph illustrates the percent overestimation in nodule volume when the diameter of the structuring kernel used (μ.) is varied from 1.25001 to 2.5 mm. In the worst case (λ=1.25 mm, μ=1.25001 mm), where the structuring kernel is barely large enough to detach the vessel, the volume overestimation is less than 0.19%. As the kernel diameter is increased, this value decreases logarithmically.

Pleural Tail—The third variety of nodule is near the pleural surface and connected to it by a thin structure, called a "pleural tail." While it may be advantageous in some respects to treat this group differently than those in all other groups, it may be modeled as one of the other two groups, as a vascularized nodule, or as a juxtapleural nodule. In the former case, consider a model similar to that of the vascularized nodule, where the nodule region is the union of spheres of diameter μ, wherein each voxel meets a fundamental threshold criterion $$N_p = \cup s(x,y,z) | d_s = \mu \qquad (2.11)$$

This expression is sufficient to exclude all of the pleural tail except for a small, cup-shaped region. A full discussion was given in the context of vascularized nodules set forth above. When the volume of the pleural tail is to be considered jointly with the rest of the nodule, the juxtapleural nodule model tray be used, described in the next section.

Figure 17:
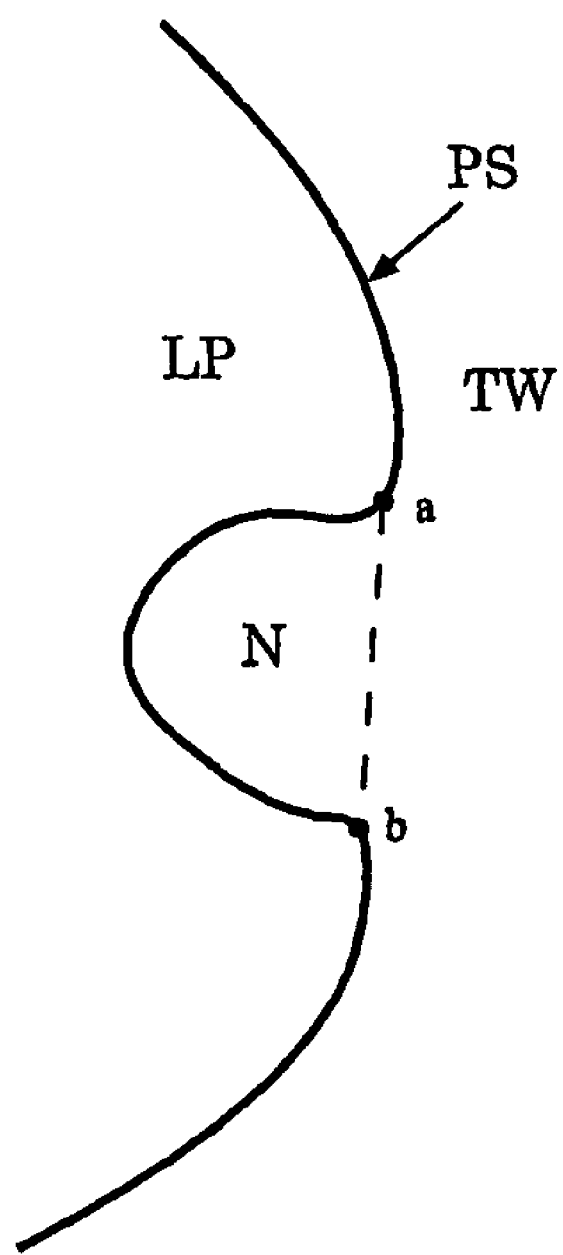
FIG. 17 illustrates a model of a juxtapleural nodule.

Juxtapleural—In juxtapleural nodules, a significant amount of the nodule periphery is connected to the pleural surface. FIG. 17 illustrates the basic model. Four regions are defined: N, the nodule region; LP, the surrounding lung parenchyma; PS, the pleural surface; and TW, the thoracic wall region. In CT images, the nodule region and the thoracic wall region both exhibit high-attenuation characteristics. Therefore, while simple thresholding is able to separate the nodule from the lung parenchyma, it is insufficient to separate the nodule from the outer thoracic region. In FIG. 17, a dashed line between points a and b has been included to indicate one possible boundary between nodule and thoracic wall regions. Physiologically, the pleural surface separates the lung volume (containing the parenchyma) and the thoracic wall. When a juxtapleural nodule is present, however, there may or may not be invasion of the pleura. Whether the nodule has invaded the pleura or is merely adjacent to it, voxel density (intensity) information is rarely sufficient to distinguish these regions.

In our model, we would like to consider the nodule region to be only that volume which is unlikely to be part of the thoracic wall. This can be defined geometrically. We may define points a and b in the two-dimensional cross-section shown in FIG. 17 to be those points of maximum concavity for a given scale. The notion of scale in the estimation of concavity here is quite important, as the pleural surface boundary is likely to have local concavities due to image sampling geometry and also physiologic/anatomic variation. Techniques for determination of the boundary between the nodule region and thoracic wall will be discussed below.

Figure 3:
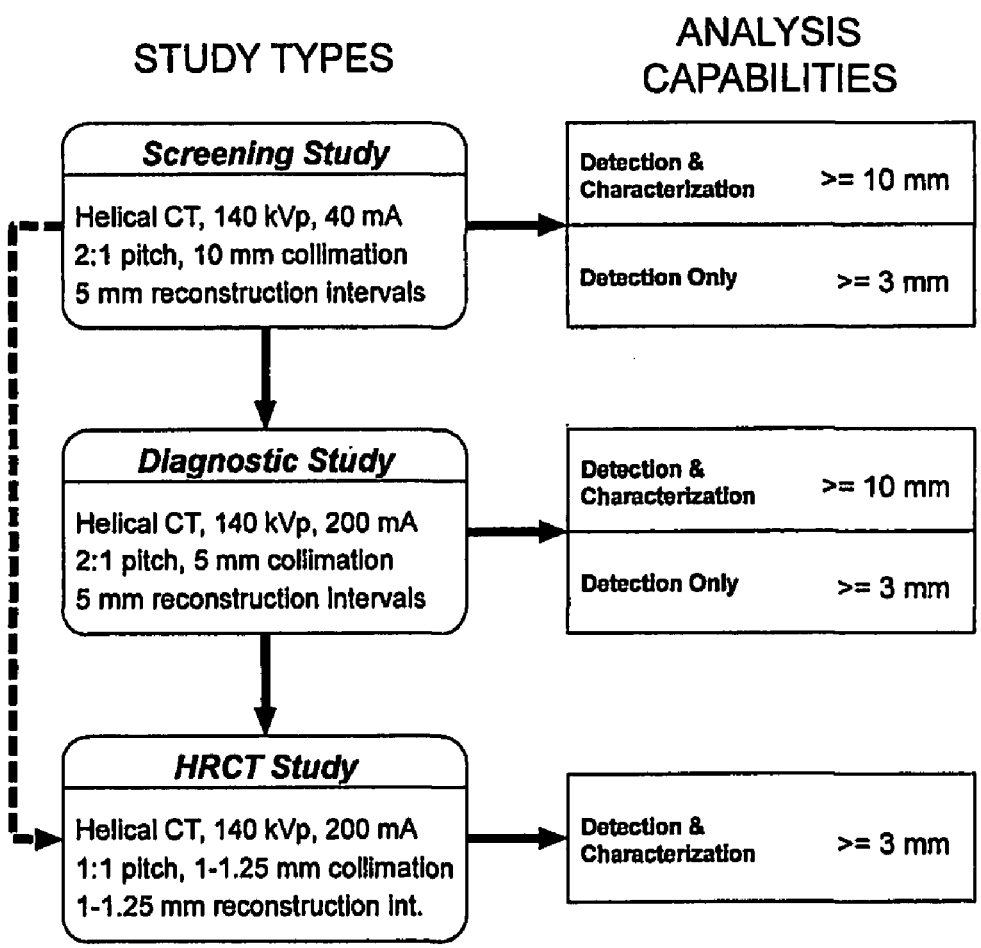
FIG. 3 illustrates a comparison of screening and diagnostic CT protocols.
Figure 4:
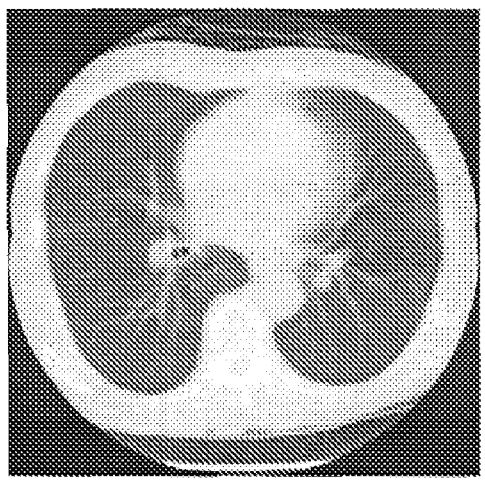
FIG. 4 illustrates a single slice from a whole-lung CT scan.
Figure 5:
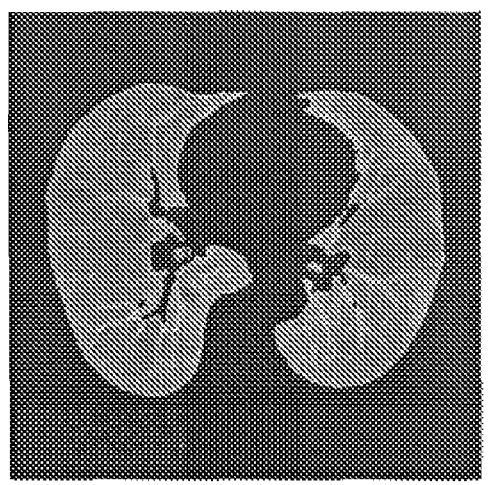
FIG. 5 illustrates the lung region identified from the CT slice shown in FIG. 4.
Figure 6:
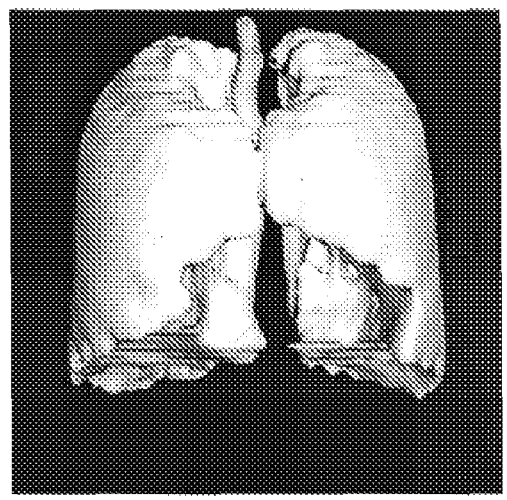
FIG. 6 illustrates a 3D reconstruction of the lung surface.
Figure 7:
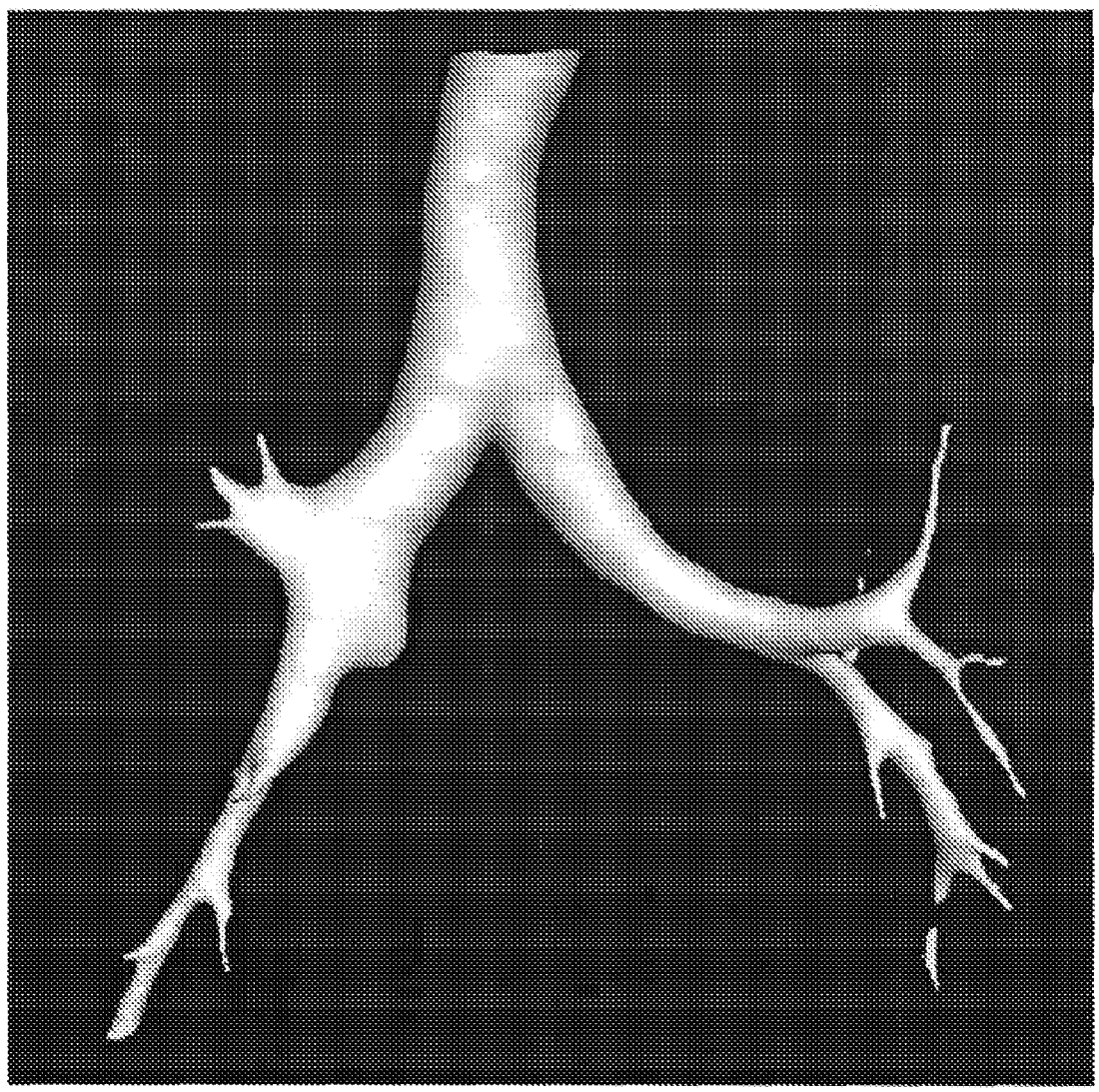
FIG. 7 illustrates a 3D reconstruction of the trachea and main bronchi.
Figure 8:
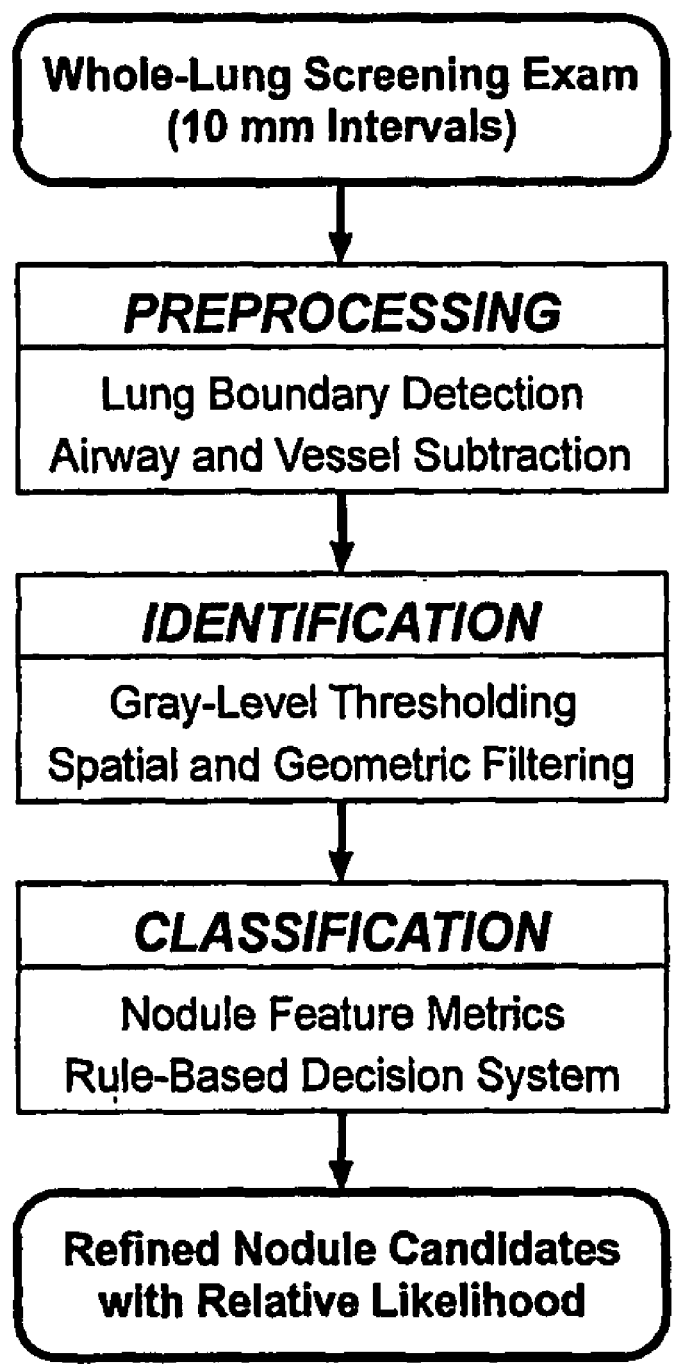
FIG. 8 illustrates a multi-stage approach for the automated detection of pulmonary nodules in screening scans.

Section 3: Data Acquisition—Data acquisition and management are non-trivial aspects to lung cancer research using computed tomography. All CT data used in this work were collected as part of the IRB-approved Cornell Early Lung Cancer Action Project (ELCAP). The data were acquired using GE High-Speed and LightSpeed CT scanners using the protocols described the Background and shown in FIG. 3.

Each two-dimensional CT image is a 512×512 image with 12-bit pixels, providing a dynamic range of 4096 gray-levels. The pixels are backed into two-byte words (16 bits), simplifying the data alignment for storage and processing. A given CT examination may generate as many as 200 of these images, given several series and associated reconstructions. A quick calculation illustrates the enormity (by current technological standards) of the storage problem.

$$\text{Size}_{image} = 512 \cdot 512 \cdot 2 \text{ bytes} = 512 \text{ KB} \qquad (3.1)$$

$$\text{Size}_{exam} = 200 \cdot 512 \text{ KB} = 100 \text{ MB} \qquad (3.2)$$

While the raw data for most studies is on the order of 50 MB, additional storage must be available for processed images, results of image analyses, and special visualizations. Given the large data storage and management requirements of this project, standardized mechanisms were developed for image accrual, processing, and archiving.

DICOM—The Digital Imaging and Communications in Medicine (DICOM) 3.0 [13] communication protocol and image storage standards can be used as the interface to the system. These are well-defined standards which allow the acquisition of data from a variety of sources, providing a system and vendor independent interface to the analysis system.

VisionX—The VisionX system, developed at Cornell University, is a collection of computer vision and image processing libraries which have been used in a wide range of image analysis research. The VisionX development system was the basis for the method, system, and software developed in this invention.

Software for the transmission of DICOM images to and from PACS (Picture Archiving and Communication Systems) systems and conversion to and VisionX format was developed. In VisionX format, the DICOM header information, selectively blinded with respect to patient-identifying information, is retained to facilitate retransmission of data and/or analyses to standard PACS systems.

Isotropic Resampling—Most CT data are sampled in an anisotropic space, where the resolution in each of the three dimensions is not equal. The in-plane (x-y) resolution on modern scanners is typically better than 1.0 mm in both dimensions. The axial (z) resolution, however, may be anywhere from near 1 mm to as high as 20 mm. A typical high resolution scan protocol provides 0.5 mm in-plane resolution with 1 mm axial reconstructions, producing voxels that are (0.5×0.5×1.0 mm). This poses several problems. First, although high-resolution 2D measurements can be made in any one of the highly-resolved CT slices, 3D measurements are hindered by the less-resolved axial dimension. Special anisotropic image filters need to take into account the different axial resolution, which becomes computationally cumbersome. A second, more important problem to consider is that of partial volume effects.

Figure 18:
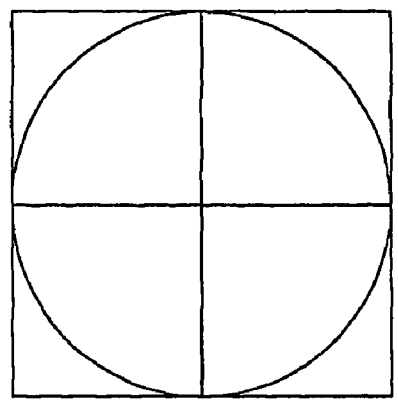
FIG. 18 illustrates a two-dimensional sampling of a circle where n equals 0.
Figure 19:
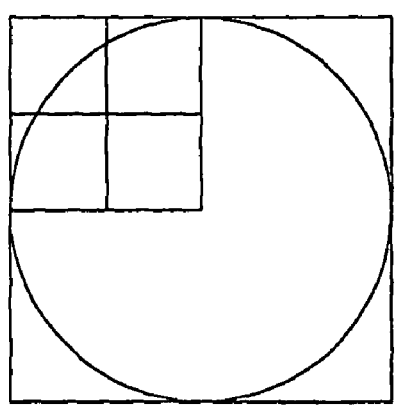
FIG. 19 illustrates a two-dimensional sampling of a segment of a circle where n equals 1 and 2.
Figure 19:
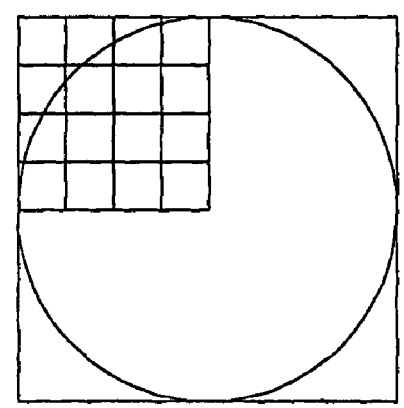

Partial Volume Effects—The partial volume problem describes the quantized, discrete spatial nature of the CT image. Consider the following two-dimensional example. A unit circle (radius=1) is perfectly sampled on a regular grid. Pixels are set if a sufficient percentage of their area corresponds to the interior of the circle. We may assume this threshold to be 50% of a pixel's area. The resolution of the system, at the coarsest setting is equal to the radius of the circle. This is illustrated graphically in FIG. 18. For simplicity, most of the following discussion will concern only one segment of the circle, the upper left 90° segment, and the corresponding quadrant of the square in which the circle is inscribed. The quadrant may be divided at any number of regular intervals to define an appropriate sampling grid, but for this example, we will choose this division factor to be powers of two for the number of divisions in the x and y dimensions, with n the appropriate exponent of 2. In FIG. 18, for example n is equal to zero, and the quadrant is divided into one large pixel, with area equal to 1. FIG. 19 illustrates the cases where n is equal to 1 and 2.

With this model in place, we may discuss the accuracy of area measurement of the circular segment as a function of sampling interval (image resolution). The true In the area of the circular segment is $$\frac{\pi r^2}{4} = \pi/4 \approx 0.7854$$

In the case where n=1, the area is estimated to be 1.0, as more than 50% of the pixel is covered by the circle. When n is increased to 1 and 2, the area estimates improve. In the first case, three of four pixels are set, yielding an area estimate of 0.75. For n=2, 13 of the 16 pixels are sufficiently filled by the circle, giving an estimate of 0.8125.

Figure 20:
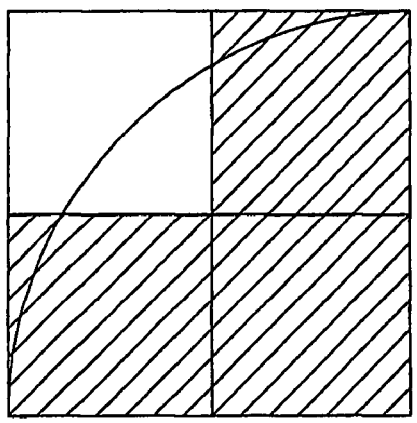
FIG. 20 illustrates a two-dimensional area estimation of a segment of a circle.
Figure 20:
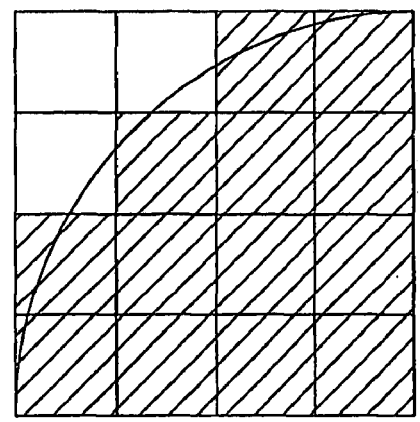
Figure 20:
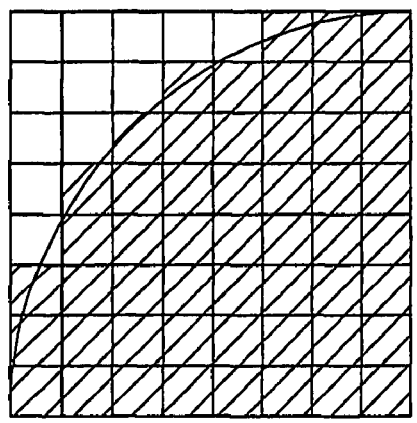
Figure 20:
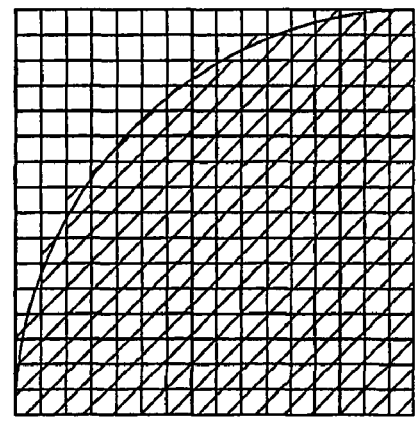

FIG. 20 illustrates the cases in which n is equal to 1, 2, 3, and 4, showing only the quadrant of interest. In each case, the pixels that would be considered members of the circle are shaded. It is obvious from the figures that as the degree of subdivision of the sampling grid increases, the error in area estimation of the circle decreases. It is also possible to produce bounds for this error as a function of the degree of subdivision. Consider, however, the case where the unified quadrant is the original pixel size in the acquired image. We may then cast our discussion in terms of the degree of resampling of the image space. We may define the supersampling ratio, s, to be the number of divisions of the original pixel size in each of the x and y dimensions. The n-th term of the series describing s, then, is simply $$s_n = 2^n \qquad (3.3)$$

Similarly, the number of pixels, p, in the quadrant is given by $$p_n = 2^{2n} \qquad (3.4)$$

Now, consider that the error in area estimation is the sum of errors made in representing the circle boundary, and that we therefore only need to consider the pixels through which this boundary passes to evaluate the error. Each of these pixels will each contribute to either an overestimate or underestimate of the true area. For example, in the upper left illustration (n=1) in FIG. 20, the upper right and lower left pixels are set, each overestimating the true area of the segment. The upper left pixel however, is unset, contributing to a local underestimation of the area. Again, it should be clear that only those pixels through which the true boundary passes contribute to this error. Pixels that are definitively in the image foreground (set) or background (unset) will be correct. In the upper right illustration (n=2) in FIG. 20, there are 8 definitive foreground pixels and one definitive background pixel. The remaining seven, those on the boundary, each contribute some positive or negative error to the overall area estimate.

It is possible to formally define the number of such boundary pixels in this model, those for which the relative proportion of foreground will determine whether they are set. The number of these boundary pixels, b, in this quadrant is defined as $$b_n = 2^{n+1} - 1 \qquad (3.5)$$

The first few terms in the series, {1, 3, 7, 15, 31}, corresponding to $0 \leq n \leq 4$, describe the numbers of upper left quadrant boundary pixels shown in FIGS. 18 and 20. For example, in the lower left illustration in FIG. 20 (n=3), the supersampling ratio, s, is 8, the number of pixels, p, is 64, and the number of boundary pixels; b, is 15.

The magnitude of the contribution each boundary pixel to the overall error is bounded by 0.5 times the area of the pixel, as we chose 50% coverage as the threshold for determining whether a pixel is set. Therefore, a conservative upper bound on the error for estimating the area of the circular segment, ε can be expressed as $$\epsilon = b \cdot \frac{a}{2} \qquad (3.6)$$

where a is the area of a pixel. Given that this is a unit circle, and therefore the quadrant has unit area, the area of each pixel is $$a_n = \frac{1}{p_n} = \frac{1}{2^{2n}} = \left(\frac{1}{2}\right)^{2n} \qquad (3.7)$$

Thus, the error bound for a given value of n may be restated as the series where $$\epsilon_n = b_n \cdot \frac{a_n}{2} = (2^{n+1} - 1)(2^{-(2n+1)}) \qquad (3.8)$$

and, after some manipulation, $$\epsilon_n = \left(\frac{1}{2^n} - \frac{1}{2^{2n+1}}\right) \qquad (3.9)$$

Each of the two terms in this series converges to zero, with the latter converging much faster. Essentially, as n increases by one, the number of boundary pixels basically doubles, while their size, and thus their error contribution, is divided by four. This leads to an error bound that is approximately halved with each increase in n. With this two-dimensional example, we can see how perfect interpolation, or resampling, of the image space can reduce errors in size estimation. In three dimensions, isotropic resampling (supersampling to an isotropic space) allows segmentation decisions to be made on a super-resolved, or supersampled, grid, allowing more accurate, consistent boundary decisions to be made. The intensity in each image voxel is interpolated to estimate the intensities in each of the sub-voxels in the supersampled space. Thus, each original voxel intensity value is responsible for several in the new image space, mitigating partial volume effects in the original data, as a more precise spatial location of the desired gray-level transition (boundary) can be identified.

Supersampling—Three-dimensional supersampling is the process by which the image is given a new representation in units bearing a higher spatial frequency than those in the original image, resulting in an improvement in image resolution. The original image may be anisotropic or isotropic and supersampled to either a more refined anisotropic or isotropic space. The process involves computing new voxel values at every location in the new, more refined coordinate space. Each of these values may be computed using one of a variety of interpolation schemes including trilinear, tricubic, and B-spline interpolation.

Trilinear interpolation—In the present invention, supersampling was conducted using trilinear interpolation of each voxel value at location $(x_n, y_n, z_n)$, where each new voxel value can be defined in terms of the voxels' eight nearest neighbors in the original space, $v(x_i, y_j, z_k)$, where $$i=[0|1]$$

$$j=[0|1]$$

$$k=[0|1] \quad (3.10)$$

For notational simplicity, we define three distances between $v(x_n, y_n, z_n)$ and $v(x_i, y_j, z_k)$ in terms of the perpendicular distance along each of the x, y, and z Cartesian axes.

$$dx_i = |x_n - x_i|$$

$$dy_j = |y_n - y_j|$$

$$dz_k = |z_n - x_k| \quad (3.11)$$

We also define the resolution in each dimension in terms of the distance between adjacent voxels in each dimension.

$$rx = |x_1 - x_0|$$

$$ry = |y_1 - y_0|$$

$$rz = |z_1 - x_0| \quad (3.12)$$

Given the above, the value of the new voxel based on trilinear interpolation is $$v(x_n, y_n, z_n) = v(x_0, y_0, z_0) \cdot (1 - dx_0/rx) \cdot (1 - dy_0/ry) \cdot \quad (3.13)$$
$$(1 - dz_0/rz) + v(x_1, y_0, z_0) \cdot dx_0/rx \cdot$$
$$(1 - dy_0/ry) \cdot (1 - dz_0/rz) + v(x_0, y_1, z_0) \cdot$$
$$(1 - dx_0/rx \cdot dy_0/ry \cdot (1 - dz_0/rz) + v(x_0, y_0, z_1) \cdot$$
$$(1 - dx_0/rx) \cdot (1 - dy_0/ry) \cdot dz_0/rz) +$$
$$v(x_1, y_0, z_1) \cdot dx_0/rx \cdot (1 - dy_0/ry) \cdot dz_0/rz) +$$
$$v(x_0, y_1, z_1) \cdot (1 - dx_0/rx \cdot (1 - dy_0/ry) \cdot$$
$$(1 - dz_0/rz) + v(x_1, y_1, z_0) \cdot dx_0/rx \cdot dy_0/ry \cdot$$
$$(1 - dz_0/rz) + v(x_1, y_1, z_1) \cdot dx_0/rx \cdot dy_0/ry \cdot$$
$$dz_0/rz)$$

An alternative, more concise expression for the value of $v(x_n, y_n, z_n)$ would be $$v(x_n, y_n, z_n) = \quad (3.14)$$
$$\sum_{i=0}^{1}\sum_{j=0}^{1}\sum_{k=0}^{1}(1-dx_i/rx)(1-dy_j/ry)(1-dz_k/rz)v(x_i, y_j, z_k)$$

Tricubic interpolation—Supersampling was also conducted using tricubic interpolation which generates a new voxel value at location $(x_n, y_n, z_k)$ based on the 64 nearest neighbors in the original space, $v(x_i, y_j, z_k)$, where i, j, and k can have the values −1, 0, 1, 2. Briefly, the new value can be expressed as $$v(x_n, y_n, z_n) = \quad (3.15)$$
$$\sum_{i=-1}^{2}\sum_{j=-1}^{2}\sum_{k=-1}^{2} P\!\left(\frac{x_n - x_i}{x_1 - x_0}\right)\!P\!\left(\frac{y_n - y_j}{y_1 - y_0}\right)\!P\!\left(\frac{z_n - z_k}{z_1 - z_0}\right)\!v(x_i, y_j, z_k)$$

where $P(t)$ is a cubic polynomial interpolation function with the following specification:

$$P(t) = \begin{cases} 1 - 2(t^2) + |t^3|: & 0 \leq |t| \leq 1.0 \\ 4 - 8 \cdot |t| + 5 \cdot t^2 - |t^3|: & 1 < |t| \leq 2.0 \\ 0: & |t| > 2.0 \end{cases} \quad (3.16)$$

Although, the inventors have used the methods set forth hereinabove, the present invention includes any method of supersampling which provides sufficiently improved image resolution.

Section 4: Segmentation—Image segmentation is the process by which an image is divided into regions corresponding to objects and background. In the analysis of pulmonary nodules in radiographic images, segmentation involves the differentiation of nodule from non-nodule regions. This chapter details algorithmic solutions to the nodule segmentation problem, both for well-circumscribed nodules and for those with attachments to vasculature or the pleural surface.

Basic Segmentation—The automated (and manual) analysis of pulmonary nodules is intimately tied to the image segmentation problem. In order to take measurements of nodule size, shape, and density characteristics, one must first determine which image regions belong to the nodule and which do not. A first order solution to this problem can be described using a two-level model.

Figure 21:
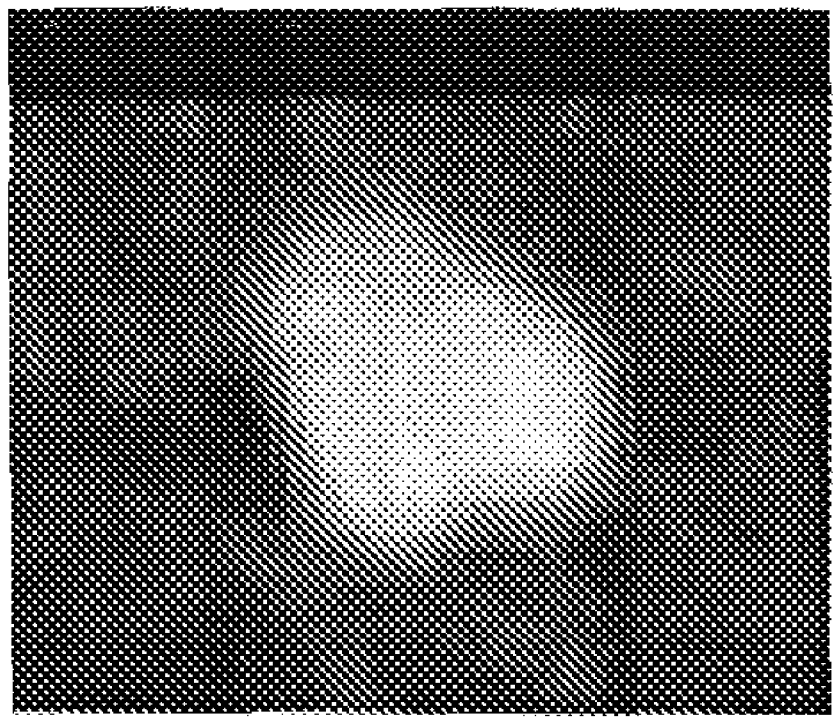
FIG. 21 illustrates a two-dimensional image of a small pulmonary nodule.

Two-Level Model—Considering the region of interest (ROI) as composed of two classes of voxels, those that are part of the nodule (foreground) and those that are not (background). FIG. 21 shows a single 2D image of a nodule. The bright, high-attenuation region is the nodule, surrounded by a darker, low-attenuation region corresponding to lung parenchymal tissue.

Figure 22:
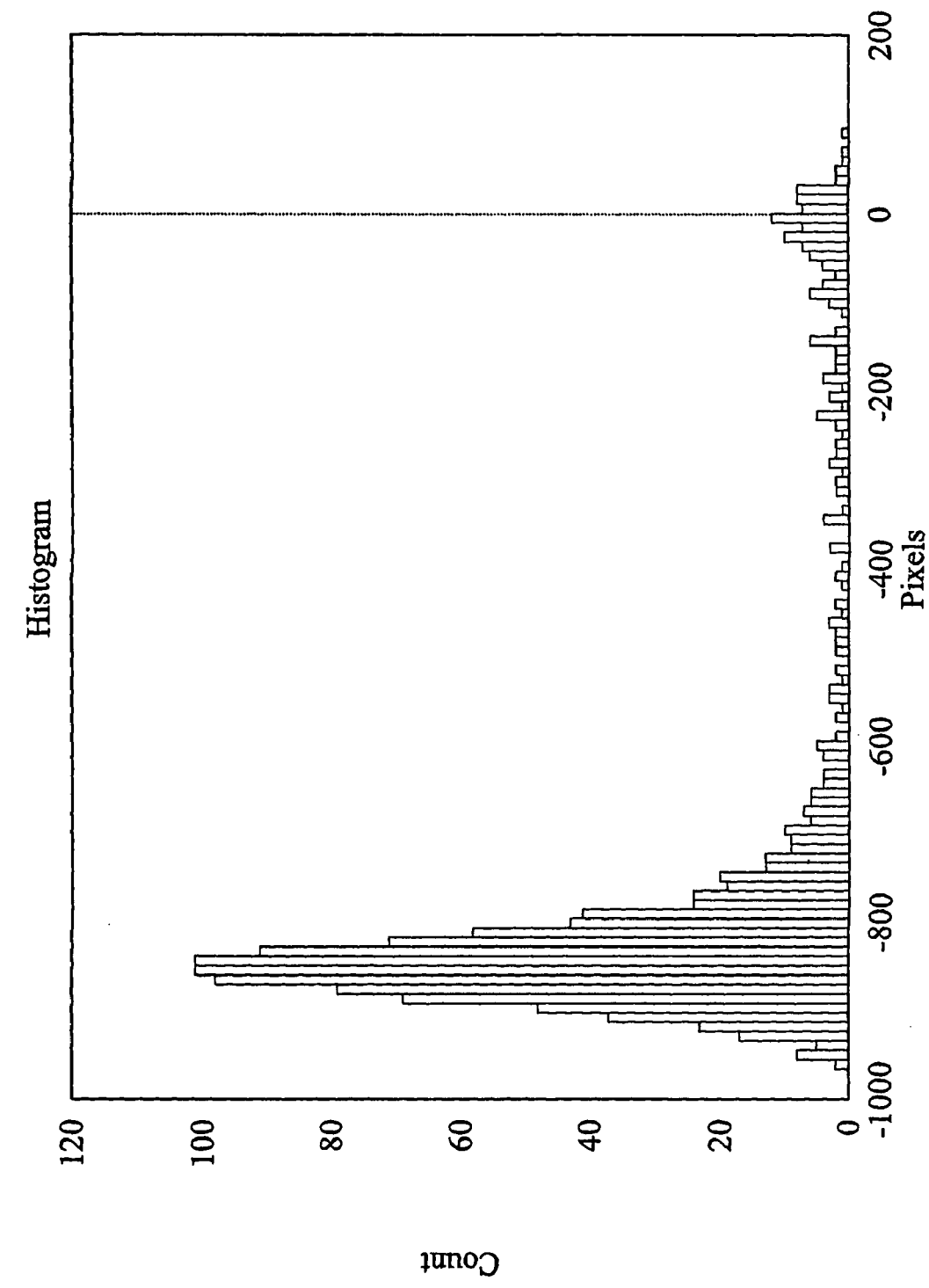
FIG. 22 illustrates a histogram of gray-level intensities in nodule image.

Examining the frequency distribution of gray-level intensities in this image, it is found that they exhibit a bimodal distribution. A histogram of the image gray-levels (in HU) is shown in FIG. 22. The large mode centered at around −850 HU represents the low-intensity pixels in the background. The smaller mode centered near 0 HU corresponds to the higher-intensity nodule region.

Consider the two-dimensional image function, $f(x, y)$. A simple two-level model can be defined where foreground and background pixel classes may be separated by intensity. A transformation r maps pixels in two one of two classes, 0 or 1. A simple transformation that relies on the two classes having complete separation by intensity can be described as follows:

$$r(f(x, y)) = \begin{cases} 0: f(x, y) < T \\ 1: f(x, y) \geq T \end{cases} \quad (4.1)$$

This gray-level intensity transformation is commonly known as thresholding. The challenge in separating the classes in this two-level model, then, is the choice of an appropriate threshold value, T. Several methods of threshold selection are described in the next section.

Thresholding—The goal of threshold selection is to determine a threshold which optimally separates background from foreground regions. While this may seem straightforward for a simple image (such as that shown in FIG. 21), the optimality criteria may change in a variety of circumstances. Here are some examples: (a) maximize separation of two modes in a bimodal histogram derived from a single image; (b) maximize separation of two modes in a bimodal histogram of an entire 3D ROI; (c) maintain a consistent segmentation method between scans of the same nodule over time; and (d) maintain a consistent segmentation method across nodules in multiple subjects.

The threshold selection problem for a single 2D nodule image may be solved using histogram analysis and selection of a threshold value which best separates the two modes of the (expected) bimodal distribution. Many mathematical relationships (e.g., algorithms) have been proposed for the global thresholding problem (a single threshold for the entire image), as well as for local thresholding (thresholds depend on local image properties in addition to pixel intensity) [24, 36]. A simple global threshold selection algorithm will now be described, based on the method of Ridler and Calvard [68].

---
Algorithm 4.1 (Iterative Threshold Selection)
---
Select a candidate threshold value T for histogram H(p)
$\Delta\mu_1 = \Delta\mu_2 = \infty$
$\mu_{1p} = \mu_{2p} = \infty$
while $((\Delta\mu_1 > \epsilon) || (\Delta\mu_2 > \epsilon))$
   $R_1 = H(p): 0 < p < T$
   $R_2 = H(p): T \leq p < \infty$
   $\mu_{1p} = \mu_1$
   $\mu_{2p} = \mu_2$
   $\mu_1 = (\Sigma R_1) / |R_1|$
   $\mu_2 = (\Sigma R_2) / |R_2|$
   $T = (\mu_1 + \mu_2) / 2$
   $\Delta\mu_1 = \mu_1 - \mu_{1p}$
   $\Delta\mu_2 = \mu_2 - \mu_{2p}$
end
---

Algorithm 4.1 iteratively selects a threshold based on the mean intensities $(\mu_1, \mu_2)$ of the two histogram regions $(R_1, R_2)$ divided by T. At each iteration the new value of T is computed as the mean of the mean values of each region.

$$T = (\mu_1 + \mu_2)/2 \quad (4.2)$$

Figure 23:
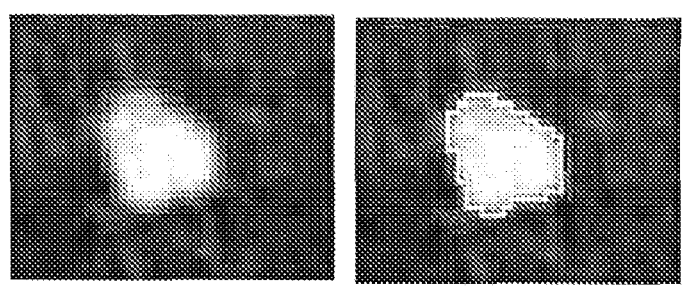
FIG. 23 illustrates a two-dimensional segmentation of a small pulmonary nodule using iterative threshold selection.

The termination condition is that the means of each region change by no more than $\epsilon$, which is somewhat application dependent. The result of Algorithm 4.1 on the 2D image shown in FIG. 21 is a threshold of −476 HU. The resulting segmented image is shown in FIG. 23.

This method works quite well for bimodal distributions where the modes encompass similar area and have minimal overlap. One factor affecting the relative area in each of the modes, of course, is ROI selection. If the nodule is surrounded by a large amount of lung parenchyma (i.e. the ROI is large compared to the nodule itself), the high-attenuation mode may not have sufficient area to be distinguished above the contributions of image noise and other high-attenuation, non-nodule structures. This becomes particularly important when analyzing three-dimensional regions.

Figure 24:
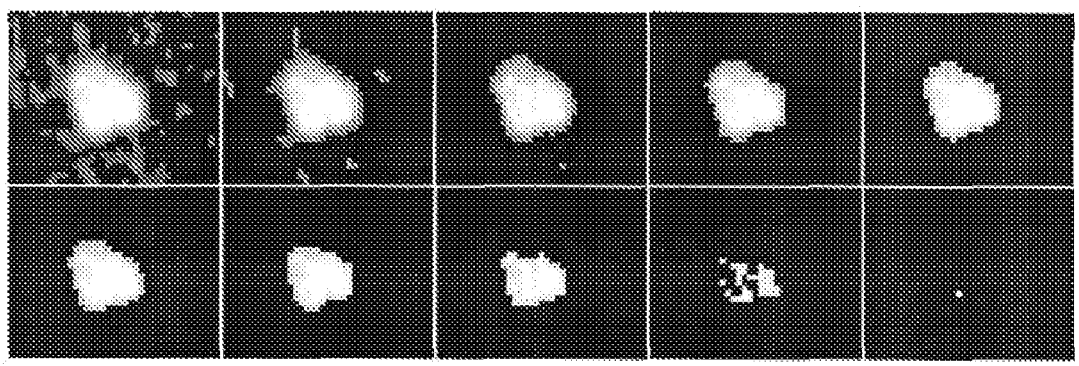
FIG. 24 illustrates segmentation results by varying threshold from −800 HU to 100 HU.

One of the issues in threshold selection is that lower threshold values produce segmented nodules which appear larger, as the interface (margin) between nodule and lung parenchyma varies widely in attenuation. FIG. 24 illustrates the effect of changing the threshold value T in 100 HU steps from −800 HU (top left) to 100 HU (bottom right) when segmenting the nodule shown in FIG. 21.

In order to make accurate estimates of nodule growth, the segmentation should be consistent across multiple scans taken at different times. In growth estimation, the absolute error in size measurement is less significant than the relative error, considering multiple studies of the same nodule. This is due to the fact that growth estimates are computed based on size ratios, not on absolute size. For this reason, a single threshold value should be used in segmentation of each of the scans. Important caveats, however, are that the scanner must be well-calibrated and the scan protocol (dose and resolution parameters) fixed for the observed attenuation values in each scan to be comparable. Growth estimation is covered in detail in Section 5.

It may also be beneficial to attempt a standard thresholding policy across nodules in different subjects. This is a more difficult problem, however, as mean nodule attenuation varies somewhat with nodule type. Non-solid nodules, known as ground glass opacities (GGOs), and lesions with mixed solid and GGO components frequently require a much lower threshold for accurate segmentation.

A more general problem with global thresholding methods is that regions of similar intensity may be spatially disparate, and not represent components of the same object. For example, nearby vessels or other structures of nodule-like attenuation may be included in a thresholding-based segmentation. Image noise may also be of sufficient intensity to contribute to the output of a thresholding operation. These structures should not be included in the nodule region to be considered for fisher size and shape analysis.

Connected Component Analysis—One solution to the problem of disparate high-intensity regions contributing to the segmented nodule volume is the use of connected component labeling and analysis. In connected component labeling, each pixel/voxel is assigned an integer value indicating the unique 2D/3D connected component of which it is a member [24]. These connected components include all voxels through which a connected path can be followed. Such a path connects adjacent non-zero voxels that share at least one vertex. In other words, a voxel v(x, y, z) belongs to the same connected component as any of its 26 neighbors in the set N, where $$N(x', y', z') = \begin{cases} x' \ni x - 1 \leq x' \leq x + 1; \\ y' \ni y - 1 \leq y' \leq y + 1; \\ z' \ni z - 1 \leq z' \leq z + 1; \\ (x', y', z') \neq (x, y, z) \end{cases}$$

and the value of the neighboring voxel is non-zero.

The use of 3D connected component analysis allows noise and extraneous structures to be removed from the nodule image data. The result of selecting a single connected component is an object that is contiguous in 3D space.

The first step in connected component analysis is the connected component labeling itself. There two general algorithms that can be used to accomplish connected component labeling in three dimensions, one recursive and one iterative.

Recursive Connected Component Labeling—The recursive connected component labeling algorithm takes as input a three-dimensional image v and produces a labeled image 1, where each non-zero voxel value is the index of the component of which it is a member. The algorithm has two sections. The outer section loops over all voxels v(x, y, z) in the input image. When an object voxel is encountered (voxels with zero value are considered as background), the component label L is incremented and the recursive labeling function label( ) is called. This recursive function examines each of its 26 neighbors for connectivity. If a connected voxel is found, it is given the same label in a recursive call to label( ).

A recursive algorithm is quite elegant in that it labels each component completely and in turn. The primary disadvantage of such an algorithm, however is that each recursion places state on the system stack which is not removed until the termination cases are reached and the recursive calls removed from the stack.

Iterative Connected Component Labeling—To eliminate the memory demands associated with connective component labeling, it is possible to formulate an iterative algorithm, albeit at the cost of complexity and execution time.

The iterative method traverses the image in order, in increasing x, y, and z. If connectivity is established between the current voxel v(x, y, z) and any of the 13 previously searched (v(x−1 ... x+1, y−1 ... y+1, z−1) (9), v(x−1 ... x+1, y−1, z) (3), v(x−1, y, z) (1)), all possible connections are recorded in a table. At the end of the iterative search through the image space, this table must be reconciled so that connected components originally assigned different labels that are subsequently found to be connected are given a consistent label.

Size and Spatial Analysis—Once connected component labeling has been performed, more complete connected component analysis can take place. In segmentation of pulmonary nodules, several selection criteria are commonly used in connected component analysis. These criteria are used to (i) select the component of greatest volume, (ii) select all components greater than or equal to a specified volume threshold, and (iii) discard components within a specified distance of the ROI boundaries.

These three criteria are used in the following way. 1) The object of greatest volume in the ROI is typically the nodule. 2) In some cases, more than one object of high relative volume in the ROI may need to be selected. 3) Lastly, segmentation of nodules near other large structures (e.g. pleural surface) may not be the object of greatest volume. In these cases, the extraneous object is typically close to (or adjoining) the ROI boundary.

Thus, image thresholding and connected component analysis can be used for segmentation of pulmonary nodules when they are of relatively high intensity compared with the surrounding lung parenchyma. Such methods are insufficient when nodules are attached to other structures of similar intensity (e.g. blood vessels).

More advanced segmentation techniques are required for isolating the nodule volume in these cases. Such techniques have been developed in this invention and are based on morphological filtering.

Morphological Filtering—Mathematical morphology is the study of non-linear image filters based on geometric constraints. This field was first developed by G. Matheron and J. Serra in the late 1960's and popularized in computer vision and image processing in the subsequent decades [74, 75]. Morphological operations are useful in edge-detection, shape-detection, skeletonization, and other image segmentation tasks. The fundamental morphological operations, erosion and dilation are based on comparison between small regions of an image and a structuring element or kernel, translated across the image in much the same way as the convolution kernel used in many other filtering operations. Morphological operations were first defined to operate on binary images, and whereas they have been extended to gray-level morphology, the current discussion concerns the binary morphological transformations [74, 35].

Erosion is the set of all voxels in an image A that can include a small kernel, B. It can be expressed as $$A \ominus B = \{v(x,y,z) \ni B_{(x,y,z)} \subset A\} \quad (4.3)$$

where B(x,y,z) indicates the kernel B centered at voxel (x, y, z).

Dilation is the set of points where the translated kernel B(x, y, z) would touch the image A. This can also be expressed as $$A \oplus B = \{v(x,y,z) \ni B_{(x,y,z)}\} \cap A \neq \emptyset \quad (4.4)$$

An additional operation of interest is reflection, $$A' = \{v(-x,-y,-z) | v(x,y,z) \in A\} \quad (4.5)$$

which is geometric reflection of all voxels about the center of a structuring element or a complete image.

Two additional morphological operations are defined as each composition of the previous two, as erosion and dilation do not form an inverse pair. Opening, is the erosion of an image A by a kernel B followed by dilation of the result using the same kernel:

$$A_B = (A \ominus B) \oplus B \quad (4.6)$$

Sometimes referred to as a "rolling-ball" filter, the result of a morphological opening operation can be viewed as the interior region of an object covered by translation of the kernel into all areas where it remains completely enclosed. An opening operation has the effect of breaking small connections between regions and removing sharp edges.

The dual operation, closing, is a dilation followed by an erosion:

$$A^B = (A \oplus B) \ominus B \quad (4.7)$$

Figure 25:
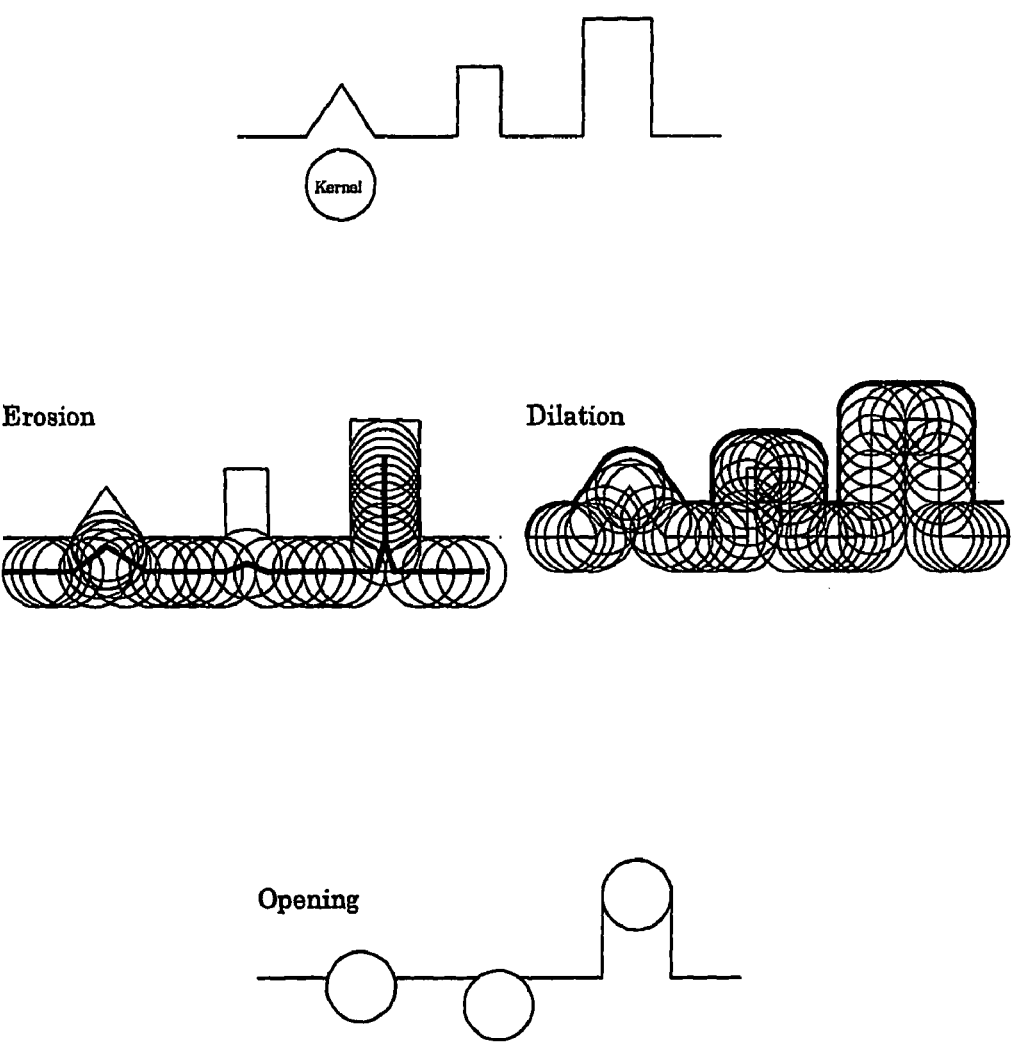
FIG. 25 illustrates examples of morphological operations using a spherical kernel.

Closing can be viewed as an opening operation performed on the background (non-object region) of an image using the geometric reflection of the structuring kernel, B'. Graphical examples of morphological erosion, dilation, and opening are shown in FIG. 25. Vote the effect of the structuring element on each of the surface features in the dilation example. An opening operation gives the resultant surface the characteristics of the structuring kernel; in this case, the circular characteristics of the disk-shaped kernel. In addition, note that to remove thin structures connected to a surface (e.g. vessels), the kernel must be of a size greater than that of the structure to be removed. As suggested by this example, in the segmentation of pulmonary nodules, a morphological opening operation may be used to reduce the likelihood that noise artifacts and small vessels be considered part of a nodule.

Vascular Subtraction—Global methods for removing the pulmonary vasculature, based on three-dimensional region growing, tree-traversal algorithms, and other techniques have been described [90, 16, 79]. The goal of these global methods is to simplify the nodule detection problem. For the characterization of pulmonary nodules using high-resolution data, however, local methods of vascular subtraction are more appropriate. Since only a small subset of the lung volume is normally acquired in a high-resolution diagnostic study, global methods tracing the vascular branches from the pulmonary artery and veins onward are impossible. Even if high-resolution data of the entire lung volume were available, this approach would likely be impractical. Furthermore, global or semi-global region growing schemes based on voxel intensity alone have the danger of removing small nodules when they exhibit vascular connections.

Methods—As an alternative to global region growing techniques, we use a local filtering approach based on mathematical morphology. This method is based on the model described in Section 2. The initial morphological processing in our segmentation algorithm consists of an opening operation based on a spherical kernel. This kernel is passed over the input data in a convolution-like filter for both the erosion and dilation steps, followed by connected component analysis to retain the nodule volume and discard vascular components that were initially disjoint or were disconnected via the opening operation.

Figure 26:
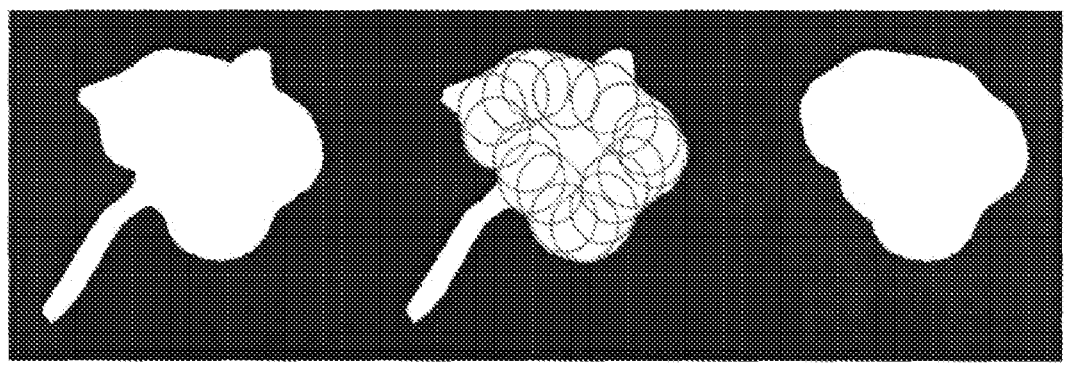
FIG. 26 illustrates a 2D morphological opening on a pulmonary nodule.

One disadvantage of morphological opening in this application is that it has a "smoothing" effect on the nodule surface, as surface details are removed, such as fine spiculations. Consider the illustration in FIG. 26. The illustration on the left depicts a pulmonary nodule with a vascular attachment. In the center illustration, the translation of a circular kernel is shown, depicting a 2D morphological opening operation ("rolling-ball filter"). In the result shown on the right, notice that while the vessel has been removed (the desired effect), some of the surface features present in the original nodule have been deleted, as they were smaller than the structuring kernel.

While the need to remove vessels from consideration is important, we would prefer not to smooth away the very nodule surface characteristics we hope to analyze. To compensate for this smoothing effect, we may perform an iterative constrained dilation (morphological opening followed by geodesic dilation) process to "regrow" these features. The entire morphological filtering process is as follows:

---
Algorithm 4.2 (Iterative Morphological Filtering)
---
Begin with an initial binary image I
$J = (I \ominus S_d) \oplus S_d$ {Perform opening using a spherical kernel $S_d$ of diameter d}
Perform connected component analysis, keeping the component of interest
while s >= 2 {Number of useful dilations}
$J = J \oplus Ss$ {Perform dilation using a spherical kernel of diameter s}
$J = J \wedge I$ {Perform a voxel-by-voxel logical AND}
S = s/2
end
---

This technique restores the detailed surface features of the nodule without regrowing vessels more than L=d voxels from the surface. In the first iteration, the dilation with a sphere of diameter d extends the surface at most d/2 voxels in the direction of the vessel. In each subsequent iteration, the surface may be extended by, at most, half the distance of the previous iteration. The upper bound on the growth of each vessel, therefore, is a distance of d voxels, as can be seen from the following geometric series.

$$L = \sum_{i=0}^{\log_2 d} \frac{d}{2^i} \simeq d \quad (4.8)$$

Figure 27:
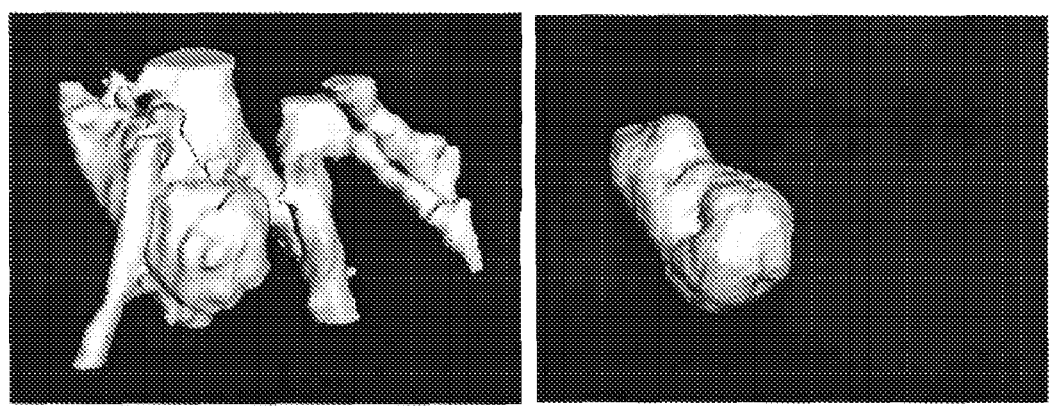
FIG. 27 illustrates a three-dimensional morphological opening for vascular subtraction.

In addition, the logical AND operation guarantees that all the features that are grown were present in the initially thresholded image. FIG. 27 illustrates the vascular subtraction using morphological opening and connected component analysis, but without iterative filtering to regrow surface features. Two 3D shaded surface models are shown. The left image shows the result of a basic segmentation method based on thresholding. The right image shows the result of a 3D morphological opening using a spherical kernel of an appropriate size to remove the vessels connected to the nodule (as well as others in the ROI), via connected component analysis. Note that the surface of the segmented nodule is significantly smoothed when compared with the original thresholded data.

Figure 28:
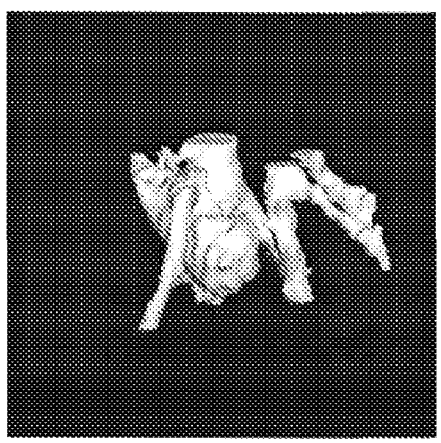
FIG. 28 illustrates a three-dimensional iterative morphological filtering for vascular subtraction.
Figure 28:
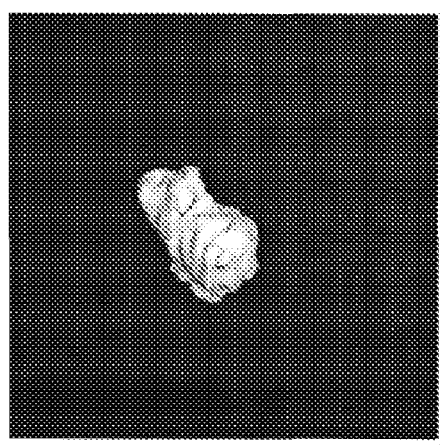

In comparison, FIG. 28 illustrates the result of vascular subtraction via Algorithm 4.2, which adds the iterative morphological operations needed to regrow the nodule surface features. Note that the surface features present in the original thresholded data have been restored.

Figure 29:
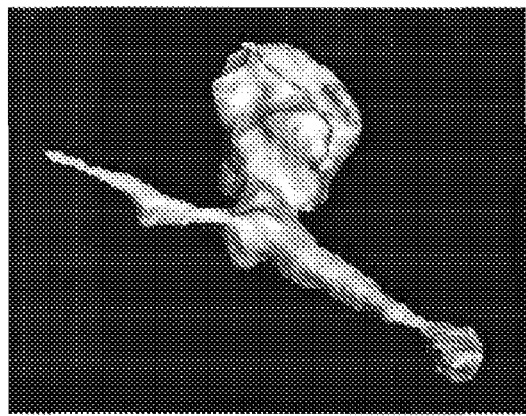
FIG. 29 illustrates a three-dimensional iterative morphological filtering for vascular subtraction.
Figure 29:
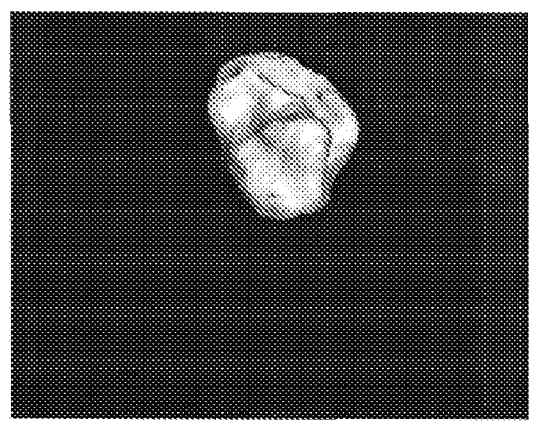

FIG. 29 shows another example of vascular subtraction via iterative morphological filtering. In this example, the major vascular component is removed, in addition to several minor vessels (note the small vessels protruding from the top surface of the threshold-segmented nodule (left). Again, the vascular subtraction was achieved without significant effect on desirable nodule surface features.

Sensitivity Analysis—The two critical choices in the segmentation algorithm for vascularized nodules are the gray-level threshold and the structuring kernel diameter. Methods for threshold selection were discussed hereinabove. In this section, we will examine the sensitivity of the morphological filtering methods used to remove vascular structures from the thresholded nodule ROIs.

The diameter of the structuring kernel used in Algorithm 4.2 affects both the initial morphological opening of the scene, but also the sizes of kernels used to regrow the surface features. The most important consideration when choosing the kernel size is that the sizes of nodules and vessels vary, as described in our vascularized nodule model (Section 2). In particular, the cross-sectional diameter of attached vessels ($\lambda$ from our model), may vary considerably from case to case. Still, although we may choose a kernel of diameter d, such that it is likely to be larger than most vessels, overestimation of the appropriate kernel size may lead to overestimation of the nodule volume at those points where considerably smaller vessels were attached. This relationship was expressed mathematically in Equation 4.8, where the upper bound on "regrowth" of a vessel is bounded by the diameter of the structuring kernel, d. A complete expression for this overestimate was derived for the spherical vascularized nodule model in Equations 2.7, 2.9, and 2.10. Here, we will illustrate graphically for a three-dimensional synthetic model. In this example, a synthetic nodule was constructed having a diameter of 25 voxels, with an attached vessel of 5 voxels in diameter. Given our standard 0.25 mm isotropically resampled data, this would correspond to a nodule diameter of 6.25 mm and vessel diameter of 1.25 mm, well within the typical range in this study.

Using this synthetic nodule, the diameter of the structuring element used in Algorithm 4.2 was varied and the resultant segmentations evaluated visually and numerically. Given the characteristics of the iterative vascular subtraction method, there are three regions in which values of this parameter may fall: (i) d is too small—the vessel is not removed; (ii) d is in an acceptable range—the vessel is correctly removed; and (iii) d is too large—the vessel is removed, but regrown to a significant degree.

Figure 30:
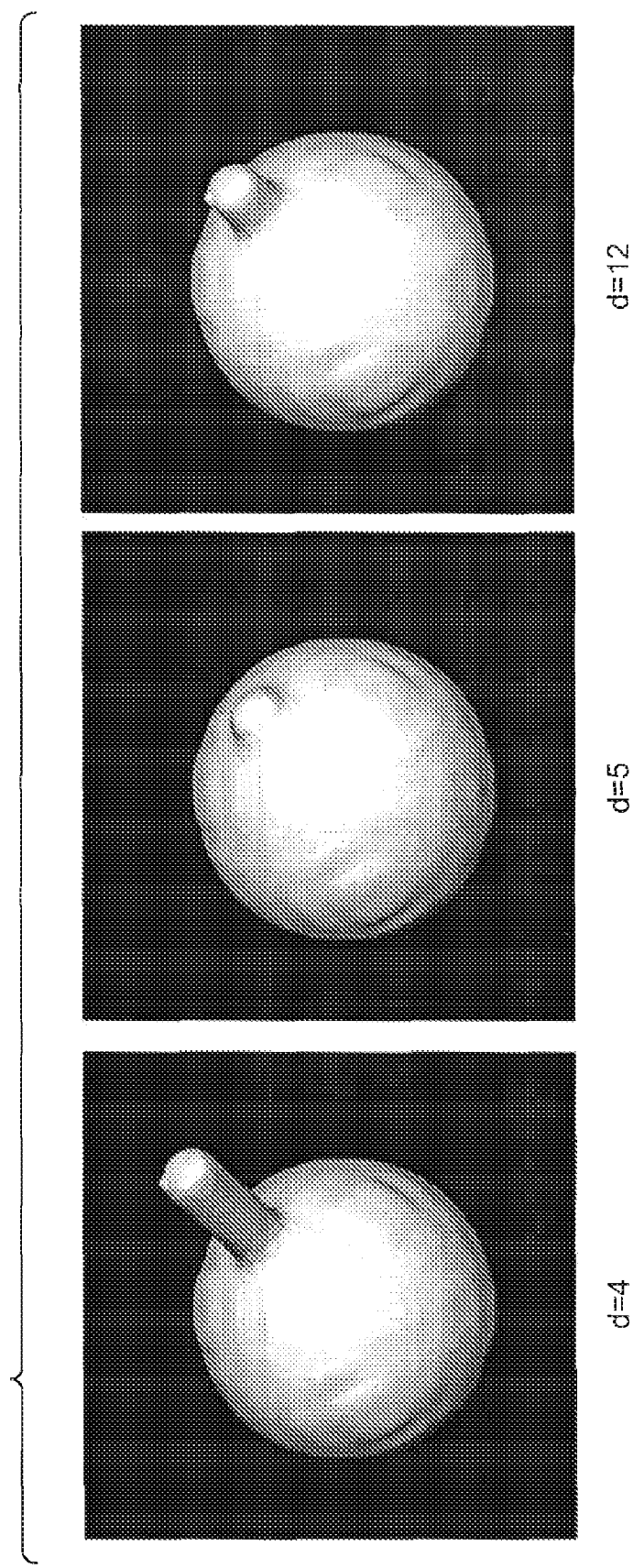
FIG. 30 illustrates segmentation of a synthetic vascularized nodule.

Three examples from this experiment are shown in FIG. 30. On the left (d=4), the kernel is too small to remove the vessel in the initial morphological opening. In the center image, the kernel is in the acceptable range for a proper segmentation (in this case, d=5). On the right, the kernel is somewhat too large, resulting in a significant amount of vessel "regrowth".

Figure 31:
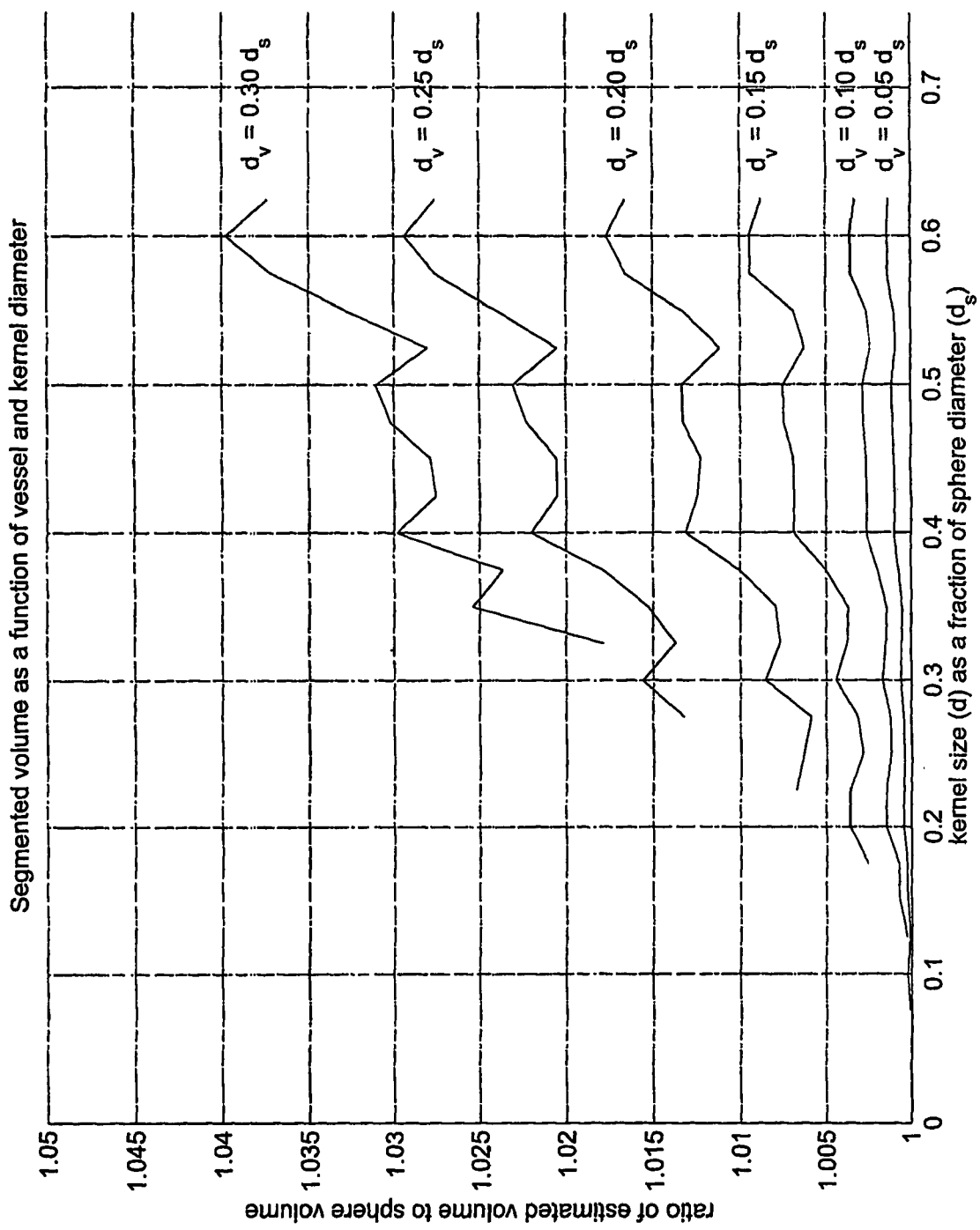
FIG. 31 illustrates sensitivity of vascular subtraction as a function of vessel diameter and kernel size.

An experiment was performed to assess the behavior of this segmentation technique using synthetic vascularized nodules (a sphere with vessels of varying diameters). These models were segmented using kernels of increasing size, and the degree of volume overestimation recorded. FIG. 31 shows the relative volume of the segmented nodule model as a function of vessel diameter, $d_v$, and kernel diameter, d. Each of these parameters are expressed with respect to nodule spherical diameter, $d_s$. The data for each vessel diameter are shown beginning with the kernel size that is sufficiently large to exclude the vessel.

These data show that, although the degree of volume overestimation increases with kernel size (over the minimum diameter required to exclude the vessel), the effect is still within 4% for kernels as large as 60% of the diameter of the nodule and for vessels as large as 30% the nodule. Still, the overall goal is to identify that range of kernel sizes that leads to good nodule segmentation for a wide variety of in vivo nodules.

To this end, additional experiments were performed to test the sensitivity of the vascular subtraction technique (Algorithm 4.2) to structuring kernel diameter in 21 in vivo pulmonary nodules. For each nodule, the diameter of the structuring kernel was varied from 1 to 20 voxels. In each of the resultant segmentations, the degree to which the vessel or vessels (most nodules had more than one vascular attachment) were removed was evaluated.

Figure 32:
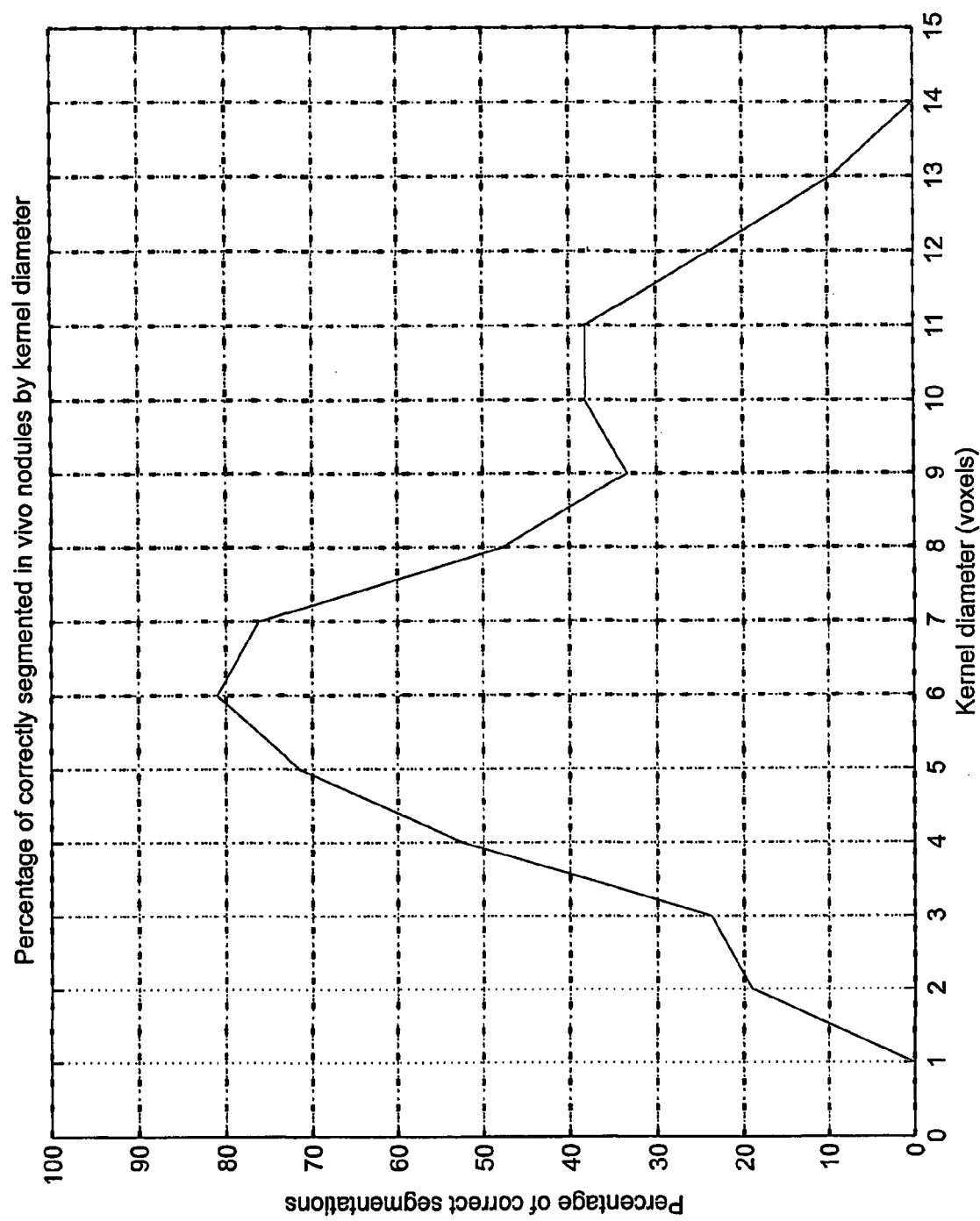
FIG. 32 illustrates sensitivity of vascular subtraction to kernel size in segmenting in vivo pulmonary nodules.

FIG. 32 illustrates the results of these experiments. The graph shows the relationship between structuring kernel diameter and the percentage of nodules correctly segmented. Recall that, for a given nodule and set of attached vessels, there are usually a range of values of d that lead to a correct segmentation.

In these results we may note that more than 80% of the in vivo vascularized nodules were correctly segmented by using a fixed structuring kernel diameter of 6 voxels (1.5 mm). The graph also exhibits a bimodal appearance. This is due to the fact that while the majority of vascularized nodules studied were connected to vessels smaller than 2 mm in diameter, there was an additional group of nodules with larger vascular components, resulting in the secondary peak at d=10. Therefore, although a static structuring kernel size may be chosen that yields reasonably good results over a wide range of nodules, a better approach is to choose a structuring kernel of the appropriate size for a particular case.

Pleural Surface Removal—Consider the basic model of the pulmonary nodule described in Sections 2. It describes two classes of pulmonary nodules that exhibit connectivity to the pleural surface, those with a pleural-tail and those that are juxtapleural. Nodules exhibiting a pleural tail, a thin structure similar in size and density to the rest of the nodule, can be treated in much the same way as juxtapleural nodules.

Juxtapleural nodules, those that share a significant amount of their periphery with the pleural surface, require a different segmentation approach. An effective segmentation of a juxtapleural nodule is one that eliminates pleural and other thoracic components from the nodule volume. One approach to the detection of juxtapleural nodules has been to use 2D morphological opening with a spherical kernel within the chest wall, and subtraction from the lung volume [4].

Methods—A two stage approach is used in the segmentation of juxtapleural nodules. First, the orientation of the pleural surface in the ROI containing the nodule is determined using three-dimensional moment analysis [65, 64]. The method of moments is described in Section 6. For the purposes of the current discussion, this method is used to determine the angles describing the orientation of the pleural surface at the point where the juxtapleural nodule is attached. Once this orientation has been determined, a structuring kernel is generated with the appropriate size and orientation such that an opening operation can be used to detect the majority of the pleural surface and chest wall, while excluding the nodule. This kernel is disk-shaped and large enough so that it will fit only within the chest wall region and not the nodule portion of the image. Three-dimensional image subtraction is then used to remove these external structures from the original image. Lastly, the remaining pleural components not detected in the opening operation are removed during the application of Algorithm 4.2. The complete method is described as Algorithm 4.3.

---

Algorithm 4.3 (Pleural Surface Removal)

---

Begin with an initial binary image I
Using moments, determine the orientation of the pleural surface
Generate a disk-shape kernel D, oriented parallel to the pleural surface
$J = (I \ominus D) \oplus D$ {Perform morphological opening using D}
$K = I - J$ {Perform image subtraction}
Continue with iterative morphological filtering {Algorithm 4.2}

---

Figure 33:
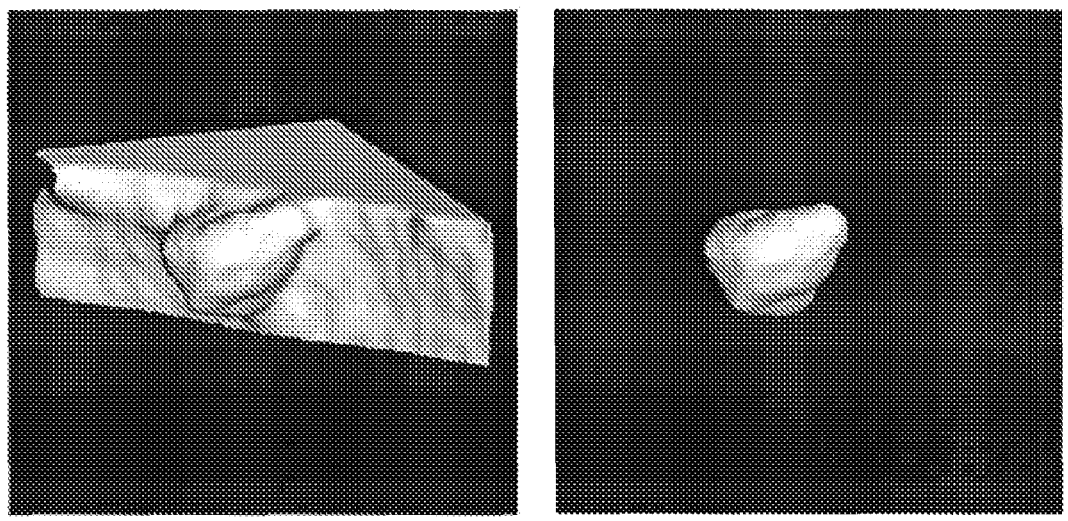
FIG. 33 illustrates an example of the pleural surface removal technique.

An example of the pleural surface removal technique is shown in FIG. 33. The nodule, approximately 5.5 mm in diameter, is removed from the pleural surface prior to volumetric and shape characterization. The segmentation process was as follows.

Figure 34:
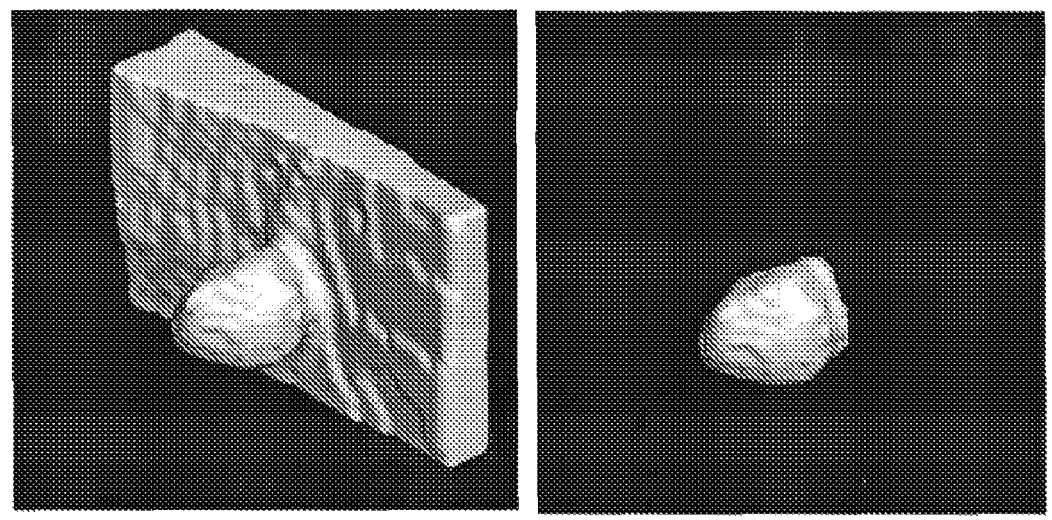
FIG. 34 illustrates an example of the pleural surface removal technique.

The method of moments was used to compute the orientation of the pleural surface and attached nodule. Once the orientation of the pleural surface was determined, a disk-shaped kernel of 34 voxels (8.5) mm was generated and used in a morphological opening to identify those voxels in the pleural wall not containing the nodule. The pleural surface component was subsequently subtracted from the image, leaving the nodule and a small amount of pleural surface not identified by the opening operation. The resultant image was then segmented using iterative morphological filtering using a spherical kernel of 5 voxels (1.25 mm) in diameter, to remove the remaining elements not belonging to the nodule volume. An additional example of this segmentation method is shown in FIG. 34. As in the previous example, the nodule is automatically removed from the pleural surface.

Sensitivity Analysis—It should be noted that the success of the pleural surface removal algorithm is somewhat dependent on the geometry of the nodule ROI. This is due to the fact that estimation of the orientation of the nodule-pleura interface is based on moment calculations involving the thresholded ROI. In experiments performed on in vivo juxtapleural nodules, Algorithm 4.3 was able to perform a correct segmentation in 72% of the cases. When a user was able to manually specify the orientation of the disk, the results improved, allowing for correct segmentation in 83% of the cases. In the remainder of the cases, manual segmentation was required. Overall, these results are promising in that they offer a consistent, automated segmentation technique for the majority of juxtapleural nodules.

Three-Dimensional Surface Generation—In addition to the three-dimensional voxel representation of a segmented nodule, it is useful to have a polygonal surface model for the segmented volume. Surface area and curvature calculations can be much more reliably performed on a smoothed surface representation. Computation of these metrics will be discussed in Chapter 6.

Surface Tessellation—A closed 3D segmented region can be used to generate a polygonal surface model. One such surface model is a triangular tessellation of the surface. The surface models in this work are generated using a variant of the "marching cubes'" algorithm, described by Lorensen and Cline [48]. The modifications made to this algorithm will be explained, following a short description of the original implementation.

Figure 35:
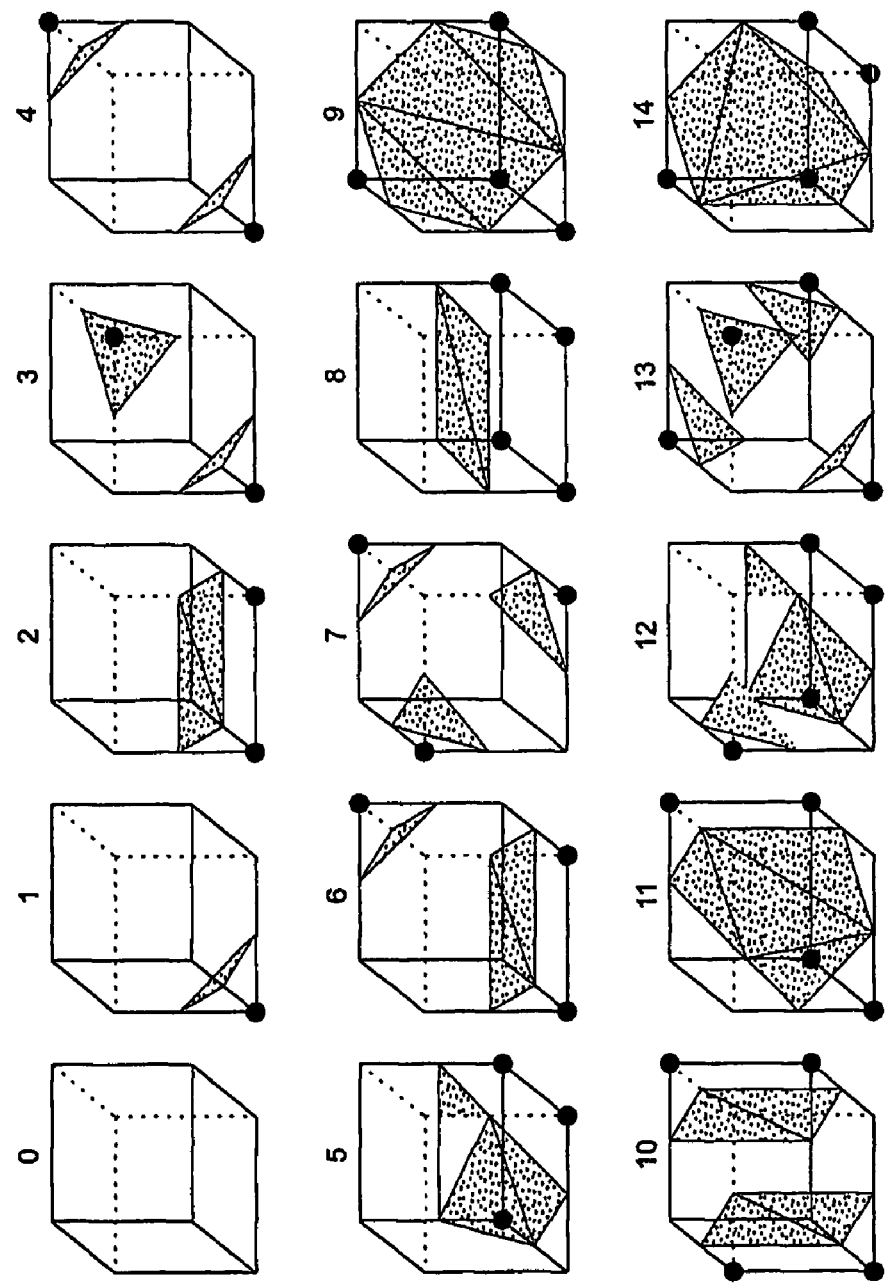
FIG. 35 illustrates a 15 conical 2×2×2 neighborhoods and associated triangulations in the marching cubes algorithm.

In the standard marching cubes algorithm, each 2×2×2 voxel neighborhood is considered separately. The pattern of set voxels in this neighborhood falls in to one of 15 basic classes. These are illustrated in FIG. 35. Each of the 256 ($2^8$) permutations of set voxels in a 2×2×2 neighborhood can be generated using these classes via symmetry, rotation, and logical complement.

For each of these canonical neighborhoods, a simple set of polygonal surfaces (composed of one or more triangles) is used to separate image background from foreground (see FIG. 35). When these surface elements are generated for each neighborhood in a 3D image, a simple polygonal tessellation of the surface is created. The appropriate polygons corresponding to each 2×2×2 neighborhood may be assembled quickly using a lookup table indexed by a key corresponding to one of the 256 possible neighborhoods, or octants, in the image. A description of the process is given in Algorithm 4.4.

---
Algorithm 4.4 (Three-Dimensional Surface Generation)
--- for all $N_{x,y,z} = v(x...x + 1, y...y + 1, z...z + 1)$
    compute octant o(x,y,z)
    index polygon look-up table using o(x,y,z)
    add triangles corresponding to o(x,y,z), offset by (x,y,z)
end

---

Several modifications were made to the original marching cubes algorithm. First, the internal thresholding operation and gradient calculations have been removed. Segmentation decisions yielding the locations of each surface boundary are made prior to polygonization, in the 3D segmentation method. The surface gradient calculations needed for rendering Gouraud-shaded triangles are discarded, as the tessellation is used for subsequent geometric analysis. Surface rendering is handled separately, by other tools in the VisionX system (urend, u3d).

While the polygons described in the original algorithm are based on triangles, the effective aggregate polygons may be quadrilateral, or more complex non-planar polygons. In the new implementation, each of the constituent triangles is considered separately, so that the basic surface unit is the triangle, simplifying subsequent surface analysis.

An additional, more interesting, change was made to the algorithm to avoid "holes" in the generated surface. When using the original marching cubes algorithm, it is possible for holes to appear in the final surface tessellation. It is possible to fix this problem by splitting several of the fifteen canonical classes and adding polygons to prevent these discontinuities [21].

One important note with regard to surface curvature estimation (described in Section 6) is that the triangles generated by the tessellation algorithm should be generated in a consistent right- or left-handed system. In other words, the order in which the three vertices of each triangle is encoded should be used to differentiate the inside from the outside of the surface. This will simplify surface normal calculations later in the curvature estimation method.

Surface Filtering—Although the surface model of the segmented nodule is a much better approximation to the true nodule surface, it is still somewhat rough, as all angles are multiples of 45°. Algorithm 4.5 is a technique for filtering the 3D surface representation. Each vertex in the surface is replaced with the weighted sum of neighboring vertices and itself. The parameter $\alpha$ specifies the proportional weight given to the neighboring vertices. When $\alpha=0.9$, the new location of a vertex depends 90% on the locations of neighboring vertices and 10% on its original location. If $\alpha$ is set to 1.0, none of the original vertex location contributes to the result. In addition, this smoothing algorithm may be iteratively applied n times, to control the degree of smoothing.

---
Algorithm 4.5 (Three-Dimensional Surface Filtering)
--- for k = 1 : n
    for all $V_i \in V$ {for each vertex}
        $S_i(x,y,z) \leftarrow 0$
        for all $V_j \in adj(V_i)$ {for each vertex adjacent to $V_i$}
            $S_i(x,y,z) \leftarrow S_i + V_j$
        end
        $V_i \leftarrow (1 - \alpha) V_i + \alpha(S_i/|adj(V_i)|)$
    end
end

---

The overall goal of the surface filtering process is to achieve a representation of the nodule surface that is more likely to represent its actual form. In combination with the isotropic resampling technique described in Section 3, it helps to mitigate the partial volume problem. One method of measuring the accuracy of the surface representations described is to measure the surface area of each representation of an object with known geometry. One such example is a sphere.

Figure 36:
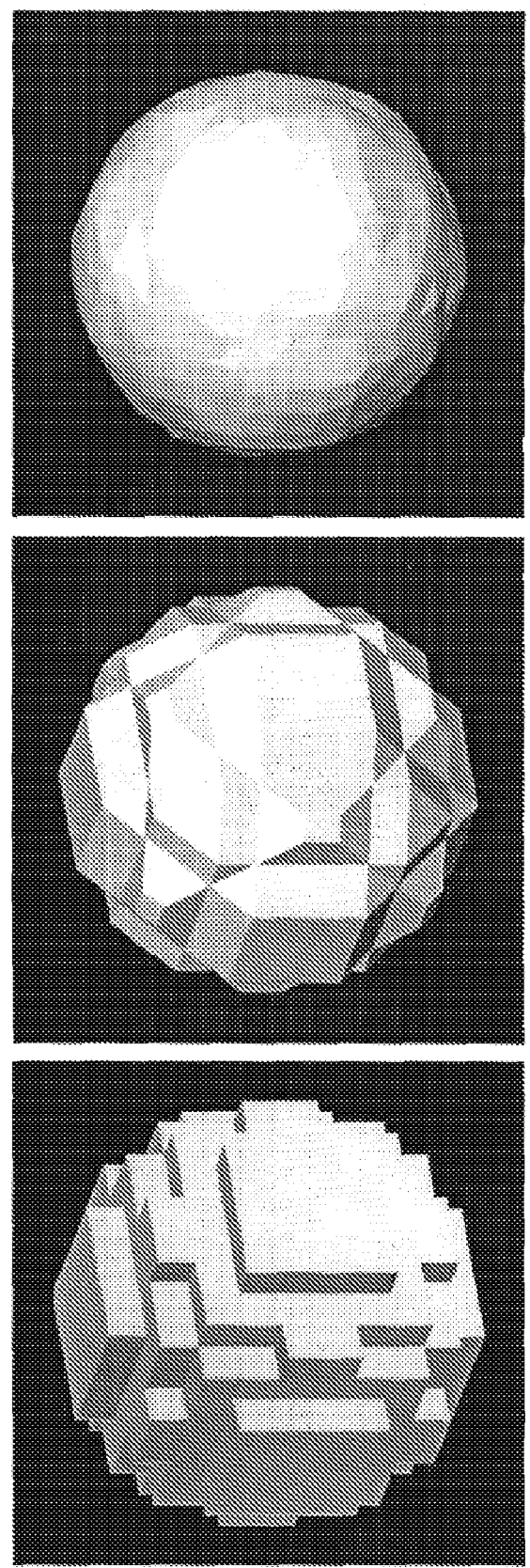
FIG. 36 illustrates a comparison of 3D surface representations of a known sphere.

A sphere of diameter 10 mm was generated synthetically and sampled to an isotropic grid with 1-mm resolution. FIG. 36 shows shaded surface renderings of three surface representations of this sampled data. From right to left, they include: the original voxel surfaces, the surface tessellation generated using the modified marching cubes technique (see above), and the result of one iteration of Algorithm 4.5 applied to the previous representation.

Analytically, the theoretical surface area for this sphere is equal to $110\pi \text{ mm}^2 \approx 314.15 \text{ mm}^2$. The surface area calculated from these three representations are 480 mm$^2$, 353.16 mm$^2$, and 314.931 mm$^2$, respectively. These correspond to surface area estimation errors of 52.8%, 12.4%, and 0.249%, respectively. Clearly, the filtered surface approximation gives the best estimate of the surface area. While the sphere may be an especially good case for the surface filtering algorithm, the surface of most nodules can be assumed to be locally spherical (in a small voxel neighborhood). In that model, the smoothed surface representation is a reasonably good one, and in any case, much more accurate than the voxel representation. Further discussion of surface area estimation is given in Section 6. The degree to which the surface is filtered, however, has an effect on all subsequent, surface-based metrics, including the analysis of three-dimensional surface curvature distribution. This topic will be revisited in Section 6.

Section 5: Volume Measurement—This section and much of the disclosure hereafter concerns volumetric measurements. The actual work and the discussion accompanying the work refers to "growth" in volumetric size. However, the present invention is not limited to "growth." It also includes the basis for measuring and handling information (e.g., data) related to reduction in volumetric size which might occur as, for example, by regression. Indeed, the scope of the invention covers "change" and volumetric size.

The most important step in volumetric measurement of pulmonary nodules is segmentation of the nodule from the surrounding lung parenchyma and other structures. Segmentation methods were discussed in Section 4. Once the nodule region has been identified, volume measurement is straightforward. The volume in voxels, is merely the sums of all "set" voxels U in the region of interest (ROI).

$$V(\text{voxels}) = \sum_{x=0}^{M-1}\sum_{y=0}^{N-1}\sum_{z=0}^{L-1} v(x, y, z) \quad v = \{0|1\} \tag{5.1}$$

To give the volume standard units, we must consider the volume of each voxel.

$$V(\text{mm}^3) = \sum_{x=0}^{M-1}\sum_{y=0}^{N-1}\sum_{z=0}^{L-1} v(x, y, z) \cdot v_{vol} \tag{5.2}$$

In most CT data, the voxels are anisotropic, with much higher in-plane (x-y) than axial (z) resolution. The voxel volume is therefore:

$$v_{vol}(\text{mm}^3) = v_{xres} \cdot v_{yres} \cdot v_{xres} = v_{in\text{-}plane}^2 \cdot v_{xres} \tag{5.3}$$

In our system, we resample the nodule ROI to isotropic space using trilinear interpolation. The voxel volume is then simply the cube of the isotropic resolution.

$$v_{vol}(\text{mm}^3) = v_{iso}^3 \tag{5.4}$$

Isotropic resampling, described in Section 3, has several benefits. It brings the data into isotropic space, where the resolution is the same in each dimension. This has the benefit of simplifying subsequent processing. Isotropic image filters may be used, rather than having to compensate for the different resolution in the less-resolved axial dimension. More important, the data are now at a supersampled resolution, where each original voxel value is responsible for several in the new image space. This helps mitigate partial volume effects in the original data.

Exponential Growth Model—Exponential growth models have long been used in the differentiation of benign from malignant nodules [56, 89, 86, 80]. The basic model was developed on the assumption of uniform cell division, with cell dividing in two, in every generation. Therefore, the number of cells (N) as a function of the number of generations (n) is $$N(n) = \sum_{i=0}^{n-1} 2^i = \frac{1-2^n}{1-2} = 2^n - 1 \tag{5.5}$$

This exponential growth can be characterized by a simple differential equation.

$$\frac{dV}{dt} = \lambda V \tag{5.6}$$

The solution of this equation is straightforward.

$$\frac{dV}{dt} = \lambda V \tag{5.7}$$

$$\frac{dV}{V} = \lambda dt \tag{5.8}$$

$$\ln V = \lambda t + C \tag{5.9}$$

Solving for the constant C at t=0.

$$\ln V_0 = \lambda \cdot 0 + C \tag{5.10}$$

$$C = \ln V_0 \tag{5.11}$$

Combining Equations 5.9 and 5.11 yields $$\ln V = \lambda t + \ln V_0 \tag{5.12}$$

$$V = e^{(\lambda t + \ln V_0)} = e^{(\ln V_0)} \cdot e^{\lambda t} \tag{5.13}$$

This yields the most common form of the generalized exponential model for tumor volume based on an estimate of initial volume:

$$V = V_0 e^{\lambda t} \tag{5.14}$$

where the exponential coefficient $\lambda$ may be defined with respect to the nodule doubling time.

$$\lambda = \frac{1_n^2}{DT} \tag{5.15}$$

A simple derivation follows, considering V to be double $V_0$ (this occurs at one doubling time).

$$\frac{V}{V_0} = 2 = e^{\lambda DT} \tag{5.16}$$

$$\ln 2 = \lambda DT \tag{5.17}$$

$$\lambda = \frac{\ln 2}{DT} \tag{5.18}$$

More generally, the exponential model can be expressed in terms of two volume measurements $\Delta t$ days apart:

$$\frac{V_2}{V_1} = e^{\lambda \Delta t} \tag{5.19}$$

The doubling time, DT, of a nodule, then, can be computed using a ratio of two volume measurements and the time in days, $\Delta t$, between them. This can be derived as follows:

$$V_2 = V_1 e^{\lambda \Delta t} \tag{5.20}$$

$$\frac{V_2}{V_1} = e^{\lambda \Delta t} \tag{5.21}$$

$$\ln(V_2/V_1) = \lambda \Delta t \tag{5.22}$$

Substituting our expression for $\lambda$ (Equation 5.15), results in $$\ln(V_2/V_1) = \frac{\ln 2 \cdot \Delta t}{DT} \tag{5.23}$$

$$DT = \frac{\ln 2 \cdot \Delta t}{\ln(V_2/V_1)} \tag{5.24}$$

Using Equation 5.24, doubling times can be computed for clinically-seen nodules, given accurate measures of their volume at two times. Historically, however, the doubling time has been estimated using measures of diameter on chest radiographs, or even in CT slices. In this case, there is an additional factor of three in the denominator (diameter varies as the cube root of volume).

$$DT_{2D} = \frac{\ln 2 \cdot \Delta t}{3\ln(D_2/D_1)} \quad (5.25)$$

Figure 37:
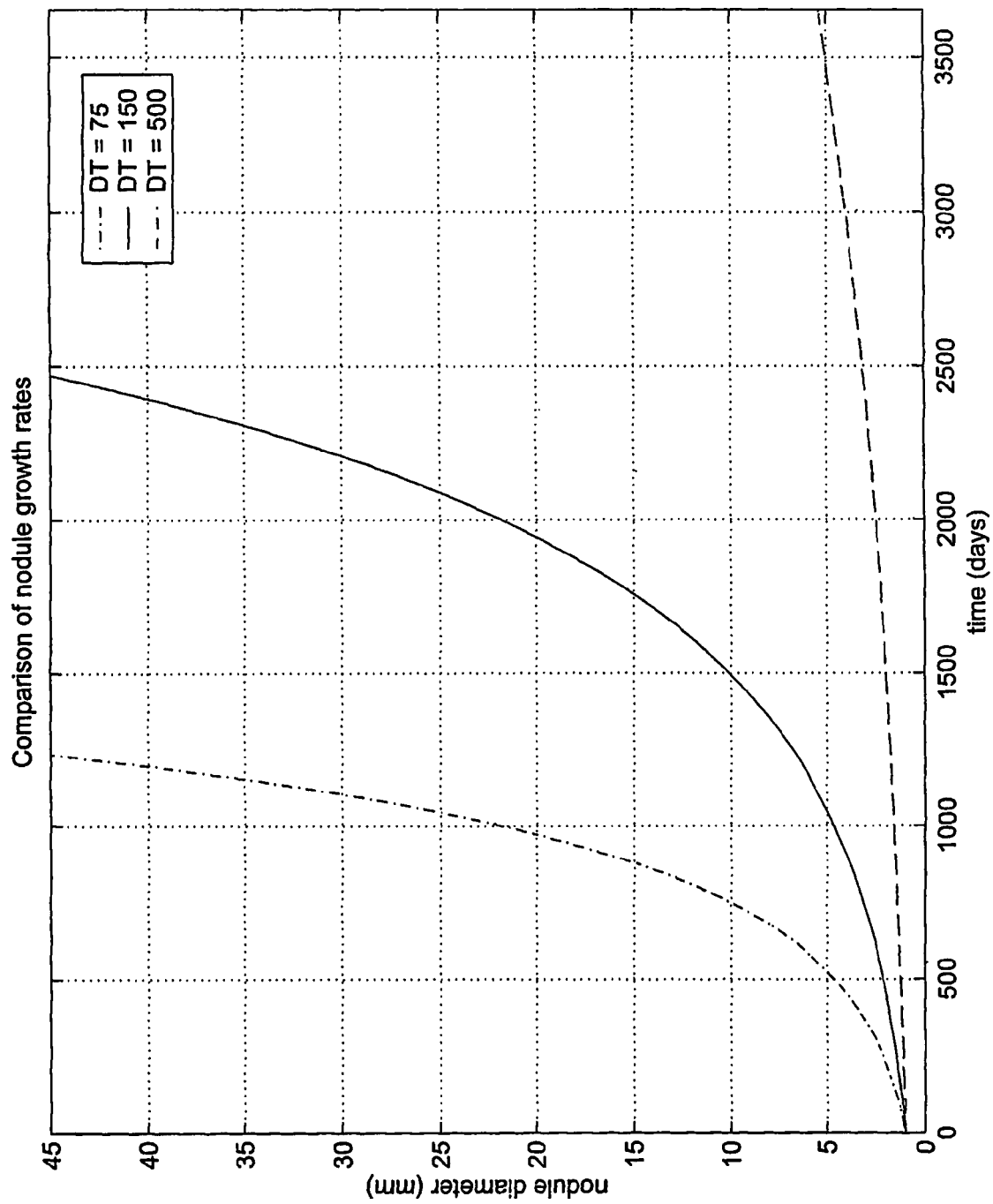
FIG. 37 illustrates a comparison of exponential nodule growth for three doubling times TD=75 (aggressively malignant), TD=150 (malignant), and TD=500 (benign)

To put the model in perspective, FIG. 37 shows a comparison of characteristically malignant and benign doubling times as measured by the increase in nodule diameter from a baseline value of 1 mm. The time scale of the graph is 10 years. It can be seen that the progression of each nodule from the (currently) pre-detectable size of 1 mm, varies significantly for the three doubling times, 75, 150, and 500 days. At the end of the 10 year period, the benign lesion is still only approximately 5 mm in diameter. The malignant lesion, however, reaches the T1-T2 size boundary (30 mm) after only 6 years. Furthermore, it can be seen that the malignant nodule remains in the small, sub-centimeter category for only 4 years (≈1500 days). It is worth noting that more aggressive malignancies, such as those with a doubling time of 75 days, will remain in the sub-centimeter category for only 2 years, and will reach 30 mm in diameter only one year later.

Gompertzian Growth Model—Although the standard model for tumor growth is exponential, other models have been proposed. These models attempt to capture a possible retardation of growth rate for tumors of an advanced size, and have included logarithmic [25], logistic [57], and Gompertzian [45] mathematics as a means to model this effect.

The latter model, based on a Gompertzian function, in which exponential growth is retarded at larger tumor sizes, is the most common of the alternatives to the standard exponential growth model. This slowing of the growth rate has been hypothesized to correspond to cell death and central tumor necrosis, lack of nutritional supply, cell migration and differentiation, as well as homologous inhibition [1].

It is arguable how early in the history of lung cancer the exponential retardation is measurable, if present at all. It has been debated in the literature whether a Gompertzian model is clinically practical [1], or observable in cancers outside those in animal models [89].

Much of the literature on lung cancer screening and growth analysis has been based on a simple exponential growth model. In addition, the focus of our study is small pulmonary nodules, which are likely at a stage prior to appreciable growth retardation; it has been reported that reductions from a constant growth rate may not be observable until the lesion is 2-3 cm in diameter [55]. These facts have lead to the choice of a simple exponential growth model for our characterization of nodule growth.

Interscan Intervals—One of the issues surrounding doubling time estimation is the choice of interscan interval; the number of days between CT examinations. The optimization of interscan interval, $t_i$ is concerned with the following two constraints: (a) $t_i$ must be enough between scans so that accurate size change (growth) can be measured; and (b) $t_i$ must not be so long to allow substantial growth of a malignancy.

Based on our experimental results regarding the accuracy of volume measurement as a function of nodule diameter d, (see Section 5), we can develop an expression for optimal values of the interscan interval. This leads to a scheduling function for early-repeat CT (ERCT) in the study of small pulmonary nodules.

Our data on the reproducibility of volume measurements on synthetic nodules lead to the following assumptions. For small nodules (3≤d<6), the percent error in volume estimation was 1.1% (RMS) and 2.8% (maximum). For larger nodules (6<d<11), the RMS and maximum percent errors were 0.5% and 0.9% respectively. If we take the maximum percent error, $\epsilon$ for each size and conservatively estimate that the minimum reliably-detectable percent volume change, $\alpha$ is twice that (2·$\epsilon$), and, further, assume a conservative linear relationship between magnitude of error and nodule size (intuitively it should be cubic, decaying much faster with nodule diameter), we may construct the following relationship $\alpha$ as a function of nodule diameter, d. Let $\epsilon_S$ and $\epsilon_L$ be the maximum percent errors in volume estimation for a small ($d_S$) and large ($d_L$) diameter value, respectively. We assume a linear model, and that the minimum reliably-detectable percent volume change, $\alpha$, for a given diameter, d is $2E_d$. This leads to the following model for a:

$$\alpha = md + b \quad (5.29)$$

where the slope and intercept are $$m = \frac{2\epsilon_L - 2\epsilon_S}{d_L - d_S} = \frac{2(\epsilon_L - \epsilon_S)}{d_L - d_S} \quad (5.30)$$

and $$b = 2\epsilon_S - mds = \frac{2(\epsilon_S d_L - \epsilon_L d_S)}{d_L - d_S} \quad (5.31)$$

The complete expression for $\alpha$, then, is $$\alpha = \frac{2(d(\epsilon_L - \epsilon_S) + (\epsilon_S d_L - \epsilon_L d_S))}{d_L - d_S} \quad (5.32)$$

For a nodule of a given diameter, d, and doubling time, DT, the minimum reliably-detectable percent volume change is, $\alpha$ given by Equation 5.32. We can then reformulate Equations 5.19 and 5.15 to yield the number of days needed to observe a percent change in volume of $\alpha$.

$$\frac{V_2}{V_1} = 1 + (\alpha/100) = e^{\lambda \Delta t} \quad (5.33)$$

$$1 + (\alpha/100) = e^{(\ln 2/DT)\Delta t} \quad (5.34)$$

$$\ln(1 + (\alpha/100)) = (\ln 2/DT)\Delta t \quad (5.35)$$

$$\Delta t = DT \cdot \ln(1 + (\alpha/100))/\ln 2 \quad (5.36)$$

This interval ($\Delta t$), can be used as the interscan interval for nodules of doubling time DT. It is the minimum duration in days needed to observe a reliably measurable volume change of a percent, given a doubling time, DT. All that remains is the choice of doubling time on which to base our model.

Doubling times for most malignant nodules range from 30400 days [47]. If we are conservative, we may estimate an upper bound on the doubling time of most malignancies as 500 days. We select a doubling time between that of the of the slowest growing nodule for which we would like to predict a status of malignancy and that of the fastest growing nodule that we would like to classify as benign. If we tailor our interscan interval to this doubling time, nodules with shorter doubling times (more aggressive) will be detected more easily, as they will have grown proportionally more in the time between CT examinations. Nodules with longer doubling times will exhibit little or no detectable growth in that time and will, therefore, be characterized as benign with respect to growth rate.

Let $DT_D$ be the doubling time value that separates benign from malignant nodules. A conservative estimate of this value might be 500 days. We now have all of the mathematics in place to formally state the model for determination of the interscan interval.

Given a nodule seen at first HRCT to have a diameter of d, we may calculate the value for the minimum reliably-detectable percent volume change, $\alpha$, using Equation 5.32, and our estimates of $\epsilon_S$ and $\epsilon_L$ at diameters $d_s$ and $d_L$ for the system under study. Following this calculation, the interscan interval (in days) for our chosen value of $DT_D$ is given by:

$$t_i = DT_D \cdot \ln(1+(\alpha/100))/\ln 2 \quad (5.37)$$

Consider the following examples, based on the error estimates determined hereinabove, and a $DT_D$ value of 500 days. From our synthetic nodule studies, $\epsilon_S \approx 3.0\%$, $\epsilon_L \approx 1.0\%$, at $d_s = 3.0$ mm and $d_L = 11.0$ mm.

Example 1

A 3.5-mm (diameter) nodule is detected using HRCT. Using Equation 5.32, we determine a to be 5.75%. Equation 5.37 then yields a value of 40 days for $t_i$.

Example 2

A 9.0-mm (diameter) nodule is detected using HRCT. The corresponding value for $\alpha$ is 3.0%. The appropriate interscan interval is 21 days.

Each of these interscan intervals less than 90 days, perhaps the maximum time a second high-resolution CT study should be delayed. Intuitively, one must wait a longer interscan interval to accurately assess growth in a smaller nodule. As mentioned at the beginning of this section, one of the constraints of this model should be to avoid the possibility of significant nodule growth during the interscan interval. The maximum amount of time a small pulmonary nodule ($3 \geq d < 10$ mm) will be held between scans, given the error estimates described is approximately 42 days, which is less than 1.5 doubling times for even the most aggressive malignancy. Traditional exam intervals for the study of lung cancer ranged from six months to two years (approximately 4-17 times as long), even though the smallest detectable lesion was at least 10 mm in diameter.

This model for interscan interval calculation can be used as the scheduling function for duration to ERCT following an initial high-resolution study of a pulmonary nodule detected in a lung cancer screening program. While it may be administratively impossible to schedule patient visits on exactly the appropriate day suggested by the model, the value of $t_i$ serves as a lower bound on the time needed to wait for an accurate growth assessment to be made.

Figure 38:
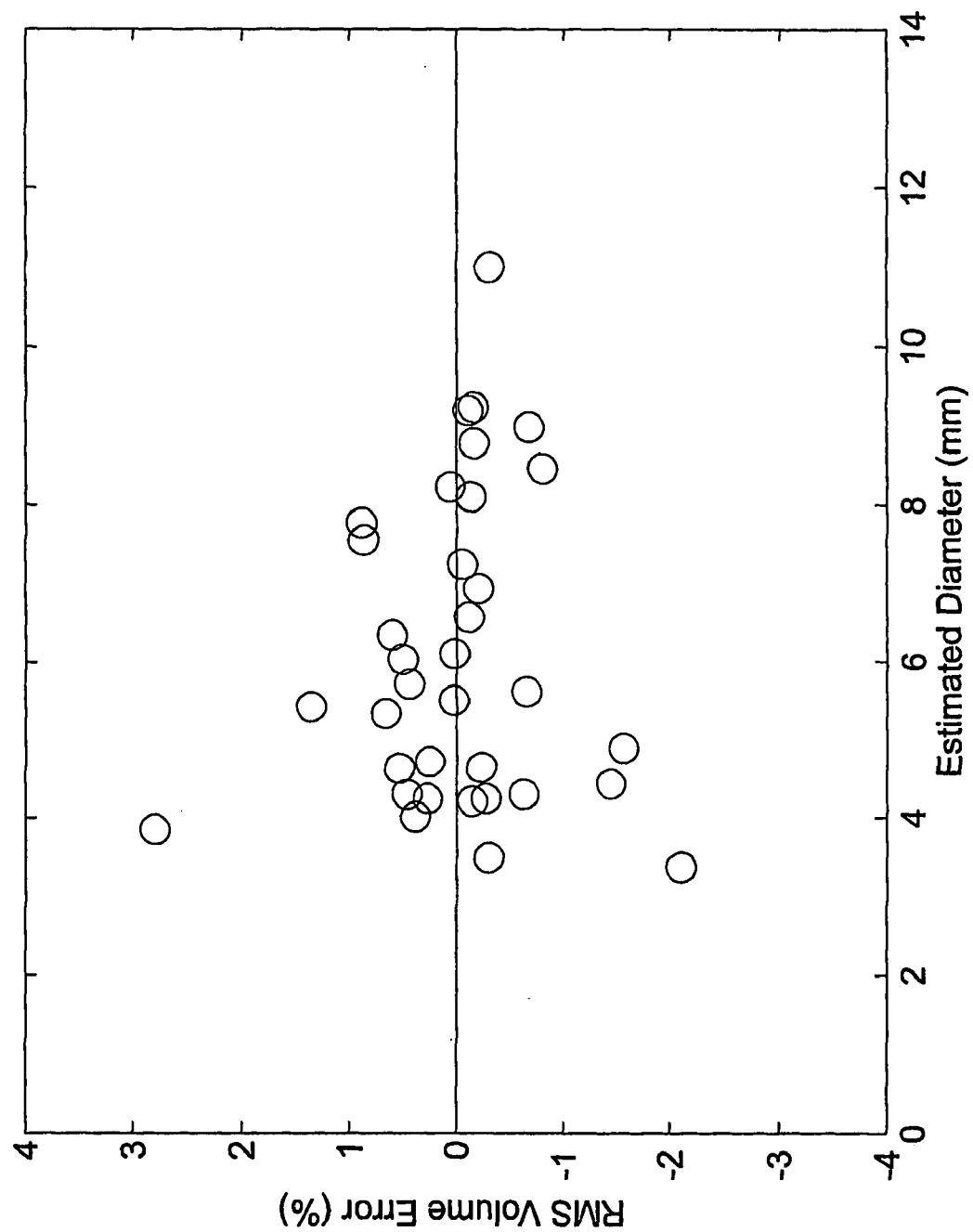
FIG. 38 illustrates RMS percent error in 35 volume measurements of spherical silicone nodules.

Accuracy of Doubling Time Estimates—An estimate the sensitivity of volumetric doubling time estimation can be made using $\epsilon$, the RMS percent error in volume measurement as determined experimentally (see FIG. 38). For this model, as compared with the parameter $\alpha$ in the interscan interval model, it is sufficient to use the RMS percent error rather than the maximum error, as we are estimating the underlying variance of the measurements, rather than a conservative maximum error bound. The volumetric doubling time calculation is a non-linear function of two volumetric measurements which we will assume to be uncorrelated. In addition, it depends on the difference in time between scans, $\Delta t$, which may introduce additional error.

$$DT = f(V_1, V_2) = \frac{\ln 2 \cdot \Delta t}{\ln(V_2/V_1)} \quad (5.38)$$

The error in a nonlinear function, $y = f(x_1, x_2, \ldots, x_n)$, of uncorrelated variables can be estimated based on the variances of each variable. The exact differential of y, $$dy = \frac{\partial f}{\partial x_1} dx_1 + \frac{\partial f}{\partial x_2} dx_2 + \ldots + \frac{\partial f}{\partial x_n} dx_n \quad (5.39)$$

leads to the argument that the variance in the function may be estimated by a sum of the contributions of the variances of each variable. This is known as the law of error propagation. The variance in the nonlinear function above (if all $x_i$ are uncorrelated) is $$\sigma_y^2 = \left(\frac{\partial f}{\partial x_1}\right)^2 \sigma_{x_1}^2 + \left(\frac{\partial f}{\partial x_2}\right)^2 \sigma_{x_2}^2 + \ldots + \left(\frac{\partial f}{\partial x_n}\right)^2 \sigma_{x_n}^2 \quad (5.40)$$

In other words, the change (variance) in the function due to measurement error (as given by the exact differential) can be expressed as a function of the variance in measurement of each variable. We may, therefore, use this method to determine the sensitivity of the doubling time estimation, given estimates of the variance in each measurement, $V_1$, $V_2$, and $\Delta t$.

Starting from Equation 5.38, we form the exact differential of the DT function. The partial derivatives of DT with respect to each variable are $$\frac{\partial (DT)}{\partial (\Delta t)} = \frac{\ln 2}{\ln(V_2/V_1)} \quad (5.41)$$

$$\frac{\partial (DT)}{\partial (V_1)} = \frac{\ln 2 \cdot \Delta t}{V_1 (\ln(V_2/V_1))^2} \quad (5.42)$$

$$\frac{\partial (DT)}{\partial (V_2)} = \frac{-\ln 2 \cdot \Delta t}{V_2 (\ln(V_2/V_1))^2} \quad (5.43)$$

and the exact differential of DT is therefore $$d(DT) = \quad (5.44)$$
$$\frac{\ln 2}{\ln(V_2/V_1)} d(\Delta t) + \frac{\ln 2 \cdot \Delta t}{V_1 (\ln(V_2/V_1))^2} d(V_1) + \frac{-\ln 2 \cdot \Delta t}{V_2 (\ln(V_2/V_1))^2} d(V_2)$$

Then, using the law of error propagation, the variance in doubling tune estimation is $$\sigma_{DT}^2 = \left(\frac{\ln 2}{\ln(V_2/V_1)}\right)^2 \sigma_{\Delta t}^2 + \quad (5.45)$$
$$\left(\frac{\ln 2 \cdot \Delta t}{V_1 (\ln V_2/V_1)^2}\right)^2 \sigma_{V_1}^2 + \left(\frac{-\ln 2 \cdot \Delta t}{V_2 (\ln(V_2/V_1))^2}\right)^2 \sigma_{V_2}^2$$

Interestingly, the variance of DT is not the appropriate error bound in this application. We would prefer, instead, to estimate the RMS error of the measurement, which is equivalent to the standard deviation, $\sigma$, or the square root of the variance.

For n measurements of variable x, these are equal to $$\text{RMS error} = \sigma = \sqrt{\frac{1}{N}\sum_{i=o}^{N-1}(x_t - \mu)^2} \quad (5.46)$$

Thus, the RMS error in doubling time estimation is the square root of Equation 5.45, or $$\sigma_{DT} = \sqrt{\left(\frac{\ln 2}{\ln(V2/V1)}\right)^2 \sigma_{\Delta t}^2 + \left(\frac{\ln 2 \cdot \Delta t}{V_1(\ln(V_2/V_1))^2}\right)^2 \sigma_{V_1}^2 + \left(\frac{-\ln 2 \cdot \Delta t}{V_2(\ln(V_2/V_1))^2}\right)^2 \sigma_{V_2}^2} \quad (5.47)$$

Doubling Time Estimation in Incidence Cases—Estimates of volumetric doubling time of a nodule can be made using two measurements of a nodule, as described by Equation 5.24. It may also be possible to estimate the doubling time of a nodule without two volume measurements, if there is a prior study in which the nodule was undetectable. Once a nodule is detected, prior CT examinations can be evaluated retrospectively to determine if a nodule had been present. If a nodule was in the pre-detectable phase on a prior CT, it may be considered an "incidence case," one that became detectable between regular examinations, as in a screening program. It is possible to estimate the maximum doubling time for these incidence cases using assumptions about minimum detectable size.

If we define $\beta$ to be the minimum-detectable nodule diameter for a given CT protocol, it is possible to determine an upper bound on the nodule doubling time given two examinations; one in which the nodule was undetectable, and one in which precise volume measurements were made. We may assume that the nodule size was smaller than $\beta$ at the time of the first scan and compute the doubling time using the second study in which the nodule volume was measured and the interval between screening studies, $\Delta t_s$. The actual doubling time of the nodule would have to be equal to or smaller (faster growth rate) than the derived value. The upper bound on the doubling time in an incidence case may be computed as $$DT_i = \frac{\ln 2 \cdot \Delta t_s}{\ln(V_2/V_\beta)} \quad (5.48)$$

where $V_\beta$ is a minimum-detectable volume estimate based on the minimum-detectable nodule diameter, $\beta$. Given the assumption of a spherical nodule volume, $V_\beta$ would be $$V_\beta = \frac{4}{3}\pi\left(\frac{\beta}{2}\right)^3 \quad (5.49)$$

As an example, consider an annual screening protocol in which 10-mm reconstructions are generated and for which the minimum-detectable nodule diameter is determined to be 2.5 mm.

Example 3

After several annual screens, a nodule is detected in a patient that was undetectable retrospectively in the previous exam. The nodule is scanned at high-resolution (1 mm slice thickness) for volumetric measurement yielding a volume estimate of 73.57 mm 3. The upper bound on doubling time for this nodule could be estimated using $V_\beta=8.18$ mm$^3$ and $\Delta t_s=365.25$. The incidence estimated doubling time would then be $$DT_i = \frac{\ln 2 \cdot 365.25}{\ln(73.57/8.18)} = 115.3 \text{ days}$$

Such a doubling time would put this nodule well within the range of malignancy. Furthermore, as this is an upper bound on the doubling time, it is possible that the nodule is growing even more aggressively.

Estimation of the doubling time of incidence cases may be an important alternative to waiting an appropriate interscan interval for a second volumetric measurement. This is particularly true in incidence cases that are significantly larger than the minimum-detectable nodule size, as they are those most likely to be malignant.

Example 4

To validate the volumetric doubling time estimation method and to make comparisons with more traditional methods based on 2D measurement, a study was performed using high-resolution CT data acquired at two times for 13 patients enrolled in the ELCAP lung cancer screening study [28]. The final diagnostic status of their nodules was determined either by biopsy or demonstrated lack of growth for more than two years (2YNC). In addition, three nodules were included with unknown, but likely benign status.

The 3D resampling and segmentation procedures described in this work were used prior to automated measurement of nodule size. Volumetric measurements were made of each scan of each nodule. For comparison, area measurements were made using the CT slice of maximum cross-sectional area, and diameter estimates computed from the major and minor principal axes of the nodule in the same image.

Nodule doubling times were computed for each case based on two criteria: volumetric measurements (Equation 5.24) and area measurements (Equation 5.25). Table 5.3 lists the diameter, volume, and area estimates for each case, as well as the two doubling time determinations and the final diagnostic status.

Volumetrically-determined doubling times for the malignant nodules ranged from 51 to 177 days, all well within the range for malignancy. Similarly, doubling times for the non-malignant nodules ranged from 318 to 33700 days for growing nodules and from −242 to −3610 for those nodules that were found to have reduced volume on repeat examination. With the exception of Case 14, all non-malignant nodules had doubling times consistent with benignity.

Figure 39:
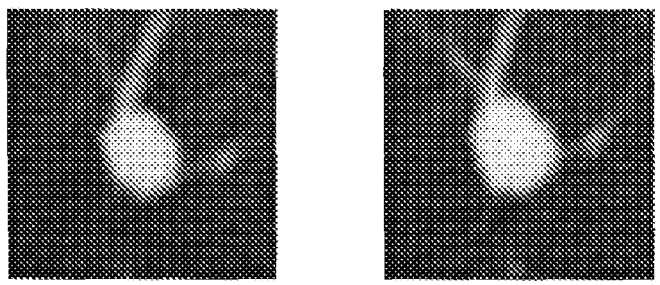
FIG. 39 illustrates CT images of a small nodule at baseline and 33 days later.
Figure 40:
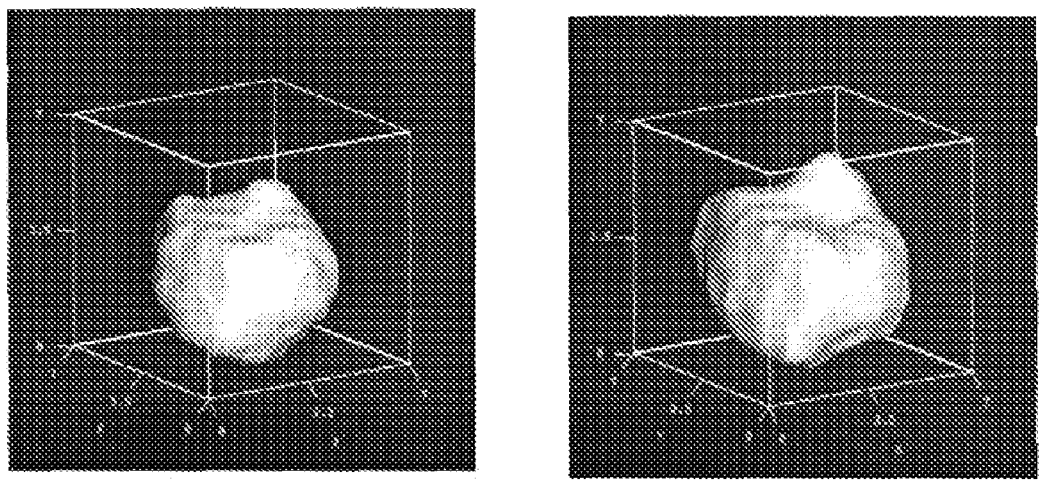
FIG. 40 illustrates 3D visualization of nodule at baseline and 33 days later.

An example illustrating volumetric growth estimation is shown in FIGS. 39 and 40. FIG. 39 shows 2D CT images of a small pulmonary nodule (baseline diameter ≈5.5 mm) taken at baseline and on repeat HRCT 33 days later. The marked growth of this small nodule is clearly visible even with such a short interscan period. The nodule data were resampled to 0.25 mm$^3$ isotropic space and segmented using Algorithm 4.2, which performs morphological segmentation to remove the small vascular attachments. FIG. 40 shows surface-rendered 3D representations of the segmented nodule at baseline and on repeat HRCT, respectively. The overall growth of this nodule is even more evident in the 3D representations than from the original 2D CT slices. Note the asymmetric growth observable in the exaggerated protrusions on the top and front nodule surfaces.

Volumetric analysis was performed on both scans of the nodule. It was found that the nodule grew from 62.5 mm³ to 85.3 mm³ during the interscan period. Using the exponential nodule growth model and Equation 5.24, the nodule doubling time

TABLE 5.3

In-vivo nodule doubling times based on change in volume and area measurements

| Case | Δt | d (mm) | Volume (mm³) $t_0$ | Volume (mm³) $t_1$ | Area (mm 2) $t_0$ | Area (mm 2) $t_1$ | DT (days) based on Volume | DT (days) based on Area | Final Diagnosis |
|---|---|---|---|---|---|---|---|---|---|
| 1 | 36 | 6.9 | 106.9 | 135.7 | 36.5 | 36.6 | 104 | 9700 | Malignant |
| 2 | 20 | 9.3 | 239.8 | 313.8 | 65.9 | 74.1 | 51 | 78 | Malignant |
| 3 | 69 | 5.4 | 141.3 | 184.8 | 18.1 | 25.7 | 177 | 90 | Malignant |
| 4 | 71 | 6.5 | 265.2 | 466.4 | 32.6 | 66.9 | 87 | 46 | Malignant |
| 5 | 33 | 5.5 | 62.5 | 85.3 | 250.1 | 341.2 | 73 | 49 | Malignant |
| 6 | 745 | 3.9 | 89.0 | 166.4 | 11.4 | 28.3 | 826 | 378 | Benign |
| 7 | 35 | 7.4 | 70.0 | 70.9 | 280.1 | 283.4 | 2030 | 135 | Benign |
| 8 | 35 | 7.2 | 54.6 | 56.3 | 218.5 | 225.3 | 798 | 532 | Benign |
| 9 | 84 | 4.1 | 36.2 | 36.2 | 13.0 | 14.9 | 33700 | 288 | Benign |
| 10 | 225 | 4.0 | 41.5 | 37.6 | 12.2 | 11.8 | −1570 | −2840 | Benign |
| 11 | 61 | 7.1 | 208.6 | 219.3 | 38.9 | 46.3 | 846 | 164 | Benign |
| 12 | 70 | 8.4 | 207.9 | 222.2 | 52.4 | 53.6 | 731 | 1520 | 2YNC |
| 13 | 306 | 5.8 | 91.5 | 156.2 | 25.6 | 34.1 | 396 | 494 | 2YN C |
| 14 | 128 | 4.2 | 49.6 | 65.6 | 14.0 | 17.5 | 318 | 265 | Unknown |
| 15 | 140 | 11.9 | 507.8 | 494.3 | 109.8 | 106.1 | −3610 | −1890 | Unknown |
| 16 | 111 | 4.6 | 36.7 | 26.7 | 146.9 | 106.9 | −242 | −161 | Unknown | was computed to be 74 days, well within the range for malignancy. The nodule was subsequently resected and proven malignant by histologic examination.

Figure 41:
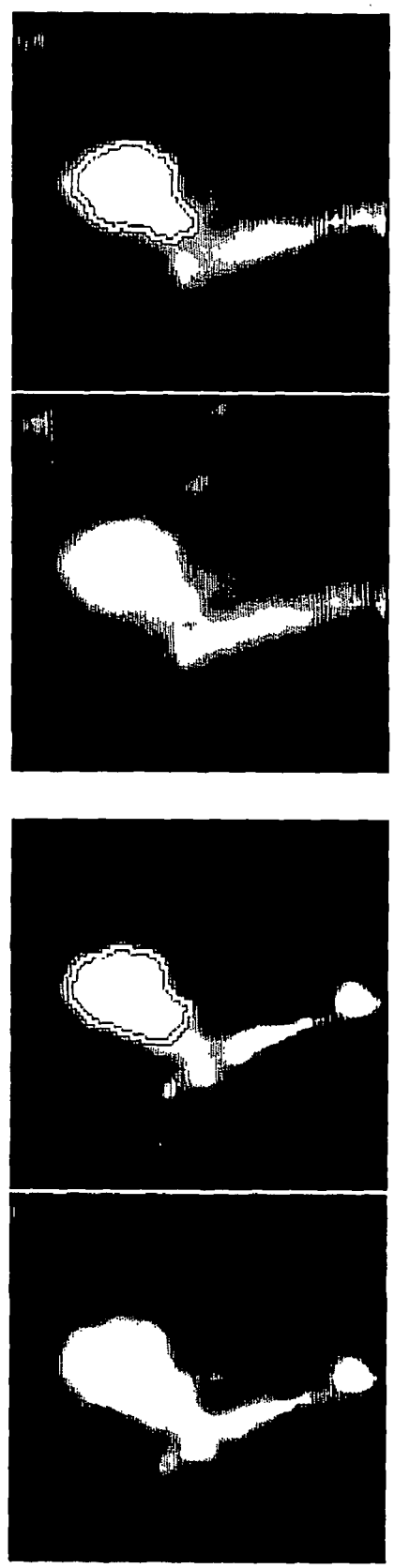
FIG. 41 illustrates two-dimensional images and segmentation of a malignant small pulmonary nodule at baseline and 36 days later.

The asymmetry observed in this example was relatively minor. Non-uniform growth in three dimensions may, however, be a significant factor in doubling time estimation. When comparing volumetrically-determined doubling times with those based on 2D area measurements, we see discrepancies is several cases. Consider Case 1, where the volumetrically-determined doubling time is markedly different from that based on area measurement. FIG. 41 shows 2D images of the CT images with maximum cross-sectional area used for computation of area-based doubling time.

Figure 42:
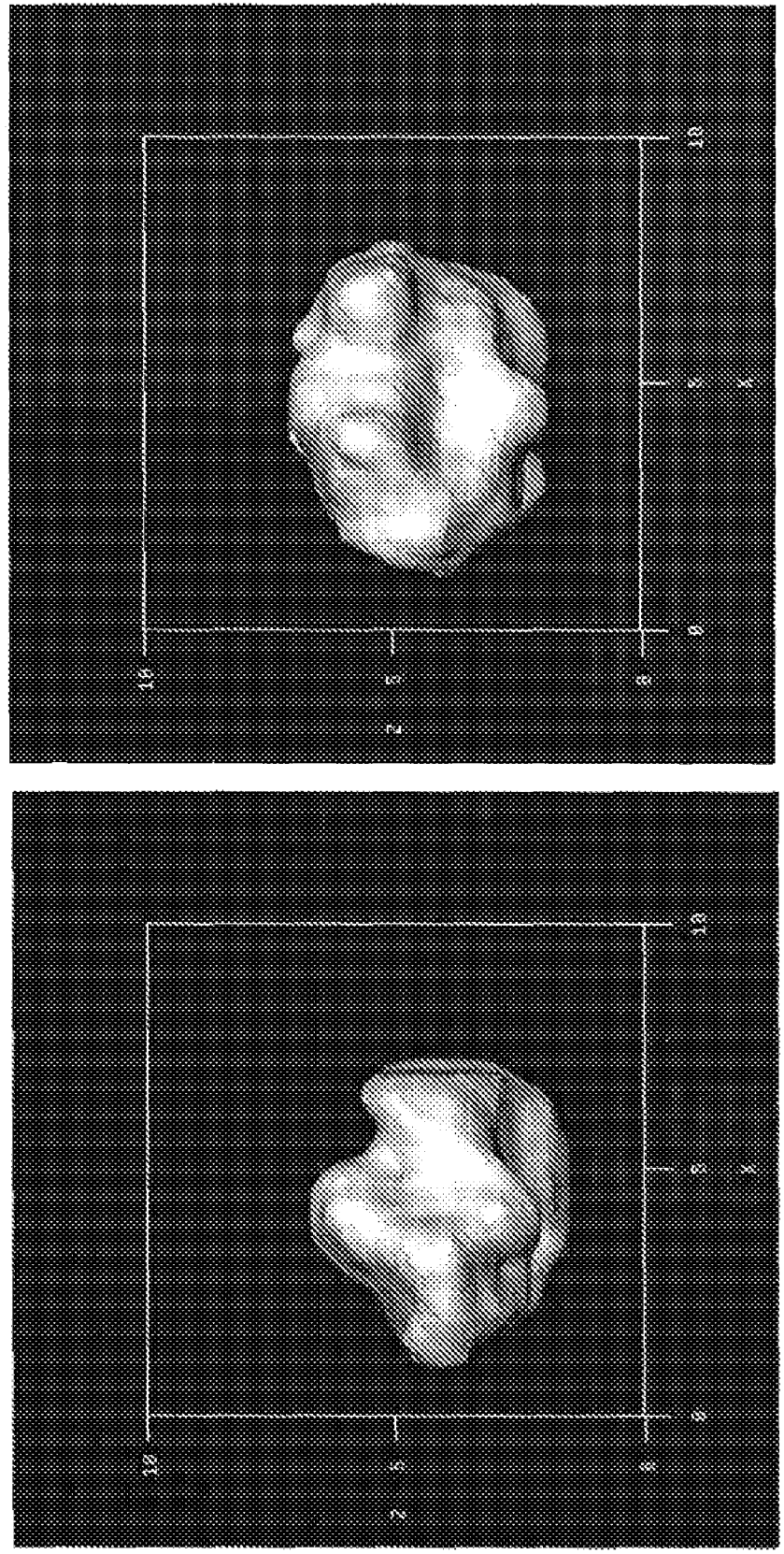
FIG. 42 illustrates 3D visualization of malignant nodule exhibiting non-uniform growth.

The segmented images of the nodule at baseline and at repeat HRCT are quite similar. Their cross-sectional areas are 36.5 and 36.6 mm², respectively, and their perimeters are 22.7 and 23.4 mm, respectively. From this two-dimensional perspective, it is impossible to discern that the nodule is growing in any significant manner. FIG. 42, however, illustrates the nodule in 3D, viewed perpendicular to the scanner axis. This reveals that the nodule is, in fact, growing perpendicular to the scan plane. Thus, while the area-determined doubling time for this nodule was a benign-appearing 9700 days, the true volumetrically-determined doubling time was computed to be 104 days, consistent with malignancy. Again, the nodule was resected and confirmed malignant by histology. Similar cases in which 2D measurements were insufficient to correctly characterize growth were Cases 7, 9, and 11. True volumetrically-determined doubling times appear, therefore, to be better quantifiers of nodule growth, as would be expected.

Volumetric Growth Index—When evaluating the statistical differences between doubling times computed for malignant and non-malignant nodules, it becomes apparent that the nonlinearity of the measure poses a challenge to evaluation. Student's t-test was used to estimate the difference in means between the values of DT computed for malignant and non-malignant nodules. The fact that both large doubling times (corresponding to slow growth) and negative doubling times (corresponding to reduction in nodule size) both correspond to non-malignant processes, assessment of the means of the DT distributions does not effectively characterize their differences.

To eliminate this non-linearity and to provide another intuitive measure of growth, we may define the volumetric growth index, or VGI. The VGI is defined to be the relative increase in nodule volume in one year. This effectively remaps the non-malignant nodules that grow slowly or that are seen to be reduced in volume to the range of small positive and negative numbers. This transformation can be accomplished as follows. Beginning with Equation 5.24, substituting one year (365.25 days) as Δt, and solving for the ratio of volume measurements we get $$\frac{V_2}{V_1} = \exp\left(\frac{\ln 2 \cdot 365.25}{DT}\right) \quad (5.50)$$

Subtracting one from this ratio, to give the relative increase in volume yields the expression for VGI:

$$VGI = \exp\left(\frac{\ln 2 \cdot 365.25}{DT}\right) - 1 \quad (5.51)$$

This metric describes the fractional relative increase in nodule volume each year, given in units of relative volume (percent/100). Consider the following three examples.

Example 5

A benign nodule is determined to have a volumetric doubling time, DT, of 1240 days. Using Equation 5.51, we determine the volumetric growth index, VGI, to be 0.227, or 22.7%. This indicates that at the current growth rate, the nodule will increase 22.7% in volume per year.

Example 6

A malignant nodule is determined to have DT value of 75 days. We may then determine its volumetric growth index, VGI, to be 28.2, or 2820%. In each year, this aggressive nodule with increase its volume approximately 28-fold.

Example 7

A benign nodule is determined to have DT value of −2100 days. The corresponding value for VGI would be −0.114, or −11.4%. The nodule is therefore slowly decreasing in size.

Example 8

With the volumetric growth index, we may now perform a statistical comparison of the distribution of this metric in malignant and non-malignant nodules. Table 5.4 lists the doubling time and volumetric growth index for each of the in-vivo nodules given in Table 5.3.

Statistical analysis reveals that the distributions of VGI values for malignant and non-malignant nodules are significantly different. The VGI for malignant nodules was 40.44±25.53 (mean±sem), whereas for non-malignant nodules it was 0.262±0.1520. The distributions showed a significant difference in means, using Student's t-test (p<0.028). Given the limited sample size, and to remove assumptions about the normality of the distributions, we may also use non-parametric statistics to compare values for the two classes of nodules. Using Wilcoxon rank sums, the distributions were also shown to be significantly different (p<0.002).

TABLE 5.4

In-vivo volumetric doubling times and associated volumetric growth indices

| Case | DT | VGI | I Status |
|---|---|---|---|
| 1 | 104.4 | 10.31 | Malignant |
| 2 | 51.09 | 140.9 | Malignant |
| 3 | 177.4 | 3.167 | Malignant |
| 4 | 87.04 | 17.33 | Malignant |
| 5 | 73.42 | 30.45 | Malignant |
| 6 | 825.5 | 0.3589 | Benign |
| 7 | 2026 | 0.1331 | Benign |
| 8 | 797.9 | 0.3734 | Benign |
| 9 | 33670 | 0.007548 | Benign |
| 10 | −1571 | −0.1488 | Benign |
| 11 | 845.9 | 0.3489 | Benign |
| 12 | 730.7 | 0.4141 | 2YNC |
| 13 | 395.6 | 0.8941 | 2YNC |
| 14 | 317.8 | 1.218 | Unknown |
| 15 | −3606 | −0.06780 | Unknown |
| 16 | −241.6 | −0.6493 | Unknown |

Section 6: Analysis of Three-Dimensional Moments—Three-dimensional moments [65] have been used to characterize shape information in a variety of three-dimensional data. The standard 3D Cartesian moment set of order n, $m_{(pqr)}$, contains all moments $m_{(pqr)}$, such that $p+q+r \leq n$. These moments are defined as follows:

$$m_{pgr} = \int_{-\infty}^{\infty} \int_{-\infty}^{\infty} \int_{-\infty}^{\infty} x^p y^q z^r f(x, y, z) dx\,dy\,dz \qquad (6.1)$$

where $f(x, y, z)$ is a continuous function of three dimensions. In 3D sampled images (such as those arising in from CT data) this results in a discrete image v (x, y, z) of size (M×N×L). The corresponding moment set can then be calculated using the discrete expression $$m_{pqr} = \sum_{x=0}^{M-1} \sum_{y=0}^{N-1} \sum_{z=0}^{L-1} x^p y^q z^r v(x, y, z) \qquad (6.2)$$

Many of the lower order moments have physical interpretations. The zeroth-order moment in three dimensions, for example, is the volume of the object:

$$m_{000} = \sum_{x=0}^{M-1} \sum_{y=0}^{N-1} \sum_{z=0}^{L-1} v(x, y, z) \qquad (6.3)$$

Similarly, the center of mass of the object is described by (x, y, z), where $$\bar{x} = \frac{m_{100}}{m_{000}}, \bar{y} = \frac{m_{010}}{m_{000}}, \bar{z} = \frac{m_{001}}{m_{000}} \qquad (6.4)$$

Geometric and Densitometric Moments—Moment analysis methods for the characterization of objects in images fall into two general classes, based on type of application: applications that are concerned purely with shape characteristics, and those that take into consideration the distribution of intensity within regions. These lead to two types of moment sets that can be computed as follows: (a) geometric moments—each voxel value is considered as binary-valued, contributing a 0 or 1 to the moment sum; and (b) densitometric moments—each voxel value is considered to have a range of intensities, or densities.

Geometric moments are computed from a segmented, binary representation of an object or scene, whereas densitometric moments are computed from a gray-level representation. Consider Equation 6.2. When computing geometric moments, each value of v (x, y, z) is binary-valued. In contrast, when computing densitometric moments, v(x, y, z) may have a range of values in a suitable representation (8-bit/16-bit integer, 16-bit/32-bit floating point).

Both geometric and densitometric moment analyses can be used in the characterization of pulmonary nodules. These techniques will be discussed in Sections set forth below.

Moment Invariants—In an effort to develop metrics that do not change with object scale, position, or orientation, certain nonlinear combinations of moments have been devised known as moment invariants. These are of obvious use in both pattern recognition and machine vision, as they allow objects to be described in a unique manner. One drawback of conventional moment invariants is that they have limited physical meaning (as do the higher-order moments themselves).

Invariant Moment Sets—An alternative technique in object description is to establish a standard set of moments that can uniquely describe an object. It can be shown that such a unique set would need to be of infinite order, but that moment sets of order 3-5 are sufficient for practical classification of most three-dimensional objects [65, 60].

The first step toward generating an invariant moment set is to require the center of mass to be located at the origin.

$$\mu_{100} = \mu_{010} = \mu_{001} = 0 \qquad (6.5)$$

This produces a central moment set, $\{\mu_{pqr}\}$. If further normalizing restrictions are placed on a moment set $\{m_{pqr}\}$, it can be transformed into a standard moment set, $\{M_{pqr}\}$. Briefly, these restrictions are as follows:

1. Volume—The object volume must be normalized to 1.0.

$$M_{000}=1.0 \qquad (6.6)$$

2. Center of Mass—The center of mass of the object must be at the origin.

$$M_{100}=M_{010}=M_{001}=0 \qquad (6.7)$$

3. Principal Axes—The principal axes of the object's ellipsoid of inertia (EOI) must be aligned with the Cartesian axes.

$$M_{110}=M_{101}=M_{011}=0 \qquad (6.8)$$

4. Moments of Inertia—The moments of inertia must be (in descending order) z, y, and x.

$$m_{200} \geq m_{020} \geq m_{002} \qquad (6.9)$$

5. Rotational Normalization—There must be a unique orientation of the object.

$$m_{300} \geq 0, \ m_{030} \geq 0, \text{ and (optionally) } m_{030} \geq 0 \qquad (6.10)$$

Transformations of Three-Dimensional Moments—Consider the following 3-by-3 matrix, specifying a generalized orthogonal transformation of the 3D image space.

$$U = \begin{pmatrix} \mu_{00} & \mu_{01} & \mu_{02} \\ \mu_{10} & \mu_{11} & \mu_{12} \\ \mu_{20} & \mu_{21} & \mu_{22} \end{pmatrix} \qquad (6.11)$$

The effect of this arbitrary orthogonal image transformation is to transform the moment $m_{pqr}$ to $m'_{pqr}$. Its effect can be achieved directly in moment space using the following formula:

$$m'_{pqr} = \sum_{s_1=0}^{p} \sum_{t_1=0}^{s_1} \sum_{s_2=0}^{q} \sum_{t_2=0}^{s_2} \sum_{s_3=0}^{r} \sum_{t_3=0}^{s_3} C \ U \ m_{abc} \qquad (6.12)$$

where the combinatorial product C is defined as $$C = \binom{p}{s_1}\binom{s_1}{t_1}\binom{q}{s_2}\binom{s_2}{t_2}\binom{r}{s_3}\binom{s_3}{t_3} \qquad (6.13)$$

the transformation product U is defined as $$U = u_{11}^{t_1} u_{21}^{t_2} u_{12}^{s_1-t_1} u_{22}^{s_2-t_2} u_{13}^{p-s_1} u_{23}^{q-s_2} u_{31}^{t_3} u_{32}^{s_3-t_3} u_{33}^{r-s_3} \qquad (6.14)$$

and the indices a, b, and c of the independent moment term are as follows.

$$a = t_1 + t_2 + t_3 \qquad (6.15)$$

$$b = s_1 + s_2 + s_3 - t_1 - t_2 - t_3 \qquad (6.16)$$

$$c = p + q + r - s_1 - s_2 - s_3 \qquad (6.17)$$

This formulation allows scaling and rotation to be applied in one step. A complete affine transformation (translation, rotation, and scaling) and may be accomplished by translation of the center of mass to the origin followed by a linear transformation combining scaling and rotation.

Object Orientation—In order to put the object under study into standard form (and thereby compute $\{M_{pqr}\}$), it is necessary to determine its orientation in three-dimensional space. This can be accomplished via the solution to the following eigenproblem:

$$Ax = \lambda x \qquad (6.18)$$

where $$A = \begin{pmatrix} m_{200} & m_{110} & m_{101} \\ m_{110} & m_{020} & m_{011} \\ m_{101} & m_{011} & m_{002} \end{pmatrix} \qquad (6.19)$$

Figure 43:
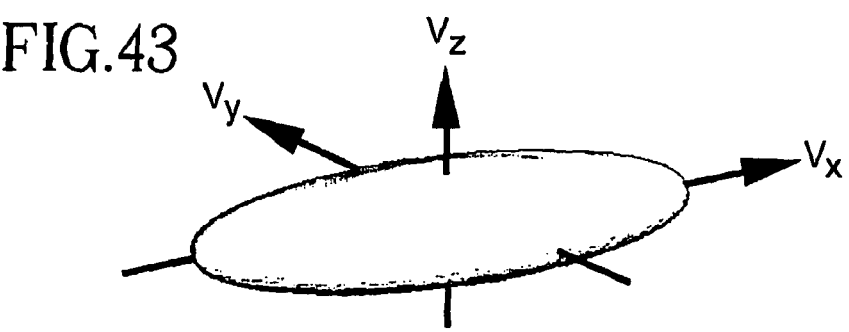
FIG. 43 illustrates an ellipsoid with its principal axes labeled.

The orthonormal basis of eigenvectors produced in the solution of this problem will point in the directions of each of the principal axes of the object. Using these unit vectors $V_x$, $V_y$, $V_z$, it is possible to find the orientation of the object. Consider a standard orientation where the major principal axis ($V_x$) is aligned with the x-axis, the intermediate principal axis ($V_y$) is aligned with the y-axis, and the minor principal axis ($V_z$) is aligned with the z-axis (FIG. 43).

Note that the three principal axes must be mutually orthogonal, as they form an orthonormal basis for the object distribution. This standard orientation can also be specified in terms of second order moments (moments of inertia):

$$m_{200} \geq m_{020} \geq m_{002} \qquad (6.20)$$

The moment of inertia about the x-axis ($m_{200}$) should be greater than or equal to that about the y-axis ($m_{020}$), which should, in turn, be greater than that about the x-axis ($m_{200}$).

The lengths of the principal axes (twice the length of the semi-axes of the ellipsoid of inertia) can be derived from the eigenvalues of the system. If the eigenvalues of the system given in Equation 6.18 are sorted such that $$\lambda_0 \geq \lambda_1 \geq \lambda_2 \qquad (6.21)$$

then the lengths of the principal axes are $$\text{length} = |V_x| = 2\sqrt{\lambda_0} \cdot \sqrt[3]{\frac{3V}{4\pi\sqrt{\lambda_0\lambda_1\lambda_2}}} \qquad (6.22)$$

$$\text{width} = |V_y| = 2\sqrt{\lambda_1} \cdot \sqrt[3]{\frac{3V}{4\pi\sqrt{\lambda_0\lambda_1\lambda_2}}} \qquad (6.23)$$

$$\text{height} = |V_z| = 2\sqrt{\lambda_2} \cdot \sqrt[3]{\frac{3V}{4\pi\sqrt{\lambda_0\lambda_1\lambda_2}}} \qquad (6.24)$$

Given the restrictions of standard orientation, it is possible to define notions of roll, pitch, and yaw, allowing the specification of an arbitrary orientation as three rotations from the standard form. If we restrict objects to be longest along their major principal axis and shortest along their minor axis, these definitions correspond to their standard geometric counterparts. Simply, roll is a rotation about the major principal axis; pitch is a rotation about the intermediate principal axis; yaw is a rotation about the minor principal axis. Using the principal axis vectors obtained from the solution to the above eigenproblem, these rotational angles are simple functions of their projections on the YZ, XZ, and XY planes, respectively.

$$\text{roll} = \cos^{-1}\left(\frac{proj_{YZ}V_z}{|V_z|}\right) \cdot \text{sign}(V_z(y)) \qquad (6.25)$$

$$\text{pitch} = \cos^{-1}\left(\frac{proj_{XZ}V_x}{|V_x|}\right) \cdot sign(V_x(z)) \quad (6.26)$$

$$\text{yaw} = \cos^{-1}\left(\frac{proj_{XY}V_x}{|V_x|}\right) \cdot sign(V_x(y)) \quad (6.27)$$

The projections, derived from the dot products of each vector with the line of minimum distance in each corresponding plane simplify to the following:

$$proj_{yz}V_z=(0,V_z(y),V_z(z)) \quad (6.28)$$

$$proj_{xz}V_x=(V_x(x),0,V_x(z)) \quad (6.29)$$

$$proj_{xy}V_x=(V_x(x),V_x(y),0) \quad (6.30)$$

The sign ( ) (signum) function is used to uniquely define the rotations, as there are otherwise two possible solutions mapped to the same angle by the inverse cosine (the range of $\cos^{-1}$ is $[0,\pi]$).

TABLE 6.1

Primary size metrics in two and three dimensions

| Feature. | 2D | 3D |
|---|---|---|
| gross size | area | volume |
| surface | perimeter | surface area |
| dimensions of EOI | length, width | length, width, height |

Once the orientation of an object has been determined, it is possible to transform the entire moment set $\{m_{pqr}\}$ into its corresponding standard moment set, $\{m_{pqr}\}$, using the general transformation given in Equation 6.12.

Primary Metrics—Primary metrics of nodule size and density are those that are computed directly from the segmented nodule data.

Primary Size Metrics—The primary measures of nodule size in two and three dimensions are shown in Table 6.1, where "EOI" refers to the ellipse of inertia (in 2D) or ellipsoid of inertia (in 3D) representing the nodule. Calculation of two-dimensional metrics is normally performed on the single CT image of maximum cross-sectional area.

Volume and area calculations are straightforward, as they are the zeroth-order geometric moment in 3D, and 2D, respectively. Using the general equation for moments (Equation 6.2), we get volume ($m_{000}$) as expressed in Equation 6.3. Similarly, the area of a two-dimensional object is $m_{00}$. It is important to note that these equations result in size measures in units of voxels or pixels. Section 5 discusses the normalization of volume units based on voxel resolution.

Surface Area Calculation—There are two types of methods for surface area calculation. Those that operate on segmented voxel data, and those that operate on a polygonal surface representation of the nodule (described in Section 4 Surface area calculations made directly from the segmented voxel representation are basically the sum of the exposed voxel faces, those that separate object from background. The area of each exposed voxel face is simply the product of two of the image resolution values.

Algorithm 6.1 (Surface Area Calculation (Voxel-Based))

S ← 0
for all v(x, y, z) ∋ (v(x, y, z) == 1) {for each foreground voxel}

Algorithm 6.1 (Surface Area Calculation (Voxel-Based))

if (v(x − 1, y, z) == 0 || v(x + 1, y, z) == 0)
    S ← S + ($v_{yres} \cdot v_{yres}$) {add yz rectangle}
if (v(x, y − 1, z) == 0 || v(x, y + 1, z) == 0)
    S ← S + ($v_{xres} \cdot v_{zres}$) {add xz rectangle}
if (v(x, y, z − 1) == 0 || v(x, y, z + 1) == 0)
    S ← S + ($v_{xres} \cdot v_{yres}$) {add xy rectangle}
end This voxel-based algorithm tends to exaggerate the surface area estimate, as the rectangular approximation to the surface is, in general, not nearly as smooth as the object it represents. FIGS. 44 through 47 illustrate this point in two dimensions.

Figure 44:
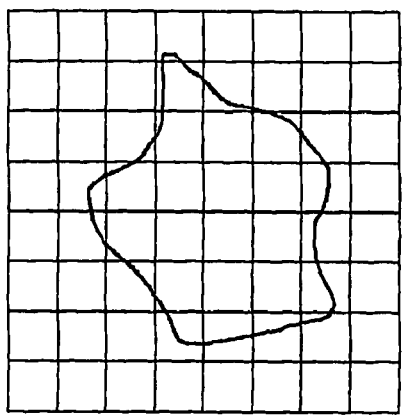
FIG. 44 illustrates a silhouette of an object whose shape will be discretized by the sampling procedure.
Figure 45:
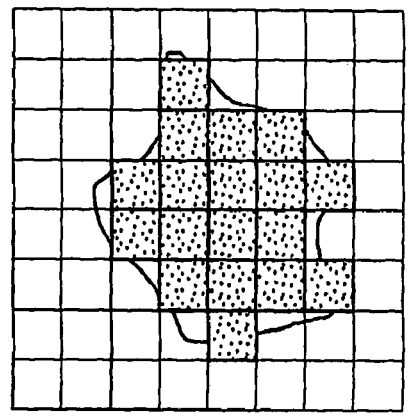
FIG. 45 illustrates the discretized representation of the object shown in FIG. 44.
Figure 46:
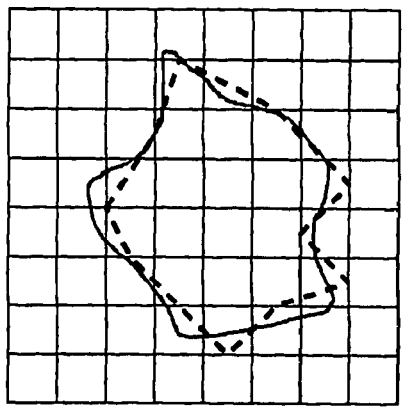
FIG. 46 illustrates a polyline representation of the object shown in FIG. 44.
Figure 47:
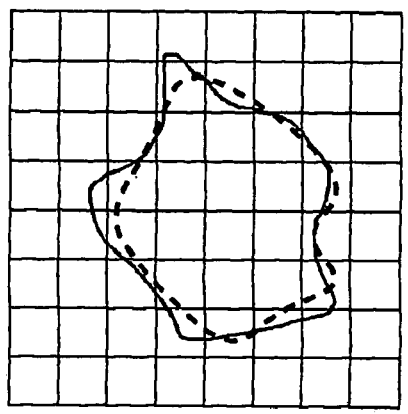
FIG. 47 illustrates a filtered (smooth) polyline representation of the object shown in FIG. 44.

FIG. 44 shows the silhouette of an object whose shape will be discretized by the sampling procedure. FIG. 45 shows the discretized representation of the object. Note the error introduced by sampling the continuous image to the grid. Similar to the partial volume problem in CT, pixels containing insufficient overlap with the object are assigned to the background. The boundary of this pixel-based representation clearly overestimates the true extent of the object surface (perimeter). FIG. 46 illustrates a polyline representation of the object boundary. The polyline (a two-dimensional analog to the polygonal surfaces used in our nodule analysis) provides a better representation of the true object form and corresponding surface length. Finally, FIG. 47 illustrates a filtered (smoothed) polyline representation, where the location of each vertex is replaced by a weighted sum of its original location and that of the two adjacent vertices.

Figure 48:
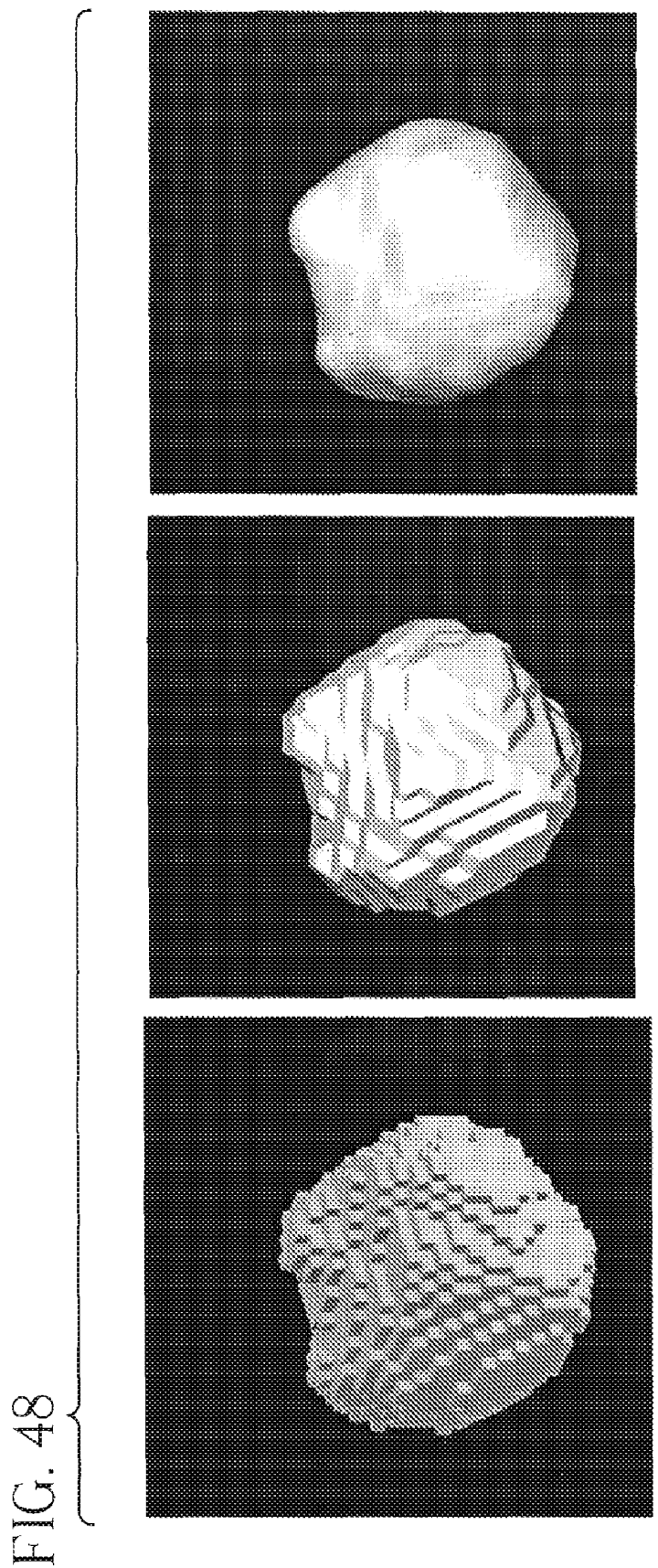
FIG. 48 illustrates a comparison of 3D surface representations of a small pulmonary nodule.

FIG. 48 illustrates the difference in voxel and surface representations in three dimensions. Each is a shaded surface rendering of a polygonal surface representation of the same small (d≈5 mm) pulmonary nodule. The image on the left is the surface given by the voxels themselves. The center image is the result of surface tessellation by the modified marching cubes algorithm discussed in Section 4. The image on the right is the filtered version of the center image following two iterations of Algorithm 4.6.

It is clear from the figure that the voxel-based representation exaggerates the surface area. The degree to which the surface area is overestimated can be evaluated by comparing voxel-based surface area estimates to those computed from polygonally tessellated surfaces.

The standard surface area estimation method for this work operates on the polygonal surface representations of the nodule described in Section 4. Surface area is computed as the sum of areas of each polygon in the surface. Algorithm 6.2 is a description of this method for surfaces tessellated with triangles (the standard). Extension of the method to include convex planar polygons of n sides is straight-forward, as they can be decomposed into triangles (as is the case for the squares used to tessellated the voxel-based image). It is based on computing the area of each triangle using Heron's formula. For clarity, we define the Euclidean distance function between vertices $V_a$ and $V_b$ as:

$$D(V_a, V_b) = \sqrt{(V_a(x) - V_b(x))^2 + (V_a(y) - V_b(y))^2 + (V_a(z) - V_b(z))^2} \quad (6.31)$$

Algorithm 6.2 (Surface Area Calculation (Polygon-Based))

$S \leftarrow 0$
for all $T_I = \{V_0, V_1, V_2\}$ {for each triangle}
    $a = D(V_0, V_1)$
    $b = D(V_1, V_2)$
    $c = D(V_2, V_0)$
    $s = \frac{1}{2}(a + b + c);$
    $A = \sqrt{s(s-a)(s-b)(s-c)}$
    $S \leftarrow S + A$
end Consider the nodule surfaces shown in FIG. 48. Using Algorithm 6.2, we find the surface areas are 122.25 mm$^2$, 81.2759 mm$^2$, and 79.4623 mm$^2$, for the voxel-based, polygonal surface, and filtered polygonal surface representations, respectively.

This result is similar to that derived in Section 3, where it was shown that the error in area and volume measurement is reduced with an increasing resampling ratio. Filtering of the polygonal representation provides much the same benefit, allowing the locations of each vertex in the boundary to have displacements that are more finely resolved than on the original grid. Further evidence of the benefit of surface filtering prior to the estimation of surface area was shown in Section 4. The error in surface area estimation of a 10 mm sphere was shown to be reduced from 12% when calculated from a polygonal surface generated by the modified marching cubes method to 0.25% following the application of Algorithm 4.5.

An additional experiment was performed to assess the relationship between the number of iterations of surface filtering and estimation of surface area. Synthetic spheres of varying diameter (from 2.5 to 25 mm) were generated, tessellated, and surface filtered a varying number of times prior to surface area computation. The surface area estimates were within 2% (mean=0.4%) of theoretical values following one filter iteration as compared with 12% (mean=9.4%) using the unfiltered tessellations. Furthermore, for spheres greater than 5 mm in diameter, the surface area estimates could be improved to within 1% (means=0.4%) following two iterations of Algorithm 4.5.

Primary Density Metrics—Computation of voxel density statistics are based on statistical moments. More specifically, they are functions of the central statistical moments. Analogous to the central moments of the image data described in Section 6.2, these moments are summations of powers of the voxel density values, normalized to the mean value.

$$\mu_p = \sum_0^{N-1} (v(x, y, z) - \mu)^p \qquad (6.32)$$

The number of voxels, then, is simply $\mu_0$, the zeroth-order moment.

$$\mu_0 = N \qquad (6.33)$$

This is exactly analogous to area and volume in two and three dimensions, respectively. Note that the normalization of these moments is to the mean value in the one-dimensional distribution of density, not to a particular spatial location (e.g. the center of mass). Therefore, voxel density statistics provide information about the statistical distribution of all voxel densities in the nodule region without regard to spatial location.

The mean voxel density is the arithmetic mean of all density values in the segmented nodule volume and can be defined as the first-order moment divided by zeroth-order moment.

$$\mu = \frac{1}{N} \sum_0^{N-1} v(x, y, z). \qquad (6.34)$$

Variance, a measure of the variability of density values, is derived from the second-order moment, expressing the mean-squared deviation of the voxel values from the mean.

$$\text{variance} = \frac{\mu_2}{\mu_0} = \frac{1}{N} \sum_0^{N-1} (v(x, y, z) - \mu)^2 \qquad (6.35)$$

An unbiased estimate of variance is sometimes used when it is hypothesized that the sample mean does not represent the true mean of a variable over an entire population. Such hypothesis are not usually necessary when dealing with the distribution of voxel values in a nodule, as we often have data representing the entire nodule volume.

$$\text{variance(unbiased)} = \frac{\mu_2}{\mu_0 - 1} = \frac{1}{N-1} \sum_0^{N-1} (v(x, y, z) - \mu)^2 \qquad (6.36)$$

The standard deviation, $\sigma$ is another measure of the variation in values from the mean. It is simply defined as the square root of the variance.

$$\sigma = \sqrt{\text{variance}} \qquad (6.37)$$

Two additional parameters based on statistical moments, skewness and kurtosis, are used to quantify the shape of the distribution. Skewness measures the shift of the density distribution to the right or left (above or below) the mean.

$$\text{skewness} = \frac{\mu_3}{\sigma^3} = \frac{\sum_0^{N-1} (v(x, y, z) - \mu)^3}{\sigma^3} \qquad (6.38)$$

Kurtosis is a measure of the "peskiness" of the distribution.

$$\text{kurtosis} = \frac{\mu_4}{\sigma^4} - 3 = \frac{\sum_0^{N-1} (v(x, y, z) - \mu)^4}{\sigma^4} - 3 \qquad (6.39)$$

Note that the expression given above is normalized (by subtracting 3 from the "raw" kurtosis) such that the kurtosis of a normal distribution is 0.0.

These voxel statistics can be used to assess the uniformity of density in the nodule, which may be useful in characterizing nodule cavitation, or, more generally, cell necrosis. In addition, the mean voxel density within the nodule can be used in the assessment of nodule calcification, a major predictor of benignity. If the mean density or a significant subset of the density distribution is found to be higher than that observed for calcium, the likelihood of benignity is considerably higher. Patterns of calcification within nodules have been studied [47], but are generally only observable in nodules larger than 1 cm in diameter. In this study, however, our focus is generally restricted to small non-calcified nodules.

Secondary Metrics—Secondary metrics of nodule size, shape, and density are those that are derived from primary metrics, rather than measured directly from the image data. One of the major benefits of secondary metrics is that they are typically defined to be size invariant. Unlike primary size metrics, the size invariance of secondary metrics allows nodules of different sizes to be compared without regard to size. Although overall nodule size is a metric typically predictive of malignancy, it is less appropriate as a measure of small pulmonary nodules. Size as a predictor of malignancy is typically used to stratify larger lung masses lung masses (d>3 cm) (not generally classified as nodules) from smaller lesions. These large masses have a high probability of malignancy, as benign nodules rarely grow to this size (82). In the study of small pulmonary nodules (d<1 cm), however, such differentiation based on size is not possible. Therefore, the study of size-invariant metrics is concerned with determining those shape and density characteristics that can be used to differentiate benign from malignant lesions when they are all of a similar size.

Aspect Ratios—The simplest secondary metrics describing the shape of a nodule are the aspect ratios, simple ratios of the dimensions of the segmented nodule volume. These dimensions are computed using moment analysis and are (in descending order of magnitude) the length, width, and height of the ellipsoid of inertia describing the segmented volume. Computation of these dimensions is done using Equations 6.22-6.24, following the solution of the eigenproblem described above. The three aspect ratios of these nodule dimensions are defined as $$LHR = \frac{length}{height} \quad (6.40)$$

$$LWR = \frac{length}{width} \quad (6.41)$$

$$WHR = \frac{width}{height} \quad (6.42)$$

Similarly, an aspect ratio may be defined in two-dimensions based on the ellipse of inertia computed from a single 2D image. In this case there is only a single ratio, that of length (major axis) to width (minor axis).

Nodule Compactness—Another important measure of the geometric distribution of a pulmonary nodule is compactness. Compactness is a measure of the ratio of size to surface of a nodule.

In two dimensions, compactness has been defined as a function of cross-sectional area and perimeter (22).

$$Compactness_{2D} = \frac{4\pi \cdot Area}{Perimeter^2} \quad (6.43)$$

The constant, $4\pi$, and exponent of perimeter are used as a normalization such that the 2D compactness of a circle is equal to one.

We can extend compactness to a three-dimensional metric. Three-dimensional compactness may be defined as a function of nodule volume and surface area [62].

$$Compactness_{3D} = -\frac{6\sqrt{\pi} \cdot V}{S^{3/2}} \quad (6.44)$$

The constant, $6\sqrt{\pi}$, and exponent of surface area are used to normalize the function such that the compactness of a sphere is equal to one.

Sphericity and Circularity—Two additional measures of nodule shape may be defined that capture both the compactness and the major:minor aspect ratio the nodule. Sphericity is a measure of similarity of the nodule to a sphere of the same volume.

$$Spericity = \frac{Compactness_{3D}}{LHR} \quad (6.45)$$

In two dimensions, the analogous metric is circularity.

$$Circularity = \frac{Compactness_{2D}}{LWR} \quad (6.46)$$

Secondary Density Metrics—Secondary metrics of density distribution within the nodule may also be defined. The goal of these measures is to quantify the regularity of the nodule density distribution and how it deviates from a uniformly dense sphere.

Eccentricity, $\xi$, of the density distribution measures the displacement between the geometric and densitometric centers of mass (COM). It is defined as $$\xi = D(COM_{geom}.COM_{dens.}) \quad (6.47)$$

using the D operator for Euclidean distance (Equation 6.31). To obtain a truly size-invariant metric, the eccentricity may be normalized by the cube root of the volume (an estimate of nodule radius).

$$\hat{\xi} = \frac{D(COM_{geom}.COM_{dens.})}{\sqrt[3]{V}} \quad (6.48)$$

Density skew, $\Phi_d$, is a measure of the angle between the geometric and densitometric ellipsoids of inertia (EOI). If we define the orientation of the geometric EOI to be $\theta_{geom}$ and that of the densitometric EOI to be $\theta_{dens}$, the density skew is simply $$\Phi_d = \theta_{geom.} - \theta_{dens.} \quad (6.49)$$

One concern in using this metric is the stability of the measure of EOI orientation. Note that as the nodule becomes more spherical, the calculation of the orientation becomes unstable. Therefore, the measure of density skew is less accurate as the nodule is more spherical. This leads to the use of the normalized density skew, $\hat{\Phi}_d$, which is simply resealed by the sphericity of the nodule such that the less-confident values are closer to zero and the more-confident values are given a greater magnitude.

$$\hat{\phi}_d = \frac{\theta_{geom.} - \theta_{dens.}}{\text{Sphericity}} \quad (6.50)$$

Curvature Model—Analysis of surface curvature is the study of the rate of change of the surface normal, $\Phi$, with respect to the surface length. In two dimensions, this is the derivative of the normal vector with respect to the arc length.

$$\kappa = \frac{d\phi}{ds} \quad (6.51)$$

In three dimensions, an infinite number of curvatures can be defined at a point on a surface, as they are computed from the curve given by the intersection of the 3D surface with any plane containing that point and that is parallel to the surface normal at that point.

In our discrete piecewise linear model of the 3D surface of a nodule, the situation is more straightforward. The surface curvature can be computed as the change in surface normal between a particular vertex and any (or all) of the adjacent vertices. Curvature estimates may be defined at each vertex, or on each triangle in the surface. Methods for the computation of these curvature estimates will now be described.

Curvature Estimation Method—Curvature estimation methods are often based on analysis of 2D and 3D image gradient information. In this work, curvature estimation is performed on a smoothed piecewise linear surface model, derived from the results of 3D image segmentation. The surface tessellation and smoothing are described in Section 4.

Normal and Curvature Estimation—Three-dimensional surface curvature estimation may be performed on the nodule surface model in two steps. Curvature estimates are made for each vertex comprising the surface and, in turn, for each triangle.

For each vertex $V_i$ in V, connectivity analysis is performed to generate an adjacency list, $\text{adj}(V_i)$. From this adjacency list, it is possible to compute the set of triangles, T, of which $V_i$ is a member. Consider a pair of vertices $(V_a, V_b)$ adjacent to $V_i$. If they also share adjacency, there exists a triangle with vertices $\{V_i, V_a, V_b\}$.

This method is described more formally in Algorithm 6.3.

---
Algorithm 6.3 (Triangle Detection)
---

```
∀V_i ∈ V
    ∀(V_a,V_b)∈ adj(V_i) {For each pair of vertices adjacent to V_i}
        if V_b ∈ adj(V_a) {If adj(V_a) contains V_b}
            T = (T ∪ {V_i,V_a,V_b})
    end
```

---

Figure 49:
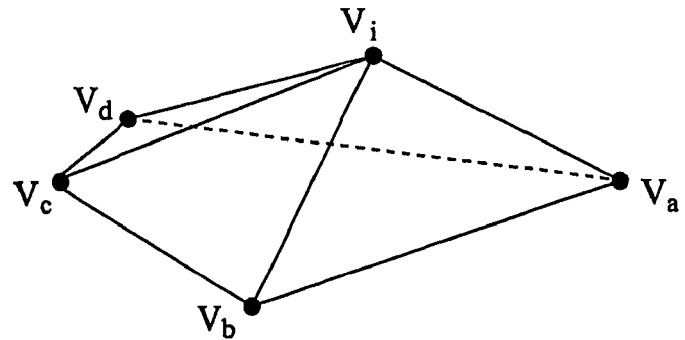
FIG. 49 is an illustrative patch of a 3D tessellated surface.

FIG. 49 illustrates a small patch of a 3D tessellated surface. Vertex $V_i$, and the four vertices in $\text{adj}(V_i) = \{V_a, V_b, V_c, V_d\}$ are shown. This patch will form the basis of a running example to be used in illustrating the curvature estimation model.

Once the set of triangles, $T = \{T_o \ldots T_m\}$, of which $V_i$ is a member has been determined, the first step is to calculate the surface normal for each triangle in T. If $T_2 = \{V_i, V_a, V_b\}$, then its surface normal, $\psi_1$, can be computed as the normalized cross product of two of its sides:

$$\psi_l = \frac{\overrightarrow{V_iV_a} \times \overrightarrow{V_iV_b}}{\left|\overrightarrow{V_iV_a} \times \overrightarrow{V_iV_b}\right|} \quad (6.52)$$

Figure 50:
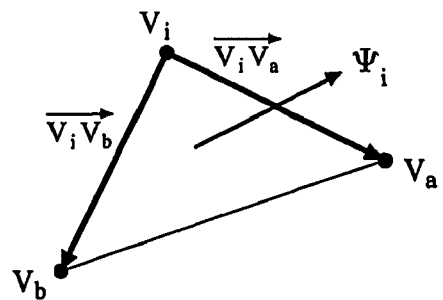
FIG. 50 illustrates a computation of the surface normal of each triangle.

This relationship is illustrated in FIG. 50. Note that we normalize this result to obtain the unit surface normal vector for each triangle. The surface normal at vertex $V_1$, $\Phi_1$, can now be calculated as the average of surface normals of each triangle of which it is a member.

$$\phi_i = \left(\sum_{j=0}^{m} \psi_j\right) / |T| \quad (6.53)$$

Figure 51:
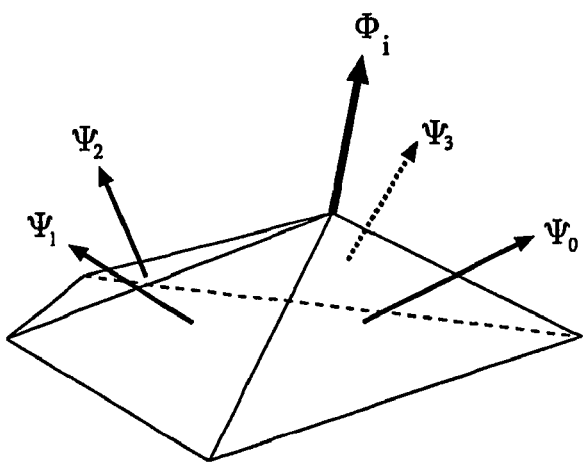
FIG. 51 illustrates a calculation of the surface normal at each vertex.

This is illustrated in FIG. 51 for the vertex V. The curvature at that vertex, $V_i$, is computed using the four triangles of which it is a member, $\{T_a, T_b, T_c, T_d\}$, and their respective surface normals, $\{\psi_a, \psi_b, \psi_c, \psi_d\}$.

Figure 52:
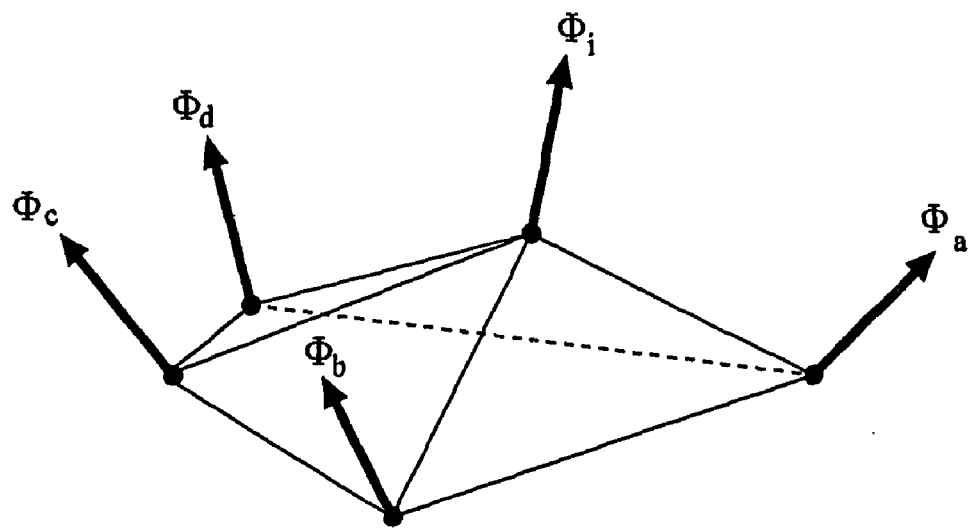
FIG. 52 illustrates surface normals forming the basis of curvature estimation at a vertex.

Curvature estimates for each vertex, C, may be derived from the vertex surface normals, $\Phi$. The goal is to estimate the derivative of the surface normal across points on the surface. Since the tessellated surface model is a piecewise linear approximation to this surface, discrete curvature estimates may be made at each vertex by considering the variation in vertex surface normal and that of adjacent vertices. Such an arrangement is illustrated in FIG. 52, which shows the surface normals at $V_i$ ($\phi_i$) and each of the vertices in $\text{adj}(V_i)$. Note that the surface normals of the adjacent surfaces have been determined using triangles not shown in the figure.

Based on this foundation of triangle and vertex surface normals, several types of curvature estimates may be defined. Each of these is based on the angular difference between the surface normal of a vertex, $V_i$, and that of each of the adjacent vertices, $\text{adj}(V_i)$. The angular difference, $\theta_a$, between surface normals at vertices $V_i$ and $V_a$ can be computed using the arc cosine of the normalized scalar (dot) product of the two surface normal vectors, $\Phi_i$ and $\Phi_a$.

$$\phi_a = \cos^{-1}\left(\frac{\phi_i \cdot \phi_a}{|\phi_i||\phi_a|}\right) \quad (6.54)$$

Figure 53:
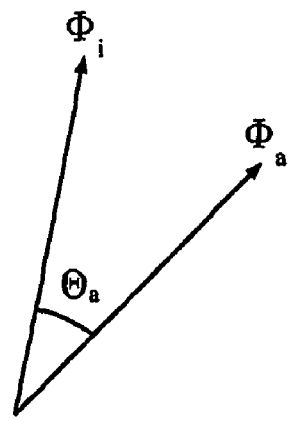
FIG. 53 illustrates an atomic measure of curvature based on the angular difference between vertex surface normals.

Graphically, each of the vertices (and associated surface normals) may be translated so that they are coincident, and the angle between there clearly defined. This is illustrated in FIG. 53.

With this differencing mechanism in place, we may now discuss the varying curvature estimates possible, given our 3D tessellated model. The simplest of these is the determination of the principal curvatures. The principal curvatures, $\kappa_1$ and $\kappa_2$ are defined as the maximum and minimum values, respectively, of the normal curvature evaluated at a vertex. Note that in our discrete vertex space, this may be approximated using the extrema of the curvature values with respect to each of the adjacent vertices. Algorithm 6.4 illustrates the computation of principal curvatures for each vertex in a 3D surface model.

Algorithm 6.4 (Principal Curvature Estimation)

```
for all V_i ∈ V (for each vertex)
    for all V_a ∈ adj (V_i)
        θ_a = cos^−1 (φ_i · φ_a)
    end
    κ_1 (V_i) = max(θ)
    κ_2 (V_i) = min(θ)
end
```

Two additional curvature measures may be defined in terms of the principal curvatures, $\kappa_1$ and $\kappa_2$. Gaussian curvature, K, is the product of the principal curvatures at a vertex.

$$K = \kappa_1 \kappa_2 \tag{6.55}$$

Mean curvature, H, is the mean of the two principal curvatures.

$$H = \frac{(\kappa_1 + \kappa_2)}{2} \tag{6.56}$$

Gaussian and mean curvatures may be computed as a simple extension to Algorithm 6.4. While mean curvature is an excellent metric for continuous surfaces in 3D space, it is much more sensitive to noise in our discrete model. Therefore, a more robust measure of the average normal curvature at each vertex is used. Rather than computing H based on only two atomic curvature values, we may estimate the average normal curvature; C, as the average of angular differences in surface normal between a vertex and all of the adjacent vertices. This method is described in Algorithm 6.5.

Algorithm 6.5 (Average Normal Curvature Estimation)

```
for all V_i ∈ V (for each vertex)
    (compute curvature at vertex as average of angular differences)
    for all V_a ∈ adj(V_i)
        θ_a = cos^−1((φ_i · φ_a)/(|φ_i||φ_a|))
    end
    C_Vi = (Σ_{j=0}^{N} θ_j) / |θ|
end
```

Example 9

Figure 54:
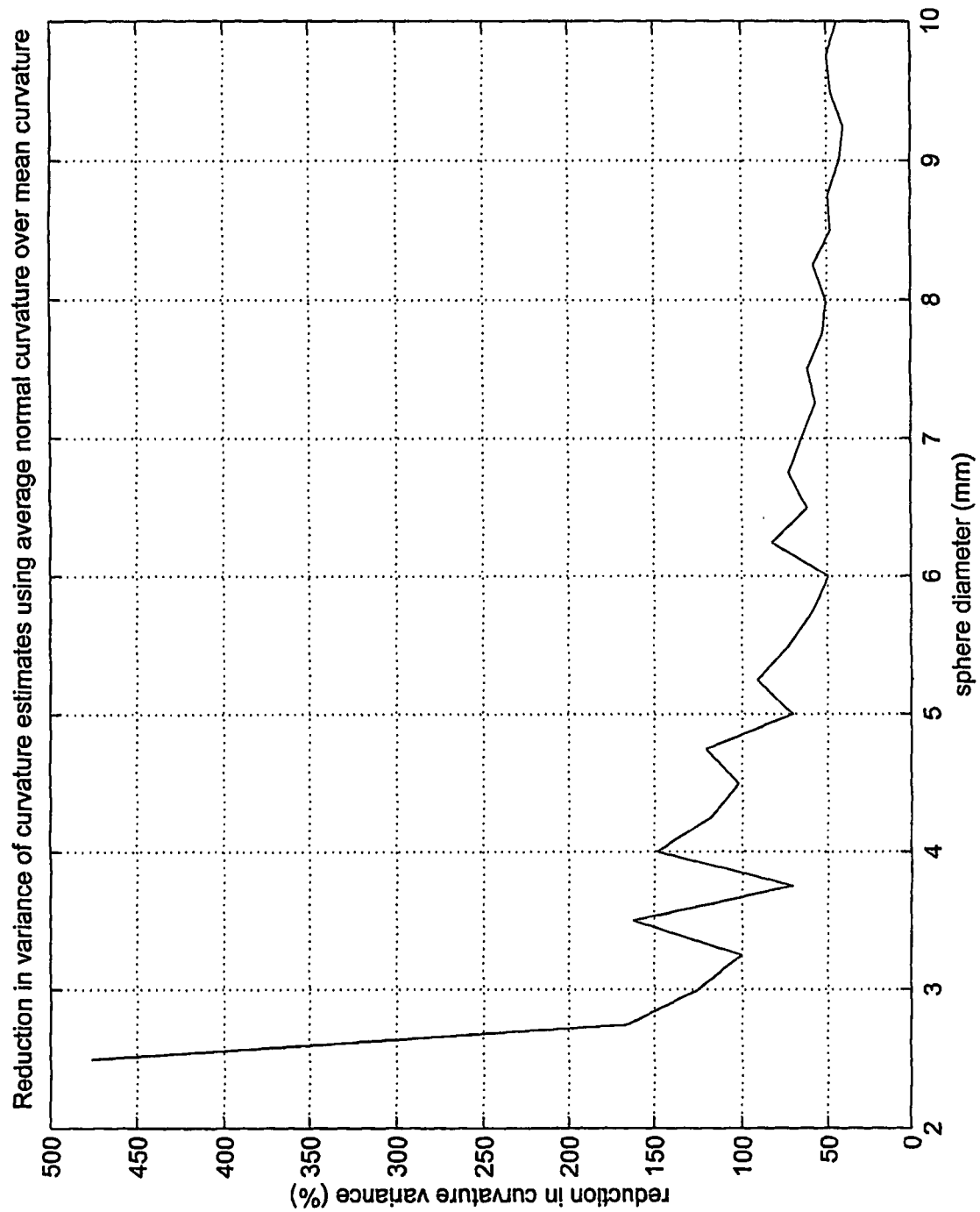
FIG. 54 illustrates a reduction in variance of curvature estimates of synthetic spheres when using average normal curvature over mean curvature.

An experiment was performed to assess the improvement in accuracy of the average normal curvature estimation technique over mean curvature estimation. Synthetic spheres of varying diameter were generated, tessellated using the modified marching cubes method, and filtered using two iterations of Algorithm 4.5. Curvature estimates were computed based on average normal curvature and mean curvature. The reduction in the variance of curvature estimates was used to show the improvement in curvature estimation by average normal curvature over mean curvature, as the true curvature of a sphere should be constant (zero variance). FIG. 54 shows the results of this experiment as the percent reduction in the variance of curvature estimates when using average normal curvature over mean curvature. There is a minimum of 50% percent reduction in variance (increase in reproducibility) when using the average normal curvature estimates. This advantage increases with decreased sphere size, as the tessellation becomes more coarse.

Curvature estimates of each type may be made for each triangle in the surface by averaging the curvature values for each of the constituent vertices.

$$C_{T1} = \frac{(C_{Va} + C_{Vb} + C_{Vc})}{3}; T_1 = \{V_a, V_b, V_c\} \tag{6.57}$$

This provides an elegant method for visualization of the 3D curvature map. Each triangle in the surface may be assigned a color (or gray-level) proportional to the curvature estimate determined for that triangle. The complete curvature estimation technique is described in Algorithm 6.6.

Algorithm 6.6 (Three-Dimensional Surface Curvature Estimation)

```
for V_i = V_o : V_n (for each vertex)
    for (V_a, V_b) ∈ adj(V_i)
        if V_b ∈ adj(V_a)
            ⇒ ∃ T_j = {V_i, V_a, V_b}(V_i is a member of triangle T_j)
    end
    for T_j = T_0 : T_m (for each triangle T_j)
        ψ_j = (ia × ib)/|ia × ib|(calculate triangle surface normal)
    end
    Φ_i = (Σ_{j=0}^{m} ψ_j)/(m = 1)(calculate vertex surface normal)
end
for V_i = V_0 : V_n (for each vertex)
    for V_a ∈ adj(V_i)
        θ_a = cos^−1((φ_i · φ_a)/(|φ_i||φ_a|))|
    C_Vi = (Σ_{j=0}^{Nθa} θ_a)/N_θa(calculate curvature at vertex)
    end
end
for T_i = T_0 : T_n (for each triangle)
    T_i = {V_a, V_b, V_c}
    C_Ti = (C_Va + C_Vb + C_Vb)/3 (calculate curvature on triangle)
end
```

Figure 55:
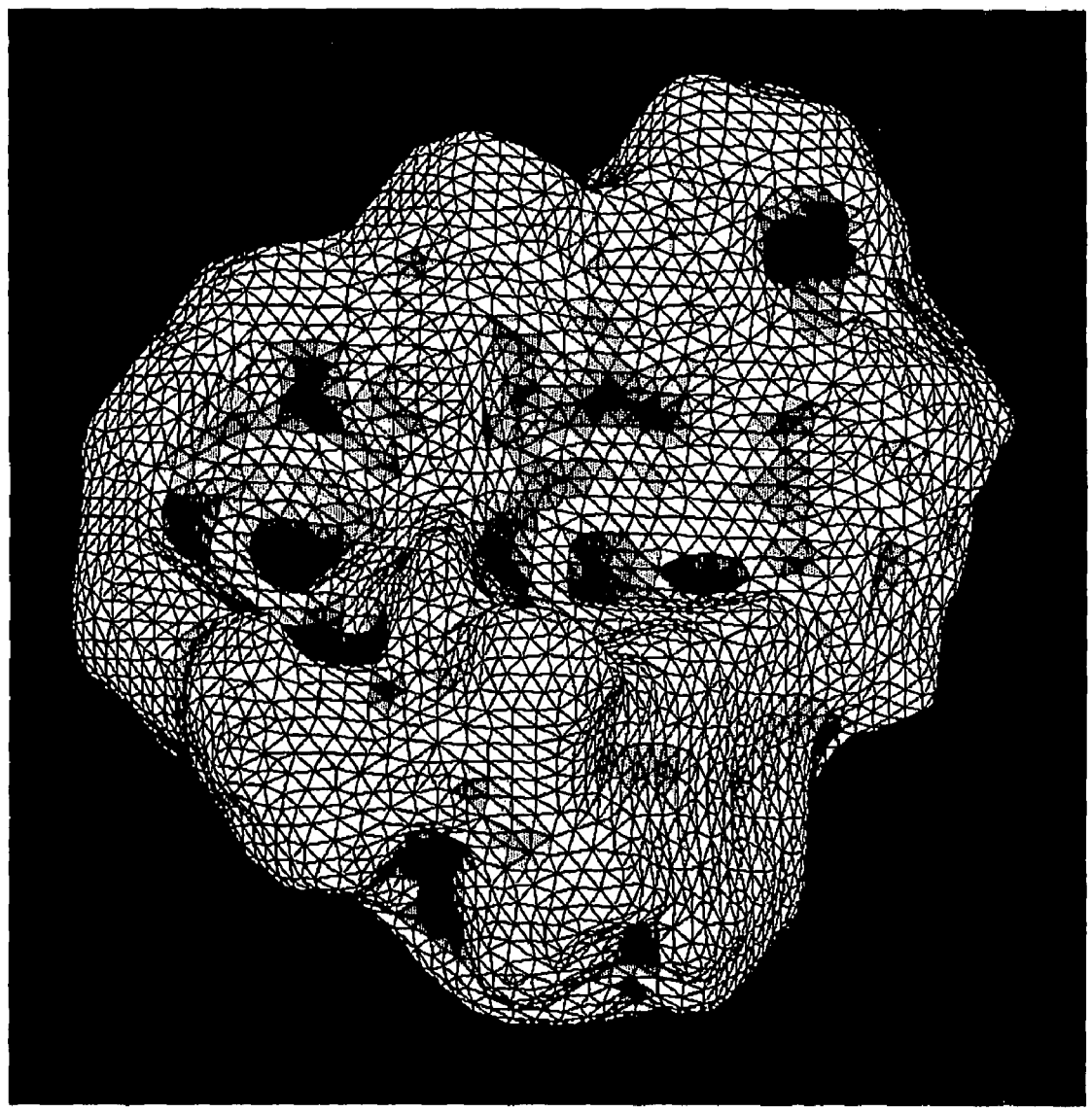
FIG. 55 illustrates a surface curvature analysis of a malignant small pulmonary nodule.

FIG. 55 shows the result of 3D surface curvature estimation on a malignant small pulmonary nodule. The brighter surfaces correspond to regions of higher convexity, whereas the darker surfaces are regions of higher concavity. The intermediate gray-level between white and black is assigned to flat regions.

Histogram Analysis of Curvature Estimates—With methods to estimate the surface curvature of the nodule, we may now explore how such data can be analyzed and made suitable as a nodule metric. In particular, we would like to devise a curvature metric appropriate for the differentiation of benign from malignant nodules.

It has been documented in the literature that malignant nodules are more bumpy (spiculated, lobular) than benign ones [26, 82, 73]. One appropriate goal for a curvature-based metric, therefore, would be to characterize the degree of surface irregularity present in pulmonary nodules. This may be accomplished using the surface curvature estimation method described above, combined with an analysis of the frequency distribution of values measured in each pulmonary nodule.

Curvature Distribution Model—Consider a perfect sphere of radius r. At each point on its surface, the mean curvature has a constant value of 1/r. The curvature of a sphere, then, is constant and inversely proportional to its size.

Figure 56:
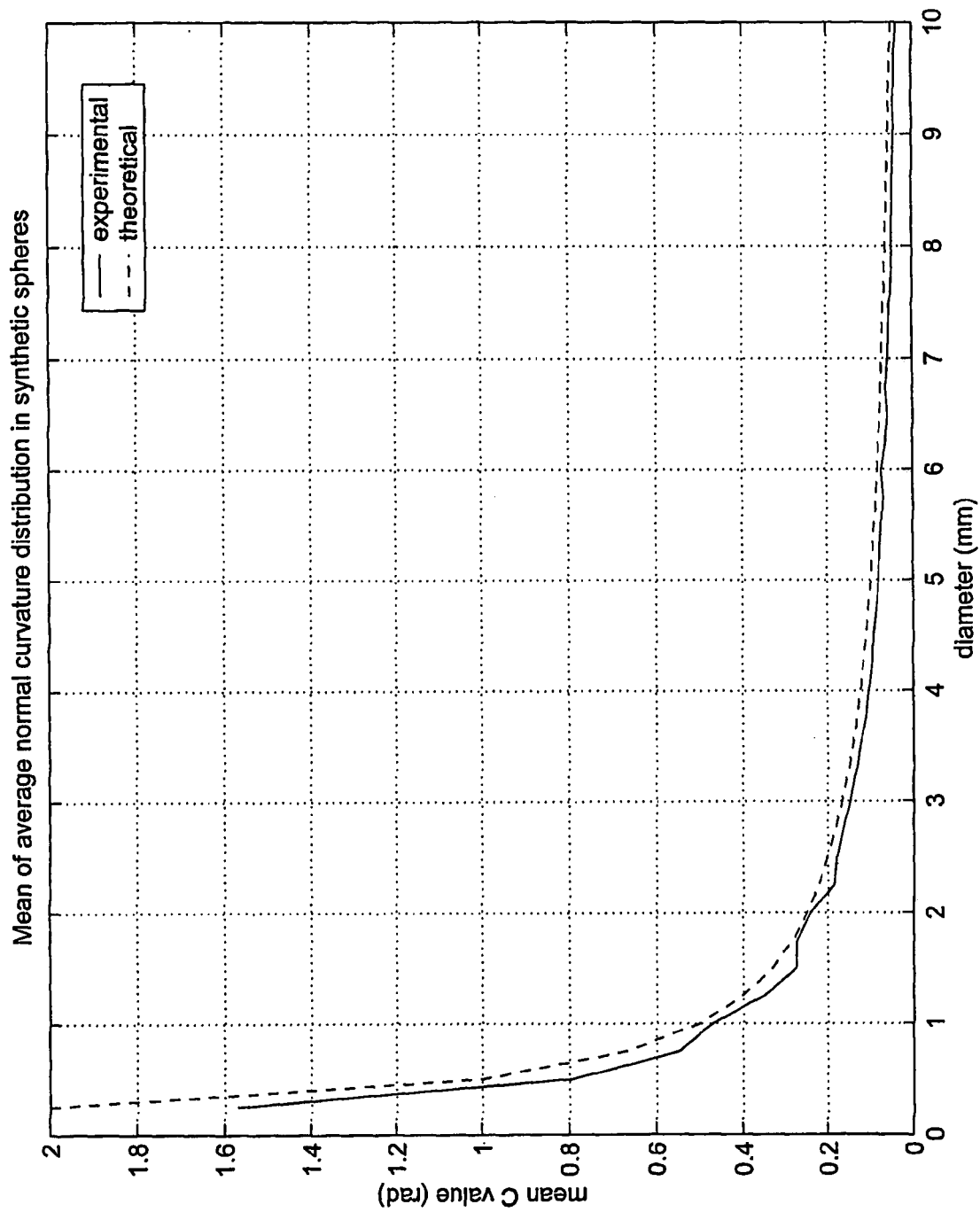
FIG. 56 illustrates a mean of average normal curvature distribution in synthetic spheres.

In our curvature model defined in 3D tessellated space, the average normal curvature estimate of a "perfect sphere" asymptotically approaches a single value as the density of triangles in the tessellation increases For practical spheres in our tessellated model, the average normal curvature will have a range of values whose variance decreases with sphere size. Furthermore, the mean of this distribution will approximate the mean curvature of the sphere, or 1/r, where r is measured in voxels. FIG. 56 shows the mean average normal curvature estimate for synthetically-generated spheres of up to 10 cm in diameter, sampled on a perfectly isotropic 0.25 mm grid, tessellated using Algorithm 4.4, and filtered using two iterations of Algorithm 4.5. The theoretical curvature values by sphere diameter are shown using the dashed line in the same graph. Given the 0.25 mm resolution of the grid, the radius of each sphere in voxels is 4d/2. Consider the 1 mm sphere. Its radius is 2 voxels, and the corresponding curvature estimate is ½=0.5 radians. Similarly, for the 5 mm sphere, the radius is 10 voxels and the curvature estimate is 0.1 radians.

Figure 57:
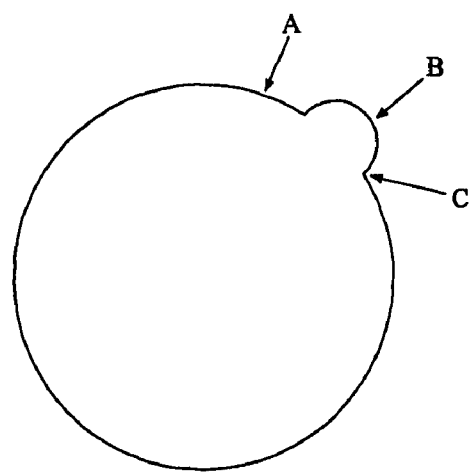
FIG. 57 illustrates a spherical perturbation model for surface curvature analysis.

We may begin with a nodule model that is spherical and determine how perturbations in the nodule surface (such as those arising from spiculations) affect the distribution of the curvature estimates made on the nodule representation. FIG. 57 is a 2D illustration of a nodule with a surface perturbation. In this simple illustration, the surface is perturbed to contain a smaller region of constant curvature (circular/spherical). It can be seen that in this case, the frequency distribution of curvature estimates will have three basic components, a large peak corresponding to the general curvature of the nodule (A), and two additional peaks, one containing the curvature of the protrusion (B), and one corresponding to the local concavity, C, at the interface between convex curvatures A and B.

Consider the following illustrative example. The surface of a spherical nodule model of diameter $d_n$ is perturbed using a local spherical function at a number of points, n. The diameter of each perturbation is $d_P$. Given our model, we would expect three curvature peaks in the frequency distribution of curvature estimates for the surface, one each corresponding to the curvature of the original nodule surface, to the curvature of the perturbations, and to the concavity introduced at the interface between the large sphere and each perturbation. We will consider an example where $d_n=40$, $d_P=8$, and n=26.

Figure 58:
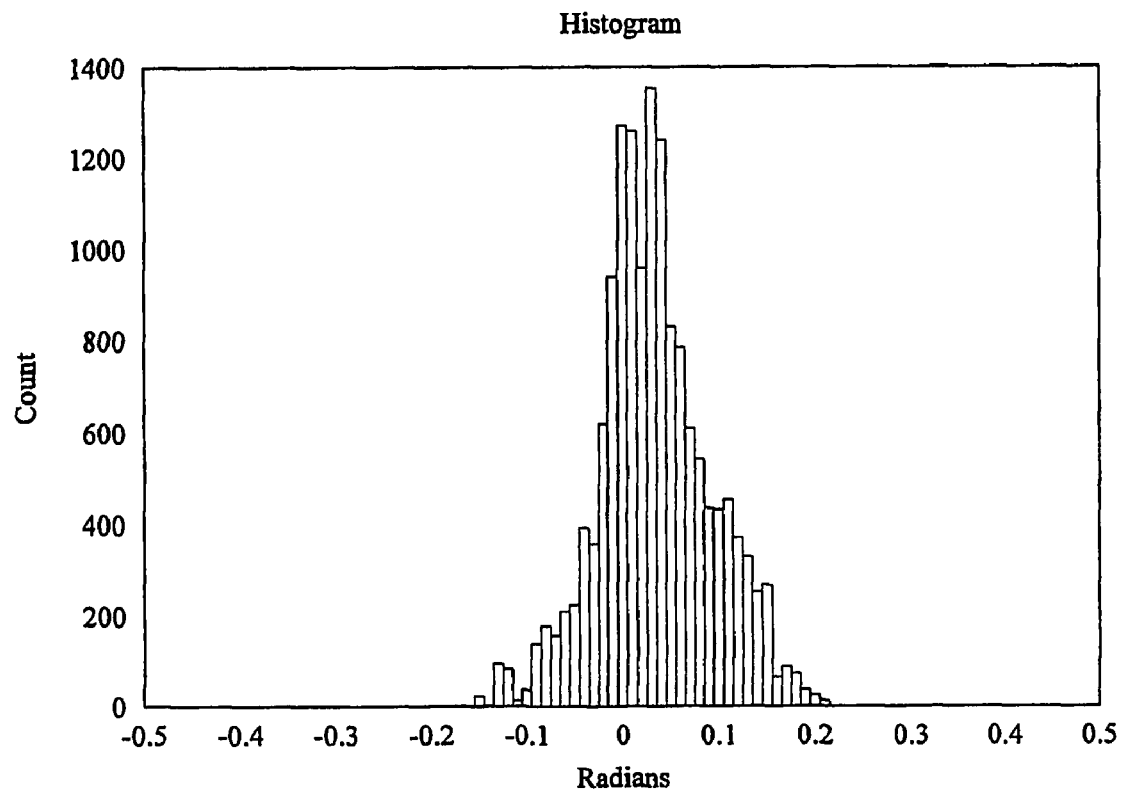
FIG. 58 illustrates a frequency distribution of curvature estimates in a synthetic sphere.
Figure 59:
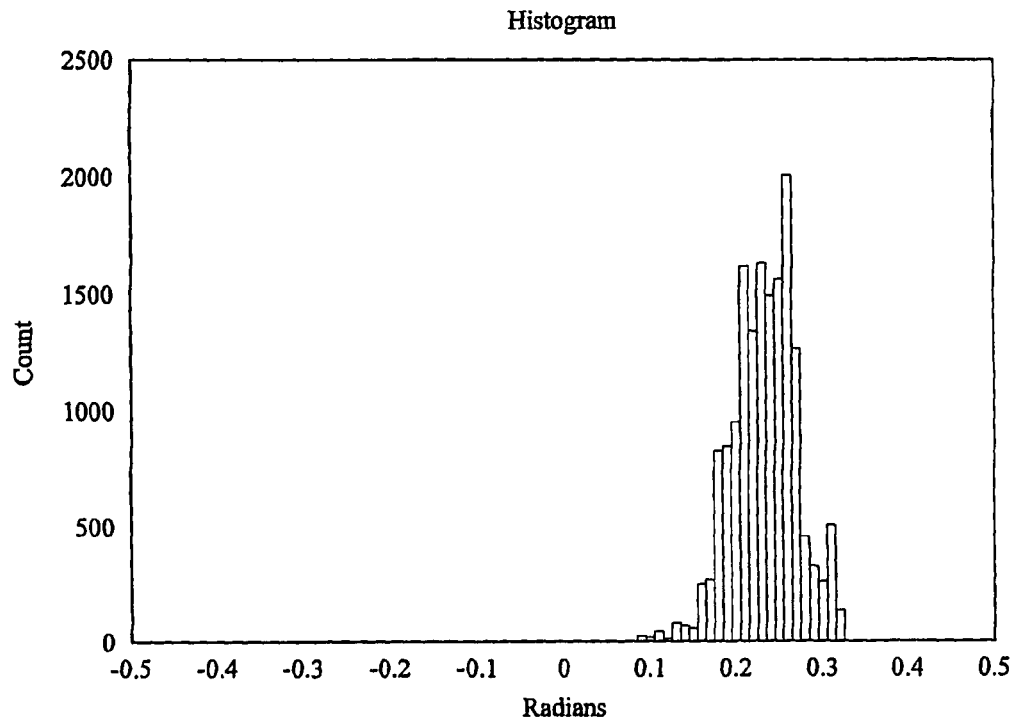
FIG. 59 illustrates a frequency distribution of curvature estimates in surface perturbations.

FIG. 58 shows the frequency distribution (histogram) of average normal curvature estimates in a synthetic sphere which is 40 voxels in diameter. The theoretical curvature of this sphere is therefore.

$$1/r=2/d=0.05 \text{ radians}$$

and the observed frequency distribution (mean=0.046, SD=0.048) agrees, as expected. Next, we may examine the distribution of measured curvature estimates for the spheres ($d_P=8$) with which the surface will be perturbed. This histogram (mean=0.241, SD=0.032) is shown in FIG. 59.

Figure 60:
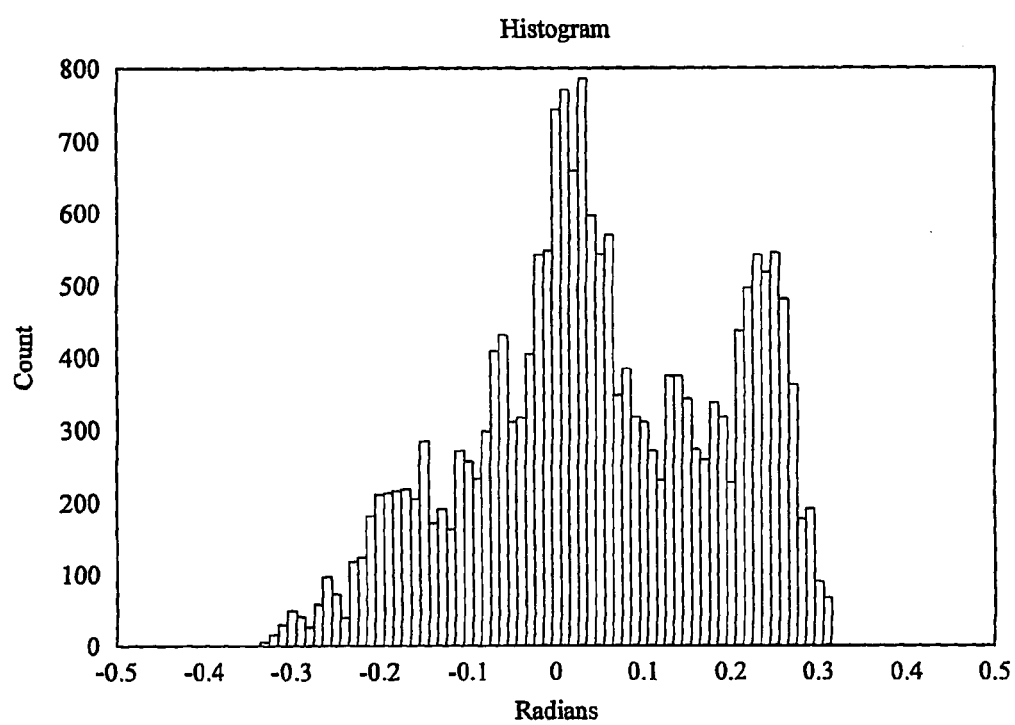
FIG. 60 illustrates a frequency distribution of curvature estimates of a spherically-perturbed synthetic sphere.

The result of performing surface curvature analysis on the entire perturbed sphere model; however, contains more than simply the sum of the two characteristic curvatures of the large (nodule) and small (perturbations) spheres. FIG. 60 shows the frequency distribution of curvature estimates for the entire model. In addition to the peaks corresponding to the nodule surface (0.05 radians) and to the curvature of each perturbation (0.25 radians), there is also a concave component at approximately −0.2 radians. This is, in fact, the manifestation of the expected concavities at the interface between the spherical surface and each smaller spherical perturbation.

Figure 61:
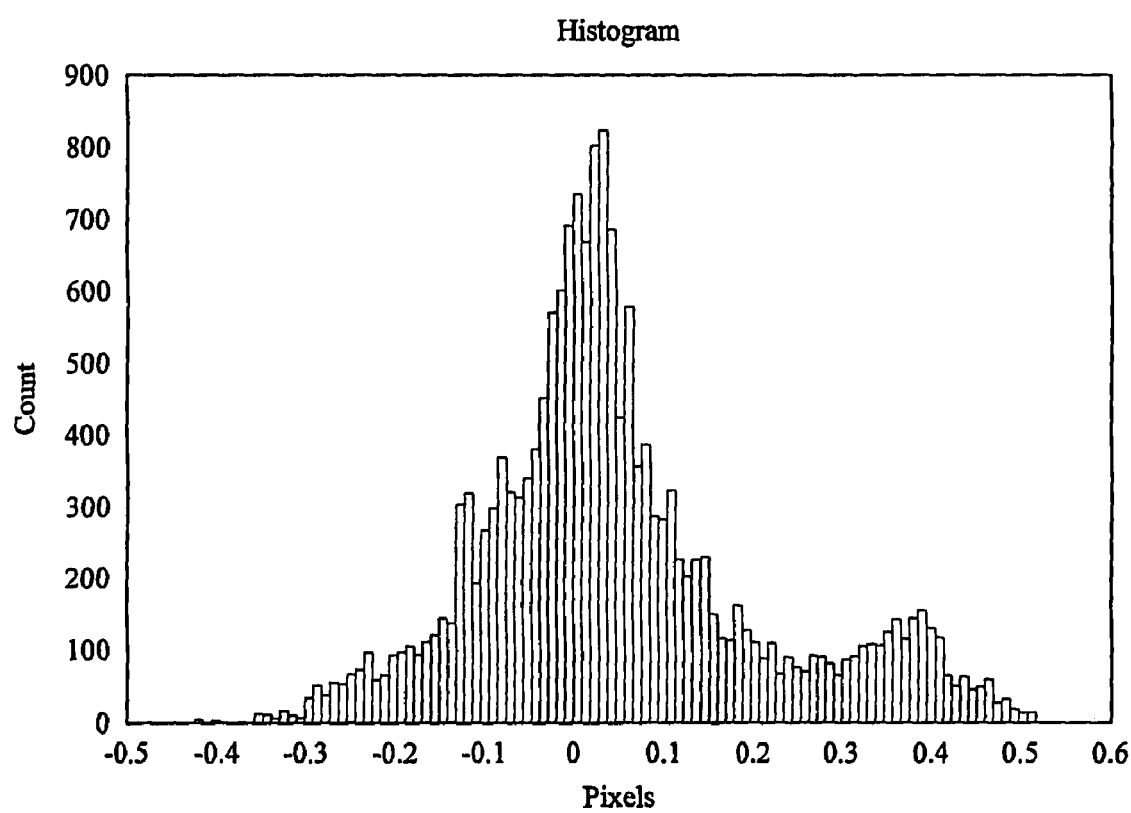
FIG. 61 illustrates a frequency distribution of curvature estimates of a spherically-perturbed synthetic sphere.

The location of the two peaks added to the histogram as a result of surface perturbation increase in absolute magnitude with decreasing perturbation diameter. The convex component increases due to its decreasing radius of curvature, and, correspondingly, the magnitude of the (negative) concave component increases as the angular difference between the surface and perturbation increases at the point of junction. As an example, FIG. 61 illustrates another perturbed sphere model where the diameter of the perturbations is half that used in the example shown in FIG. 60. Note that the curvature peaks for the perturbation surface and the nodule-perturbation interface have each moved away from the origin.

Using such a model, several observations can be made. First, it can be seen that as the number of surface perturbations increases, the number of added curvature peaks increases. Second, the curvature of each of the perturbations is higher than that of the underlying nodule surface. Third, the curvature estimates resulting from the interfaces of each outward perturbation contribute negative (convex) curvature values to the distribution. Each of these observations lead to the conclusion that with increased numbers of surface perturbations and decreasing diameter of each perturbation, the width (and correspondingly, the variance) of the curvature distribution will increase. Thus, a measure of the variance of the frequency distribution of curvature estimates will provide a quantitative means of characterizing the irregularity of the nodule surface. Furthermore, as nodule surface irregularity has been shown to correlate with malignancy, this curvature variance metric may prove useful in the discrimination of benign and malignant nodules.

One more note must be made on the evaluation of the distribution of curvature estimates. When analyzing the 3D curvature of a nodule which has been segmented to remove other structures (e.g. vessels), there may be artifacts, such as artificially convex regions, at these points of segmentation. For this reason, when 3D curvature analysis is performed, the curvature estimates for those regions should be discarded. The procedure may be done as follows: (a) segment the pulmonary nodule, removing extraneous structures; (b) generate the 3D tessellated surface model; (c) compute 3D curvature estimates for each vertex and triangle in the model; (d) mask the surface model of the nodule using the dilation of each of the deleted components; and (e) compute the frequency distribution of the remaining curvature values. This was the method used in the 3D curvature analysis of all of the nodules in this work. The results are described in below.

Sensitivity of Curvature Estimates—Curvature estimates and the analysis of their distribution are sensitive to three general parameters: (i) image resolution; (ii) segmentation method; and (iii) degree of surface smoothing The original CT image resolution and the isotropically-resampled image resolution affect the degree of accuracy with which curvature estimates can be made. Improved (finer) resolution allows curvature estimates to be made more locally, at the cost of increased noise. Parameters of the segmentation method, including any intensity thresholds used, affect the curvature estimates by redefining the boundary of the nodule being studied. Finally, the degree of surface smoothing (in this case, the number of iterations of Algorithm 4.5 affects the curvature estimates by removing high-frequency noise due to spatial quantization. Over-application of this smoothing process, however, may result in the elimination of true curvature characteristics.

Example 10

Figure 62:
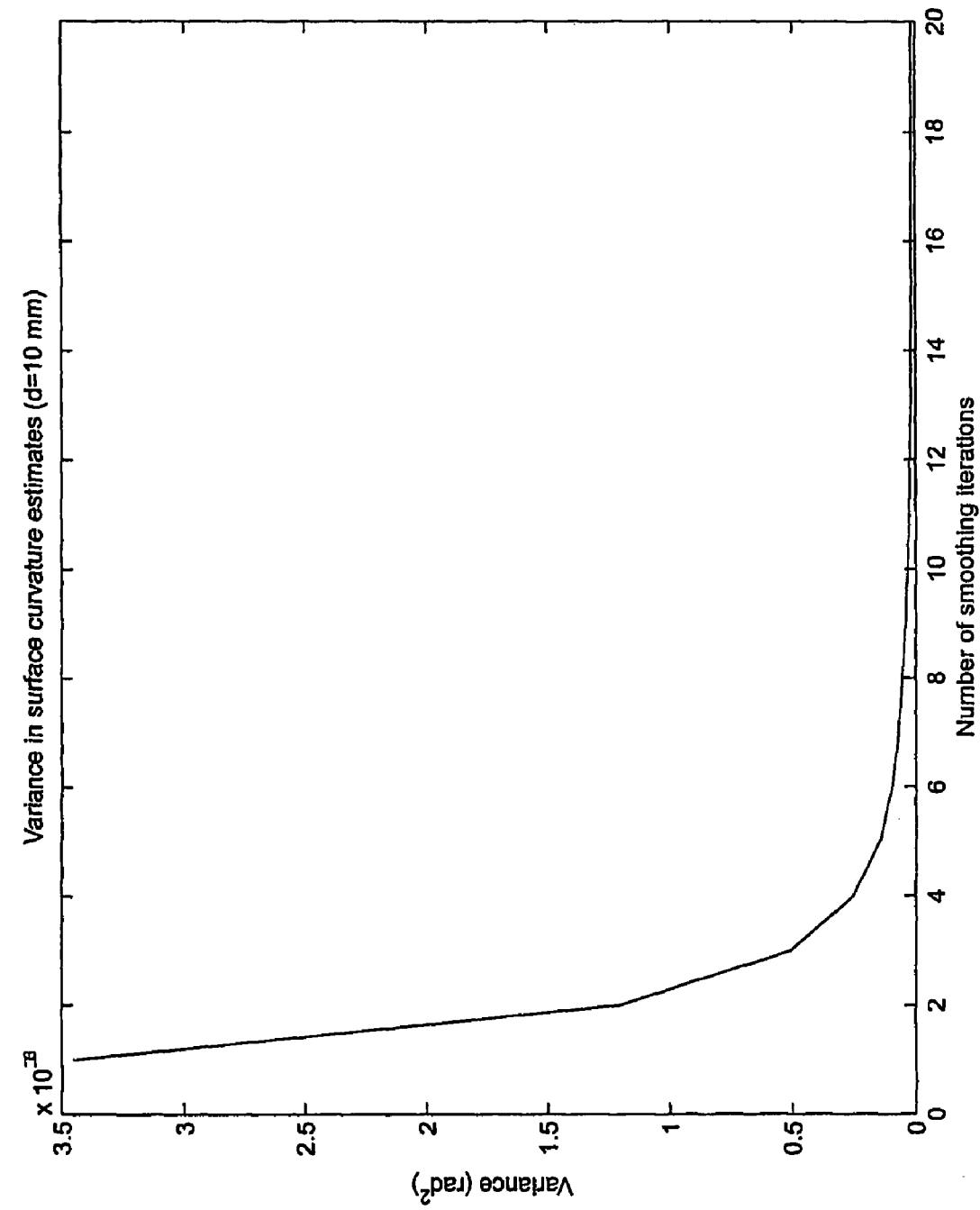
FIG. 62 illustrates a variance of curvature estimates as a function of smoothing.

Experiments were performed to assess the affect of Algorithm 4.5 on the distribution of surface curvature estimates. First, a synthetic sphere of 10 mm in diameter (40 voxels) was tessellated using Algorithm 4.4. A varying number of smoothing iterations were then applied and the variance of the surface curvature distribution calculated. FIG. 62 shows the results of this experiment. It can be seen that in each iteration, the variance of the curvature distribution decreases as each curvature estimate approaches the true mean value for the sphere. This observed reduction in variance is approximately proportional to $1/n_2$, where n is the number of smoothing iterations.

Malignancy Models—Malignancy models are mathematical tools used to predict the likelihood of nodule malignancy based on a variety of parameters. The majority of these parameters may be calculated feature metrics, such as those described in the preceding sections. Malignancy models may also include, however, risk-related patient demographic information, such as age, smoking history, and exposure to other known lung carcinogens. The actual selection of parameters may, therefore, be based on a number of methods, mostly statistical, that maximize the ability of the model to characterize the likelihood of nodule malignancy across a wide range of pulmonary nodules.

Statistical Parameter Selection—Parameters in a model of nodule malignancy are generally selected in two steps. The first step that is employed is to include parameters that would be expected to be different in benign and malignant nodules, based on the underlying biology. The second step is to select parameters through the use of statistical tests that quantify the degree to which each parameter is associated with malignancy.

Student's t-test was used to compare the distributions of values for each shape parameter in malignant and non-malignant nodules. This served two purposes. The first was to determine which parameters, on there own, were significantly different in the two classes of nodules. This information is quite useful in that it can lead to new research into refinement of metrics that appear promising as predictors of malignancy. The second goal was to determine those parameters which might be successfully combined into a model that would be predictive of malignancy. Once promising individual parameters were determined, combinations thereof can be used to generate logistic regression models for the classification of nodules.

The logistic regression model is a type of nonlinear multiple regression which is used to model data with categorical (non-continuous outputs). For example, a standard multiple linear regression model, $y=f(x_1, x_2, \ldots, x_n)$ uses a linear combination of the input parameters, $x_i$, to predict the output y:

$$y = a + b_1 x_1 + b_2 x_2 + \ldots b_n x_n \quad (6.58)$$

The regression method, generally based on linear least-squares methods, uses a known set, of observation vectors, x, and the corresponding vector of outputs, y, to optimize the coefficients of the model, a and $b_1 \ldots b_n$. The range of output values in linear regression model is continuous, as the output, y could be any real number.

In the case where the outputs are categorical, however, logistic regression models may be used. These allow the output to be restricted to a particular range, typically between 0 and 1. For cases where the process being modeled has multiple discrete values, multinomial (or polytomous) logistic regression may be used. However, most frequently, as in the case of nodule malignancy models, the dependent variable is binary-valued, either malignant or non-malignant (benign). Therefore, a binary logistic regression model is appropriate.

Logistic regression is based on the logit transformation, which is the natural log of the odds ratio. The odds ratio of an event is a function of the probability, P of that event:

$$\text{odds} = \frac{P}{1-P} \quad (6.59)$$

The logit transformation, then is $$\text{logit}(P) = \ln(\text{odds}) = \left(\frac{P}{1-P}\right) \quad (6.60)$$

Logistic regression models are based on the assumption that the dependent variable (e.g. malignant or benign) is linearly dependent not on the observed parameters, $x_i$, but on the logarithm of the odds ratio. Therefore, $$\ln(\text{odds}) = \ln\left(\frac{P}{1-P}\right) = a + b_1 x_1 + b_2 x_2 + \ldots b_n x_n \quad (6.61)$$

It can be seen, then, that the probability of the event in terms of the observed parameters is $$P = \frac{\exp(a + b_1 x_1 + b_2 x_2 + \ldots b_n x_n)}{1 + \exp(a + b_1 x_1 + b_2 x_2 + \ldots b_n x_n)} \quad (6.62)$$

which is equivalent to $$P = \frac{1}{1 + \exp(-(a + b_1 x_1 + b_2 x_2 + \ldots b_n x_n))} \quad (6.63)$$

Thus, if our logistic model is $$y = \frac{1}{1 + \exp(-(a + b_1 x_1 + b_2 x_2 + \ldots b_n x_n))} \quad (6.64)$$

the range of outcomes is between 0 and 1 for any values of the observed parameters, and furthermore, the output of the model varies sigmoidally between the two extremes.

The logistic regression model was used in this work to develop malignancy models based on two- and three-dimensional shape and density features. Selection of the individual parameters and performance of the models will be discussed in Section below.

Example 11

In order to quantify the ability of each of the shape metrics studied in characterizing the differences between benign and malignant small pulmonary nodules, a series of tests were performed using a group of in vivo pulmonary nodules, scanned using high-resolution CT. The metrics were first compared individually, to assess differences in the distributions of each parameter in the two nodule classes. Next, logistic regression models were developed based on 2D and 3D metrics, as well as metrics derived from 3D surface curvature analysis.

Individual 2D and 3D Metrics—As a first step in assessing the suitability of each shape metric for the prediction of malignancy, Student's t-test was applied to test the difference in means of the distribution of each parameter for benign and malignant nodules. Table 6.2 shows the significance of the difference in means between values of size-variant 3D shape metrics for 22 benign and malignant pulmonary nodules In addition, the means and standard deviations of the distribution of each metric for benign and malignant nodules is given. As size has been well-documented as associated with malignancy, it is not surprising that each one of these metrics significant ($p<0.05$), and that most are quite significant ($p<0.01$).

TABLE 6.2

Analysis of distribution of size-variant 3D metrics for benign and malignant nodules

| Parameter | P Value | Benign | | Malignant | |
| --- | --- | --- | --- | --- | --- |
| | | Mean | SD | Mean | SD |
| height | 0.0015 | 3.53413 | 0.81352 | 6.02052 | 2.39888 |
| surface area | 0.0031 | 96.309 | 62.419 | 339.126 | 271.547 |
| x-extent | 0.0037 | 5.7000 | 1.88557 | 10.6429 | 5.26952 |
| z-extent | 0.0038 | 5.05000 | 1.39578 | 8.64286 | 3.81842 |
| width | 0.0054 | 5.16328 | 1.63050 | 8.21210 | 3.00452 |
| length | 0.0081 | 6.6068 | 2.47830 | 10.7895 | 4.22890 |
| volume | 0.0087 | 75.546 | 66.686 | 383.776 | 410.535 |
| mass | 0.0096 | 11931.1 | 12136.2 | 57878.3 | 61302.5 |
| y-extent | 0.0178 | 6.21667 | 2.43645 | 9.78571 | 4.06568 |

TABLE 6.3

Analysis of distribution of size-variant 2D metrics for benign and malignant nodules

| Parameter | P Value | Benign | | Malignant | |
| --- | --- | --- | --- | --- | --- |
| | | Mean | SD | Mean | SD |
| length | 0.0010 | 5.73953 | 1.94499 | 9.96925 | 3.20678 |
| x-extent | 0.0071 | 5.46667 | 1.83193 | 9.71429 | 4.90626 |
| y-extent | 0.0194 | 5.43333 | 2.02543 | 8.42857 | 3.53764 |
| mass | 0.0240 | 1086.72 | 627.56 | 2357.92 | 1842.10 |
| width | 0.0247 | 4.57575 | 1.18593 | 6.70308 | 2.98820 |
| area | 0.0444 | 36.1917 | 37.4608 | 81.4286 | 61.6513 |
| perimeter | 0.2400 | 33.7924 | 43.8789 | 66.6005 | 84.7562 |

For comparison, Table 6.3 shows the results for the same 22 nodules using 2D size-variant features computed on the image of maximum cross-sectional area for each nodule. Note that the distributions of each of the nine 3D metrics exhibit more significant differences between benign and malignant nodules than all but two of the five 2D metrics.

As the focus of this work is on small pulmonary nodules, such as those that may be detected in a lung cancer screening program, we may not always expect size to be a useful parameter. This is due to the fact that nodules may be detected at any point in their growth progression. Therefore, malignancies may frequently be caught while they are still small (especially as incidence cases, see Section 5). Furthermore, in those cases that are of larger size (i.e. diameter >3 cm), malignancy is less often in doubt, and biopsy is more straightforward. For these reasons, this study is primarily restricted to nodules with diameters smaller than 1 cm. With that in mind, size-invariant metrics should offer a better hope of differentiating small benign and malignant nodules that are all of a similar size. Table 6.4 shows the results of t-test analysis of size-invariant 3D shape metrics applied to 22 small pulmonary nodules. The metrics are listed in ascending order of p value (descending order with respect to significance).

Results for a comparative group of size-invariant 2D metrics are shown in Table 6.5. When possible, the analogous 2D metrics to those studied in 3D were included (e.g. compactness). Here, the difference between 3D and 2D shape metrics is less clear. As with the 3D size-invariant metrics, there are relatively few that exhibit high significance when used as the sole parameter in differentiating benign from malignant nodules. Therefore, we may turn to another, more appropriate measure of the relative benefit of 2D versus 3D nodule shape metrics. Groups of each may be included in a logistic regression model and the relative qualities of the models compared.

Logistic Regression Models—To test the ability of multiple feature metrics to characterize differences between benign and malignant nodules, logistic regression models were developed based on metrics whose individual t-tests showed promising differences in distribution between the two nodule classes. In addition, the models were restricted to contain parameters that captured uncorrelated information. Models were developed using 2D and 3D metrics to compare the ability of each of these groups in the characterization of nodule malignancy. Each was based on three features.

The 2D model included LWR, an aspect ratio based on the ellipse of inertia of the nodule cross-section; APR, an alternate measure of 2D nodule compactness; and voxel skewness, a measure of the normality of the distribution of density within the nodule.

TABLE 6.4

Analysis of distribution of size-invariant 3D metrics for benign and malignant nodules

| Parameter | P Value | Benign Mean | Benign SD | Malignant Mean | Malignant SD |
|---|---|---|---|---|---|
| normalized volume/surface ratio | 0.0053 | 0.42401 | 0.01615 | 0.38916 | 0.03701 |
| 3D compactness | 0.0064 | 0.81399 | 0.09248 | 0.64124 | 0.17669 |
| volume/surface ratio | 0.0124 | 0.69891 | 0.14654 | 0.96051 | 0.30697 |
| sphericity | 0.1861 | 0.47675 | 0.16617 | 0.37546 | 0.15039 |
| $\phi d$ | 0.1888 | 6.0125 | 14.043 | 50.9941 | 130.101 |
| XYR | 0.1984 | 0.96358 | 0.12552 | 1.08233 | 0.29998 |
| $\hat{\phi}d$ | 0.2234 | 4.0257 | 11.4424 | 25.9638 | 67.4143 |
| yaw | 0.2887 | −70.419 | 41.1223 | −49.083 | 46.3801 |
| variance | 0.3676 | 445.517 | 248.491 | 603.033 | 566.038 |
| roll | 0.3846 | −3.1443 | 75.422 | −38.859 | 111.360 |
| $\xi$ | 0.5462 | 0.03285 | 0.02325 | 0.04076 | 0.03711 |
| WHR | 0.6037 | 1.48294 | 0.45815 | 1.38355 | 0.27398 |
| pitch | 0.6100 | 24.6851 | 18.9031 | 31.1248 | 40.2918 |
| $\hat{\xi}$ | 0.6121 | 0.00906 | 0.00816 | 0.00716 | 0.00782 |
| LWR | 0.6519 | 1.27539 | 0.18937 | 1.31137 | 0.12034 |
| YZR | 0.7101 | 1.20822 | 0.27464 | 1.14632 | 0.50272 |
| standard deviation | 0.7378 | 20.2685 | 6.0980 | 21.6028 | 12.6127 |
| mean | 0.7424 | 144.513 | 40.7856 | 137.408 | 57.8951 |
| LHR | 0.7463 | 1.86727 | 0.52547 | 1.79719 | 0.28645 |
| skewness | 0.7777 | 0.07568 | 0.32579 | 0.11836 | 0.32586 |
| kurtosis | 0.9956 | 2.20742 | 0.36081 | 2.20840 | 0.44150 |

TABLE 6.5

Analysis of distribution of size-invariant 2D metrics for benign and malignant nodules

| Parameter | P Value | Benign Mean | Benign SD | Malignant Mean | Malignant SD |
|---|---|---|---|---|---|
| LWR | 0.0046 | 1.24344 | 0.17693 | 1.58450 | 0.32985 |
| circularity | 0.0313 | 0.64667 | 0.26691 | 0.37888 | 0.21562 |
| skewness | 0.0852 | −0.626 | 0.52973 | −0.1523 | 0.65853 |
| 2D compactness | 0.0875 | 0.79975 | 0.30742 | 0.55109 | 0.28999 |
| apr | 0.0953 | 1.18576 | 0.31016 | 1.56414 | 0.72021 |
| napr | 0.1722 | 0.24347 | 0.06839 | 0.19826 | 0.07285 |
| $\xi$ | 0.1994 | 0.04062 | 0.02536 | 0.06981 | 0.07872 |
| XYR | 0.2695 | 1.04246 | 0.222191 | 1.9934 | 0.43396 |
| $\phi_d$ | 0.4483 | 4.23139 | 11.3991 | 0.84959 | 0.9959 |
| $\hat{\phi}d$ | 0.4678 | 43.7186 | 146.571 | 2.1665 | 2.1970 |
| yaw | 0.4889 | −42.213 | 45.7468 | −24.268 | 73.6191 |
| mean | 0.6055 | 152.847 | 43.1481 | 141.136 | 59.8249 |
| variance | 0.7178 | 481.253 | 305.517 | 544.265 | 502.266 |
| kurtosis | 0.7660 | 0.33915 | 25.7179 | 3.31157 | 0.8487 |
| standard deviation | 0.9083 | 20.9205 | 6.8338 | 20.4526 | 12.1223 |
| $\hat{\xi}$ | 0.9466 | 0.00166 | 0.00134 | 0.00160 | 0.00298 |

The 3D model included 3D compactness, a gross measure of surface irregularity; normalized density skew ($\hat{\phi}_d$), a measure of the irregularity of the density distribution within the nodule volume; and the variance of the average normal surface curvature metric, a fine measure of surface irregularity.

The pertinent shape metrics were computed for each of 22 small pulmonary nodules (7 malignant, 15 non-malignant). Statistical analysis was performed to assess the ability of each model to differentiate malignant from non-malignant nodules. The results of this experiment are summarized in Table 6.6.

TABLE 6.6

Performance of 2D and 3D metric-based models in characterizing malignant and non-malignant small pulmonary nodules

| Nodule Status | 2D Metrics Malignant | 2D Metrics Benign | 3D Metrics Malignant | 3D Metrics Benign |
|---|---|---|---|---|
| Malignant (7) | 6 | 1 FN | 7 | 0 |
| Non-Malignant (15) | 1 FP | 14 | 1 FP | 14 |
| $R^2$ | 0.690 | | 0.778 | |
| P | <0.0003 | | <0.0001 | |

The model based on 2D metrics was able to characterize much of the difference between benign and malignant nodules. The $R_2$ value (used to assess the proportion of the data explained by the model) was 0.6900, and the p value (probability that the effect would be produced by chance) was 0.0003. The model was able to classify all but one malignancy (1 false negative (FN)), and one benign nodule (1 false positive (FP)) correctly. Therefore, the sensitivity was 86% and the specificity was 93%. The positive predictive value was 86%.

The model based on 3D metrics fit the experimental data even more closely. The value of $R_2$ was 0.7776, with p<0.0001. In addition, the model was able to classify each of the cases correctly, with the exception of one benign nodule (1 FP). The sensitivity was 100%, the specificity was 93%, and the positive predictive value was 88%. This is an especially good result considering that the penalty in producing a false-positive result (unnecessary biopsy) is much less severe than a false-negative one (missed cancer).

Figure 63:
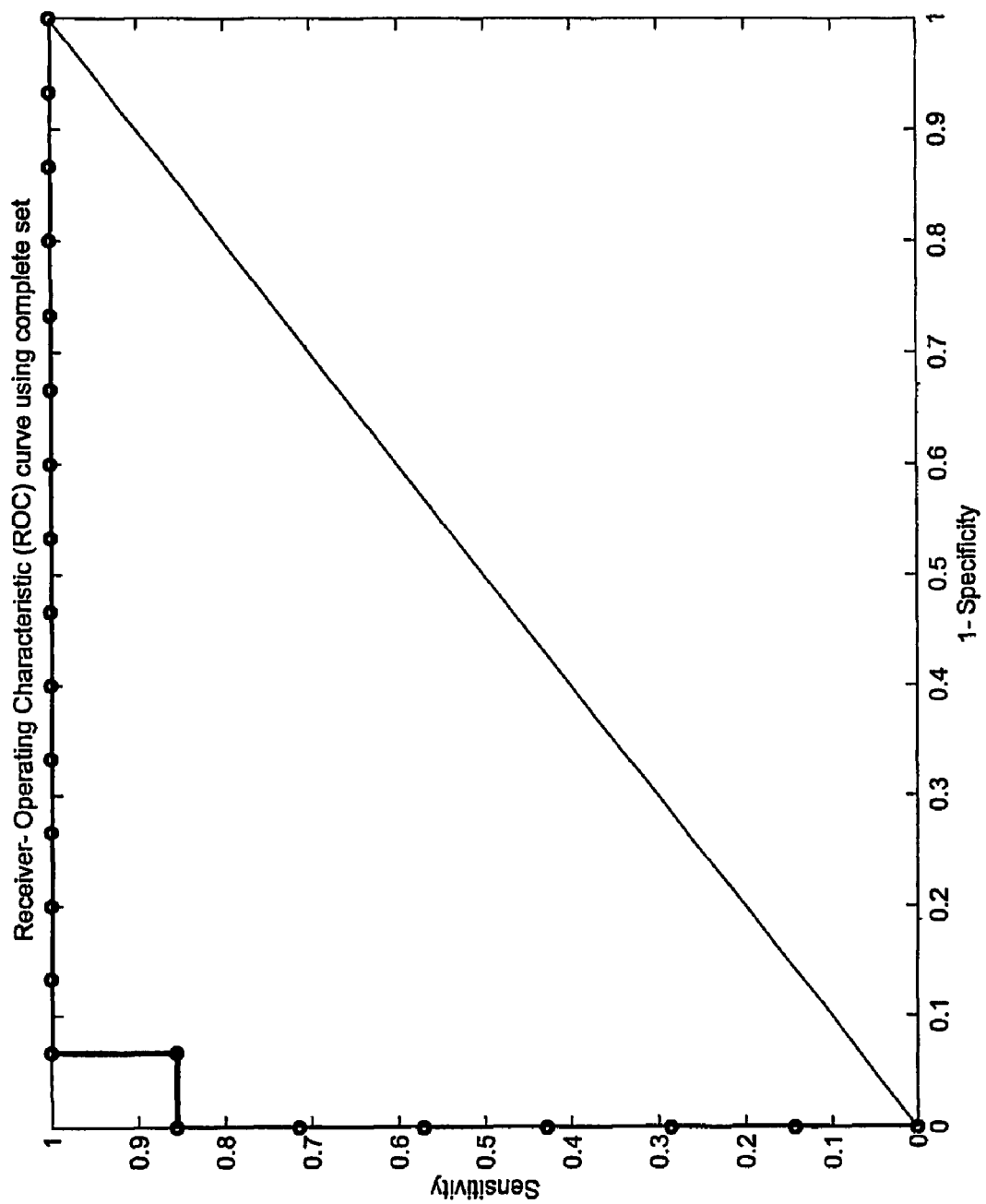
FIG. 63 illustrates a Receiver-Operating Characteristic (ROC) curve for the complete set.
Figure 64:
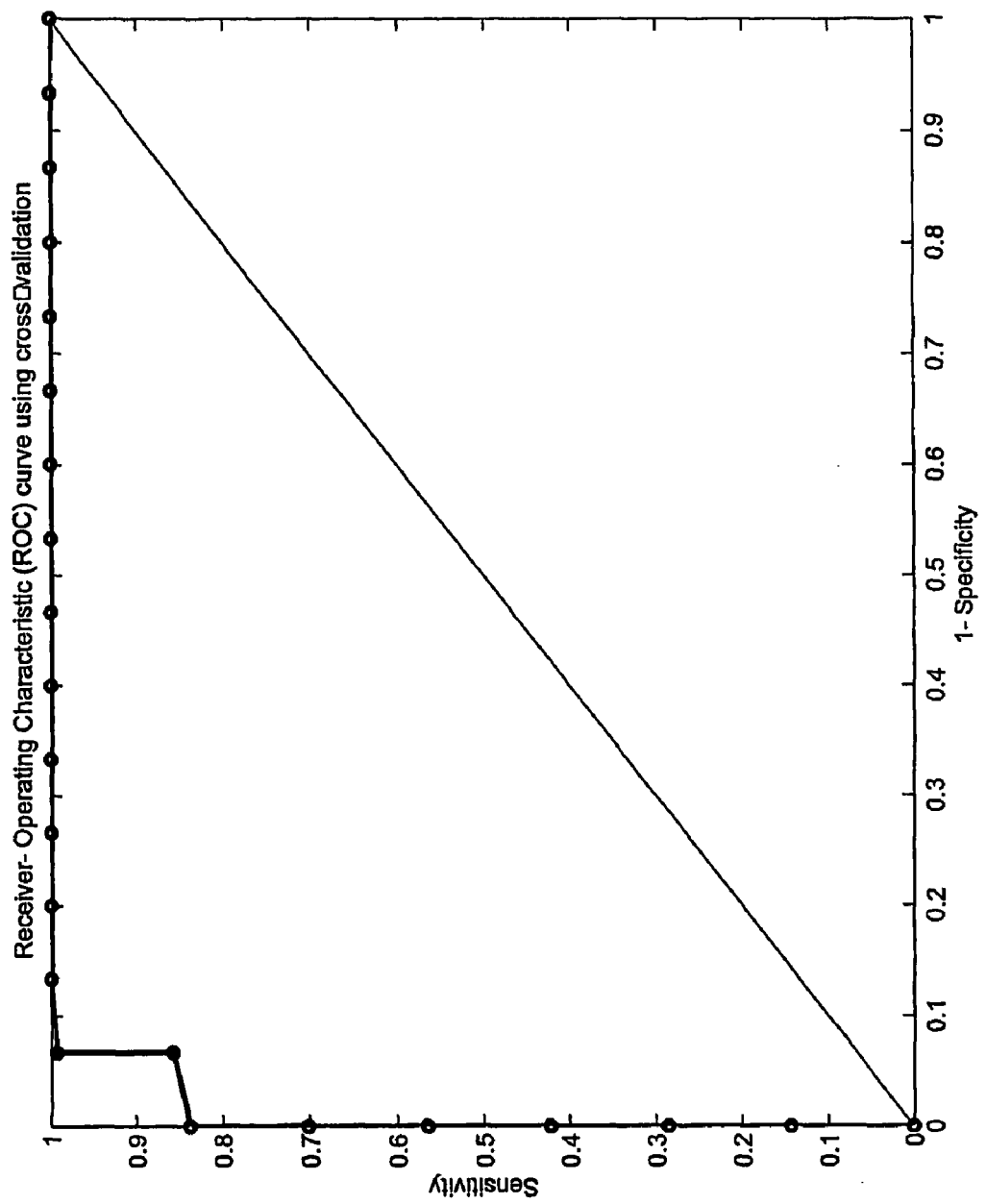
FIG. 64 illustrates a Receiver-Operating Characteristic (ROC) curve using cross-validation.

An n-way (leave-one-out) cross-validation approach was also used to evaluate the performance of the model based on 3D metrics, as it may produce a somewhat less-biased evaluation of the model. In this experiment, the model was able to correctly classify 86% of the nodules correctly, producing 2 FP and 1 FN. The sensitivity was 86%, the specificity was 87%, and the positive predictive value was 75%. To provide a more general evaluation, Receiver-Operating Characteristic (ROC) curves were generated based on the ability of the model to characterize the entire dataset, as well as each of the individual models developed in the cross-validation scheme [27, 2]. The area under the ROC curve, $A_z$, for the overall model was 0.9905. The ROC curve for the complete dataset is shown in FIG. 63. The mean area under the ROC curves using the cross-validation scheme was 0.9870, with 95% confidence intervals between 0.9822 and 0.9918, while the area under the aggregate curve was 0.9203. This aggregate ROC curve is shown in FIG. 64. Overall, the model showed considerable ability to characterize the cases in the study.

Example 12

Analysis of 3D Surface Curvature—To evaluate the usefulness of the 3D surface curvature analysis itself, an experiment was performed using the set of 22 in-vivo pulmonary nodules used to evaluate the 2D and 3D feature metrics. The measure of the three-dimensional surface curvature was computed using the techniques described above, including the analysis of surface curvature distribution. Each of the nodules studied had complete 3D information derived from high-resolution (1 mm slice thickness) helical CT. Curvature values computed from portions of the surface in contact with other structures (e.g. vessels) were removed from consideration. Frequency distribution of this measure as well as the mean, variance, coefficient of variation, and skewness were determined, as described hereinabove. The distribution of each of these metrics in the 22 in-vivo pulmonary nodules were examined. The results are summarized in Table 6.7.

TABLE 6.7

Analysis of distribution of 3D curvature-based metrics for benign and malignant nodules

| Parameter | P Value | Benign Mean | Benign JSD | Malignant Mean | Malignant SD |
|---|---|---|---|---|---|
| variance | <0.0001 | 0.01084 | 0.00395 | 0.02274 | 0.00499 |
| standard deviation | <0.0001 | 0.10234 | 0.01983 | 0.15001 | 0.01653 |
| mean | 0.0003 | 0.10349 | 0.02682 | 0.05095 | 0.02419 |
| range | 0.0006 | 0.85084 | 0.26098 | 1.94865 | 0.99224 |
| skewness | 0.0059 | 0.35311 | 0.55021 | −0.5373 | 0.78756 |
| kurtosis | 0.0492 | 4.40753 | 2.40237 | 6.99628 | 3.29447 |
| maximum | 0.0999 | 0.58676 | 0.19492 | 0.85648 | 0.54787 |

The mean curvature estimate in malignant nodules was 0.0509±0.010 (mean±sem) vs. 0.1035±0.007 in benign nodules (p<0.0003). The variance of curvature in malignant lesions was 0.0227±0.002 vs. 0.0108±0.001 in benign ones (p 0.0001). The skewness of the curvature distribution was −0.537±0.298 vs. 0.353±0.142 in malignant and benign nodules, respectively (p<0.01). Finally, as a mean-normalized measure of curvature distribution, the coefficient of variation (CV) of curvature estimates for malignant nodules was 3.823±0.919 vs. 1.095±0.132 in benign nodules (p=0.0004). Thus, each metric of the measure of 3D curvature was useful in differentiating between small malignant and benign nodules.

Region Analysis Without Segmentation—Image segmentation is one of the most challenging steps in the analysis of small pulmonary nodules. It may be difficult to remove connected structures (e.g. vessels) without removing information about the surface of the nodule itself. In addition, when studying the change in the nodule over time (as in volumetric doubling time estimation), it is of great importance that the segmentations of each image are consistent.

It may be possible to study the change in nodule size and shape over time, without performing explicit segmentation, however. This chapter describes techniques for comparing three-dimensional nodule regions of interest (ROIs) as two density distributions, without segmentation.

Three-Dimensional Region Registration—Prior to comparison of two three-dimensional ROIs, they must be well-defined so that each corresponds to the same lung region in each study. This is a problem of three-dimensional region registration. Two techniques for region registration will be discussed: 1) center of mass (COM) alignment and 2) correlation-based region matching.

Center of Mass Alignment—The two 3D ROIs may be aligned using a simple procedure based on the computation of the center of mass. Beginning from an initial starting point in the 3D image, an iterative search method is used to find the location of the COM in each of a number of translated ROIs. In each iteration, the current location of the COM, $C_c$ is compared with the actual COM measured for the current ROI, $C_m$. The next location of the COM is then replaced with $C_m$ and the ROI recomputed. The stopping condition is when the location of the COM does not move by more than some small distance $\epsilon$ between iterations. Algorithm 7.1 describes the center of mass determination technique, where $D(V_a, V_b)$ is the Euclidean distance function between voxels $V_a$ and $V_b$.

---

Algorithm 7.1 (Iterative Center of Mass Determination)

Select an initial location for the COM: $C_i = v(x_i, y_i, z_i)$
Select the desired size of the ROI: S = x, y, z
$\Delta C = \infty$
$C_c = C_i$
while ($\Delta C > \epsilon$ )
    Compute new ROI bounds based on $C_c$ and S
    $C_m(x) = m_{100}/m_{000}$
    $C_m(y) = m_{010}/m_{000}$
    $C_m(z) = m_{001}/m_{000}$
    $\Delta C = D(C_{m1}, C_c)$
    $C_c = C_m$
end

---

Figure 65:
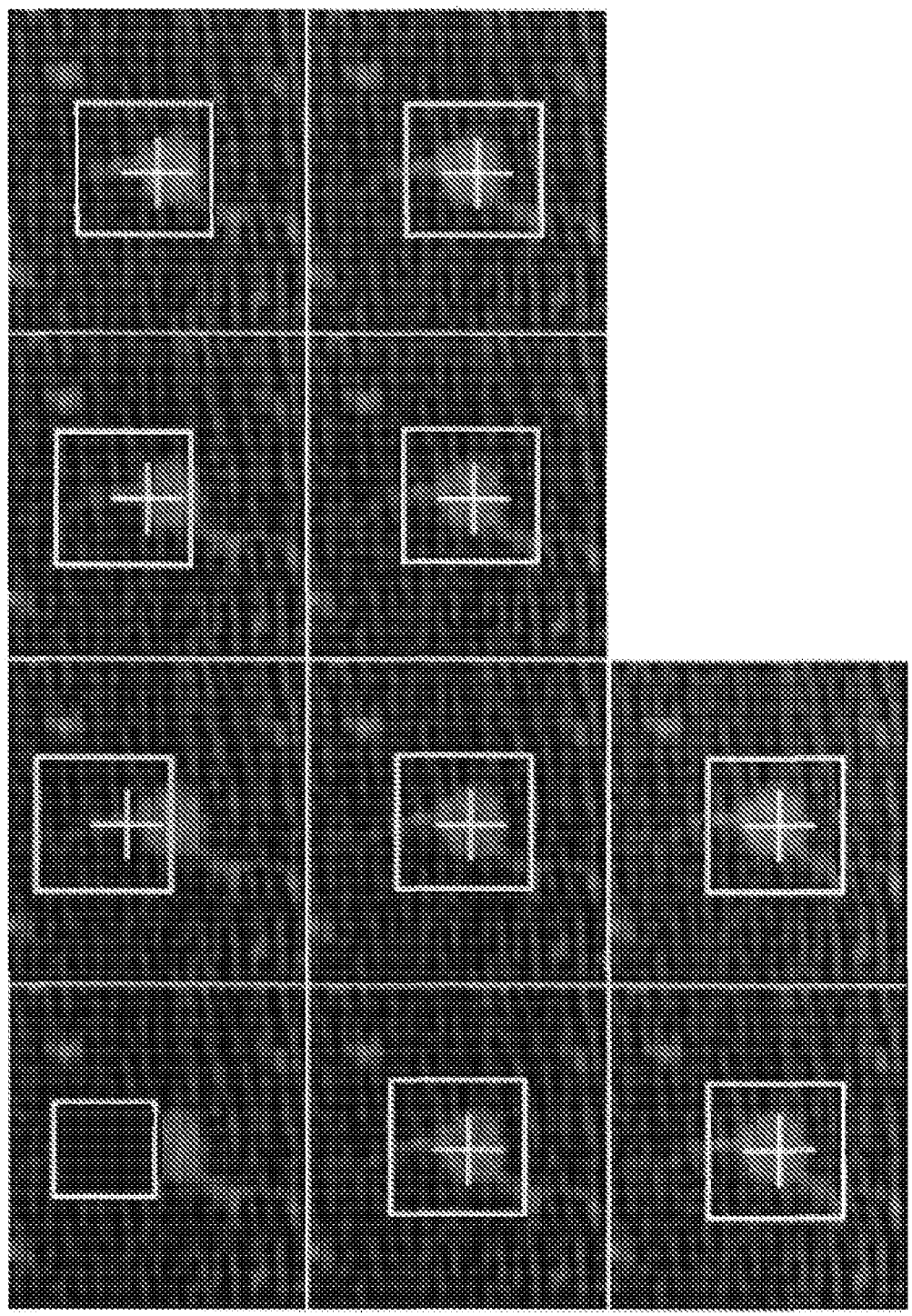
FIG. 65 illustrates an iterative center of mass determination in a CT scan of a small pulmonary nodule.
Figure 66:
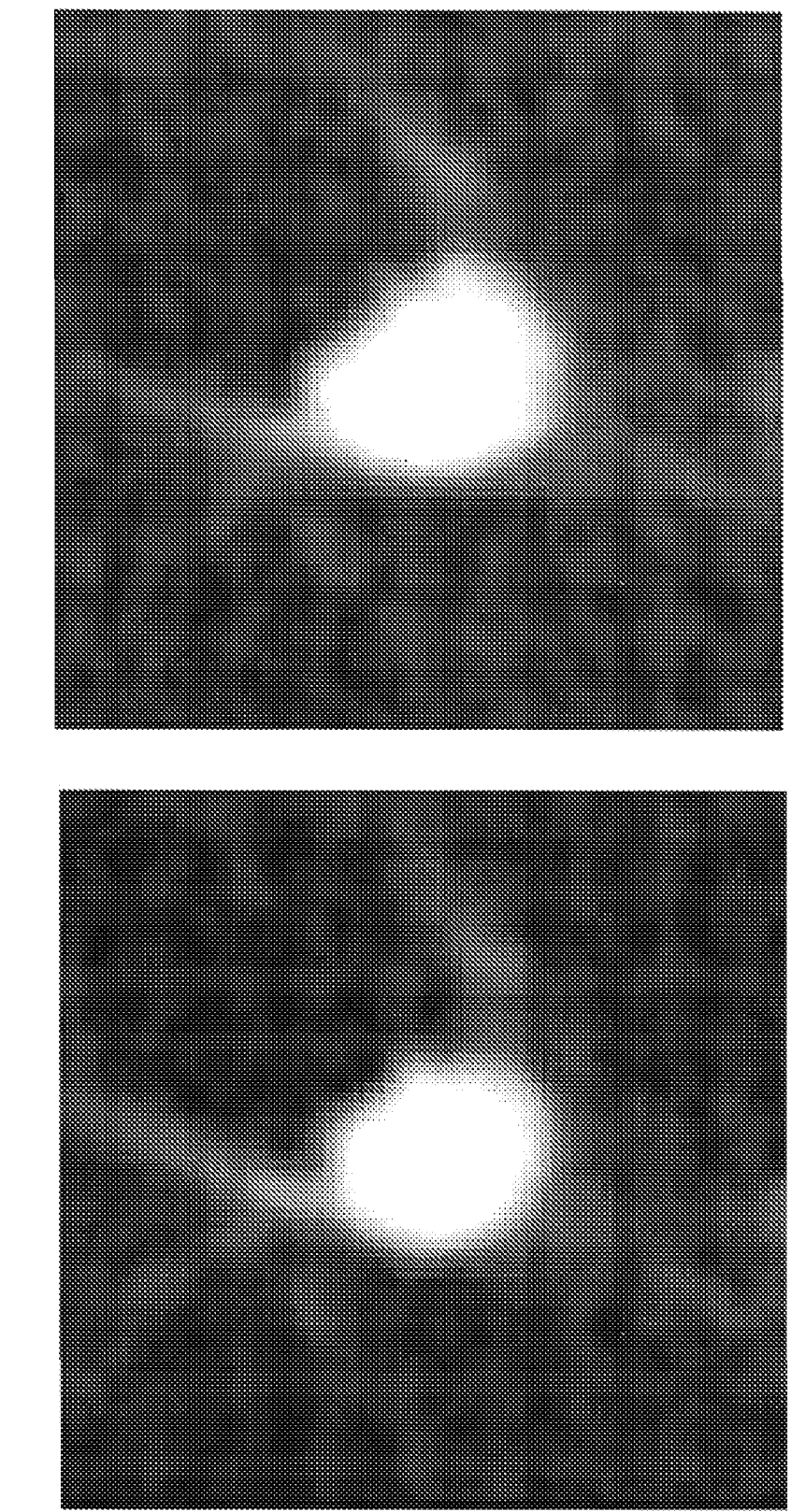
FIG. 66 illustrates a correlation-based registration of nodule ROIs.

The inputs to this procedure, in addition to the 3D image, are an initial starting point for the search, and the dimensions of the ROI desired. A two-dimensional example of the operation of Algorithm 7.1 is shown in FIG. 65. Each image represents one iteration of the algorithm. In each frame, the white rectangle illustrates the current ROI, in which the white cross shows the computed center of mass, $C_m$.

This value then becomes the center of the ROI in the next iteration. The algorithm stops after 10 iterations, as the COM did not change by more than $\epsilon=2$ voxels between the final two iterations.

Algorithm 7.1 can be used for the determination of two matching ROIs in sequential scans of a pulmonary nodule, allowing for comparative analysis. The method is quite sensitive to the exact distribution of density, including that corresponding to structures in the periphery (such as vessels), however. In particular, when a nodule exhibits non-uniform growth, the resultant ROIs may not correspond perfectly.

Correlation-Based Region Matching—In the method described in the previous section, we aligned two images by determining a robust center of mass for each and aligned these, using the assumption that the COM would not shift significantly between scans. An alternative approach to the determination and alignment of two comparable ROIs may be defined in terms of image correlation. The two ROIs may be aligned using 3D correlation as a measure of image correspondence. The method requires selection of the two ROIs and specification of the limits on the extent of the search. The second ROI is then translated to all locations in the search region and the 3D correlation computed between the two ROIs. The translation yielding the greatest value of this match metric is used to specify the alignment of the ROIs for subsequent analysis. The technique is described in Algorithm 7.2, where the T (ROI, i, j, k) specifies the translation of an ROI coordinate system by x=i, y=j, z=k and the star (★) operator is the three-dimensional correlation described in Equation 7.1.

$$c(i, j, k) + \sum_x \sum_y \sum_z f(x, y, z) \cdot g(x - i, y - j, z - k) \quad (7.1)$$

In each iteration, the correlation of the two ROIs at the current translation of $ROI_b$ is computed. If the value of this correlation, c, is greater than the previous maximum value, M, the value and the location of this better match, L, are recorded. The final result of the algorithm is that translation, L, that produces the best alignment between the ROIs.

---
Algorithm 7.2 (Correlation-Based Region Matching)
---

Select two ROIs: $ROI_a$, $ROI_b$
Select the extent of the search region in each dimension: S = {x, y, z}
    M=0
    for k = $-S_z$ : $S_z$ {for each translation in search region}
        for j = $-S_y$ : $S_y$
            for i = $S_x$ : $S_x$
                c(i, j, k) = $ROI_a$ ★ $ROI_b$
                if c(i, j, k) > M
                M = c(i, j, k)
                L = (i, j, k)
            end
        end
    end
end

---

An example of the result of correlation-based registration is shown for two scans of a small pulmonary nodule in FIG. 60. When using correlation-based matching, changes in the absolute center of mass of the nodule are less likely to affect the registration, as the overall match is based on direct correspondence between areas of intensity in each ROI. For this reason, the correlation-based matching technique was chosen for the analysis methods described later in this chapter.

Three-Dimensional Region Weighting—Since we are analyzing the nodule ROI without performing explicit segmentation, vessels and other confounding structures will influence the metrics computed on the region as a whole. In an effort to reduce the influence of peripheral structures, we may prefilter the region using a weighting function that gives the highest weight to central structures (near the center of mass), and less weight to the periphery. In this section we will examine several weighting functions and their effects on our model of the nodule region.

Weighting Functions—Two region weighting functions were considered when developing the region analysis technique. These included: (a) rectangular radial window; (b) triangular radial window; and (c) Gaussian window.

In the following discussion, we will assume the ROI to be translated such that the center of mass is located at the origin of the coordinate system, which simplifies the mathematical notation. With that in mind, the rectangular radial window can be defined as follows:

$$\omega_r(d) = \begin{cases} 1, & |d| \le r \\ 0, & |d| > r \end{cases} ; d = \{x, y, z\} \quad (7.2)$$

In the one-dimensional case, this degenerates to the familiar recto ( ) function, where the width of the rectangle is 2r. In two dimensions, the window is circular with radius r. Similarly, in the three-dimensional case the window is spherical with radius r. This function, while easy to implement has several disadvantages. First, it imposes a hard cut-off point, giving zero weight to any voxels outside of r. More important, there is no scaling given to any of the interior region. This, in effect, imposes a hard segmentation based on distance from the center of mass.

An improvement over the rectangular window would be one that provides a gradual attenuation of the voxel intensities as they appear further from the COM. Such a window would allow the weighting function to retain the majority of the density information near the center of ROI and much less near the periphery. This lead to the choice of a Gaussian weighting function.

The one-dimensional Gaussian may be specified in terms of it's standard deviation, σ. The intensity at a point relative to the mean, μ, is defined as $$\omega_g(x) = \frac{1}{\sigma\sqrt{2\pi}} e^c (x - \mu)^2 / 2\sigma^2 \quad (7.3)$$

In two dimensions, the distribution may have a different standard deviation for each dimension (resulting in an elliptical Gaussian), but as we wish to obtain a symmetric weighting function, we will consider the circular case where $$\sigma = \sigma_x = \sigma_y$$

The corresponding two-dimensional Gaussian function may be expressed as $$w_g(x, y) = \frac{1}{2\pi\sigma^2} e^{-[(x-\mu)2x]} / 2\sigma^2 \quad (7.4)$$

where the origin is located at $(\mu_x, \mu_y)$. Similarly, we may define a symmetric (spherical) three-dimensional Gaussian weighting function as $$w_g(x, y, z) = \frac{1}{\sigma^3 (2\pi)^{3/2}} e^{-[(x-\mu_x)^2+(y-\mu_y)^2+(z-\mu_z)^2]/2\sigma^2} \quad (7.5)$$

Whereas we will set the mean (origin) of the Gaussian weighting function to be the center of mass of the ROI to be weighted, the choice of an appropriate value for the standard deviation, σ, is less obvious. The overall goal of the weighting is to provide a representation of the original ROI with structures at the periphery smoothly attenuated, so that they contribute less to the overall density distribution. Thus, the choice of values for σ must be a function of two parameters: the size of the ROI, and the degree to which the periphery should be attenuated. In addition, the weighting function used for an ROI containing a nodule in one CT scan should be the same as that used to weight the ROI in a subsequent scan. A discussion of the appropriate mechanism for selection of values for σ will be given in the context of the doubling time estimation problem in Section 7.3.1.

Moment-Based Analysis—The method of moments may be employed to study the density distribution of the weighted ROI. Moments were discussed in Section 6. In this context, we are using densitometric moments as descriptors of the weighted region containing the nodule. First and foremost is the zeroth-order moment:

$$m_{000} = \sum_{x=0}^{M-1} \sum_{y=0}^{N-1} \sum_{x=0}^{L-1} v(x, y, z) \quad (7.6)$$

where v(x, y, z) is a continuous, real-valued function describing the CT attenuation at a given location in 3-space. Recall that when v (x, y, z) is binary-valued, as in a segmented ROI, the zeroth-order moment corresponds to the volume of the nodule region. In this case, however, it is the sum of the attenuation at each voxel in the ROI. More specifically, if we assume that CT attenuation corresponds to object density at a particular location, $m_{000}$ may be thought of as a measure of region mass.

In the current application, however, we are analyzing a weighted nodule ROI. The goal, then, is to determine a moment-based descriptor that can be used to characterize the nodule or change in the nodule over time. We will, therefore, define the mean density of the weighted nodule ROI as $$md = \frac{m_{000}}{(M \cdot N \cdot L)} = \frac{m_{000}}{\mu_0} \quad (7.7)$$

This is simply the "mass" of the region divided by the volume of the ROI, analogous to physical density measurements. Using this metric, we are able to study the change in size of the nodule over time.

Doubling Time Estimation—Doubling time estimates based on the change in segmented nodule volume were discussed in Section 5. An alternative approach to doubling time estimation not requiring explicit segmentation would be to quantify the change in mean density of the ROI as a surrogate for change in nodule volume.

Consider two scans of an growing object at two times within ROIs of identical size. At baseline, the volume of the object is $V_1$, and in the second scan it is $V_2$. If we consider the case where the object is of uniform density and that the background is zero-valued (empty), the ratio of the mean densities of these regions is exactly equal to the ratios of their volumes:

$$md_1 = \frac{V_1}{V_{ROI}}, md_2 = \frac{V_2}{V_{ROI}} \Rightarrow \frac{md_1}{md_2} = \frac{V_1}{V_2} \quad (7.8)$$

This mathematical relationship suggests that it may be possible to use the mean density metric as a proxy for nodule volume in computing doubling time estimates. Of great importance, obviously, is the selection of two corresponding ROIs with identical dimensions. There are two additional considerations, however: (a) the nodule may not be of uniform density; and (b) non-nodule objects may be included in the ROI.

The first consideration supposes that if the nodule changes in density but not in "size," the relationship between mean density and segmented volume no longer applies. This is true. However, it may be argued that an increase in measured nodule density, for equivalent nodule "size," may be a better indicator of increased numbers of cells in the region. Furthermore, the removal of the intensity-based thresholding step in traditional nodule segmentation allows us to consider the entire nodule volume in every case, eliminating the complexity and algorithmic (or radiologist) bias in segmentation.

The second consideration, pertaining to the inclusion of non-nodule regions of significant attenuation in the ROI is also valid. However, most of the non-nodule structures in the ROI correspond to vasculature or small airways. In each case, the size of such structures is likely to remain constant between scans, unless the nodule (as in the case of some malignant tumors) is responsible for angiogenesis in the region. In this case, the additional density measured in the ROI would contribute to a more aggressive estimate of growth, appropriate in such cases. Furthermore, the contribution of structures at the periphery of the ROI will be limited as the region has been pre-weighted using a Gaussian weighting function. This will help achieve the goal of keeping the density distribution of the nodule itself as the chief contributor to the density distribution of the entire ROI.

Methods—A complete method for nodule doubling time estimation without explicit nodule segmentation has been developed. The goal is to use the mean density of the Gaussian-weighted nodule ROI as a proxy for the true nodule volume. In this way, we can compare the mean densities of two appropriately weighted nodule ROIs taken at two different times and determine an estimate of the rate of growth of the nodule. A key parameter in this procedure is the standard deviation, σ, used in each of the ROI weighting functions. It is desirable to have the Gaussian taper toward zero near the periphery of the ROI so that additional, non-nodule structures (e.g. vessels) present in the ROI will have less of a contribution toward the density calculations. This would suggest a relatively small value of σ might be appropriate. However, we do not wish to over-attenuate the true nodule region. Furthermore, as our growth estimation technique is based on measures of mean density in the region, we do not wish to choose a value of σ small enough such that the mean density metric will become "saturated" upon subsequent nodule growth. This might otherwise be possible as we are using the same weighting function for the ROI at each time. For example, if the first ROI is weighted such that the mean density is quite high (near the effective maximum of the metric), nodule growth that appears in the second ROI may be missed if the radius of the Gaussian is too small. Furthermore, increases in mean attenuation near the center of the nodule in the second ROI may not be accurately measured in this case, as there might be insufficient dynamic range in the weighted density scale.

For these reasons, an iterative technique is employed to determine the value of σ for the Gaussian weighting function such that the mean density in the first ROI is fixed at a pre-determined point. In this way, a sufficient amount of dynamic range in the mean density metric is preserved for measurement of growth in the second ROI Algorithm 7.3 describes the method for selection of the appropriate value of σ for a given standardized mean density, $md_s$, and value of ε, the stopping criterion.

Algorithm 7.3 (Iterative Sigma Determination)

```
Select an ROI, ROI, and a standardized mean density value, md_s
    σ_b = σ_c = 0
    s = 0.1 md_s = 0
    md_c = 0
    while done ≠ 1
        Generate Gaussian weighting function w_c using σ_c
        WROI_c(x, y, z) = w_c(x, y, z) · ROI(x, y, z)
        md_c = (∑_{x=0}^{M-1} ∑_{y=0}^{N-1} ∑_{z=0}^{L-1} WROI_c(x, y, z)) / (M·N·L)
        δ = (md_s − md_c)
        if |δ| > 0
            σ_b = σ_c
            if |δ| < ε
                done = 1
            else
                σ_c = σ_c + s
            end
        else
            if |δ| < ε
                done = 1
            else
                s = s/2
                σ_c = σ_c + s
            end
        end
    end
end
```

At the termination of the algorithm, the value of σ is the appropriate standard deviation for the Gaussian weighting function, such that it will produce the desired mean density, $md_s$.

Using the mean density of the weighted nodule ROIs as a surrogate for the nodule volume, it is possible to estimate the growth rate of a nodule in sequential CT scans without performing explicit segmentation. Given two 3D nodule ROIs, $ROI_1$ and $ROI_2$, acquired at $t_1$ and $t_2$, respectively, we may use the first to compute the appropriate weighting function for the pair, and subsequently produce the Gaussian-weighted regions of interest, $WROI_1$ and $WROI_2$. In each of the Gaussian-weighted 3D regions, we then compute the mean voxel densities, $md_1$ and $md_2$. Given these mean density measures and the time between scans, $\Delta t$, we may compute a region-based doubling time estimate, $DT_R$ as $$DT_R = \frac{ln2 \cdot \Delta t}{ln(md_2/md_1)} \quad (7.9)$$

This is the analogous expression to the calculation of nodule doubling time based on segmented volumetric data (Equation 5.24). The entire doubling time estimation technique is described in Algorithm 7.4.

Algorithm 7.4 (Doubling Time Estimation Without Explicit Segmentation)

```
Select two ROIs, ROI_1, ROI_2, at t_1 and t_2, respectively
Align (ROI_1, ROI_2) using Algorithm 7.2
Determine σ based on ROI_1 using Algorithm 7.3
Generate Gaussian weighting function w using σ
W ROI_1(x,y,z) = w(x,y,z) · ROI_1(x,y,z)
W ROI_2(x,y,z) = w(x,y,z) · ROI_2(x,y,z)
md_2 = (∑_{x=0}^{M-1} ∑_{y=0}^{N-1} ∑_{z=0}^{L-1} WROI_1(x, y, z)) / (M·N·L)
```

Algorithm 7.4 (Doubling Time Estimation Without Explicit Segmentation) —continued

```
md_2 = (∑_{x=0}^{M-1} ∑_{y=0}^{N-1} ∑_{z=0}^{L-1} WROI_2(x, y, z)) / (M·N·L)
Δt = t_2 − t_1
DT_R = (ln2 · Δt) / ln(md_2/md_1)
```

It is important to note that this algorithm was designed chiefly to operate on well-circumscribed and vascularized nodules. Nodules with sufficient proximity or connectivity to the pleural surface (pleural tail, and juxtapleural nodules) present significant ROI registration problems. In particular, both the COM-based and correlation-based alignment techniques are quite sensitive to ROI selection when a significant portion of the pleural wall is included.

Example 12

The techniques for three-dimensional region analysis without explicit nodule segmentation were compared with those based on segmentation. The following is a summary of the results.

Doubling Time Estimation—A study was performed using eleven pulmonary nodules for which two high-resolution studies were available. Five were malignant and six benign, either biopsy-proven or exhibiting no growth over two years. Volumetric doubling times (DT) were computed based on three-dimensional segmentations of each nodule at each time. Doubling time estimates ($DT_R$) were also computed using the change in mean density of the registered ROI, using the techniques described above. The results are shown in Table 7.1.

TABLE 7.1

Comparison of in vivo doubling time estimates with and without explicit segmentation

| Case | $DT_R$ | DT | Status |
| --- | --- | --- | --- |
| 1 | 193.5 | 104.4 | Malignant |
| 2 | 46.70 | 51.09 | Malignant |
| 3 | 182.8 | 73.42 | Malignant |
| 4 | 341.4 | 177.4 | Malignant |
| 5 | 224.2 | 87.04 | Malignant |
| 6 | 4557 | 825.5 | Benign |
| 7 | 580.2 | 2026 | Benign |
| 8 | −2894 | −1571 | Benign |
| 9 | 1167 | 395.6 | 2YNC |
| 10 | 7162 | 3335 | Benign |
| 11 | 801.8 | 845.9 | Benign |

Comparative statistics were performed to assess the degree of relationship between the two types of doubling time estimate. As it was difficult to make the assumption both DT and $DT_R$ would be Gaussian-distributed variables, the standard Pearson correlation was substituted with the Spearman rank correlation. A non-parametric measure of correlation, it is based on the difference in rank of corresponding values in each variable. If we define $R_1$ to be the rank of one variable in its distribution and $S_1$ to be the rank of the second variable in its distribution, the Spearman rank-order correlation coefficient, $r_s$ is defined as $$r_s = \frac{\Sigma_i(R_i - \bar{R})(S_i - \bar{S})}{\sqrt{\Sigma_i(R_i - \bar{R})^2}\sqrt{\Sigma_i(S_i - \bar{S})^2}} \tag{7.10}$$

This expression can be simplified if we define the sum squared difference of ranks, D as $$D = \sum_{i=1} N(R_i - S_i)^2 \tag{7.11}$$

The expression for $r_s$ is then simply $$r_s = 1 - \frac{6D}{N^3 - N} \tag{7.12}$$

The value of $r_s$ was computed to show the relationship of volumetrically determined doubling times to those determined from change in mean density. In this experiment, $r_s$ was equal to 0.9091, P>|$r_s$|=0.0001. This indicates a very high correlation between the values of DT and $DT_R$. Thus, the estimation of nodule doubling time without explicit segmentation may be an effective measure in place of the segmentation-based method.

An examination of the $DT_R$ values alone as a predictor of nodule malignancy was also encouraging. The density-estimated doubling time values were significantly different for malignant nodules, 197.73±47.1 (mean±sem), vs. benign ones, 2860.7±1059.6 (p<0.01, using Wilcoxon rank sums). Again, these techniques for the estimation of nodule growth without explicit segmentation appear promising in the differentiation of benign from malignant lesions.

Thus, while there have been described what presently believed to be the preferred embodiment of the invention, those skilled in the art will realize that changes and modifications may be made thereto without departing from the spirit of the invention, and it is intended to claim all such changes and modifications as fall within the true scope of the invention.

CITED LITERATURE

[1] A. Akanuma. Clinical method to estimate time of origin and maximum volume of malignant tumors. *Radiation Medicine*, 1(1):89-104, January-March 1983.

[2] E. Arana, P. Delicado, and L. Marti-Bonmati. Validation procedures in radiologic diagnostic models. Neural network and logistic regression. *Investigative Radiology*, 34(10):636-642, October 1999.

[3] S. G. Armato, III, M. L. Giger, K. Ashizawa, and H. MacMahon. Automated lung segmentation in digital lateral chest radiographs. *Medical Physics*, 25(8):1507-1520, August 1998.

[4] S. G. Armato, III, M. L. Giger, C. J. Moran, J. T. Blackburn, K. Doi, and H. MacMahon. Computerized detection of pulmonary nodules on CT scans. *Radiographics*, 19(5):1303-1311, September-October 1999.

[5] P. J. Besl and R. C. Jain. Invariant surface characteristics for 3D object recognition in range images. *Computer Vision, Graphics, and Image Processing*, 33(1):33-80, January 1986.

[6] R. N. Bracewell and S. J. Wernealse. Image reconstruction over a finite field of view. *Journal of the Optical Society of America*, 65:1342-1346, 1975.

[7] M. S. Brown, M. F. McNitt-Gray, N. J. Mankovich, J. G. Goldin, J. Hiller, L. S. Wilson, and D. R. Aberle. Method for segmenting chest CT image data using an anatomical model: Preliminary results. *IEEE Transactions on Medical Imaging*, 16(6):828-839, December 1997.

[8] M. J. Carreira, D. Cabello, M. G. Penedo, and A. Mosquera. Computer-aided diagnoses: Automatic detection of lung nodules. *Medical Physics*, 25(10):1998-2006, October 1998.

[9] Z.-H. Cho, J. P. Jones, and M. Singh. *Foundations of Medical Imaging*. John Wiley and Sons Inc., 1993.

[10] G. Cittadini Jr., R. Conzi, and G. Motta. [Spiral computed tomography in the diagnosis and staging of bronchopulmonary carcinoma]. *Chir Ital*, 47(3):13-17, 1995.

[11] J. Collins and E. J. Stem. Ground-glass opacity at CT: the ABCs. *AJR American Journal of Roentgenology*, 169(2):355-367, August 1997.

[12] V. P. Collins, R. K. Loeffler, and H. Tivey. Observations on growth rates of human tumors. *American Journal of Roentgenology*, 76:988-1000, 1956.

[13] ACR-NEMA Standards Committee. *Digital Imaging and Communications in Medicine (DICOM): Version 3.2*. Rosslyn, Va., 1999.

[14] A. M. Cormack. Representation of a function by its line integrals with some radiological applications. *Journal of Applied Physics*, 34:2722-2727, 1963.

[15] A. M. Cormack. Representation of a function by its line integrals with some radiological applications. ii. *Journal of Applied Physics*, 34:2908-2913, 1964.

[16] P. Croisille, M. Souto, M. Cova, S. Wood, Y. Afework, J. E. Kuhlman, and E. A. Zerhouni. Pulmonary nodules: Improved detection with vascular segmentation and extraction with spiral CT. Work in progress. *Radiology*, 197(2):397-401, November 1995.

[17] S. Dholakia and D. C. Rappaport. The solitary pulmonary nodule. Is it malignant or benign? *Postgraduate Medicine*, 99(2):246-250, February 1996.

[18] C. E. Engeler, J. H. Tashjian, S. W. Trenkner, and J. W. Walsh. Ground-glass opacity of the lung parenchyma: a guide to analysis with high-resolution CT. *AJR American Journal of Roentgenology*, 160(2):249-251, February 1993.

[19] B. J. Flehinger. M. Kimmel, T. Polyak, and M. R. Melamed. Screening for lung cancer. The Mayo Lung Project revisited. *Cancer*, 72(5):1573-1580, Sep. 1 1993.

[20] R. S. Fontana, D. R. Sanderson, L. B. Woolner, W. F. Taylor, W. E. Miller, J. R. Muhm, P. E. Bernatz, W. S. Payne, P. C. Pairolero, and E. J. Bergstralh. Screening for lung cancer. A critique of the Mayo Lung Project. *Cancer*, 67(4 (suppl.)):1155-1164, Feb. 15, 1991.

[21] A. Van Gelder and J. Wilhelms. Topological considerations in isosurface generation. *ACM Transactions on Graphics*, 13(4):337-375, October 1994.

[22] M. L. Giger, K. T. Bae, and H. MacMahon. Computerized detection of pulmonary nodules in computed tomography images. *Investigative Radiology*, 29(4):459-465, April 1994.

[23] M. L. Giger, K. Doi, and H. MacMahon. Image feature analysis and computer-aided diagnosis in digital radiography. 3. Automated detection of nodules in peripheral lung fields. *Medical Physics*, 15(2):158-166, March-April 1988.

[24] R. C. Gonzales and R. E. Woods. *Digital Image Processing*. Addison-Wesley, Reading, Mass., 1992.

[25] J. W. Green and C. C. Lushbaugh. Histopathological study of the mode of inhibition of cellular proliferation by urethane. *Cancer Research*, 9:199-209, 1949.

[26] Gurney. Determining the likelihood of malignancy in solitary pulmonary nodules with Bayesian analysis. Part 1. Theory. *Radiology*, 186(2):405-413, February 1993.

[27] J. A. Hanley and B. J. McNeil. The meaning and use of the area under a receiver operating characteristic (ROC) curve. *Radiology*, 143(1):29-36, April 1982.

[28] C. 1. Henschke, D. 1. McCauley, D. F. Yankelevitz, D. P. Naidich, G. McGuinness, O, S. Miettinen, D. M. Libby, M. W. Pasmantier, J. Koizumi, N. K. Altorki, and J. P. Smith. Early Lung Cancer Action Project: overall design and findings from baseline screening. *Lancet*, 354(9173):99-105, July 1999.

[29] C. J. Herold, A. A. Bankier, and D. Fleischmann. Lung metastases. *European Radiology*, 6(5):596-606, 1996.

[30] G. N. Hounsfield. Computerized transverse axial scanning (tomography). I. Description of system. *British Journal of Radiology*, 46(552):1016-1022, December 1973.

[31] G. N. Hounsfield. Computed medical imaging. Nobel lecture, Dec. 8, 1979. *Journal of Computer Assisted Tomography*, 4(5):665-674, October 1980.

[32] Z. Huo, M. L. Giger, C. J. Vyborny, U. Bick, P. Lu, D. E. Wolverton, and R. A. Schmidt. Analysis of spiculation in the computerized classification of mammographic masses. *Medical Physics*, 22(10):1569-1579, October 1995.

[33] Z. Huo, M. L. Giger, C. J. Vyborny, D. E. Wolverton, R. A. Schmidt, and K. Doi. Automated computerized classification of malignant and benign masses on digitized mammograms. *Academic Radiology*, 5(3):155-168, March 1998.

[34] S. Itoh, M. Ikeda, T. Isomura, T. Endo, K. Yamakawa, K. Itoh, S. Naganawa, K. Maruyama, and T. Ishigaki. Screening helical CT for mass screening of lung cancer: application of low-dose and single-breath-hold scanning. *Radiation Medicine*, 16(2):75-83, March-April 1998.

[35] A. K. Jain. *Fundamentals of Digital Image Processing*. Prentice Hall, Englewood Cliffs, N.J., 1989.

[36] R. Jain, R. Kasturi, and B. G. Schunck. *Machine Vision*. McGraw-Hill, New York, 1995.

[37] L. R. Kaiser and J. B. Shrager. Video-assisted thoracic surgery: the current state of the art. *AJR American Journal of Roentgenology*, 99(2):246-250, February 1996.

[38] W. A. Kalender. Technical foundations of spiral CT. *Seminars in Ultrasound, CT, and MRI*, 15(2):81-89, April 1994.

[39] W. A. Kalender. Thin-section three-dimensional spiral CT: is isotropic imaging possible? *Radiology*, 197(3):578-580, December 1995.

[40] W. A. Kalender, W. A. Seissle, E. Klotz, and P. Vock. Spiral volumetric CT with single breath-hold technique continuous transport and continuous scanner rotation. *Radiology*, 176(1):181-183, July 1990.

[41] M. Kaneko, K. Eguchi, H. Ohmatsu, R. Kakinuma, T. Naruke, K. Suemasu, and N. Moriyama. Peripheral lung cancer: screening and detection with low-dose spiral CT versus radiography. *Radiology*, 201(3):798-802, December 1996.

[42] Y. Kawata, N. Niki, H. Ohmatsu, K. Eguchi, and N. Moriyama Shape analysis of pulmonary nodules based on thin section CT images. SPIE *Proceedings*, 3034:964-974, February 1997.

[43] J. H. Kim, J. G. Im, M. C. Han, B. G. Min, and C. W. Lee. Improved visualization of simulated nodules by adaptive enhancement of digital chest radiography. *Academic Radiology*, 1(2):93-99, October 1994.

[44] T. Kobayashi, X.-W. Xu, H. MacMahon, C. E. Metz, and K. Doi. Effect of a computer-aided diagnosis scheme on radiologists' performance in detection of lung nodules on radiographs. *Radiology*, 199(3):843-848, June 1996.

[45] A. K. Laird. Dynamics of tumor growth: Comparison of growth rates and extrapolation of growth curve to one cell. *British Journal of Cancer*, 19:278-291, 1965.

[46] S. H. Landis, T. Murray, S. Bolden, and P. A. Wingo. Cancer statistics, 1999. *CA: A Cancer Journal for Clinicians*, 49(1):8-31, January-February 1999.

[47] G. A. Lillington. Management of solitary pulmonary nodules. *Postgraduate Medicine*, 101(3):145-150, March 1997.

[48] W. E. Lorensen and H. E. Cline. Marching cubes: A high resolution 3D surface construction algorithm. *Computer Graphics*, 21(4):163-169, July 1987.

[49] F. Mao, W. Qian, J. Gaviria, and L. P. Clarke. Fragmentary window filtering for multiscale lung nodule detection: Preliminary study. *Academic Radiology*, 5(4):306-311, April 1998.

[50] T. Matsumoto, H. Yoshimura, K. Doi, M. L. Giger, A. Kano, H. MacMahon, K. Abe, and S. M. Montner. Image feature analysis of false-positive diagnoses produced by automated detection of lung nodules. *Investigative Radiology*, 27(8):587-597, August 1992.

[51] M. F. McNitt-Gray, E. M. Hart, N. Wyckoff, J. W. Sayre, J. G. Goldin, and D. R. Aberle. A pattern classification approach to characterizing solitary pulmonary nodules imaged on high resolution CT: Preliminary results. *Medical Physics*, 26(6):880-888, June 1999.

[52] M. R. Melamed, B. J. Flehinger, M. B. Zaman, R. T. Heelan, W. A. Perchick, and N. Martini. Screening for early lung cancer. Results of the Memorial Sloan-Kettering study in New York. *Chest*, 86(1):44-53, July 1984.

[53] S. Mitruka, R. J. Landreneau, M. J. Mack, L. S. Fetterman, J. Gammie, S. Bartley, S. R. Sutherland, C. M. Bowers, R. J. Keenan R J, P. F. Ferson, and R. J. Weyant. Diagnosing the indeterminate pulmonary nodule: percutaneous biopsy versus thoracoscopy. *Surgery*, 118(4):676-684, October 1995.

[54] 0. Monga, R. Deriche, and J.-M. Rocchisani. 3D edge detection using recursive filtering: Application to scanner images. *Computer Vision, Graphics, and Image Processing: Image Understanding*, 53(1):76-87, January 1991.

[55] H. Nathan. Management of solitary pulmonary nodules. An organized approach based on growth rate and statistics. *JAMA*, 227(10):1141-1144, March 1974.

[56] M. H. Nathan, V. P. Collins, and R. A. Adams. Differentiation of benign and malignant pulmonary nodules by growth rate. *Radiology*, 79:221-231, 1962.

[57] R. Pearl and L. J. Reed. On the rate of growth of the population of the United States since 1790 and its mathematical presentation. *Proceedings of the National Academy of Sciences*, 6:275-285, 1920.

[58] J. Peiss, M. Verlande, W. Ameling, and R. W. Guenther. Classification of lung tumors on chest radiographs by fractal texture analysis. *Investigative Radiology*, 31(10):625-629, October 1996.

[59] M. G. Penedo, M. J. Carreira, A. Mosquera, and D. Cabello. Computer-aided diagnosis: A neural-network-based approach to lung nodule detection. *IEEE Transactions on Medical Imaging*, 17(6):872-880, December 1998.

[60] R. J. Prokop and A. P. Reeves. A survey of moment-based techniques for unoccluded object representation and recognition. *CVGIP: Graphical Models and Image Processing*, 54(5):438-360, September 1992.

[61] R. D. Pugatch. Radiologic evaluation in chest malignancies. A review of imaging modalities. *Chest*, 107(6 (suppl.)):294S-297S, June 1995.

[62] A. P. Reeves, W. J. Kostis, C. 1. Henschke, B. Zhao, and D. F. Yankelevitz. Three-dimensional feature characterization of small pulmonary nodules from helical CT images. *Radiology*, 209P:163, November 1998.

[63] A. P. Reeves, W. J. Kostis, D. F. Yankelevitz, and C. I. Henschke. Three-dimensional shape characterization of solitary pulmonary nodules from helical CT scans. In H. U. Lemke, M. W. Vannier, K. Inamura, and A. G. Farman, editors, *Proceedings of Computer Assisted Radiology and Surgery (CARS '99)*, pages 83-87. Elsevier Science, June 1999.

[64] A. P. Reeves, R. J. Prokop, S. E. Andrews, and F. P. Kuhl. Three-dimensional shape analysis using moments and Fourier descriptors. *IEEE Transactions on Pattern Analysis and Machine Intelligence*, 10(6):937-943, November 1988.

[65] A. P. Reeves and B. S. Wittner. Shape analysis of three dimensional objects using the method of moments. In *Proceedings of 1983 IEEE Conference on Computer Vision and Pattern Recognition*, pages 20-26, June 1983.

[66] J. Remy, M. Remy-Jardin, F. Giraud, and J. Wannebroucq. [Spiral volumetric scanning and its applications in thoracic pathology. *Rev Mal Respir*, 11(1):13-27, 1994.

[67] S. N. Reske, R. Bares, U. Bull, A. Guhlmann. E. Moser, and M. F. Wannenmacher. [Clinical value of positron emission tomography (PET) in oncologic questions: results of an interdisciplinary consensus conference. Schirmerreschaft der Deutschen Gesellschaft for Nuklearmedizin.]. *Nuklearmedizin*, 35(2):42-52, April 1996.

[68] T. W. Ridler and S. Calvard. Picture thresholding using an iterative selection method. *IEEE Transactions on Systems, Man, and Cybernetics*, SMC-8(8):630-632, August 1978.

[69] K. V. Rolston, S. Rodrguez, M. Dholakia, E. Whimbey E, and I. Raad. Pulmonary infections mimicking cancer: a retrospective; three-year review. *Support Care Cancer*, 5(2):90-93, March 1997.

[70] S. Sanada, K. Doi, and H. MacMahon. Image feature analysis and computer-aided diagnosis in digital radiography: automated delineation of posterior ribs in chest images. *Medical Physics*, 18(5):964-971, September-October 1991.

[71] S. Sasaoka. H. Takabatake, M. Mori, H. Natori, and S. Abe. Digital analysis of pulmonary nodules-potential usefulness of computer-aided diagnosis for differentiation of benign from malignant nodules. *Nippon Kyobu Shikkan Gakkai Zasshi*, 33(5):489-496, May 1995.

[72] M. D. Seemann, T. Beinert, F. Spelsberg, B. Obst, H. Dienemann, U. Fink, P. Kohz, and M. Reiser. Differentiation of solitary pulmonary coin lesions by high-resolution computerized tomography. *Radiology*, 36(7):579-585, July 1996.

[73] M. D. Seemann, A. Staebler, T. Beinert, H. Dienemann, B. Obst, M. Matzko, C. Pistitsch, and M. F. Reiser. Usefulness of morphological characteristics for the differentiation of benign from malignant solitary pulmonary lesions using HRCT. *European Radiology*, 9(3):409-417, 1999.

[74] J. Serra. *Image analysis and mathematical morphology*. Academic Press, London, 1982.

[75] J. Serra. *Image analysis and mathematical morphology. Volume 2: Theoretical advances*. Academic Press, London, 1988.

[76] R. Shah, S. Sabanathan, J. Richardson, A. J. Mearns, and C. Goulden. Results of surgical treatment of stage I and II lung cancer. *Journal of Cardiovascular Surgery*, 37(2): 169-172, April 1996.

[77] R. H. Sherrier, C. Chiles, W. E. Wilkinson, G. A. Johnson, and C. E. Ravin. Effects of image processing on nodule detection rates in digitized chest radiographs: ROC study of observer performance. *Radiology*, 166(2):447-450, February 1998.

[78] S. Sone, S. Takashima, F. Li, Z. Yang, T. Honda, Y. Maruyama, M. Hasegawa, T. Yamanda, K. Kubo, K. Hanamura, and K. Asakura. Mass screening for lung cancer with mobile spiral computed tomography scanner. *Lancet*, 351 (9111): 1242-1245, April 1998.

[79] M. Sonka, G. Sundararmoorthy, and E. A. Hoffman. Knowledge-based segmentation of intrathoracic airways from multidimensional high resolution CT images. *SPIE*, 2168:73-85, August 1994.

[80] J. S. Spratt, J. S. Meyer, and J. A. Spratt. Rates of growth of human solid neoplasms: Part I. *Journal of Surgical Oncology*, 60(2):137-146, October 1995.

[81] S. J. Swensen, J. R. Jett, W. S. Payne, R. W. Viggiano, P. C. Pairolero, and V. F. Trastek. An integrated approach to evaluation of the solitary pulmonary nodule. *Mayo Clinic Proceedings*, 65(2):173-186, February 1990.

[82] S. J. Swensen, M. D. Silverstein, D. M. Ilstrup, C. D. Schleck, and E. S. Edell. The probability of malignancy in solitary pulmonary nodules. Application to small radiologically indeterminate nodules. *Archives of Internal Medicine*, 157(8):849-855, April 1997.

[83] S. W. Tamarkim. Spiral computed tomography and computed tomographic angiography. In J. R. Haaga, C. F. Lanzieri, D. J. Sartoris, and E. A. Zehrouni, editors, *Computed tomography and magnetic resonance imaging of the whole body*. Mosby, 1994.

[84] S. Toshioka, K. Kanazawa, N. Niki, H. Satoh, H. Ohmatsu, K. Eguchi, and N. Moriyama. Computer aided diagnosis system for lung cancer based on helical CT images. *SPIE Proceedings*, 3034:975-984, February 1997.

[85] J. D. Urschel. Surgical treatment of peripheral small cell lung cancer. *Chest Surg Clin N Am*, 7(1):95-103, February 1997.

[86] K. Usuda, Y. Saito, M. Sagawa, M. Sato, K. Kanma, S. Takahashi, C. Endo, Y. Chen, A. Sakurada, and S. Fujimura. Tumor doubling time and prognostic assessment of patients with primary lung cancer. *Cancer*, 74(8):2239-2244, October 1994.

[87] N. F. Vittitoe, J. A. Baker, and C. E. Floyd. Fractal texture analysis in computer-aided diagnosis of solitary pulmonary nodules. *Academic Radiology*, 4(2):96-101, February 1997.

[88] P. Vock, M. Soucek, M. Daepp, and W. A. Kalender. Lung: spiral volumetric CT with single-breath-hold technique. *Radiology*, 176(3):864-867, September 1990.

[89] W. Weiss. Implications of tumor growth rate for the natural history of lung cancer. *Journal of Occupational Medicine*, 26(5):345-352, May 1984.

[90] S. A. Wood, E. A. Zerhouni, J. D. Hoford, E. A. Hoffman, and W. Mitzner. Measurement of three-dimensional lung tree structures by using computed tomography. *Journal of Applied Physiology*, 79(5):1687-97, November 1995.

[91] X.-W. Xu and K. Doi. Image feature analysis for computer-aided diagnosis: Accurate determination of ribcage boundary in chest radiographs. *Medical Physics*, 22(5): 617-626, May 1995.

[92] X.-W. Xu and K. Doi. Image feature analysis for computer-aided diagnosis: Detection of right and left hemidiaphragm edges and delineation of lung field in chest radiographs. *Medical Physics,* 23(9):1613-1624, September 1996.

[93] X.-W. Xu, K. Doi, T. Kobayashi, H. MacMahon, and M. L. Giger. Development of an improved CAD scheme for automated detection of lung nodules in digital chest images. *Medical Physics,* 24(9):1395-1403, September 1997.

[94] S. Yamamoto, I. Tanaka, M. Senda, Y. Tateno, T. Iinuma, T. Matsumoto, and M. Matsumoto. Image processing for computer-aided diagnosis of lung cancer by CT (LSCT). *Systems and Computers in Japan,* 25(2):67-80, February 1994.

[95] D. F. Yankelevitz, C. I. Henschke, J. H. Koizumi, N. K. Altorki, and D. Libby. CT-guided transthoracic needle biopsy of small solitary pulmonary nodules. *Clinical Imaging,* 21(2):107-10, March-April 1997.

[96] H. Yoshimura, M. L. Giger, K. Doi, H. MacMahon, and S. M. Montner. Computerized scheme for the detection of pulmonary nodules: A nonlinear filtering technique. *Investigative Radiology,* 27(2):124-129, February 1992.

[97] P. Chandrasekhar, L. Wolff, E. Zerhouni, and W. Mitzner. Segmentation of 3 pulmonary trees using mathematical morphology. In P. Maragos, R. W. Schafer, and M. A. Butt, editors, *Mathematical Morphology and its Applications to Image and Signal Processing,* pages 409-416. Kluwer Academic Press, May 1996.

[98] T. Fleiter, E. M. Merkle, A. J. Aschoff, G. Lang, M. Stein, J. Gorich, F. Liewald, N. Rilinger, and R. Sokiranski. Comparison of real-time virtual and fiberoptic bronchoscopy in patients with bronchial carcinoma: opportunities and limitations. *American Journal of Roentgenology,* 169(2):1591-1595, December 1997.

[99] M. L. Giger, K. T. Bae, and H. MacMahon. Image processing and computer-aided diagnosis. *Radiologic Clinics of North America,* 34(3):565-596, May 1996.

[100] P. A. Heng, P. F. Fung, T. T. Wong, Y. H. Siu, and H. Sun. Interactive navigation and bronchial tube tracking in virtual bronchoscopy. *Studies in Health Technology and Informatics,* 62:130-133, 1999.

[101] W. J. Kostis, A. P. Reeves, D. F. Yankelvitz, and C. I. Henschke. Three-dimensional segmentation of solitary pulmonary nodules from helical CT scans. In H. U. Lemke, M. W. Vannier, K. Inamura, and A. G. Farman, editors, *Proceedings of Computer Assisted Radiology and Surgery (CARS '99),* pages 203-207. Elsevier Science, June 1999.

[102] F. Maes, A. Collingnon, D. Vandermeulen, G. Marchal, and P. Suetens. Multimodality image registration by maximization of mutual information. *IEEE Transactions on Medical Imaging,* 16(2):187-198, April 1997.

[103] W. Park, E. A. Hoffman, and M. Sonka. Segmentation of intrathoracic airway trees: A fuzzy logic approach. *IEEE Transactions on Medical Imaging,* 17(4):489-497, August 1998.

[104] A. P. Reeves and W. J. Kostis. Computer-aided diagnosis for lung cancer. *Radiologic Clinics of North America,* 38(3):497-509, May 2000.

[105] R. M. Summers, D. H. Feng, S. M. Holland, M. C. Sneller, and J. H. Shelhamer. Virtual bronchoscopy: Segmentation method for real-time display. *Radiology,* 200(3):857-862, September 1996.

[106] J. K. Udupa. Three-dimensional visualization and analysis methodologies: a current perspective. *Radiographics,* 19(3):783-806, May-June 1999.

[107] W. M. Wells, III, P. Viola, H. Atsumi, S. Nakajima, and R. Kikinis. Multi-modal volume registration by maximization of mutual information. *Medical Image Analysis,* 1(1):35-51, March 1996.

[108] D. F. Yankelevitz, R. Gupta, B. Zhao, and C. I. Henschke. Small pulmonary nodules: Evaluation with repeat CT-preliminary experience. *Radiology,* 212(2):561-566, August 1999.

[109] D. F. Yankelevitz, A. P. Reeves, W. J. Kostis, B. Zhao, and C. I. Henschke. Determination of malignancy in small pulmonary nodules based on volumetrically determined growth rates. *Radiology,* 209P:375, November 1998.

[110] D. F. Yankelevitz, A. P. Reeves, W. J. Kostis, B. Zhao, and C. I. Henschke. CT evaluation of small pulmonary nodules based on volumetrically determined growth rates. *Radiology,* 2000. In press.

[111] D. F. Yankelevitz, A. P. Reeves, W. J. Kostis, B. Zhao, and C. I. Henschke. Small Pulmonary Nodules: Volumetrically Determined Growth Rates Based on CT Evaluation, Radiology, 217(1):251-256, October 2000.

[112] A. P. Reeves and W. J. Kostis. Computer-Aided Diagnosis of Small Pulmonary Nodules, Seminars in Ultrasound, CT, and MRI, 21(2):116-128, April 2000.

[113] B. Zhao, W. J. Kostis, A. P. Reeves, D. F. Yankelevitz, and C. I. Henschke, Consistent Segmentation of Repeat CT Scans for Growth Assessment in Pulmonary Nodules, Proceedings of the SPIE, Medical Imaging 1999, 3661:1012-1018, May 1999.

We claim:

1. A method of providing a three-dimensional image representation of an object, said object capable of detectably attenuating a signal resulting from scanning, comprising:

scanning said object with a scanning-medium capable of producing an original three-dimensional image of said object using original three-dimensional image representation units; and supersampling said original three-dimensional image by representing the original three-dimensional image using three-dimensional image representation units comprising a higher spatial frequency than the original three-dimensional image representation units, the supersampling comprising recomputing voxel-values associated with the object in a higher spatial frequency coordinate space than a coordinate space associated with the original three-dimensional image representation units, thereby improving image resolution, the supersampling being performed using trilinear interpolation of each voxel value at location $(x_n, y_n, z_n)$, wherein each supersampled voxel value is defined in terms of eight nearest neighbors in an original space $v(x_i, y_j, z_k)$ associated with the original three-dimensional image using $$v(x_n, y_n, z_n) = \sum_{i=0}^{1}\sum_{j=0}^{1}\sum_{k=0}^{1}(1-dx_i/rx)(1-dy_j/ry)(1-dz_k/rz)v(x_i,y_j,z_k) \quad (3.14)$$

where $i = [0|1]$ $j = [0|1]$ $k = [0|1],$ \hfill (3.10)

$dx_i = |x_n - x_i|$ $$dy_j=|y_n-y_j|$$

$$dz_k=|z_n-x_k|, \text{ and} \quad (3.11)$$

$$rx=|x_1-x_0|$$

$$ry=|y_1-y_0|$$

$$rz=|z_1-x_0|. \quad (3.12)$$

2. A method as in claim 1, wherein said scanning-medium is selected from the group consisting of x-ray, magnetic field, ultrasound, laser, electrical current, visible light, ultraviolet light, infrared light, and radio frequency.

3. A method as in claim 1, wherein said scanning-medium is x-ray.

4. A method as in claim 1, wherein said supersampling comprises increasing a number of three-dimensional image representation units to reduce contribution of error per unit.

5. A method as in claim 1, wherein said supersampling comprises supersampling the original three-dimensional image to an isotropic space.

6. A method as in claim 1, wherein said object is located in a host body.

7. A method as in claim 6, wherein said object is a tissue mass.

8. A method as in claim 6, wherein said object is a growth.

9. A method as in claim 8, wherein said growth is a tumor.

10. A method as in claim 6, wherein said object is a pulmonary nodule.

11. A method as in claim 10, wherein said nodule is not greater than 10 mm in diameter.

12. A method as in claim 4, further comprising segmenting said object from other structures found proximal to said object and scanned with said object.

13. A method as in claim 12, wherein said segmenting comprises subtracting attached structures and other objects from said object.

14. A method as in claim 12, wherein said segmenting comprises subtracting said object from adjacent structures and other objects.

15. A method as in claim 12, wherein said segmenting further comprises restoring volumetric and surface characteristics of said object.

16. An article of manufacture for providing a three-dimensional image representation of an object, said object capable of detectably attenuating a signal resulting from scanning, the article of manufacture comprising:
  a machine readable-medium containing one or more instructions which, when executed by a processing device, cause the processing device to:
  scan said object with a scanning-medium capable of producing an original three-dimensional image of said object using original three-dimensional image representation units; and
  supersample said original three-dimensional image by representing the original three-dimensional image using three-dimensional image representation units comprising a higher spatial frequency than the original three-dimensional image representation units, the supersampling comprising recomputing voxel-values associated with the object in a higher spatial frequency coordinate space than a coordinate space associated with the original three-dimensional image representation units, thereby improving image resolution, the supersampling being performed using trilinear interpolation of each voxel value at location $(x_n,y_n,z_n)$, wherein each supersampled voxel value is defined in terms of eight nearest neighbors in an original space $v(x_i,y_j,z_k)$ associated with the original three-dimensional image using $$v(x_n, y_n, z_n) = \sum_{i=0}^{1}\sum_{j=0}^{1}\sum_{k=0}^{1} (1-dx_i/rx)(1-dy_j/ry)(1-dz_k/rz)v(x_i, y_j, z_k) \quad (3.14)$$

where $$i=[0|1]$$

$$j=[0|1]$$

$$k=[0|1], \quad (3.10)$$

$$dx_i=|x_n-x_i|$$

$$dy_j=|y_n-y_j|$$

$$dz_k=|z_n-x_k|, \text{ and} \quad (3.11)$$

$$rx=|x_1-x_0|$$

$$ry=|y_1-y_0|$$

$$rz=|z_1-x_0|. \quad (3.12)$$

17. An article of manufacture as in claim 16, wherein said scanning-medium is selected from the group consisting of x-ray, magnetic field, ultrasound, laser, electrical current, visible light, ultraviolet light, infrared light, and radio frequency.

18. An article of manufacture as in claim 17, wherein said scanning-medium is x-ray.

19. An article of manufacture as in claim 16, wherein said supersampling comprises increasing a number of three-dimensional image representation units to reduce contribution of error per unit.

20. An article of manufacture as in claim 16, wherein said supersampling comprises supersampling the original three-dimensional image to an isotropic space.

21. An article of manufacture as in claim 16, wherein said object is located in a host body.

22. An article of manufacture as in claim 21, wherein said object is a tissue mass.

23. An article of manufacture as in claim 21, wherein said object is a growth.

24. An article of manufacture as in claim 23, wherein said growth is a tumor.

25. An article of manufacture as in claim 21, wherein said object is a pulmonary nodule.

26. An article of manufacture as in claim 25, wherein said nodule is not greater than 10 mm in diameter.

27. An article of manufacture as in claim 20, further comprising segmenting said object from other structures found proximal said object and scanned with said object.

28. An article of manufacture as in claim 27, wherein said segmenting comprises subtracting attached structures and other objects from said object.

29. An article of manufacture as in claim 27, wherein said segmenting comprises subtracting said object from adjacent structures and other objects.

30. An article of manufacture as in claim 27, wherein said segmenting further comprises restoring volumetric and surface characteristics of said object.

31. A system for providing a three-dimensional image representation of an object, said object capable of detectably attenuating a signal resulting from scanning, comprising:

a scanner for scanning an object with a scanning-medium capable of producing an original three-dimensional image of an object using original three-dimensional image representation units; and a processor configured to supersample said original three-dimensional image by representing the original three-dimensional image using three-dimensional image representation units comprising a higher spatial frequency than the original three-dimensional image representation units, the supersampling comprising recomputing voxel-values associated with the object in a higher spatial frequency coordinate space than a coordinate space associated with the original three-dimensional image representation units, thereby improving image resolution, the supersampling being performed using trilinear interpolation of each voxel value at location $(x_n, y_n, z_n)$, wherein each supersampled voxel value is defined in terms of eight nearest neighbors in an original space $v(x_i, y_j, z_k)$ associated with the on mal three-dimensional image using $$v(x_n, y_n, z_n) = \sum_{i=0}^{1} \sum_{j=0}^{1} \sum_{k=0}^{1} (1 - dx_i/rx)(1 - dy_j/ry)(1 - dz_k/rz) v(x_i, y_j, z_k) \quad (3.14)$$

where $i = [0|1]$ $j = [0|1]$ $k = [0|1]$, (3.10)

$dx_i = |x_n - x_i|$ $dy_j = |y_n - y_j|$ $dz_k = |z_n - x_k|$, and (3.11)

$rx = |x_1 - x_0|$ $ry = |y_1 - y_0|$ $rz = |z_1 - x_0|$. (3.12)

32. A system as in claim 31, wherein said scanning-medium is selected from the group consisting of x-ray, magnetic field, ultrasound, laser, electrical current, visible light, ultraviolet light, infrared light, and radio frequency.

33. A system as in claim 32, wherein said scanning-medium is x-ray.

34. A system as in claim 31, wherein said supersampling of said processor comprises increasing a number of image representation units to reduce contribution of error per unit, whereby estimation of object boundary is improved.

35. A system as in claim 31, wherein said supersampling comprising supersampling the original three-dimensional image to an isotropic space.

36. A system as in claim 31, wherein said object is located in a host body.

37. A system as in claim 36, wherein said object is a tissue mass.

38. A system as in claim 36, wherein said object is a growth.

39. A system as in claim 38, wherein said growth is a tumor.

40. A system as in claim 36, wherein said object is a pulmonary nodule.

41. A system as in claim 40, wherein said nodule is not greater than 10 mm in diameter.

* * * * *